(12) United States Patent
Harrison et al.

(10) Patent No.: US 12,168,748 B2
(45) Date of Patent: Dec. 17, 2024

(54) TREATED GEOTHERMAL BRINE COMPOSITIONS WITH REDUCED CONCENTRATION OF SILICA, IRON AND LITHIUM

(71) Applicant: TERRALITHIUM LLC, Houston, TX (US)

(72) Inventors: Stephen Harrison, Benicia, CA (US); John Burba, III, Parker, CO (US)

(73) Assignee: Terralithium LLC, Houston, TX (US)

( * ) Notice: Subject to any disclaimer, the term of this patent is extended or adjusted under 35 U.S.C. 154(b) by 16 days.

(21) Appl. No.: 17/900,113

(22) Filed: Aug. 31, 2022

(65) Prior Publication Data

US 2023/0085171 A1    Mar. 16, 2023

Related U.S. Application Data

(63) Continuation of application No. 17/061,106, filed on Oct. 1, 2020, now Pat. No. 11,466,191, which is a
(Continued)

(51) Int. Cl.
*C09K 5/10* (2006.01)
*B01J 20/08* (2006.01)
(Continued)

(52) U.S. Cl.
CPC ............... *C09K 5/10* (2013.01); *B01J 20/08* (2013.01); *C01B 33/26* (2013.01); *C01D 3/04* (2013.01);
(Continued)

(58) Field of Classification Search
CPC . C09K 5/10; C09K 5/048; B01J 20/08; C01B 33/26; C01D 3/04; C01D 15/00;
(Continued)

(56) References Cited

U.S. PATENT DOCUMENTS 2,738,255 A    3/1956 Sullivan et al.
2,793,934 A *  5/1957 Cunningham ......... C01D 15/08
                                                    423/179.5
(Continued)

FOREIGN PATENT DOCUMENTS

BE    861527    6/1978
CN    1558793   12/2004
(Continued)

OTHER PUBLICATIONS

Iron (III) hydroxide CAS Registry Information, Terralithium, IPR2019-1601, Ex.-2003, 2003, 1 page.
(Continued)

*Primary Examiner* — Joseph W Drodge
(74) *Attorney, Agent, or Firm* — Kilpatrick Townsend & Stockton LLP

(57) ABSTRACT

This invention relates to treated geothermal brine compositions containing reduced concentrations of lithium, iron and silica compared to the untreated brines. Exemplary compositions contain concentration of lithium ranges from 0 to 200 mg/kg, concentration of silica ranges from 0 to 30 mg/kg, concentration of iron ranges from 0 to 300 mg/kg. Exemplary compositions also contain reduced concentrations of elements like arsenic, barium, and lead.

9 Claims, 55 Drawing Sheets

Related U.S. Application Data continuation of application No. 16/258,023, filed on Jan. 25, 2019, now Pat. No. 10,829,676, which is a continuation of application No. 14/190,032, filed on Feb. 25, 2014, now Pat. No. 10,190,030, which is a continuation-in-part of application No. 14/107,689, filed on Dec. 16, 2013, now Pat. No. 9,012,357, and a continuation-in-part of application No. 14/062,781, filed on Oct. 24, 2013, now abandoned, and a continuation-in-part of application No. 13/283,311, filed on Oct. 27, 2011, now Pat. No. 8,901,032, said application No. 14/107,689 is a continuation of application No. 12/972,728, filed on Dec. 20, 2010, now Pat. No. 8,637,428, said application No. 14/190,032 is a continuation-in-part of application No. 12/945,519, filed on Nov. 12, 2010, now Pat. No. 8,753,594, said application No. 14/062,781 is a continuation of application No. 12/822,580, filed on Jun. 24, 2010, now Pat. No. 8,597,521, said application No. 14/190,032 is a continuation-in-part of application No. 12/823,000, filed on Jun. 24, 2010, now Pat. No. 9,051,827, and a continuation-in-part of application No. 12/766,589, filed on Apr. 23, 2010, now Pat. No. 8,741,256.

(60) Provisional application No. 61/873,212, filed on Sep. 3, 2013, provisional application No. 61/408,452, filed on Oct. 29, 2010, provisional application No. 61/287,983, filed on Dec. 18, 2009, provisional application No. 61/261,114, filed on Nov. 13, 2009, provisional application No. 61/239,275, filed on Sep. 2, 2009, provisional application No. 61/220,000, filed on Jun. 24, 2009, provisional application No. 61/172,540, filed on Apr. 24, 2009.

(51) Int. Cl.

| | | |
|---|---|---|
| *C01B 33/26* | (2006.01) | |
| *C01D 3/04* | (2006.01) | |
| *C01D 15/00* | (2006.01) | |
| *C01F 7/46* | (2006.01) | |
| *C02F 1/26* | (2023.01) | |
| *C02F 1/28* | (2023.01) | |
| *C02F 1/42* | (2023.01) | |
| *C02F 1/52* | (2023.01) | |
| *C02F 1/56* | (2023.01) | |
| *C02F 1/66* | (2023.01) | |
| *C02F 1/74* | (2023.01) | |
| *C02F 9/00* | (2023.01) | |
| *C09K 5/04* | (2006.01) | |
| *C22B 3/14* | (2006.01) | |
| *C22B 13/00* | (2006.01) | |
| *C22B 19/00* | (2006.01) | |
| *C22B 26/00* | (2006.01) | |
| *E21B 43/25* | (2006.01) | |
| *C02F 5/00* | (2023.01) | |
| *C02F 101/10* | (2006.01) | |
| *C02F 101/20* | (2006.01) | |
| *C02F 103/06* | (2006.01) | |
| *C02F 103/08* | (2006.01) | |
| *C02F 103/10* | (2006.01) | |

(52) U.S. Cl.
CPC ............... *C01D 15/00* (2013.01); *C01F 7/46* (2013.01); *C02F 9/00* (2013.01); *C09K 5/048* (2013.01); *C22B 3/14* (2013.01); *C22B 13/00* (2013.01); *C22B 19/00* (2013.01); *C22B 26/00* (2013.01); *E21B 43/25* (2013.01); *C02F 1/26* (2013.01); *C02F 1/281* (2013.01); *C02F 1/42* (2013.01); *C02F 2001/5218* (2013.01); *C02F 1/5245* (2013.01); *C02F 1/56* (2013.01); *C02F 1/66* (2013.01); *C02F 1/74* (2013.01); *C02F 5/00* (2013.01); *C02F 2101/10* (2013.01); *C02F 2101/203* (2013.01); *C02F 2103/06* (2013.01); *C02F 2103/08* (2013.01); *C02F 2103/10* (2013.01); *C02F 2209/02* (2013.01); *C02F 2209/06* (2013.01); *Y02W 10/37* (2015.05)

(58) Field of Classification Search
CPC . C01D 1/28; C01D 1/34; C01D 15/02; C01D 15/08; C01D 7/22; C01D 7/26; C01D 7/28; C01F 7/46; C22B 13/00; C22B 19/00; C22B 26/00; C22B 3/00; C22B 3/04; C22B 3/14; C22B 3/20; C22B 3/22; C22B 3/24; C22B 3/42; C22B 3/44; C22B 26/12; E21B 43/25; E21B 43/00; C02F 1/26; C02F 1/281; C02F 1/42; C02F 1/5245; C02F 1/56; C02F 1/60; C02F 1/66; C02F 5/00; C02F 9/00; C02F 2001/5218; C02F 2101/10; C02F 2101/203; C02F 2103/06; C02F 2103/08; C02F 2103/10; C02F 2209/02; C02F 2209/06; C02F 1/74; Y02W 10/37; C01P 2006/80; Y02P 10/20
USPC ...................................... 423/179.5, 208, 421
See application file for complete search history.

(56) References Cited

U.S. PATENT DOCUMENTS

| | | |
|---|---|---|
| 2,964,381 A | 12/1960 | Goodenough |
| 3,112,171 A * | 11/1963 | Archambault .......... C22B 26/12 423/118.1 |
| 3,306,700 A | 2/1967 | Neipert et al. |
| 3,321,268 A | 5/1967 | Copson et al. |
| 3,523,751 A | 8/1970 | Burkert et al. |
| 3,655,332 A | 4/1972 | Smith, Jr. |
| 4,016,075 A | 4/1977 | Wilkins |
| 4,036,713 A | 7/1977 | Brown |
| 4,116,856 A | 9/1978 | Lee et al. |
| 4,116,858 A | 9/1978 | Lee et al. |
| 4,127,989 A | 12/1978 | Mickelson |
| 4,142,950 A | 3/1979 | Creamer et al. |
| 4,159,311 A | 6/1979 | Lee et al. |
| 4,209,369 A | 6/1980 | Seko et al. |
| 4,211,613 A | 7/1980 | Meckler |
| 4,221,767 A | 9/1980 | Lee et al. |
| 4,251,338 A | 2/1981 | Retallack |
| 4,251,521 A | 2/1981 | Kathawala |
| 4,271,131 A | 6/1981 | Brown et al. |
| 4,276,180 A | 6/1981 | Matson |
| 4,291,001 A | 9/1981 | Repsher et al. |
| 4,347,327 A | 8/1982 | Lee et al. |
| 4,348,295 A | 9/1982 | Burba, III |
| 4,348,296 A | 9/1982 | Bauman et al. |
| 4,348,297 A | 9/1982 | Bauman et al. |
| 4,376,100 A | 3/1983 | Lee et al. |
| 4,381,349 A | 4/1983 | Lee et al. |
| 4,405,461 A | 9/1983 | Rogers |
| 4,405,463 A | 9/1983 | Jost et al. |
| 4,405,595 A | 9/1983 | Yang et al. |
| 4,428,200 A | 1/1984 | McCabe et al. |
| 4,430,311 A | 2/1984 | Lee et al. |
| 4,437,995 A | 3/1984 | Rex |
| 4,461,714 A | 7/1984 | Burba, III |
| 4,472,362 A | 9/1984 | Burba, III |
| 4,477,367 A | 10/1984 | Burba, III |
| 4,492,083 A | 1/1985 | McCabe et al. |

(56) References Cited

U.S. PATENT DOCUMENTS

| | | |
|---|---|---|
| 4,500,434 A | 2/1985 | Jost et al. |
| 4,502,285 A | 3/1985 | Awerbuch et al. |
| 4,513,818 A | 4/1985 | Michels |
| 4,522,728 A | 6/1985 | Gallup et al. |
| 4,537,684 A | 8/1985 | Gallup et al. |
| 4,540,509 A | 9/1985 | Burba, III |
| 4,602,820 A | 7/1986 | Hard |
| 4,710,367 A | 12/1987 | Wong et al. |
| 4,727,167 A | 2/1988 | Burba, III et al. |
| 4,745,977 A | 5/1988 | Love et al. |
| 4,756,888 A | 7/1988 | Gallup et al. |
| 4,762,656 A | 8/1988 | Ballard et al. |
| 4,763,479 A | 8/1988 | Hoyer et al. |
| 4,765,912 A | 8/1988 | Totten |
| 4,765,913 A | 8/1988 | Featherstone |
| 4,775,592 A | 10/1988 | Akahane et al. |
| 4,776,961 A | 10/1988 | Gritters et al. |
| 4,830,766 A | 5/1989 | Gallup et al. |
| 5,015,541 A | 5/1991 | Evans |
| 5,135,652 A | 8/1992 | Boateng |
| 5,145,656 A | 9/1992 | Gallup et al. |
| 5,200,165 A | 4/1993 | Harper et al. |
| 5,219,550 A | 6/1993 | Brown et al. |
| 5,229,003 A | 7/1993 | Duyvesteyn |
| 5,240,687 A | 8/1993 | Gallup et al. |
| 5,244,491 A | 9/1993 | Brown et al. |
| 5,246,593 A | 9/1993 | Gallup |
| 5,246,684 A | 9/1993 | Brown et al. |
| 5,254,225 A | 10/1993 | Gallup |
| 5,358,700 A | 10/1994 | Brown et al. |
| 5,389,349 A | 2/1995 | Bauman et al. |
| 5,413,718 A | 5/1995 | Gallup et al. |
| 5,427,691 A | 6/1995 | Kuyucak et al. |
| 5,441,712 A | 8/1995 | Duyvesteyn et al. |
| 5,594,923 A | 1/1997 | Inoue et al. |
| 5,599,516 A | 2/1997 | Bauman et al. |
| 5,656,172 A | 8/1997 | Kitz et al. |
| 5,656,175 A | 8/1997 | Bossier |
| 5,711,019 A | 1/1998 | Tomczuk et al. |
| 5,761,865 A | 6/1998 | Schiedegger et al. |
| 5,833,844 A | 11/1998 | Leavitt |
| 5,904,653 A | 5/1999 | Hatfield et al. |
| 5,919,287 A | 7/1999 | Moreau |
| 5,932,644 A | 8/1999 | Fujii |
| 5,935,541 A | 8/1999 | Bonnet et al. |
| 5,939,043 A | 8/1999 | Yahagi |
| 5,951,843 A | 9/1999 | Itoh et al. |
| 5,993,759 A | 11/1999 | Wilkomirsky |
| 5,997,836 A | 12/1999 | Sato et al. |
| 6,017,500 A | 1/2000 | Mehta |
| 6,048,507 A | 4/2000 | Amouzegar et al. |
| 6,080,696 A | 6/2000 | Duke et al. |
| 6,103,422 A | 8/2000 | Kanai |
| 6,139,498 A | 10/2000 | Katsman et al. |
| 6,170,037 B1 | 1/2001 | Blumenau |
| 6,207,126 B1 | 3/2001 | Boryta et al. |
| 6,219,311 B1 | 4/2001 | Mitsuno |
| 6,280,693 B1 | 8/2001 | Bauman et al. |
| 6,458,184 B2 | 10/2002 | Featherstone |
| 6,517,701 B1 | 2/2003 | Geisler |
| 6,555,078 B1 | 4/2003 | Mehta |
| 6,592,832 B1 | 7/2003 | Friedrich et al. |
| 6,682,644 B2 | 1/2004 | Featherstone et al. |
| 6,761,865 B1 | 7/2004 | Gallup et al. |
| 6,770,187 B1 | 8/2004 | Putter et al. |
| 7,026,072 B2 | 4/2006 | Barker et al. |
| 7,060,238 B2 | 6/2006 | Saidi et al. |
| 7,330,914 B2 | 2/2008 | Inogai |
| 7,390,466 B2 | 6/2008 | Boryta et al. |
| 7,504,036 B2 | 3/2009 | Gottlieb et al. |
| 7,678,470 B2 | 3/2010 | Yoon et al. |
| 7,708,972 B2 | 5/2010 | Coustry et al. |
| 7,824,766 B2 | 11/2010 | Eplee et al. |
| 8,197,707 B2 | 6/2012 | Lefenfeld et al. |
| 8,287,829 B2 | 10/2012 | Harrison et al. |
| 8,309,043 B2 | 11/2012 | Alurralde et al. |
| 8,435,468 B2 | 5/2013 | Harrison et al. |
| 8,454,816 B1 | 6/2013 | Harrison et al. |
| 8,518,232 B1 | 8/2013 | Harrison et al. |
| 8,574,519 B2 | 11/2013 | Harrison et al. |
| 8,597,521 B1 | 12/2013 | Harrison |
| 8,637,428 B1 | 1/2014 | Harrison et al. |
| 8,741,256 B1 | 6/2014 | Harrison |
| 8,753,594 B1 | 6/2014 | Burba, III et al. |
| 8,901,032 B1 | 12/2014 | Harrison et al. |
| 9,012,357 B2 | 4/2015 | Harrison et al. |
| 9,051,827 B1 | 6/2015 | Harrison |
| 9,238,851 B1 | 1/2016 | Harrison et al. |
| 9,532,276 B1 | 12/2016 | Malhotra et al. |
| 9,644,126 B2 | 5/2017 | Harrison et al. |
| 9,644,866 B2 | 5/2017 | Harrison et al. |
| 9,650,555 B2 | 5/2017 | Harrison et al. |
| 9,995,121 B2 | 6/2018 | Harrison |
| 10,190,030 B2 | 1/2019 | Harrison et al. |
| 10,683,563 B2 | 6/2020 | Harrison et al. |
| 10,773,970 B2 * | 9/2020 | Harrison .................. C01D 9/04 |
| 10,829,676 B2 | 11/2020 | Harrison et al. |
| 11,174,532 B1 * | 11/2021 | Harrison .................. B01J 20/08 |
| 11,235,282 B2 * | 2/2022 | Harrison ............. B01D 61/002 |
| 2001/0000597 A1 | 5/2001 | Featherstone |
| 2001/0011645 A1 | 8/2001 | Silva et al. |
| 2001/0028871 A1 | 10/2001 | Harrison et al. |
| 2002/0018929 A1 | 2/2002 | Dai et al. |
| 2003/0026749 A1 | 2/2003 | Burrows et al. |
| 2003/0226761 A1 | 12/2003 | Featherstone et al. |
| 2003/0228251 A1 | 12/2003 | Boryta et al. |
| 2004/0005267 A1 * | 1/2004 | Boryta ...................... C01F 5/22 |
| | | 422/600 |
| 2004/0018135 A1 | 1/2004 | Adamson et al. |
| 2004/0142485 A1 | 7/2004 | Flower et al. |
| 2004/0149590 A1 | 8/2004 | Featherstone et al. |
| 2004/0264338 A1 | 12/2004 | Chou |
| 2005/0011753 A1 | 1/2005 | Jackson et al. |
| 2005/0087903 A1 * | 4/2005 | Farr ...................... C04B 28/344 |
| | | 425/375 |
| 2005/0162990 A1 | 7/2005 | Murata |
| 2005/0227147 A1 | 10/2005 | Kogetsu et al. |
| 2005/0265909 A1 | 12/2005 | Kajiya et al. |
| 2006/0093911 A1 | 5/2006 | Chiga et al. |
| 2006/0115396 A1 | 6/2006 | Boryta et al. |
| 2006/0115407 A1 | 6/2006 | Boryta et al. |
| 2006/0115410 A1 | 6/2006 | Boryta et al. |
| 2007/0114134 A1 | 5/2007 | Legg et al. |
| 2007/0148077 A1 | 6/2007 | Boryta et al. |
| 2007/0160516 A1 | 7/2007 | Boryta et al. |
| 2008/0068963 A1 | 3/2008 | Shikata |
| 2008/0221440 A1 | 9/2008 | Iddan et al. |
| 2008/0233042 A1 | 9/2008 | Boryta et al. |
| 2008/0249395 A1 | 10/2008 | Shachar et al. |
| 2008/0300589 A1 | 12/2008 | Paul et al. |
| 2009/0107230 A1 | 4/2009 | Okcay et al. |
| 2009/0214414 A1 | 8/2009 | Boryta et al. |
| 2009/0264777 A1 | 10/2009 | Markowitz et al. |
| 2009/0275827 A1 | 11/2009 | Aiken et al. |
| 2010/0000597 A1 | 1/2010 | Cousins |
| 2010/0099991 A1 | 4/2010 | Snyder |
| 2010/0165672 A1 | 7/2010 | Li et al. |
| 2010/0172554 A1 | 7/2010 | Kassab et al. |
| 2010/0204511 A1 | 8/2010 | Horton et al. |
| 2010/0221613 A1 | 9/2010 | Ueki et al. |
| 2010/0294719 A1 | 11/2010 | Polizzotti et al. |
| 2010/0301267 A1 | 12/2010 | Mao et al. |
| 2010/0312095 A1 | 12/2010 | Jenkins et al. |
| 2010/0312096 A1 | 12/2010 | Guttman et al. |
| 2010/0327223 A1 | 12/2010 | Zaghib et al. |
| 2011/0044882 A1 | 2/2011 | Buckley et al. |
| 2011/0123427 A1 | 5/2011 | Boryta et al. |
| 2011/0142316 A1 | 6/2011 | Wang et al. |
| 2011/0200508 A1 | 8/2011 | Harrison et al. |
| 2011/0224655 A1 | 9/2011 | Asirvatham et al. |
| 2011/0230896 A1 | 9/2011 | Wallace et al. |
| 2011/0319765 A1 | 12/2011 | Gertner et al. |
| 2012/0095357 A1 | 4/2012 | Tran |

(56) References Cited

U.S. PATENT DOCUMENTS

| | | | |
|---|---|---|---|
| 2012/0158011 | A1 | 6/2012 | Sandhu et al. |
| 2012/0165672 | A1 | 6/2012 | Hill et al. |
| 2012/0235084 | A1 | 9/2012 | Lefenfeld et al. |

FOREIGN PATENT DOCUMENTS

| | | |
|---|---|---|
| CN | 1558871 | 12/2004 |
| DE | 19631794 | 8/1997 |
| DE | 19809420 | 9/1999 |
| EP | 0094983 | 11/1983 |
| EP | 0103035 | 3/1984 |
| EP | 0117316 | 9/1984 |
| EP | 1900688 | 3/2008 |
| GB | 895690 | 5/1962 |
| GB | 2190668 | 11/1987 |
| JP | 0529963 | 1/1977 |
| JP | 5531437 | 3/1980 |
| JP | 05173932 | 7/1993 |
| JP | 2004057481 | 2/2004 |
| JP | 2004225144 | 8/2004 |
| JP | 3691027 | 8/2005 |
| JP | 2006318815 | 11/2006 |
| JP | 2007188548 | 7/2007 |
| JP | 2009046390 | 3/2009 |
| JP | 2009057278 | 3/2009 |
| RU | 2009714 | 3/1994 |
| RU | 1729027 | 11/1994 |
| RU | 2050330 | 12/1995 |
| RU | 2157338 | 10/2000 |
| RU | 2157388 | 10/2000 |
| RU | 2193008 | 11/2002 |
| RU | 2232714 | 7/2004 |
| RU | 2243157 | 12/2004 |
| WO | 9419280 | 9/1994 |
| WO | 9929624 | 6/1999 |
| WO | 0078675 | 12/2000 |
| WO | 03037794 | 5/2003 |
| WO | 03041857 | 5/2003 |
| WO | 2006094968 | 9/2006 |
| WO | 2009131628 | 10/2009 |

OTHER PUBLICATIONS

Iron (III) Oxyhydroxide CAS Registry Information, Terralithium, IPR2019-1601, Ex.-2004, 2004, 2 pages.

Volume I in the Videoconference Deposition of Darrell L. Gallup, Ph. D., Case No. IPR2019-01602, Case No. IPR2019-01603, May 18, 2020, 193 pages.

Volume II in the Videoconference Deposition of Darrell L. Gallup, PH.D., Case No. IPR2019-01602, Case No. IPR2019-01603, May 19, 2020, 159 pages.

U.S. Appl. No. 17/061,106, Non-Final Office Action mailed on Jan. 31, 2022, 9 pages.

U.S. Appl. No. 17/061,106, Notice of Allowance mailed on Jun. 2, 2022, 6 pages.

Abe et al., Synthetic Inorganic Ion-Exchange Materials, XXXIV. Selective Separation of Lithium from Seawater by Tin(IV) Antimonate Cation Exchanger, Hydrometallurgy, vol. 12, No. 1, Feb. 1984, pp. 83-93.

Berthold, Magmamax No. 1 Geothermal Brine Bulk Solids Precipitation Pilot Plant: Engineering Design, U.S. Bureau of Mines, Geothermal Minerals Group, Reno Metallurgy Research Center; Hazen Research, Inc., May 25, 1978, 43 pages.

Blake, Extracting Minerals from Geothermal Brines: A Literature Study, Twin Cities Metallurgy Research Center, Information Circular 8638, Mar. 16, 2020, 30 pages.

Bloomquist, Economic Benefits of Mineral Extraction from Geothermal Brines, Proceedings of the Sohn International Sympoium, vol. 6, Aug. 27-31, 2006, 6 pages.

Bouguerra et al., Equilibrium and Kinetic Studies of Adsorption of Silica onto Activated Alumina, Desalination, vol. 206, Nos. 1-3, Feb. 2007, pp. 141-146.

Bourcier et al., Recovery of Minerals and Metals from Geothermal Fluids, SME Annual Meeting, Sep. 8, 2005, 19 pages.

Chiba et al., Removal of Arsenic and Silicon Dioxide Contained in Industrial Waste Water, 1980, 19 pages.

Christopher et al., The Recovery and Separation of Mineral Values from Geothermal Brines, Hazen Research Inc., Jun. 12, 1975, 43 pages.

Cole et al., Zinc Solvent Extraction in the Process Industries, Mineral Processing and Extractive Metallurgy Review vol. 24, No. 2, Apr. 2003, pp. 91-137.

Dreisinger et al., New Developments in the Boleo Copper-Cobalt-Zinc-Manganese Project, SME Annual Meeting and Exhibit, Available online at: http://bajamining.com/_resources/Reports/alta_paper_2006_boleo_final.pdf, Jan. 2012, 14 pages.

Fujii, Dependence of Adoptive Capability for Lithium Ions in Molten Salt on Surface Properties of Activated Alumina, Journal of the Ceramic Society of Japan, vol. 102, No. 12, 1994, pp. 1097-1101.

Gallup et al., Heavy Metal Sulfide Scaling in a Production Well at the Salton Sea Geothermal Field, Geothermal Resources Council Transactions, vol. 14, Aug. 1990, pp. 1583-1590.

Gallup et al., Laboratory Investigation of Silica Removal from Geothermal Brines to Control Silica Scaling and Produce Usable Silicates, Applied Geochemistry, vol. 18, No. 10, Oct. 2003, pp. 1597-1612.

Gotfryd et al., Recovery of Zinc(II) from Acidic Sulfate Solutions, Simulation of Counter-Current Extraction Stripping Process, Physicochemical Problems of Mineral Processing, vol. 38, No. 1, 2004, pp. 113-120.

Hamzaoui et al., Lithium Recovery from Highly Concentrated Solutions: Response Surface Methodology (RSM) Process Parameters Optimizations, Hydrometallurgy, vol. 90, No. 1, Jan. 2008, pp. 1-7.

Hawash et al., Methodology for Selective Adsorption of Lithium Ions onto Polymeric Aluminum (III) Hydroxide, Journal of American Science, vol. 6, No. 11, 2010, pp. 301-309.

Isupov et al., Synthesis, Structure, Properties, and Application of Aluminium Hydroxide Intercalation Compounds, Chemistry for Sustainable Development, vol. 8, Aug. 4, 2000, pp. 121-127.

Kawai et al., Solvent Extraction of Zinc(II) and Manganese(II) with 5,10, 15,20-Tetraphenyl-21H,23H-Porphine (TPP) through the Metal Exchange Reaction of Lead(II)-TPP, Solvent Extraction Research and Development, vol. 7, Jan. 2000, pp. 36-43.

Ku et al., The Adsorption of Fluoride Ion from Aqueous Solution by Activated Alumina, Water, Air, and Soil Pollution, vol. 133, No. 1-4, Jan. 2002, pp. 349-360.

Lee et al., Solvent Extraction of Zinc from Strong Hydrochloric Acid Solution with Alamine 336, Bulletin of the Korean Chemical Society, vol. 30, No. 7, Jul. 20, 2009, pp. 1526-1530.

Maimonia Cementation Process for Minerals Recovery from Salton Sea Geothermal Brines, Lawrence Livermore Laboratory, Jan. 26, 1982, 26 pages.

Maimoni et al., Exploitation of EI Tatio Geothermal Field, ELC-Electroconsult, Mar. 12, 1975, 102 pages.

Maimoni, Minerals Recovery from Salton Sea Geothermal Brines: A Literature Review and Proposed Cementation Process, Geothermics, vol. 11, No. 4, 1982, pp. 239-258.

Manceau et al., Nanometer-Sized, Divalent-Mn, Hydrous Silicate Domains in Geothermal Brine Precipitates, American Mineralogist, vol. 90, Feb. 28, 2005, pp. 371-381.

Menzheres et al., Solid State Interaction of Aluminium Hydroxide with Lithium Salts, Journal of Materials Synthesis and Processing, vol. 7, No. 4, Jul. 1999, pp. 239-244.

Nan et al., Recovery of Metal Values from Spent Lithium Ion Batteries with Chemical Deposition and Solvent Extraction, Journal of Power Sources, vol. 152, Dec. 1, 2005, pp. 278-284.

Pascua et al., Uptake of Dissolved Arsenic During the Retrieval of Silica from Spent Geothermal Brine, Geothermics, vol. 36, No. 3, Jun. 2007, pp. 230-242.

Potapov et al., Experiments on Silica Precipitation from Hydrothermal Solution and Utilization of Precipitated Materials, Thirtieth Workshop on Geothermal Reservoir Engineering, Available Online

(56) References Cited

OTHER PUBLICATIONS at: https://pangea.stanford.edu/ERE/pdf/IGAstandard/SGW/2005/potapov.pdf, Jan. 31-Feb. 2, 2005, 9 pages.

Potapov, Silica Precipitation from Hydrothermal Solution, Journal of Mining Science, vol. 40, No. 1, Jan. 2004, pp. 101-112.

Prokuyev et al., Mutual Influence of Zinc (II) and Cadmium (II) in Case of Extraction from Lithium Chloride Solutions with Tributyl Phosphate, Zhurnal Neorganicheskoi Khimii, vol. 25, No. 12, 1980, 11 pages.

Pyman, The Point of Zero Charge of Amorphous Coprecipitates of Silica with Hydrous Aluminium or Ferric Hydroxide, Clay Minerals, vol. 14, No. 1, Mar. 1979, pp. 87-92.

Richter et al., Phase Relations of $CsClO_4$ and $CsBF_4$ in High Pressure, Journal of Solid State Chemistry, vol. 3, No. 2, May 1971, pp. 197-205.

Ryabtsev et al., Preparation of High-Purity Lithium Hydroxide Monohydrate from Technical-Grade Lithium Carbonate by Membrane Electrolysis, Russian Journal of Applied Chemistry, vol. 77, No. 7, Jul. 2004, pp. 1108-1116.

Ryabtsev et al., Sorption of Lithium from Brine onto Granular $LiCl•2Al(OH)_3•mH_2O$ Sorbent under Dynamic Conditions, Russian Journal of Applied Chemistry, vol. 75, No. 7, Jul. 2002, pp. 1069-1074.

Samoilov, Extracting Lithium from Waste Solutions of Chemico-Metallurgical Lithium Carbonate Production, Theoretical Foundations of Chemical Engineering, vol. 42, No. 5, Oct. 2008, pp. 714-717.

Schultze et al., Operation of a Mineral Recovery Unit on Brine from the Salton Sea Known Geothermal Resource Area, Bureau of Mines Report of Investigations 8680, vol. 505, 1982, 18 pages.

Schultze, Techniques for Recovering Metal Values from Postflash Geothermal Brines, Geothermal Resources Council Transactions, vol. 8, Aug. 1984, pp. 159-162.

Sheikholeslami et al., Silica and Metals Removal by Pretreatment to Prevent Fouling of Reverse Osmosis Membranes, Desalination, vol. 143, No. 3, Jun. 10, 2002, pp. 255-267.

Song et al., Temperature-Dependent Properties of $FePO_4$ Cathode Materials, Materials Research Bulletin, vol. 37, No. 7, Jun. 2002, pp. 1249-1257.

Toprakci et al., Fabrication and Electrochemical Characteristics of $LiFePO_4$ Powders for Lithium Ion Batteries, KONA Powder and Partulces Journal No. 28, Hosokawa Powder Technology Foundation, Jul. 27, 2010, pp. 50-73.

Umetani et al., Solvent Extractions of Lithium and Sodium with 4-Benzoyl or 4-Perfluoracyl-5-Pyrazolone and Topo, Talanta, vol. 34, No. 9, Sep. 1987, pp. 779-782.

Wilcox et al., Selective Lithium Ion Extraction with Chromogenic Monoaza Crown Ethers, Analytica Chimica Acta, vol. 245, 1991, pp. 235-242.

Yang et al., Optimization of Operation Conditions for Extracting Lithium Ions from Calcium Chloride Type Oilfield Brine, International Journal of Minerals, Metallurgy, and Materials, vol. 19, No. 4, Apr. 2012, pp. 290-294.

Yeager et al., Conductance Study of Ion Pairing of Alkali Metal Tetrafluoroborates and Hexaflurophosphates in Acetonitrile, Department of Chemistry, University of Calgary, Calgary, Alberta T2N IN4, Jun. 25, 1975, pp. 3448-3451.

Yokoyama et al., A Study of the Alumina-Silica Gel Adsorbent for the Removal of Silicic Acid from Geothermal Water: Increase in Adsorption Capacity of the Adsorbent due to Formation of Amorphous Aluminosilicate by Adsorption of Silicic Acid, Journal of Colloid and Interface Science, vol. 252, No. 1, Aug. 1, 2002, pp. 1-5.

\* cited by examiner

TREATED GEOTHERMAL BRINE COMPOSITIONS WITH REDUCED CONCENTRATION OF SILICA, IRON AND LITHIUM

CROSS-REFERENCE TO RELATED APPLICATIONS

This application is a continuation application of United States Patent Application No. 17/061,106, filed Oct. 1, 2020, which is a continuation of U.S. patent application Ser. No. 16/258,023, filed Jan. 25, 2019, which is a continuation of U.S. patent application Ser. No. 14/190,032, filed on Feb. 25, 2014, which claims priority to U.S. Provisional U.S. Provisional Patent Application Ser. No. 61/873,212, filed on Sep. 3, 2013; U.S. patent application Ser. No. 14/190,032 claims priority to and is a Continuation-in-Part of U.S. patent application Ser. No. 14/062,781, filed on Oct. 24, 2013, which is a Continuation Application of U.S. Pat. No. 8,597,521 issued on Dec. 3, 2013, which claims priority to U.S. Provisional Patent Application Ser. No. 61/220,000, filed on Jun. 24, 2009; U.S. patent application Ser. No. 14/190,032 also claims priority to and is a Continuation-in-Part of U.S. patent application Ser. No. 12/823,000, filed on Jun. 24, 2010, which is now U.S. Pat. No. 9,051,827, which claims priority to U.S. Provisional Patent Application Ser. No. 61/239,275, filed on Sep. 2, 2009; U.S. patent application Ser. No. 14/190,032 claims priority to and is a Continuation-in-Part of U.S. patent application Ser. No. 12/766,589, filed on Apr. 23, 2010, which is now U.S. Pat. No. 8,741,256, which claims priority to U.S. Provisional Patent Application Ser. No. 61/172,540, filed on Apr. 24, 2009; U.S. patent application Ser. No. 14/190,032 claims priority to and is a Continuation-in-Part of U.S. patent application Ser. No. 12/945,519, filed on Nov. 12, 2010, which is now U.S. Pat. No. 8,753,594, which claims priority to U.S. Provisional Patent Application Ser. No. 61/261,114, filed on Nov. 13, 2009; U.S. patent application Ser. No. 14/190,032 is a Continuation-in-Part of Ser. No. 14/107,689, filed on Dec. 16, 2013, which is now U.S. Pat. No. 9,012,357, which claims priority to and is a Continuation of U.S. patent application Ser. No. 12/972,728, filed on Dec. 20, 2010, which is now U.S. Pat. No. 8,637,428, issued on Jan. 28, 2014, which claims priority to U.S. Provisional Patent Application Ser. No. 61/287,983, filed on Dec. 18, 2009; U.S. patent application Ser. No. 14/190,032 claims priority to and is a Continuation-in-Part of U.S. patent application Ser. No. 13/283,311, filed on Oct. 27, 2011, which is now U.S. Pat. No. 8,901,032 which claims priority to U.S. Provisional Patent Application Ser. No. 61/408,452, filed on Oct. 29, 2010, all of which are incorporated herein by reference in their entireties.

TECHNICAL FIELD OF THE INVENTION

This invention generally relates to treated brine compositions with reduced concentrations of silica, iron, and lithium. These brine compositions can be utilized for preventing scale buildup in geothermal power plants and for improving injectivity of geothermal and other brines. Certain embodiments of the invention also relate to the geothermal brine compositions from which silica has been selectively removed. More particularly, certain embodiments of the invention also relate to geothermal brine compositions from which silica and/or iron have been selectively removed. Further embodiments relate to treated brine compositions with reduced concentrations of silica, iron, and/or lithium that may also be used for recovery of other metals, including zinc, manganese, rubidium, cesium, and potassium.

BACKGROUND

A number of brine sources exist naturally. For instance, brine sources include brine deposits like the Salar de Atacama in Chile, Silver Peak Nevada, Salar de Uyuni in Bolivia, or the Salar de Hombre Muerte in Argentina. Other common brine sources are geothermal, oilfield, Smackover, and relict hydrothermal brines. These brines, however, have not previously been commercially exploited very well.

Geothermal brines are of particular interest for a variety of reasons. First, geothermal brines provide a source of power due to the fact that hot geothermal pools are stored at high pressure underground, which when released to atmospheric pressure, can provide a flash-steam. The flash-steam can be used, for example, to run a power plant. Additionally, geothermal brines contain useful elements, which can be recovered and utilized for secondary processes. In some geothermal waters and brines, binary processes can be used to heat a second fluid to provide steam for the generation of electricity without the flashing of the geothermal brine.

One problem associated with geothermal brines when utilized for the production of electricity results from scaling and deposition of solids. Silica and other solids that are dissolved within the geothermal brine precipitate out during all stages of brine processing, particularly during the cooling of a geothermal brine, and may eventually result in fouling of the injection wells or processing equipment.

It is known that geothermal brines can include various metal ions, particularly alkali and alkaline earth metals, as well as silica, iron, lead, silver, and zinc, in varying concentrations, depending upon the source of the brine. Recovery of these metals is potentially important to the chemical, pharmaceutical, and electronic industries. Typically, the economical recovery of metals from natural brines, which may vary widely in composition, depends not only on the specific concentration of the desired metal, but also upon the concentrations of interfering ions, particularly silica, calcium, and magnesium, because the presence of the interfering ions will increase recovery costs, as additional steps must be taken to remove the interfering ions. Economical recovery also depends upon the commercial cost and availability of the desired metal already present in the relevant market.

Silica is known to deposit in piping as scale deposits, typically as a result of the cooling of a geothermal brine. Frequently, geothermal brines are near saturation with respect to the silica concentration and upon cooling; deposition occurs because of the lower solubilities at lower temperatures. This is combined with the polymerization of silica and co-precipitation with other species, particularly metals. This is seen in geothermal power stations, and is particularly true for amorphous silica/silicates. Additionally, silica is a known problem in reverse osmosis desalination plants. Thus, removal of silica from low concentration brines may help to eliminate these scale deposits, and thus reduce costs and improve efficiency of facilities that use and process brines.

Known methods for the removal of silica from geothermal brines include the use of a geothermal brine clarifier for the removal and recovery of silica solids that may be precipitated with the use of various seed materials, or the use of compounds that absorb silica, such as magnesium oxide, magnesium hydroxide, or magnesium carbonate. In addition to a less than complete recovery of silicon from brines, prior methods also suffer in that they typically remove ions and compounds other than just silica and silicon containing compounds.

Geothermal brines can be flashed via several processes. There is the conventional method to produce steam for power. There have also been modifications to the conventional dual direct flash evaporation method to include multiple flash evaporation stages.

One modification to the conventional dual direct flash method is the crystallizer reactor clarifier process. In the crystallizer reactor clarifier process, a reactor clarifier precipitates components that can cause scaling, such as iron rich amorphous silica, and removes suspended particles from the brines before injection into the flash process. The process also seeds the brine in the flash vessels to reduce scale formation. Thus, when precipitation occurs it is more likely that it will occur on the seed slurry than on the metal surfaces of the flash apparatus.

There is also the pH modification process that differs from the crystallizer reactor clarifier process. In the pH modification process, compounds that cause scaling are maintained in solution. By lowering the pH of the brine solution, for example, as low as 3.0, compounds that typically cause scaling on the flash apparatus are maintained in solution. By lowering pH and modifying pressures, the compounds are maintained in solution and scaling is prevented or reduced.

Thus, although conventional methods employed in the processing of ores and brines can remove some of the silica present in silica containing solutions and brines, there exists a need to develop methods that are selective for the removal of silica from brines and other silica containing solutions at high yields to produce treated compositions with reduced silica concentrations. Additionally, once certain components are removed, the geothermal brine compositions may be injected into a geothermal reservoir, such as into the original reservoir. Compositions for improving injectivity of such brines will improve the efficiency of the process, as improved injectivity will reduce the costs and time associated with cleaning the equipment used for injecting such brines and will also increase long-term permeable flow. While current practices at geothermal plants have focused on reduction of scaling on the apparatus associated with the flash process, there is still a need to reduce scaling after the processing of the brine for energy. The current practice at Salton Sea geothermal plants is to clean injection wells on an annual basis. This is a significant expense as there are typically multiple wells (i.e., three wells) to clean out. This is typically done by hydroblasting or acid treatment. After a certain time, typically three years, this is no longer effective and portions of wells must be routed out to remove blockages, which is expensive and time consuming. The routing process can usually be repeated twice before the wells have to be completely replaced. Thus, compositions and processes that would reduce fouling and prolong the time between required cleanings would be of substantial benefit.

SUMMARY OF THE INVENTION

Exemplary embodiments of the present invention include treated geothermal brine compositions. In certain embodiments, the composition contains a treated geothermal brine having a concentration of silica ranging from 0 to 80 mg/kg and a concentration of iron ranging from 0 to 300 mg/kg. In certain embodiments, the composition contains a treated geothermal brine having a concentration of silica ranging from 0 to 50 mg/kg and a concentration of iron ranging from 0 to 300 mg/kg.

In certain embodiments, the composition contains treated geothermal brine having a concentration of lithium ranging from 0 to 200 mg/kg, a concentration of silica ranging from 0 to 80 mg/kg, and a concentration of iron ranging from 0 to 300 mg/kg. In certain embodiments, the composition contains a treated geothermal brine having a concentration of lithium ranging from 0 to 200 mg/kg, a concentration of silica ranging from 0 to 30 mg/kg, and a concentration of iron ranging from 0 to 300 mg/kg. In certain embodiments, the treated geothermal brine composition has a concentration of lithium less than about 150 mg/kg, a concentration of silica less than about 30 mg/kg, and a concentration of iron less than about 300 mg/kg. In certain embodiments, the treated geothermal brine composition has a concentration of lithium less than about 100 mg/kg, a concentration of silica less than about 30 mg/kg, and a concentration of iron less than about 300 mg/kg. In certain embodiments, the treated geothermal brine composition has a concentration of lithium less than about 50 mg/kg, a concentration of silica less than about 30 mg/kg, and a concentration of iron less than about 300 mg/kg. In certain embodiments, the treated geothermal brine composition has a concentration of lithium less than about 30 mg/kg, a concentration of silica less than about 30 mg/kg, and a concentration of iron less than about 300 mg/kg. In certain embodiments, the treated geothermal brine composition has a concentration of lithium less than about 50 mg/kg, a concentration of silica less than about 30 mg/kg, and a concentration of iron less than about 200 mg/kg. In certain embodiments, the treated geothermal brine composition has a concentration of lithium less than about 20 mg/kg, a concentration of silica less than about 20 mg/kg, and a concentration of iron less than about 200 mg/kg. In certain embodiments, the treated geothermal brine composition has a concentration of lithium less than about 20 mg/kg, a concentration of silica less than about 20 mg/kg, and a concentration of iron is less than about 100 mg/kg. In certain embodiments, the treated geothermal brine composition has a concentration of lithium less than about 20 mg/kg, a concentration of silica less than about 10 mg/kg, and a concentration of iron less than about 100 mg/kg. In certain embodiments, the treated geothermal brine composition has a concentration of lithium less than about 20 mg/kg, a concentration of silica less than about 10 mg/kg, and a concentration of iron less than about 50 mg/kg. In certain embodiments, the treated geothermal brine composition has a concentration of lithium less than about 20 mg/kg, a concentration of silica less than about 10 mg/kg, and a concentration of iron less than about 10 mg/kg. In certain embodiments, the treated geothermal brine composition has a concentration of lithium less than about 10 mg/kg, a concentration of silica less than about 5 mg/kg, and a concentration of iron less than about 5 mg/kg.

In other aspects, the invention provides methods of using the treated geothermal brine compositions described herein. For example without limitations, the treated geothermal brine compositions can be supplied to a process for mineral extraction. For example without limitations, the minerals that can be extracted selectively or in combination from the treated geothermal brine include manganese, potassium, rubidium, cesium, phosphates, zinc, and lead. Also disclosed are exemplary embodiments of methods of using the treated geothermal brine compositions described herein by injecting the treated geothermal brine compositions into a geothermal reservoir.

In other aspects, the invention provides Salton Sea geothermal brine compositions containing a concentration of lithium ranging from 0 to 200 mg/kg, a concentration of silica ranging from 0 to 80 mg/kg and a concentration of iron ranging from 0 to 300 mg/kg. In other aspects, the invention provides Salton Sea geothermal brine compositions containing a concentration of lithium ranging from 0 to 200 mg/kg, a concentration of silica ranging from 0 to 30 mg/kg and a concentration of iron ranging from 0 to 100 mg/kg. In other aspects, the invention provides Salton Sea geothermal brine compositions containing a concentration of lithium ranging from 0 to 20 mg/kg, a concentration of silica ranging from 0 to 10 mg/kg and a concentration of iron ranging from 0 to 10 mg/kg. In another embodiment, the invention provides a geothermal brine composition having a pH of about 4.0 to about 6.0 that has less than 20 ppm by weight of lithium, less than 20 ppm by weight of silica, less than 20 ppm by weight of iron, and further wherein the geothermal brine composition has total suspended solids ("TSS") of less than 10 ppm.

BRIEF DESCRIPTION OF THE DRAWINGS

So that the manner in which the features and benefits of the invention, as well as others which will become apparent, may be understood in more detail, a more particular description of the embodiments of the invention may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

DETAILED DESCRIPTION OF THE INVENTION

Figure 1:
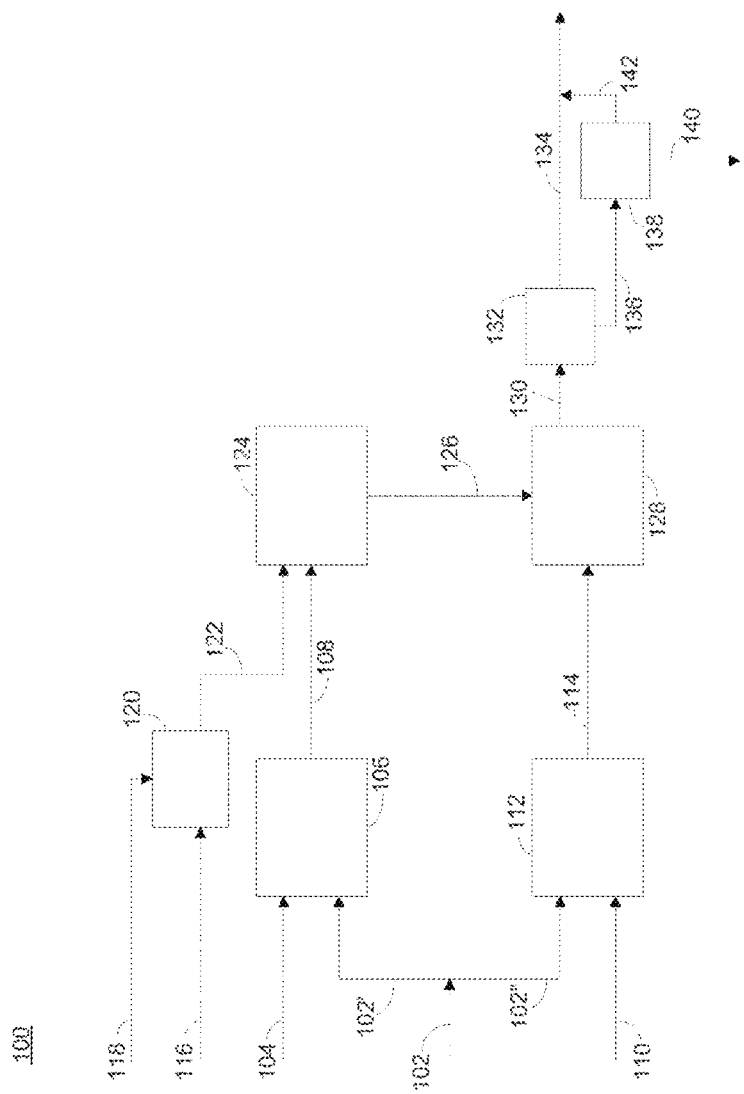
FIG. 1 is an illustration of an apparatus for the removal of silica from a silica containing brine according to an embodiment of the present invention.

As used herein, the following terms shall have the following meanings.

As used herein, "brine" or "brine solution" refers to any aqueous solution that contains a substantial amount of dissolved metals, such as alkali and/or alkaline earth metal salt(s) in water, wherein the concentration of salts can vary from trace amounts up to the point of saturation. Generally, brines suitable for the methods described herein are aqueous solutions that may include alkali or alkaline earth metal chlorides, bromides, sulfates, hydroxides, nitrates, and the like, as well as natural brines. In certain brines, other metals like lead, manganese, and zinc may be present. Exemplary elements present in the brines can include sodium, potassium, calcium, magnesium, lithium, strontium, barium, iron, boron, silica, manganese, chlorine, zinc, aluminum, antimony, chromium, cobalt, copper, lead, arsenic, mercury, molybdenum, nickel, silver, thallium, vanadium, and fluorine, although it is understood that other elements and compounds may also be present. Brines can be obtained from natural sources, such as Chilean brines or Salton Sea brines, geothermal brines, Smackover brines, sea water, mineral brines (e.g., lithium chloride or potassium chloride brines), alkali metal salt brines, and industrial brines, for example, industrial brines recovered from ore leaching, mineral dressing, and the like. The present invention is also equally applicable to artificially prepared brine or salt solutions. Brines include continental brine deposits, geothermal brines, and waste or byproduct streams from industrial processes, Smackover brines, synthetic brines, and other brines resulting from oil and gas production. In some embodiments, the brines are brines from which energy has already been extracted. For instance, brines used herein include brines from which a power plant has already extracted energy through methods such as flashing.

The term "geothermal brine" refers to a saline solution that has circulated through the crustal rocks in areas of high heat flow and has become enriched in substances leached from those rocks. Geothermal brines, such as those found in the Salton Sea geothermal fields, can include many dissolved metal salts, including alkali, alkaline earth, and transition metal salts.

The term "Salton Sea brine" refers to geothermal brines obtained from the geothermal fields in San Diego County, Imperial County, and Riverside County, in California, USA.

The term "treated" in reference to a brine (e.g., "treated brine" or "treated geothermal brine") refers to brines that have been processed such that the concentration of at least one metal or elemental component has been reduced in the brine. For instance, a brine in which the concentration of silica and iron has been reduced is a treated brine, also referred to as reduced silica and iron brine.

The term "concentrated" in reference to a brine (e.g., "concentrated brine" or "concentrated geothermal brine") refers to brines that have reduced water content compared to the original brine. The reduced water content brine may be subsequently diluted post-concentration to prevent salt precipitation. In some embodiments, concentrated brines can result from evaporative processes.

The term "synthetic brine" refers to a brine that has been prepared such that it simulates a naturally occurring brine. For instance, a synthetic brine can be prepared in an attempt to simulate the brine composition of various geothermal brine reservoirs found in the Salton Sea region (Calif., U.S.). Generally, the synthetic brine simulating a Salton Sea geothermal brine has a composition of about 280 ppm lithium, 63,000 ppm sodium, 20,000 ppm potassium, 33,000 ppm calcium, 130 ppm strontium, 700 ppm zinc, 1700 ppm iron, 450 ppm boron, 50 ppm sulfate, 3 ppm fluoride, 450 ppm ammonium ion, 180 ppm barium, 160 ppm silica (reported as $SiO_2$), and 180,000 ppm chloride. Additional elements, such as manganese, aluminum, antimony, bromine, chromium, cobalt, copper, fluorine, lead, arsenic, mercury, molybdenum, nickel, silver, thallium, and vanadium, may also be present in the brine.

The term "lithium salts" can include lithium nitrates, lithium sulfates, lithium bicarbonate, lithium halides (particularly chlorides and bromides), and acid salts. For example, the Salton Sea brines have lithium chlorides.

As used herein, precipitates of iron oxides include iron oxides, iron hydroxides, iron oxide-hydroxides and iron oxyhydroxides.

Exemplary embodiments of the present invention include treated geothermal brine compositions. In an embodiment, the concentration of silica is less than about 5 mg/kg, and the iron concentration is less than about 10 mg/kg in the treated geothermal brine composition. In another embodiment, the concentration of silica is less than about 5 mg/kg, and the iron concentration is less than about 100 mg/kg. In another embodiment, the concentration of silica is less than about 10 mg/kg, and the iron concentration is less than about 100 mg/kg. In another embodiment, the concentration of silica is less than about 20 mg/kg, and the iron concentration is less than about 100 mg/kg. In another embodiment, the concentration of silica is less than about 10 mg/kg, and the iron concentration is less than about 200 mg/kg. In another embodiment, the concentration of silica is less than about 20 mg/kg, and the iron concentration is less than about 200 mg/kg. In another embodiment, the concentration of silica is less than about 30 mg/kg, and the iron concentration is less than about 300 mg/kg. In another embodiment, the concentration of silica is less than about 40 mg/kg, and the iron concentration is less than about 300 mg/kg. In another embodiment, the concentration of silica is less than about 40 mg/kg, and the iron concentration is less than about 200 mg/kg. In another embodiment, the concentration of silica is less than about 60 mg/kg, and the iron concentration is less than about 300 mg/kg. In another embodiment, the concentration of silica is less than about 70 mg/kg, and the iron concentration is less than about 300 mg/kg.

In certain embodiments, the composition contains treated geothermal brine having a concentration of lithium ranging from 0 to 200 mg/kg, a concentration of silica ranging from 0 to 80 mg/kg, and a concentration of iron ranging from 0 to 300 mg/kg. In certain embodiments, the composition contains a treated geothermal brine having a concentration of lithium ranging from 0 to 200 mg/kg, a concentration of silica ranging from 0 to 30 mg/kg, and a concentration of iron ranging from 0 to 300 mg/kg. In certain embodiments, the treated geothermal brine composition has a concentration of lithium less than about 150 mg/kg, a concentration of silica less than about 30 mg/kg, and a concentration of iron less than about 300 mg/kg. In certain embodiments, the treated geothermal brine composition has a concentration of lithium less than about 100 mg/kg, a concentration of silica less than about 30 mg/kg, and a concentration of iron less than about 300 mg/kg. In certain embodiments, the treated geothermal brine composition has a concentration of lithium less than about 50 mg/kg, a concentration of silica less than about 30 mg/kg, and a concentration of iron less than about 300 mg/kg. In certain embodiments, the treated geothermal brine composition has a concentration of lithium less than about 30 mg/kg, a concentration of silica less than about 30 mg/kg, and a concentration of iron less than about 300 mg/kg. In certain embodiments, the treated geothermal brine composition has a concentration of lithium less than about 50 mg/kg, a concentration of silica less than about 30 mg/kg, and a concentration of iron less than about 200 mg/kg. In certain embodiments, the treated geothermal brine composition has a concentration of lithium less than about 20 mg/kg, a concentration of silica less than about 20 mg/kg, and a concentration of iron less than about 200 mg/kg. In certain embodiments, the treated geothermal brine composition has a concentration of lithium less than about 20 mg/kg, a concentration of silica less than about 20 mg/kg, and a concentration of iron is less than about 100 mg/kg. In certain embodiments, the treated geothermal brine composition has a concentration of lithium less than about 20 mg/kg, a concentration of silica less than about 10 mg/kg, and a concentration of iron less than about 100 mg/kg. In certain embodiments, the treated geothermal brine composition has a concentration of lithium less than about 20 mg/kg, a concentration of silica less than about 10 mg/kg, and a concentration of iron less than about 50 mg/kg. In certain embodiments, the treated geothermal brine composition has a concentration of lithium less than about 20 mg/kg, a concentration of silica less than about 10 mg/kg, and a concentration of iron less than about 10 mg/kg. In certain embodiments, the treated geothermal brine composition has a concentration of lithium less than about 10 mg/kg, a concentration of silica less than about 5 mg/kg, and a concentration of iron less than about 5 mg/kg.

In other aspects, the invention provides methods of using the treated geothermal brine compositions described herein. For example without limitations, the treated geothermal brine compositions can be supplied to a process for mineral extraction. For example without limitations, the minerals that can be extracted selectively or in combination from the treated geothermal brine include manganese, potassium, rubidium, cesium, phosphates, zinc, and lead. Also disclosed are exemplary embodiments of methods of using the treated geothermal brine compositions described herein by injecting the treated geothermal brine compositions into a geothermal reservoir.

In other aspects, the invention provides Salton Sea geothermal brine compositions containing a concentration of lithium ranging from 0 to 200 mg/kg, a concentration of silica ranging from 0 to 80 mg/kg and a concentration of iron ranging from 0 to 300 mg/kg. In other aspects, the invention provides Salton Sea geothermal brine compositions containing a concentration of lithium ranging from 0 to 200 mg/kg, a concentration of silica ranging from 0 to 30 mg/kg and a concentration of iron ranging from 0 to 100 mg/kg. In other aspects, the invention provides Salton Sea geothermal brine compositions containing a concentration of lithium ranging from 0 to 20 mg/kg, a concentration of silica ranging from 0 to 10 mg/kg and a concentration of iron ranging from 0 to 10 mg/kg.

In another embodiment, the treated geothermal brine compositions described herein have a concentration of arsenic ranging from 0 to 7 mg/kg. In another embodiment, the treated geothermal brine compositions described herein have a concentration of barium ranging from 0 to 200 mg/kg. In another embodiment, the treated geothermal brine compositions described herein have a concentration of lead ranging from 0 to 100 mg/kg. In another embodiment, the treated geothermal brine compositions described herein are Salton Sea brines. In certain embodiments, the treated geothermal brine is a concentrated geothermal brine.

Also disclosed are exemplary embodiments of treated Salton Sea geothermal brine compositions containing a concentration of silica ranging from 0 to 30 mg/kg and a concentration of iron ranging from 0 to 300 mg/kg. In another embodiment, the treated geothermal brine compositions described herein have a concentration of arsenic ranging from 0 to 7 mg/kg. In another embodiment, the treated geothermal brine compositions described herein have a concentration of barium ranging from 0 to 200 mg/kg. In another embodiment, the treated geothermal brine compositions described herein have a concentration of lead ranging from 0 to 100 mg/kg. In another embodiment, the treated geothermal brine compositions described herein have a concentration of arsenic less than about 7 mg/kg, barium less than about 200 mg/kg, and lead less than about 100 mg/kg. In another embodiment, the invention provides a geothermal brine composition having a pH of about 4.0 to about 6.0 that has less than 20 ppm by weight of silica, less than 20 ppm by weight of iron, and further wherein the geothermal brine composition has TSS of less than 10 ppm.

In some embodiments, the treated geothermal brine has a concentration of silica less than about 80 mg/kg. In some embodiments, the treated geothermal brine has a concentration of silica less than about 30 mg/kg. In some embodiments, the treated geothermal brine has a concentration of silica that is less than about 25 mg/kg. In some embodiments, the treated geothermal brine has a concentration of silica that is less than about 20 mg/kg. In some embodiments, the treated geothermal brine has a concentration of silica that is less than about 15 mg/kg. In some embodiments, the treated geothermal brine has a concentration of silica that is less than about 12 mg/kg. In some embodiments, the treated geothermal brine has a concentration of silica that is less than about 10 mg/kg. In some embodiments, the treated geothermal brine has a concentration of silica that is less than about 8 mg/kg. In some embodiments, the treated geothermal brine has a concentration of silica that is less than about 5 mg/kg. In some embodiments, the treated geothermal brine has a concentration of silica that is less than about 1 mg/kg. Exemplary embodiments of the present invention include treated geothermal brine compositions with reduced concentrations of silica. In an embodiment, the concentration of silica ranges from 0 to 5 mg/kg. In another embodiment, the concentration of silica ranges from 0 to 10 mg/kg. In another embodiment, the concentration of silica ranges from 0 to 15 mg/kg. In another embodiment, the concentration of silica ranges from 0 to 20 mg/kg. In another embodiment, the concentration of silica ranges from 0 to 25 mg/kg. In another embodiment, the concentration of silica ranges from 0 to 30 mg/kg. In another embodiment, the concentration of silica ranges from 0 to 35 mg/kg. In another embodiment, the concentration of silica ranges from 0 to 40 mg/kg. In another embodiment, the concentration of silica ranges from 0 to 45 mg/kg. In another embodiment, the concentration of silica ranges from 0 to 50 mg/kg. In another embodiment, the concentration of silica ranges from 0 to 55 mg/kg. In another embodiment, the concentration of silica ranges from 0 to 60 mg/kg. In another embodiment, the concentration of silica ranges from 0 to 65 mg/kg. In another embodiment, the concentration of silica ranges from 0 to 70 mg/kg. In another embodiment, the concentration of silica ranges from 0 to 75 mg/kg. In another embodiment, the concentration of silica ranges from 0 to 80 mg/kg. In another embodiment, the concentration of silica ranges from 0 to 85 mg/kg. In another embodiment, the concentration of silica ranges from 0 to 90 mg/kg. In another embodiment, the concentration of silica ranges from 0 to 95 mg/kg. In another embodiment, the concentration of silica ranges from 0 to 100 mg/kg.

In some embodiments, the treated geothermal brine has a concentration of iron that ranges from 0 to 300 mg/kg. In some embodiments, the treated geothermal brine has a concentration of iron that is less than about 300 mg/kg. In some embodiments, the treated geothermal brine has a concentration of iron that is less than about 250 mg/kg. In some embodiments, the treated geothermal brine has a concentration of iron that is less than about 200 mg/kg. In some embodiments, the treated geothermal brine has a concentration of iron that is less than about 100 mg/kg. In some embodiments, the treated geothermal brine has a concentration of iron that is less than about 75 mg/kg. In some embodiments, the treated geothermal brine has a concentration of iron that is less than about 50 mg/kg. In some embodiments, the treated geothermal brine has a concentration of iron that is less than about 40 mg/kg. In some embodiments, the treated geothermal brine has a concentration of iron that is less than about 30 mg/kg. In some embodiments, the treated geothermal brine has a concentration of iron that is less than about 20 mg/kg. In some embodiments, the treated geothermal brine has a concentration of iron that is less than about 10 mg/kg. In some embodiments, the treated geothermal brine has a concentration of iron that is less than about 5 mg/kg. In some embodiments, the treated geothermal brine has a concentration of iron that is less than about 1 mg/kg.

Exemplary embodiments of the present invention include treated geothermal brine compositions with reduced concentrations of lithium. In an embodiment, the concentration of lithium ranges from 0 to 200 mg/kg. In another embodiment, the concentration of lithium ranges from 0 to 5 mg/kg. In another embodiment, the concentration of lithium ranges from 0 to 10 mg/kg. In another embodiment, the concentration of lithium ranges from 0 to 15 mg/kg. In another embodiment, the concentration of lithium ranges from 0 to 20 mg/kg. In another embodiment, the concentration of lithium ranges from 0 to 25 mg/kg. In another embodiment, the concentration of lithium ranges from 0 to 30 mg/kg. In another embodiment, the concentration of lithium ranges from 0 to 35 mg/kg. In another embodiment, the concentration of lithium ranges from 0 to 40 mg/kg. In another embodiment, the concentration of lithium ranges from 0 to 45 mg/kg. In another embodiment, the concentration of lithium ranges from 0 to 50 mg/kg. In another embodiment, the concentration of lithium ranges from 0 to 55 mg/kg. In another embodiment, the concentration of lithium ranges from 0 to 60 mg/kg. In another embodiment, the concentration of lithium ranges from 0 to 65 mg/kg. In another embodiment, the concentration of lithium ranges from 0 to 70 mg/kg. In another embodiment, the concentration of lithium ranges from 0 to 75 mg/kg. In another embodiment, the concentration of lithium ranges from 0 to 80 mg/kg. In another embodiment, the concentration of lithium ranges from 0 to 85 mg/kg. In another embodiment, the concentration of lithium ranges from 0 to 90 mg/kg. In another embodiment, the concentration of lithium ranges from 0 to 95 mg/kg. In another embodiment, the concentration of lithium ranges from 0 to 100 mg/kg. In another embodiment, the concentration of lithium ranges from 0 to 120 mg/kg. In another embodiment, the concentration of lithium ranges from 0 to 150 mg/kg. In another embodiment, the concentration of lithium ranges from 0 to 170 mg/kg. In another embodiment, the concentration of lithium ranges from 0 to 190 mg/kg. In another embodiment, the concentration of lithium ranges from 0 to 200 mg/kg. In another embodiment, the concentration of lithium ranges from 0 to 210 mg/kg.

In some aspects, the invention provides a method for producing geothermal power using geothermal brines and producing a reduced silica and iron brine having improved injectivity. The method includes flashing a geothermal brine containing silica and iron to generate electrical power. This flashing produces precipitated silica and a reduced silica brine. The precipitated silica is then separated from the reduced silica brine and returned to the flashing the geothermal brine step. The reduced silica brine is then exposed to air to facilitate oxidation and to produce precipitated silica and iron solids, and a reduced silica and iron brine. The silica and iron solids are then separated from the reduced silica and iron brine and optionally, at least a portion of the silica and iron solids are returned to the exposing the reduced silica brine to air step. The reduced silica and iron treated brine is then injected into a separate injection well, but the same reservoir, such as a geothermal reservoir, wherein the reduced silica and iron brine has improved injectivity as compared to the reduced silica brine. In further embodiments, the treated brine having reduced silica, and optionally iron, concentration is further treated to remove additional components, such as lithium.

In geothermal power plants, heat may be recovered from a geothermal brine through the use of one or more flash tanks in a process known as flashing. Any method of flashing may be used in the present invention. In some embodiments, the crystallizer reactor clarifier process is used. In other embodiments, the pH modification process is used. In some embodiments, the brine will be treated after it has left the first clarifier of a two clarifier processing system. In some embodiments, the brine will be treated after it has been completely processed by the clarifier system.

In further embodiments of the process, other components may be removed from the brine before the brine is injected into an underground region, such as a reservoir. In one embodiment, lithium is removed from the geothermal brine before the reduced silica and iron brine before it is injected into the underground region. In another embodiment, manganese is removed from the reduced silica and iron brine before it is injected into the underground region. In another embodiment, zinc is removed from the reduced silica and iron brine before it is injected into the underground region. In another embodiment, potassium is removed from the reduced silica and iron brine before it is injected into the underground region. In another embodiment, rubidium is removed from the reduced silica and iron brine before it is injected into the underground region. In another embodiment, cesium is removed from the reduced silica and iron brine before it is injected into the underground region. In further embodiments, any combination of these components is removed from the reduced silica and iron brine before it is injected into the underground region.

In some embodiments, the reduced silica and iron brine has less than about 20 ppm of silica. In some embodiments, the reduced silica and iron brine has less than about 20 ppm of iron. In further embodiments, the reduced silica and iron brine has less than about 20 ppm of silica and less than about 20 ppm of iron. In some embodiments, the reduced silica and iron brine has less than about 15 ppm of silica. In some embodiments, the reduced silica and iron brine has less than about 15 ppm of iron. In further embodiments, the reduced silica and iron brine has less than about 15 ppm of silica and less than about 15 ppm of iron. In some embodiments, the reduced silica and iron brine has less than about 10 ppm of silica. In some embodiments, the reduced silica and iron brine has less than about 10 ppm of iron. In further embodiments, the reduced silica and iron brine has less than about 10 ppm of silica and less than about 10 ppm of iron. In some embodiments, the reduced silica and iron brine has less than about 5 ppm of silica. In further embodiments, the reduced silica and iron brine has less than about 5 ppm of silica and less than about 10 ppm of iron.

Embodiments of the present invention yield treated brines with improved injectivity over untreated brines solutions. Injectivity is defined in terms of change in pressure over a given flow rate over time. Improvements in injectivity indicate that a brine is able to flow more freely over time, and thus will lead to less required cleanings of a well. One way to assess improved injectivity is through packed bed testing.

In another aspect, the invention provides a method for preventing silica scale in geothermal brine injection wells and improving injectivity of a treated aqueous brine solution by selectively removing silica and iron from a geothermal brine solution. The method includes obtaining a geothermal brine solution comprising silica and iron from a geothermal reservoir. The geothermal brine solution is then supplied to a silica management process to produce a reduced silica geothermal brine solution relative to the geothermal brine solution. The reduced silica geothermal brine solution is then supplied to an iron removal process to produce a treated aqueous brine solution relative to the reduced silica geothermal brine solution. The treated aqueous brine product solution is then injected into the geothermal reservoir. The treated brine also has a packed bed test result that yields an operation time at least 50% greater than an operation time of the geothermal brine solution.

In some embodiments, the step of supplying the geothermal brine solution to a silica management process and the step of supplying the reduced silica geothermal brine solution to an iron removal process are the same step. In other embodiments, the step of supplying the geothermal brine solution to a silica management process and the step of supplying the reduced silica geothermal brine solution to an iron removal process are different steps.

In further embodiments, the treated brine is further treated to remove lithium. In some embodiments, the process for removing lithium occurs after the geothermal brine is supplied to a silica management step. In some embodiments, the process for removing lithium occurs after the geothermal brine is supplied to both a silica management step and an iron removal process.

In some embodiments, the treated brine has a packed bed test result that yields an operation time at least 100% greater than an operation time of the geothermal brine solution. In some embodiments, the treated brine has a packed bed test result that yields an operation time at least 200% greater than an operation time of the geothermal brine solution. In some embodiments, the treated brine has a packed bed test result that yields an operation time at least 300% greater than an operation time of the geothermal brine solution.

In another aspect, the invention provides a method for preventing silica scale in geothermal brine injection wells and improving injectivity of a treated brine by selectively removing silica and iron from a geothermal brine solution. The method includes obtaining a geothermal brine solution comprising silica and iron from a geothermal reservoir. The geothermal brine solution is supplied to a silica management process to produce a reduced silica geothermal brine solution relative to the geothermal brine solution. The reduced silica geothermal brine solution is supplied to an iron removal process to produce a treated brine. The treated brine is then injected into the geothermal reservoir. Additionally, the treated brine has a TSS of less than about 60 ppm. In some embodiments, the treated brine has a TSS of less than about 55 ppm. In some embodiments, the treated brine has a TSS of less than about 50 ppm. In some embodiments, the treated brine has a TSS of less than about 45 ppm. In some embodiments, the treated brine has a TSS of less than about 40 ppm. In some embodiments, the treated brine has a TSS of less than about 35 ppm. In some embodiments, the treated brine has a TSS of less than about 30 ppm. In some embodiments, the treated brine has a TSS of less than about 25 ppm. In some embodiments, the treated brine has a TSS of less than about 20 ppm. In some embodiments, the treated brine has a TSS of less than about 15 ppm. In some embodiments, the treated brine has a TSS of less than about 10 ppm.

In another aspect, the invention provides a method for generating energy from a geothermal brine solution and improving injectivity of a treated aqueous brine solution by selectively removing silica and iron from a geothermal brine solution used for energy production. The method includes obtaining a geothermal brine solution comprising silica and iron from a geothermal reservoir. The geothermal brine solution is then flashed to produce and recover heat and energy therefrom and to produce a spent geothermal brine solution. The spent geothermal brine solution is then supplied to a silica management process to produce a reduced silica geothermal brine solution relative to the spent geothermal brine solution. The reduced silica geothermal brine solution is then supplied to an iron removal process to produce a treated aqueous brine solution relative to the reduced silica geothermal brine solution. The treated aqueous brine product solution is then injected into the geothermal reservoir. Additionally, the treated brine has a TSS of less than about 60 ppm.

In some embodiments, the step of supplying the geothermal brine solution to a silica management process and the step of supplying the reduced silica geothermal brine solution to an iron removal process are the same step. In other embodiments, the step of supplying the geothermal brine solution to a silica management process and the step of supplying the reduced silica geothermal brine solution to an iron removal process are different steps.

In further embodiments, the treated brine is further treated to remove lithium. In some embodiments, the process for removing lithium occurs after the geothermal brine is supplied to a silica management step. In some embodiments, the process for removing lithium occurs after the geothermal brine is supplied to both a silica management step and an iron removal process.

In some embodiments, the treated brine has a TSS of less than about 55 ppm. In some embodiments, the treated brine has a TSS of less than about 50 ppm. In some embodiments, the treated brine has a TSS of less than about 45 ppm. In some embodiments, the treated brine has a TSS of less than about 40 ppm. In some embodiments, the treated brine has a TSS of less than about 35 ppm.

In some embodiments, the treated brine has a TSS of less than about 30 ppm. In some embodiments, the treated brine has a TSS of less than about 25 ppm. In some embodiments, the treated brine has a TSS of less than about 20 ppm. In some embodiments, the treated brine has a TSS of less than about 15 ppm. In some embodiments, the treated brine has a TSS of less than about 10 ppm.

In another aspect, the invention provides a treated geothermal brine composition having a pH of about 4.0 to about 6.0 that has less than about 20 ppm by weight of silica, less than about 20 ppm by weight of iron, and further wherein the treated geothermal brine composition has TSS of less than about 30 ppm. In some embodiments, the treated geothermal brine composition has a TSS of less than about 25 ppm. In some embodiments, the treated geothermal brine composition has a TSS of less than about 20 ppm. In some embodiments, the treated geothermal brine composition has a TSS of less than about 15 ppm. In some embodiments, the treated geothermal brine composition has a TSS of less than about 10 ppm.

Packed Bed Testing

The objective of packed bed testing is to simulate injectivity of brine solutions. This entails pumping a brine solution through a material that simulates the region where the brine is to be injected. Incompatibility is primarily manifested as a shorter run time to reach a 1000 maximum psi, due to generation of suspended solids and scales that cause an increase in pressure across the packed bed.

In general, the packed beds should be selected such that granulated materials, such as rock chips, may be packed within the inner region, and such that the flow of brine may be allowed continuously over the granulated materials under pressures up to at least 1000 psig and temperatures ranging from about 80 to 110° C. The primary response factor for the packed bed testing is the time period, or operation time, that the brine is able to be pumped through the packed bed, until scaling and blockage cause the head pressure to reach 1000 psi. Long-term permeable flow is desired, so the longer the packed bed unit runs, the better the potential outcome of the brine for injecting into a reservoir. In some embodiments, the brine can be injected into the reservoir from which it was obtained (also sometimes referred to as "reinjecting"). In some embodiments, the brine can be injected into a different reservoir than the one from which it was obtained.

In some embodiments, the beds are packed with screened drilling rock chips from the well hydrothermal zone (e.g., from the well into which the brine will be injected). In some embodiments, the rock chips may be primarily of two types: 1) hydrothermally-crystallized fine-grained granitic material composed of quartz and feldspar, and 2) silica-bonded meta-siltstone. In some embodiments, the packed beds may be a combination of the two types of rock chips. In other embodiments, the packed beds may be primarily of a single type of rock chip. In some embodiments, the packing material is uniform in size.

In order to yield appropriate comparisons, the same type of material and packing should be used in both packed bed tests (i.e., for the treated and untreated brine) for the comparative testing. The packed beds will have brine pumped through them until the pressure reaches about 1000 psig at 1 LPM brine flow. Thus, the materials for the packed beds should be selected from materials that will allow for such pressures and temperatures ranging from about 80 to 110° C. By comparing the packed bed tests of a treated and an untreated brine, one can assess whether the treatment process used has improved injectivity and reduced scaling. If a treated brine has a longer operation time, or the time to reach 1000 psi, then the treated brine will have improved injectivity. In some embodiments, the treated brine has an operation time at least about 50% greater than the operation time of the untreated brine solution. In some embodiments, the treated brine has an operation time at least about 100% greater than the operation time of the untreated brine solution. In some embodiments, the treated brine has an operation time at least about 150% greater than the operation time of the untreated brine solution. In some embodiments, the treated brine has an operation time at least about 200% greater than the operation time of the untreated brine solution. In some embodiments, the treated brine has an operation time at least about 250% greater than the operation time of the untreated brine solution. In some embodiments, the treated brine has an operation time at least about 300% greater than the operation time of the untreated brine solution.

The quantity of total suspended solids is also an important parameter for assessing brines. TSS can indicate whether brines may have minerals that could precipitate solids and generate suspended solids, contributing to scaling and plugging. In some embodiments, the TSS of the treated brine will be less than about 60 ppm. In some embodiments, the TSS of the treated brine will be less than about 30 ppm. In some embodiments, the TSS of the treated brine will be less than about 25 ppm. In some embodiments, the TSS of the treated brine will be less than about 20 ppm. In some embodiments, the TSS of the treated brine will be less than about 15 ppm. In some embodiments, the TSS of the treated brine will be less than about 10 ppm.

Broadly, also described herein are methods for the selective removal of silica and silicates (typically reported as silicon dioxide ($SiO_2$)) from solution. Methods for the removal of silica are commonly known as silica management. As used herein, the selective removal of silica generally refers to methods to facilitate the removal of silica from solutions, such as geothermal brines, Smackover brines, synthetic brines, and other brines resulting from oil and gas production without the simultaneous removal of other ions. In certain embodiments, silica is selectively removed such that the silica can be further refined or supplied to an associated process, without the need for extensive purification thereof. In some embodiments, the brines are brines from which energy has already been extracted. For instance, brines from which a power plant has already extracted energy through methods such as flashing. Broadly described, in certain embodiments, the methods described herein employ chemical means for the separation of silica. The removal of silica from solutions, such as geothermal brines, can prevent, reduce or delay scale formation as silica present in brines can form scale deposits. It is known that scale deposit formation is a common problem with geothermal brines and therefore the methods described herein for the selective removal of silica can be utilized to prevent scale formation in geothermal power equipment and also improve injectivity of treated brines in reservoirs. Additionally, the removal of silica from solutions, such as geothermal brines, also facilitates the subsequent recovery of various metals from the solution, such as lithium, manganese, zinc, as well as boron, cesium, potassium, rubidium, and silver. It is understood that the recovery of valuable metals from a geothermal brine depends upon the concentration of a metal in the brine, and the economics of the recovery thereof, which can vary widely among brines. The prevention, reduction, and/or delay of scale production in geothermal wells and geothermal power plant equipment can result in increased geothermal energy production by improving the equipment lifetime and reducing the frequency of equipment maintenance, as well as increase or prolong well permeability.

Typically, in geothermal power plants, heat is recovered from a geothermal brine through the use of one or more flash tanks. In certain embodiments, a silica precipitate seed can be supplied to the geothermal brine prior to the brine being supplied to the flash tanks to remove at least a portion of the silica present. In other embodiments, the post-flash geothermal brine from a geothermal plant is then fed through the silica management and iron removal steps. In certain embodiments, the silica precipitate seed can result in the removal of up to 25% of the silica present in the brine, alternatively up to about 40% of the silica present in the brine, alternatively up to about 50% of the silica present in the brine, alternatively up to about 60% of the silica present in the brine, or alternatively greater than about 60% of the silica present in the brine. In certain embodiments, the silica precipitate seed can reduce the silica concentration of the brine to less than about 200 ppm, alternatively less than about 175 ppm, alternatively less than about 160 ppm, alternatively less than about 145 ppm.

The geothermal brine supplied to the flash tanks is typically supplied at a temperature of at least about 250° C., alternatively at least about 300° C. After flashing of the geothermal brine and the recovery of significant heat and energy therefrom, the geothermal brine can be supplied to a silica management process (as further described herein) for the removal of additional silica. As noted previously, the removal of silica can prevent, reduce, or delay the buildup of scale, thereby increasing the lifetime of the equipment and improving injectivity of the treated brine. Typically, the temperature of the brine has been reduced to less than about 150° C. before it is supplied to one of the silica removal processes described herein, alternatively less than about 125° C., alternatively less than about 120° C., alternatively less than about 115° C., alternatively less than about 110° C., alternatively less than about 105° C., or alternatively less than about 100° C.

While the removal of silica from geothermal brines in geothermal power plants is useful for reducing scale buildup in the power plant, supplying the brine to one or more of the silica removal processes described herein also has the effect of reducing the injection temperature of the brine to less than about 100° C., alternatively less than about 90° C., alternatively less than about 80° C., alternatively less than about 75° C.

As described herein, the selective silica recovery of the present invention can include the use of activated alumina, aluminum salts (such as $AlCl_3$), or iron (III) oxyhydroxides.

In certain embodiments of the present invention, the brine or silica containing solution can first be filtered or treated to remove solids present prior to the selective recovery and removal of silica.

Simulated brines can be prepared to mimic naturally occurring brines. As described herein, a simulated brine can be prepared to mimic the brine composition of various test wells found in the Salton Sea geothermal fields (Calif., U.S.). Generally, the simulated brine is an aqueous solution having a composition of about 260 ppm lithium, 63,000 ppm sodium, 20,100 ppm potassium, 33,000 ppm calcium, 130 ppm strontium, 700 ppm zinc, 1700 ppm iron, 450 ppm boron, 54 ppm sulfate, 3 ppm fluoride, 450 ppm ammonium ion, 180 ppm barium, 160 ppm silicon dioxide, and 181,000 ppm chloride. Additional elements, such as manganese, aluminum, antimony, chromium, cobalt, copper, lead, arsenic, mercury, molybdenum, nickel, silver, thallium, and vanadium, may also be present in the brine. It is understood, however, that the methods described herein can be used to remove silica from brines and other silica containing solutions having silica concentrations greater than about 160 ppm. In certain embodiments, the brine or silica containing solution can have a silica concentration of greater than about 400 ppm, greater than about 500 ppm, or greater than about 600 ppm. In certain instances, geothermal brines can have silica concentrations of between about 400 and 600 ppm.

Selective Silica Recovery by Precipitation with Aluminum Salts

The addition of aluminum salts, such as $AiCl_3$, to brine at a pH of between about 4 and 6, results in the formation of charged polymers, such as $Al_{13}O_4(OH)_{24}^{7+}$. These charged polymers are highly reactive with respect to silica, resulting in the formation of amorphous aluminosilicate precipitates, which can be removed by filtration. In certain embodiments, any silica present in the brine will react with the positively charged polymer to form an amorphous aluminosilicate precipitate, thereby reducing the silica concentration of the brine. In certain embodiments, the brine can be seeded with an aluminosilicate precipitate, which allows the silica to attach to the seed material, thereby allowing the silica and aluminum polymer to be removed by conventional filtration or clarification processes. Typically, the aluminum polymers do not react with other components in the brine, such as lithium or iron, and thus they stay in solution while the silica forms the precipitate.

Silica can be selectively recovered from silica containing solutions (including brines) by contacting them with aluminum salts, particularly aluminum halides, such as chlorides and bromides and maintaining a pH of between about 4 and 6, preferably between about 4.5 and 5.5, more preferably between about 4.75 and 5.25, and even more preferably between about 4.85 and 5.15. Generally, the brine solution, as prepared, has a measured pH of between about 5.1 and 5.3, which is comparable to the brines of the Salton Sea, which typically have a measured pH of between about 4.9 and 5.1. Aluminum salt is added in a molar ratio of aluminum salt to silica of at least about 0.25:1, preferably at least about 0.5:1, and more preferably at least about 1:1. In certain embodiments, the aluminum salt to silica ratio is between about 0.5:1 and 2:1. Optionally, the solution can be maintained at elevated temperatures. In certain embodiments, the solution can be at a temperature greater than about 50° C., more preferably at least about 75° C., and even more preferably at least about 90° C. Optionally, the silica containing solution is seeded with between about 0.1 and 10% by weight of an amorphous aluminosilicate solid. In certain embodiments, the solution is seeded with between about 1 and 2% by weight of the amorphous aluminosilicate solid. In certain other embodiments, the solution is seeded with between about 1.25 and 1.75% by weight of the amorphous aluminosilicate solid.

The addition of, for example, aluminum chloride to an aqueous silica solution, such as brine, typically lowers the pH (i.e., acidifies) of the silica containing solution as the addition results in the production of aluminum hydroxide and hydrochloric acid. Typically, the pH is monitored during the process to maintain the solution at a constant pH. In certain embodiments, a base (for example, but not limited to, sodium hydroxide, calcium hydroxide, and the like) can be added to the silica containing solution to maintain the pH of the solution between about 4 and 6 alternatively, between about 4.5 and 5.5, and preferably at or about 5.

In certain embodiments, the addition rate of the base is near stoichiometric. In certain embodiments, the equipment can be designed to include control equipment to add the base in a controlled process so that at least a stoichiometric amount of base is added to the solution, based upon the amount of silica and $AlCl_3$ present in solution.

In certain embodiments, the amorphous aluminosilicate solid used as the seed material is prepared in a laboratory setting. Aluminum salt can be added to a concentrated sodium silicate solution that may optionally be heated, neutralized to a pH of between about 4 and 6, and stirred to form a precipitate. The precipitate is collected, washed, and dried.

Precipitation of the amorphous aluminosilicate with an aluminum salt is capable of removing at least 75% of the silica present in the silica containing solution, preferably at least about 90%, and even more preferably at least about 95% of the silica present in the silica containing solution. In certain embodiments, precipitation of silica from a silica containing solution with an aluminum salt results in a total silica concentration in the resulting solution of less than about 15 ppm, preferably less than about 10 ppm, and even more preferably less than about 5 ppm.

In one embodiment, the resulting amorphous aluminosilicate precipitate is removed from the solution by filtration, dried, and recycled as seed material for subsequent precipitation of silica. In other embodiments, the aluminosilicate precipitate is supplied to a subsequent process for recovery of silica and/or aluminum.

In certain embodiments, contacting the silica containing solution with an aluminum halide at a pH of between 4 and 6 results in the formation of a gel, which can be subsequently separated from the remaining aqueous solution by filtration, which can be aided by the use of a centrifuge.

In certain embodiments, precipitation occurs by adding a seed containing solution to the brine, contacting the mixture with aluminum chloride, and then contacting the resulting mixture with a base, such as limestone, NaOH or $Ca(OH)_2$.

In other embodiments, the brine is contacted with $AlCl_3$, and the resulting mixture is contacted with a base. In yet other embodiments, the brine is contacted with $AlCl_3$, the mixture is then contacted with a seed containing solution, and the resulting mixture is then contacted with a base. Finally, in certain embodiments, the brine is first contacted with $AlCl_3$, then contacted with a base, and then the resulting mixture is contacted with a seed containing solution.

Referring now to FIG. 1, apparatus 100 for the removal of silica from a silica containing brine is provided. Water is provided via line 102. First water stream 102' is supplied to first mixer 106, where the water is mixed with base 104, for example NaOH (caustic soda) or $Ca(OH)_2$ (slaked lime) or limestone to produce aqueous base stream 108. First mixer 106 can include any known means for mixing the base and water to form a homogeneous stream. Second water stream 102" is supplied to second mixer 112 where the water is combined with flocculant 110 to produce mixed flocculant stream 114. Exemplary flocculants include, but are not limited to, Magnafloc 351, Nalco 9907, 9911, 9913, 8181, 7193, 8170, and the like.

Brine 116 is supplied to third mixer 120 where it is combined with aluminum chloride ($AlCl_3$) containing stream 118 to produce mixed brine stream 122. Aqueous base stream 108 is combined with mixed brine stream 122 in fourth mixer 124 to produce basic brine stream 126. Basic brine stream 126 is supplied to fifth mixer 128 where it is combined and intimately mixed with mixed flocculant stream 114 to coagulate at least a portion of the silica present in brine stream 126 as an aluminosilicate solid. Mixed stream 130 with a reduced silica brine and solids is supplied to clarifier 132 to produce reduced silica brine stream 134 and slurry stream 136, which can include aluminosilicate precipitate. Clarifier 132 can be a settling tank or like device that can be utilized for the separation of a liquid stream from a slurry. Slurry stream 136 can be supplied to filter 138, which separates the slurry into a solid aluminosilicate precipitate, which can be removed via solid removal line 140, and a precipitate removed treated brine stream 142. Precipitate removed treated brine stream 142 can then be recombined with reduced silica brine stream 134.

Fifth mixer 128 can include multiple stages. In one embodiment, fifth mixer 128 includes three reactor stages wherein the first reactor stage includes a mixer to facilitate intimate mixing of the brine, and the aluminum salt, to produce a solid aluminosilicate solid. The second reactor stage can include means for introducing the base, such as NaOH or $Ca(OH)_2$ to the reaction mixture. The second reactor stage can optionally include means for determining the pH of the solution, and control means, such as automated valves, operable to control the addition of the base to the solution to maintain a desired predetermined pH. In certain embodiments, the second reactor stage can include means for adding an aluminum salt to the solution. The third reactor stage can include means for stabilizing the pH of the solution, and means for supplying a buffer to the solution. In certain embodiments, the third reactor stage can include means for adding an aluminum salt to the solution.

Clarifier 132 can be a vessel and can include valves and lines configured to facilitate the removal of an aluminosilicate slurry from the bottom of the vessel and a low silica concentration brine stream from a position at the midpoint or top of the vessel. In certain embodiments, fifth mixer 128 or clarifier 132 can include a line for supplying a portion of the aluminosilicate precipitate to the basic brine stream 108 as seed. In certain embodiments, fifth mixer 128 can include a line for supplying a low silica concentration brine stream to brine stream 116.

The mixers used herein can each separately be a series of continuously stirred reactors. In certain embodiments, fourth mixer 124 can include at least one pH meter, wherein the feed of the aqueous base stream 108 and brine stream 112 are regulated to maintain a desired pH.

Selective Silica Recovery by Precipitation with Iron

In one embodiment, silica can be removed from a brine by contacting the brine with iron (III) hydroxide at a pH of between about 4.5 and 6, preferably between about 4.75 and 5.5, more preferably between about 4.9 and 5.3.

A synthetic brine can be prepared having the approximate composition provided herein for the simulated Salton Sea reservoir, and further including about 1880 ppm manganese. In certain embodiments, the brine will have an iron (II) salt, such as iron (II) chloride, naturally present in a concentration, for example, of greater than about 1000 ppm. In other embodiments, an iron (II) salt or iron (III) hydroxide can be added to the brine to achieve a certain concentration of iron (II) salt or iron (III) hydroxide relative to the silica or silicon containing compounds present in the brine. In certain embodiments, the molar ratio of the iron (II) salt or iron (III) hydroxide to silica is at least about 1:1, preferably at least about 4:1, more preferably at least about 7:1 and even more preferably at least about 10:1.

When the iron in the brine or silica containing solution is iron (II), for example iron (II) chloride, an oxidant can be added to oxidize iron (II) salt to iron (III) hydroxide. Exemplary oxidants include hypohalite compounds, such as hypochlorite, hydrogen peroxide (in the presence of an acid), air, halogens, chlorine dioxide, chlorite, chlorate, perchlorate and other analogous halogen compounds, permanganate salts, chromium compounds, such as chromic and dichromic acids, chromium trioxide, pyridinium chlorochromate (PCC), chromate and dichromate compounds, sulfoxides, persulfuric acid, nitric acid, ozone, and the like. While it is understood that many different oxidants can be used for the oxidation of iron (II) to iron (III), in an embodiment, oxygen or air is used as the oxidant and lime or a like base is used to adjust and maintain the pH to a range of between about 4 and 7. This pH range is selective for the oxidation of the iron (II) salt to iron (III) hydroxide, and generally does not result in the co-precipitation or co-oxidation of other elements or compounds present in the brine. In an embodiment, the iron (II) salt can be oxidized to iron (III) by sparging the reaction vessel with air. Air can be added at a rate of at least about 10 cfm per 300 L vessel, preferably between about 10 and 50 cfm per 300 L vessel. A person of skill in the art will recognize that the cfm rate can be adjusted based on specific operation parameters. It will be recognized by those skilled in the art that iron (III) hydroxide may also have a significant affinity for arsenic (III) and (V) oxyanions, and these anions, if present in the brine, may be co-deposited with the silica on the iron (III) hydroxide. Thus, in these embodiments, steps may have to be employed to remove arsenic from the brine prior to silica management.

In another embodiment, iron (III) hydroxide can be produced by adding a solution of iron (III) chloride to the brine, which upon contact with the more neutral brine solution, will precipitate as iron (III) hydroxide. The resulting brine may require subsequent neutralization with a base to initiate precipitation of the silica. In certain embodiments, iron (III) hydroxide can be contacted with lime to form insoluble ferric hydroxide solids, which can be adsorbed with silica.

The iron (III) hydroxide contacts the silica present in the brine to form a precipitate. Without being bound to any specific theory, it is believed that the silica or silicon-containing compound attaches to the iron (III) hydroxide. In certain embodiments, the ratio of iron (III) hydroxide to silica is at least about 1:1, more preferably at least about 4:1, more preferably at least about 7:1. In other embodiments, the iron (UI) hydroxide is present in a molar excess relative to the silica. The reaction of the iron (III) hydroxide with silica is capable of removing at least about 80% of the silica present, preferably at least about 90% of the silica present, and more preferably at least about 95% of the silica present, and typically depends upon the amount of iron (III) hydroxide present in the solution.

In certain embodiments, the pH is monitored continually during the reaction of iron (III) with silica and an acid or a base is added, as needed, to maintain the pH the desired level, for example, between about 4.9 and 5.3. In alternate embodiments, a pH of between about 5.1 and 5.25 is maintained. In certain embodiments, a pH of about 5.2 is maintained.

In certain embodiments, the iron (II) salt containing solution is sparged with air for a period of at least about 5 minutes, alternately at least about 10 minutes, alternately at least about 15 minutes, and preferably at least about 30 minutes, followed by the addition of a base, such as calcium oxide, calcium hydroxide, sodium hydroxide, or the like, to achieve the desired pH for the solution. In certain embodiments, the base can be added as an aqueous solution, such as a solution containing between about 10 and 30% solids by weight.

In certain embodiments, a flocculant, such as the Magnafloc® products from Ciba®, for example Magnafloc 351, or a similar flocculant can be added in the clarification step. The flocculant can be added in an aqueous solution in amounts between about 0.005% by weight and about 1% by weight. The flocculant can be added at a rate of at least 0.001 gpm, preferably between about 0.001 and 1 gpm, based upon a 300 L vessel. A person of skill in the art will recognize that the gpm can be adjusted based on specific operation parameters. In certain embodiments, the flocculant is a non-ionic flocculant. In other embodiments, the flocculant is a cationic flocculant. In certain embodiments, it is believed that non-ionic and cationic flocculants may be useful for use with iron precipitates. In certain embodiments, Cytec Superfloc-N flocculants, such as the N-100, N-100 S, N-300, C-100, C-110, C-521, C-573, C-577 and C581 may be used for the recovery of iron and silica precipitates, according to the present invention. In other embodiments, flocculant products from Nalco, such as CAT-Floc, MaxiFloc, Nalco 98DF063, Nalco 1317 Liquid, Nalco 97ND048, Nalco 9907 Flocculant, Nalco 73281, and Nalco 9355 may be used with the present invention.

In certain embodiments, a flocculant can be added to the brine, in addition to the base, to facilitate the production of larger solids for easier solid/liquid separation. In certain embodiments, iron (III) silicate solids can be added to the solution to increase the rate of precipitation of silicates.

Figure 2:
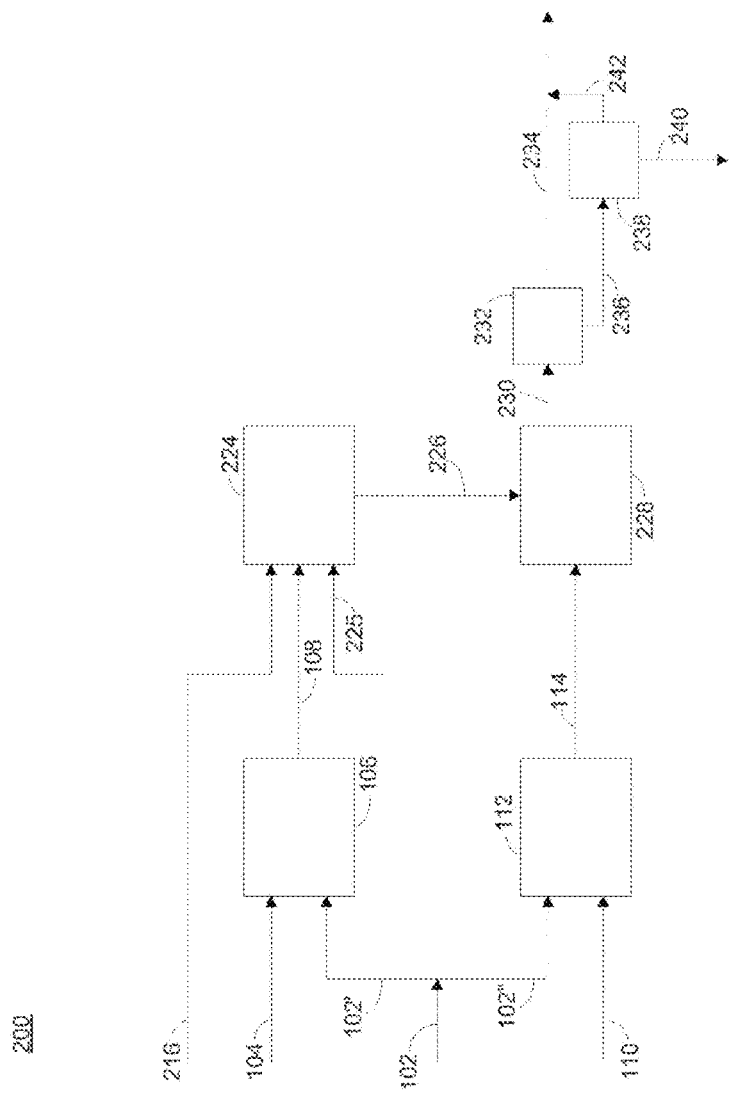
FIG. 2 is an illustration of an apparatus for the removal of silica from a silica containing brine according to an embodiment of the present invention.

Referring now to FIG. 2, apparatus 200 for the removal of silica from a silica containing brine is provided. Water is provided via line 102. First water stream 102' is supplied to first mixer 106, where the water is mixed with base 104, for example NaOH (caustic soda) or $Ca(OH)_2$ (slaked lime), to produce aqueous base stream 108. First mixer 106 can include any known means for mixing the base and water to form a homogeneous stream. Second water stream 102" is supplied to second mixer 112 where the water is combined with flocculant 110 to produce mixed flocculant stream 114.

Brine 216 is supplied to third mixer 224 where it is combined with aqueous base stream 108 and air 225 to produce mixed brine stream 226, with iron-silica precipitates. Mixed brine stream 226 is supplied to fourth mixer 228 where it is combined and intimately mixed with mixed flocculant stream 114 to further encourage precipitation of at least a portion of the silica present in brine stream 226. Mixed stream 230 containing a reduced silica brine and solids is supplied to clarifier 232 to produce reduced silica brine stream 234 and slurry stream 236, which can include iron-silica precipitates. Clarifier 232 can be a settling tank or like device that can be utilized for the separation of a liquid stream from a slurry including a filter such as candle filters. Slurry stream 236 can be supplied to filter 238, which separates the slurry into a solid precipitate, which can be removed via solid removal line 240, and a precipitate removed treated brine stream 242. Solids removed via solid removal line 240 can optionally be separated from any remaining liquid by centrifugation. Precipitate removed treated brine stream 242 can then be recombined with reduced silica brine stream 234. Optionally, precipitate removed treated brine stream 242 can be recycled to third mixer 224, or alternatively can be combined with brine stream 226.

Fourth mixer 228 can include multiple stages. In an embodiment, fourth mixer 228 includes three reactor stages wherein the first reactor stage includes a mixer to facilitate intimate mixing of the brine and air. In some embodiments, sufficient air is supplied to the reactor to oxidize at least a portion of the iron (II) present to iron (III). The second reactor stage can include means for introducing the base, such as NaOH or $Ca(OH)_2$ to the reaction mixture. The second reactor stage can optionally include means for determining the pH of the solution, and control means, such as automated valves, operable to control the addition of the base to the solution to maintain a desired predetermined pH. In certain embodiments, the third reactor stage can include means for adding an aluminum salt to the solution. Optionally, apparatus 200 can include means for supplying air to the second and third reactor stages.

In certain embodiments, the brine is supplied to the first reactor stage at a pH of about 4.9 to 5.1 and a temperature of about 95 to 110° C. where it is contacted and sparged with air to produce certain iron (III) oxyhydroxides. Preferably, a sparging diffuser is utilized to facilitate contact between the air and iron (II) contained in the brine. At a temperature of greater than about 90° C., the pH of the first reactor stage is controlled such that the pH is at least about 2.5, but preferably in the range of 3.5 to 5.3. The pH is maintained by the addition of lime or other base to the reactor to prevent the pH becoming too acidic, which would prevent further oxidation of the iron (II) to iron (III).

In certain embodiments, in the second reactor stage, the lime or other base is added while continuing to sparge air through the brine. This provokes precipitation of ferric ions as oxides, hydroxides, or oxyhydroxides. Additionally, silica and other metals are adsorbed on the surface of the iron oxyhydroxides. The metals that adsorb on the ferric oxyhydroxides include arsenic, antimony, lead, and barium. The pH of the second stage of the reactor is maintained such that the pH of no greater than about 6, alternatively not greater than about 5.4, preferably not above about 5.3, and more preferably not above about 5.2. Additional air can be fed to the second reactor stage through a sparger, such as an air diffuser, to facilitate the preparation and precipitation of iron (III) hydroxides adsorbed with silica.

In certain embodiments, the third reactor stage can serve as a buffer tank that is configured to maintain the pH of the solution at a pH of no greater than about 6, alternatively not greater than about 5.4, preferably not greater than about 5.3, and even more preferably at a pH of not greater than about 5.2. Optionally, the third reactor stage can include an air sparger, such as an air diffuser, to facilitate preparation and precipitation of iron (III) hydroxides adsorbed with silica.

Clarifier 232 can be a vessel and can include valves and lines configured to facilitate the removal of an iron-silica slurry from the bottom of the vessel and a reduced silica concentration brine stream from a position at the midpoint or top of the vessel. In certain embodiments, fourth mixer 228 or clarifier 232 can include a line for supplying a portion of the iron-silica precipitate to the basic brine stream 216 as seed. Alternatively, clarifier 232 can include one or more lines configured to deliver iron (III) hydroxide precipitate material adsorbed with silica to one or more of the first, second, or third reactor stages. In certain embodiments, fourth mixer 228 can include a line for supplying a reduced silica concentration brine stream to basic brine stream 216.

In certain embodiments, apparatus 200 can include control means for controlling the addition of base to third mixer 224. In alternate embodiments, apparatus 200 can include control means for controlling the addition of base to the second reactor stage.

In certain embodiments, brine stream 216 can be preconditioned by sparging the brine stream with air prior to supplying the brine to third mixer 224.

The mixers used herein can each separately be a series of continuously stirred reactors. In certain embodiments, third mixer 224 can include at least one pH meter, wherein the feed of the aqueous base stream 108 and brine stream 216 are regulated to maintain a desired pH.

In certain embodiments, precipitation of silica and iron hydroxide can be achieved by recycling precipitate from the clarifier 232 to third mixer 224, resulting in an increase of the size of ferrosilicate particles. Additional recycling can also be achieved by recycling the seeds from clarifier 232 to first mixer 106, where base 104 is mixed with some or all of the seeds to promote the formation of a densified seed, which can then be fed to third mixer 224. This recycling step can enhance the quality of the precipitate by increasing density of the precipitate, thus making the design of clarifier 232 smaller and simpler. It has also surprisingly been found that on the introduction of these solids to the reaction vessel a minor amount of the zinc and/or manganese is retained in the precipitate. In certain embodiments, when seeds are re-introduced into third mixer 224, there is no or minimal net loss of zinc and manganese that may be present in the brine, and the ability of the ferrosilicate precipitate to grow and capture silica is unimpaired.

The rate of the addition of the air, base, and flocculant is based upon the size of the reactor and the concentrations of iron and silica. Generally, the rates of addition of the components is proportional to the other components being added and the size of the reaction vessels. For example, to a geothermal brine having iron and silica present, which is supplied at a rate of about 6 gpm (gallons per minute) to a silica removal process having an overall capacity of about 900 gallons, air can be added at a rate of about 100 cfm, a 20% solution of calcium oxide in water can be added at a rate of about 0.5 lb/min., and a 0.025% solution of Magnafloc 351 (flocculant) at a rate of about 0.01 gpm.

Selective Silica Recovery with Activated Alumina

Activated alumina is a known absorbent for silica. In certain embodiments, activated alumina is a mixture of $\gamma$-$Al_2O_3$ and AlO(OH) (boehmite). Specifically, activated alumina has been utilized in the removal of silica from raw water, such as water that is fed to a boiler. Activated alumina has not been used for the removal of silica from brines, wherein the removal of the silica does not also result in the removal of other ions or compounds by the activated alumina. Methods have not been reported for the selective removal of silica from brines without concurrent removal of other ions or compounds.

Activated alumina is a known absorbent for organic and inorganic compounds in nonionic, cationic, and anionic forms. Indeed, activated alumina is a common filter media used in organic chemistry for the separation and purification of reaction products.

In another embodiment of the present invention, silica can be removed from a brine by contacting the brine with activated alumina at a pH of between about 4.5 and 7, alternatively between about 4.75 and 5.75, or in certain embodiments, between about 4.8 and 5.3. The activated alumina can have a BET surface area of between about 50 and 300 $m^2/g$. In certain embodiments, the brine can be combined and stirred with activated alumina to selectively remove the silica. In alternate embodiments, the activated alumina can be added to the brine and stirred to selectively remove silica and silicon containing compounds. In certain embodiments, the pH of the brine can be maintained at between about 4.5 and 8.5, preferably between about 4.75 and 5.75, and more preferably between about 4.8 and 5.3, during the step of contacting the silica with the activated alumina. In certain embodiments, the pH can be maintained at between about 4.75 and 5.25. Alternatively, the pH can be maintained at between about 5.25 and 5.75. Alternatively, the pH can be maintained at between about 5.75 and about 6.25. A pH meter can be used to monitor the pH before, during, and after the contacting step. In certain embodiments, the pH is controlled by titrating the solution with a strong base, such as sodium hydroxide. In an exemplary embodiment, approximately 0.1M solution of sodium hydroxide is used to adjust the pH of the reaction, although it is understood that a base of higher or lower concentration can be employed.

Regeneration of the activated alumina can be achieved by first washing the alumina with a base, for example, a sodium hydroxide solution of at least about 0.01M, followed by the subsequent washing with an acid, for example, a hydrochloric acid solution of at least about 0.01M. In some embodiments, regeneration can be followed by treatment with a sodium fluoride solution having a pH of between about 4 and 5, to completely recover the capacity of the activated alumina. Optionally, the column can be rinsed with water, preferably between 1 and 5 volumes of water, prior to contacting with sodium hydroxide.

In certain embodiments, wherein the silica containing solution can be contacted with the activated alumina in a column, the solution exiting the column can be monitored to determine loading of the activated alumina.

Figure 3:
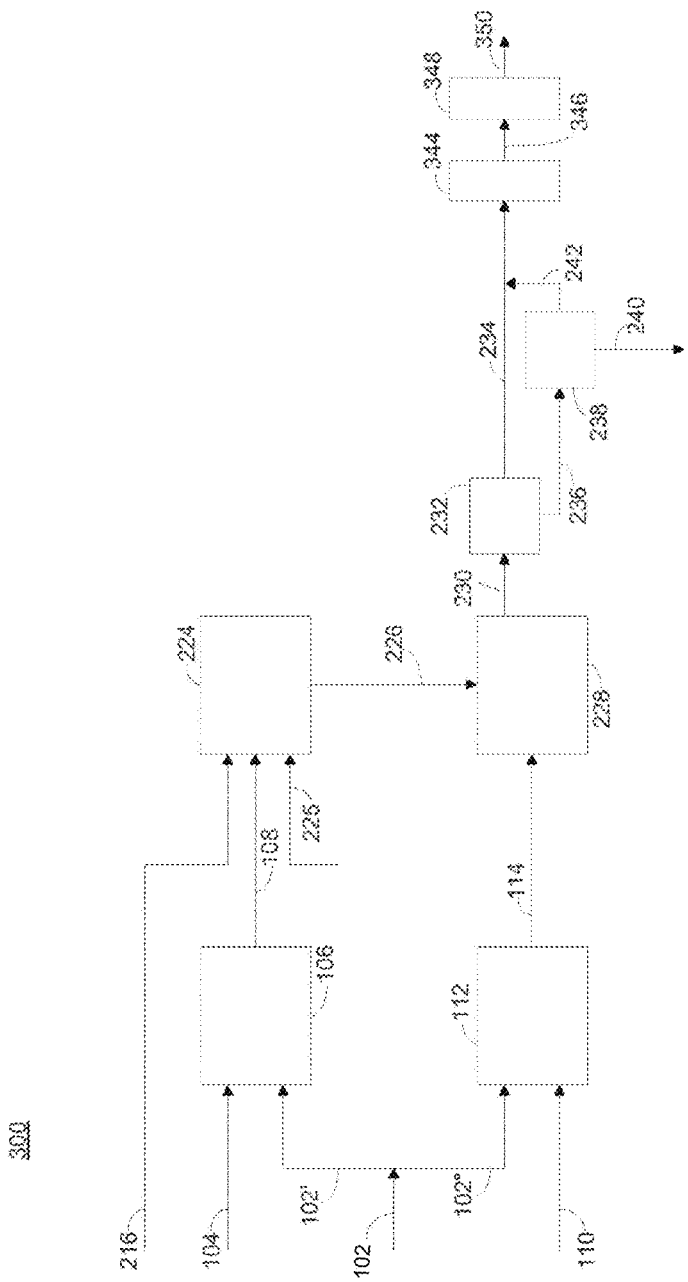
FIG. 3 is an illustration of an apparatus for the removal of silica from a silica containing brine according to an embodiment of the present invention.

FIG. 3 details apparatus 300 and shows an embodiment that incorporates removal of silica by precipitation with iron, as shown in FIG. 2, followed by removal of any remaining silica by adsorption with activated alumina. Specifically, low silica brine stream 234 can be supplied to first adsorbent column 344, which is charged with activated alumina and is operable to remove at least a portion of the silica present in the low silica brine stream. Treated stream 346 is then supplied to a second adsorbent column 348, which is similarly charged with activated alumina and is operable to remove at least a portion of the silica present in the treated stream, to produce product stream 350, which has a silica content that is lower than that of the low silica brine stream 234. In embodiments wherein treated stream 346 includes a measurable concentration of silica, second adsorbent column 348 is operable to produce a product stream 350 having a lower silica concentration than that of the treated stream 346.

Figure 4:
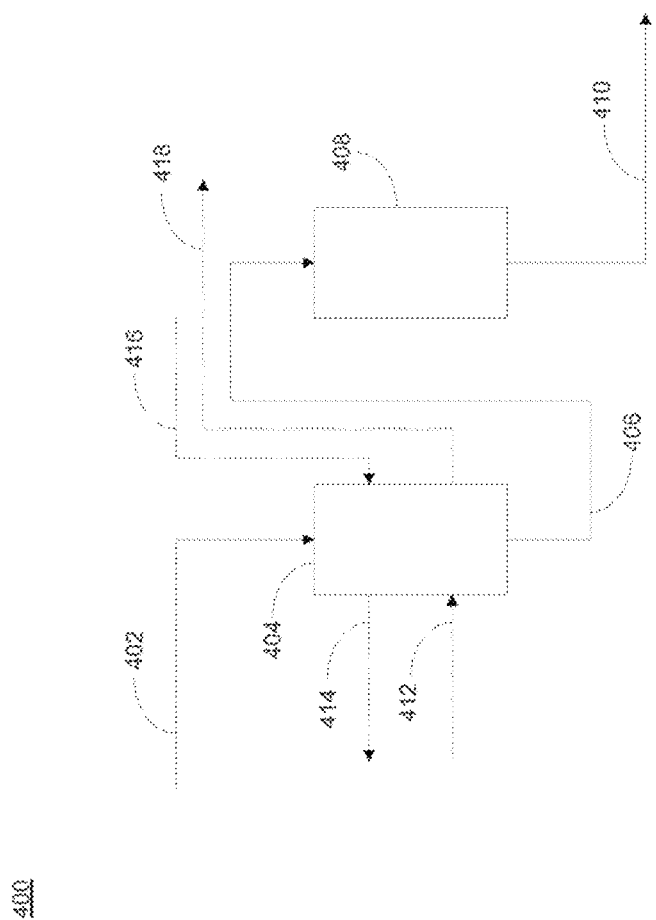
FIG. 4 is an illustration of an apparatus for the removal of silica from a silica containing brine according to an embodiment of the present invention.

Referring to FIG. 4, apparatus 400 for the removal of silica by adsorption with activated alumina is provided. A silica containing solution or silica containing brine is supplied via line 402 to first adsorbent column 404, which is charged with activated alumina and is operable to remove at least a portion of the silica present in the brine or other solution and produce treated stream 406 having a reduced silica content relative to that of the stream being fed through line 402. Treated stream 406 can then be supplied to a second adsorbent column 408, which can also be charged with an activated alumina adsorbent that is operable to remove at least a portion of the silica present in treated stream 406 to produce a product stream 410 having a reduced silica content relative to the silica containing solution or silica containing brine supplied via line 402, and in certain embodiments, relative to treated stream 406.

In certain embodiments, regenerant solution 412 can be supplied to first adsorbent column 404. Regenerant solution 412 can be a strong base, and can be supplied to remove silica adsorbed onto the activated alumina. Waste stream 414 is configured to provide means for the removal of the regenerant solution and any silica removed from the activated alumina. Optionally, as noted above, a strong acid can be supplied to first adsorbent column 404 after the regenerant solution, and/or a sodium fluoride solution can be supplied to the column. While FIG. 4 shows that regenerant solution 412 is supplied at the bottom of adsorbent column 404 and flows in a counter-current flow, it is understood that the regenerant solution can also be supplied such that it flows in a co-current flow.

In certain embodiments, wash water 416, such as deionized water, can be supplied to adsorbent column 404 and a wash water waste stream 418 can be removed from the column. While the wash water is shown as being supplied in a co-current flow, it is understood that the wash water can be supplied in a counter-current flow.

In certain embodiments, apparatus 400 can include more than two adsorbent columns. In certain methods wherein three or more columns are included in the apparatus, only two adsorbent columns are utilized at any one time. When the activated alumina of one column begins to lose efficiency (i.e., when silica has become adsorbed to a major portion of the activated alumina such that the increasing amounts of silica are not removed by the column), that column can be removed from service and a third column can be employed. When the column is removed from service, it can be regenerated, as described above, and returned to service when the efficiency of the second column decreases, thereby indicating the adsorbent in the second column is losing effectiveness. In this manner, apparatus 400 can be run continuously as two columns and can be employed for the removal of silica while a third column is regenerated.

In certain embodiments, a brine, such as a geothermal brine, can be supplied to a process designed to remove a significant portion of silica, and optionally iron, present in the brine as a precursor step to the subsequent recovery of valuable components, such as potassium, rubidium, cesium, lithium, zinc, and manganese, and other elements. Exemplary methods for the reduction of the silica concentration include those described herein. The treated brine solution having a reduced silica concentration can then be supplied to an associated process that is designed to selectively remove one or more components from the treated brine. Optionally, the process for the removal of silica can also include the removal of iron.

In certain embodiments, the treated brine can be supplied to a process designed to selectively remove and recover lithium. Certain methods for the recovery are known in the art, such as is described in U.S. Pat. Nos. 4,116,856, 4,116,858, 4,159,311, 4,221,767, 4,291,001, 4,347,327, 4,348,295, 4,348,296, 4,348,297, 4,376,100, 4,430,311, 4,461,714, 4,472,362, 4,540,509, 4,727,167, 5,389,349, 5,599,516, 6,017,500, 6,048,507, 6,280,693, 6,555,078, 8,287,829, 8,435,468, 8,574,519, and 8,637,428.

Alternatively, methods can be employed utilizing a lithium aluminate intercalate/gibbsite composite material, a resin based lithium aluminate intercalate, and a granulated lithium aluminate intercalate as described in U.S. Pat. No. 8,637,428 and U.S. patent application Ser. Nos. 12/945,519 and 13/283,311. Preferably, recovery of lithium occurs without the co-precipitation of other metals.

Figure 5:
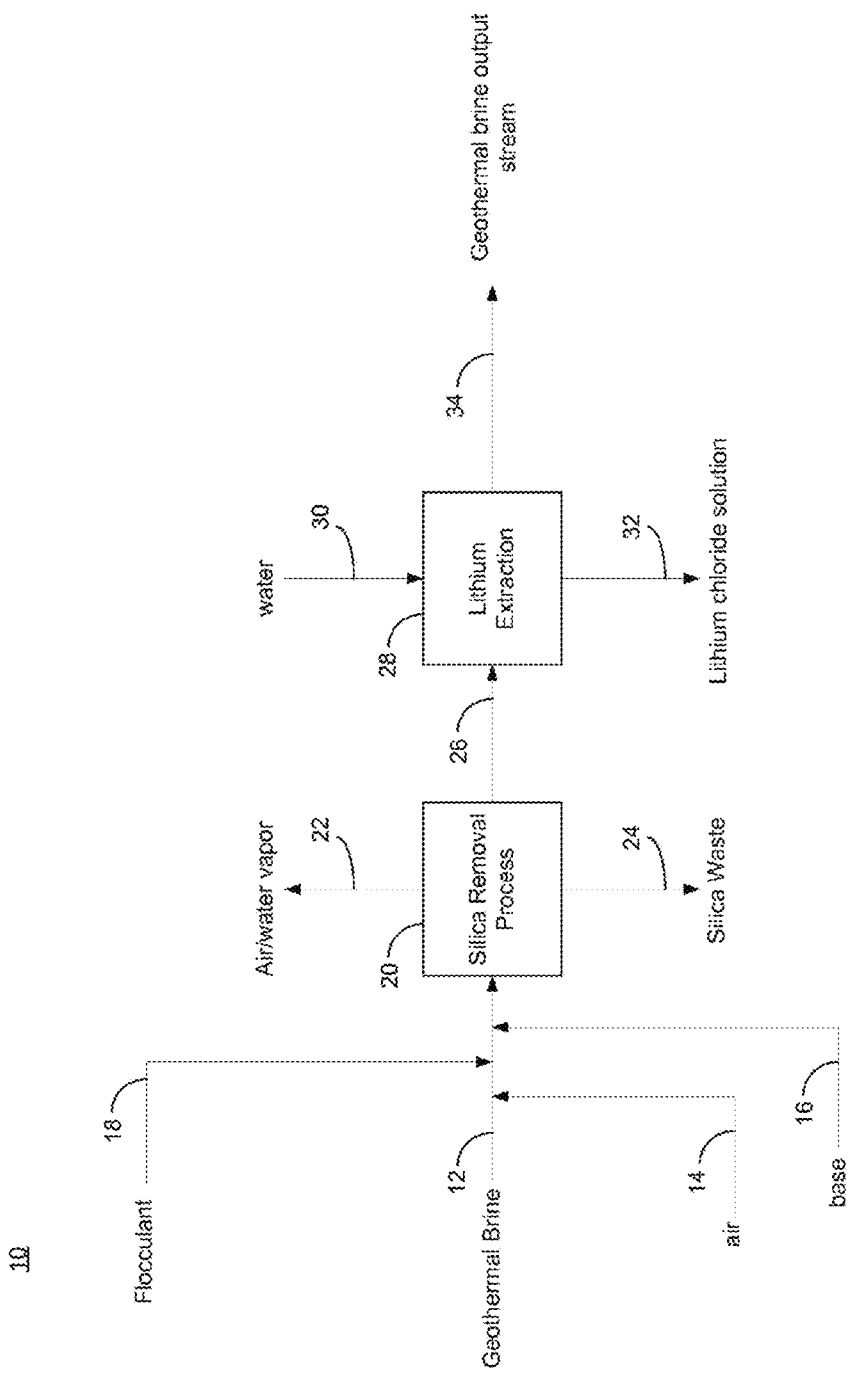
FIG. 5 is an illustration of a process for the removal of silica and iron from a geothermal brine, followed by the subsequent removal of lithium according to an embodiment of the present invention.

For example, as shown in FIG. 5, process 10 for the removal of silica and iron from brine, followed by the subsequent removal of lithium, is provided. In an exemplary embodiment, brine 12, having a silica concentration of at least about 100 ppm, an iron concentration of at least about 500 ppm, and a recoverable amount of lithium or other metal, is supplied with air 14, base stream 16, and flocculant stream 18 to a silica removal process 20.

Silica removal process 20 can produce brine solution 26 having a reduced concentration of silica, and optionally iron, compared to the initial brine, as well as a reaction by-product stream 24 that includes silica that was previously present in the geothermal brine. Additionally, air/water vapor are produced and removed via line 22.

The brine solution 26 having a reduced concentration of silica and iron can be supplied to a lithium recovery process 28. The lithium recovery process can include a column or other means for contacting the brine with an extraction material suitable for the extraction and subsequent recovery of lithium. In certain embodiments, the extraction material can be a lithium aluminate intercalate, an inorganic material with a layered crystal structure that is both highly selective for lithium and economically viable. Exemplary lithium intercalate materials can include a lithium aluminate intercalate/gibbsite composite material, a resin based lithium aluminate intercalate and a granulated lithium aluminate intercalate. The gibbsite composite can be a lithium aluminate intercalate that is grown onto an aluminum trihydrate core. The resin-based lithium aluminate intercalate can be formed within the pores of a macroreticular ion exchange resin. The granulated lithium aluminate intercalate can consist of fine-grained lithium aluminate intercalate produced by the incorporation of a small amount of inorganic polymer.

The process of contacting the lithium aluminate intercalate material with the brine is typically carried out in a column that includes the extraction material. The brine flows into the column and lithium ions are captured on the extraction material, while the water and other ions pass through the column as geothermal brine output stream 34. After the column is saturated, the captured lithium is removed by flowing water supplied via line 30, wherein the water can include a small amount of lithium chloride present, through the column to produce lithium chloride stream 32. In other embodiments, multiple columns are employed for the capture of the lithium.

Figure 6:
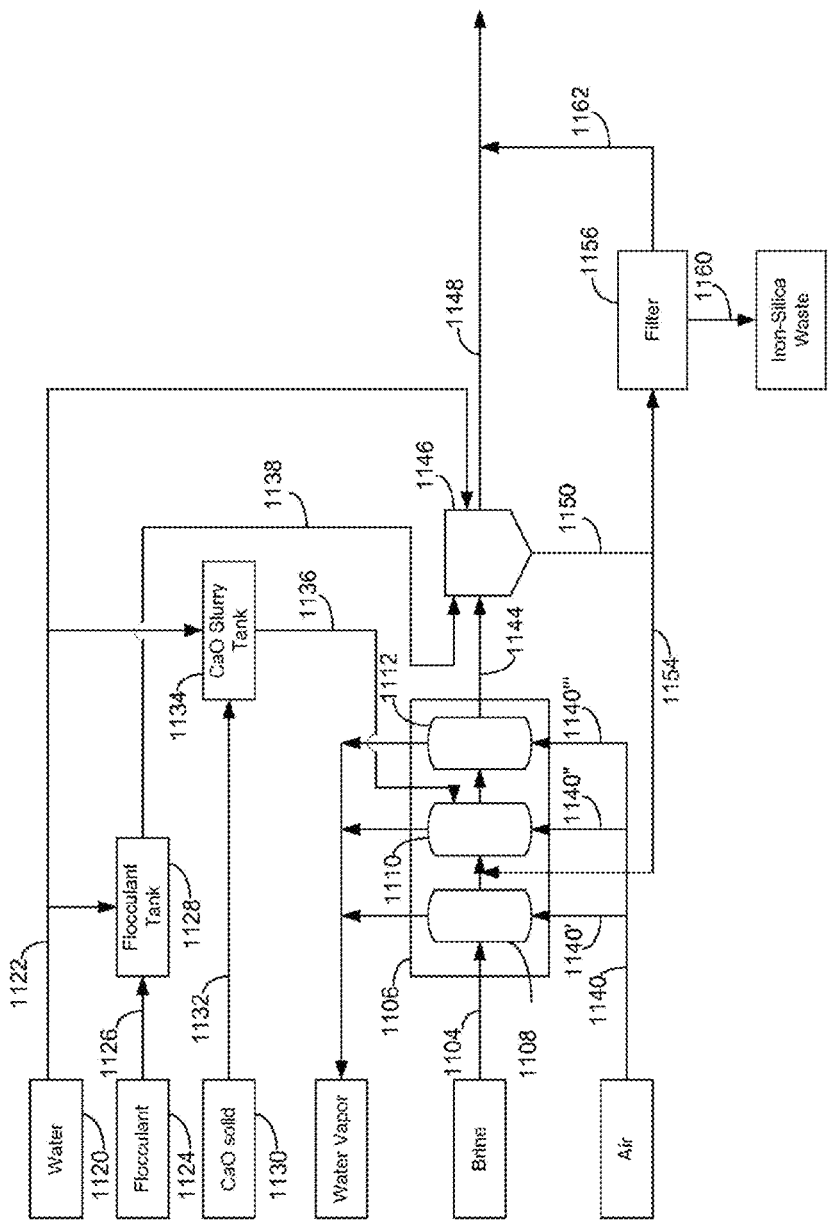
FIG. 6 is an illustration of a continuous process for the management of silica according to an embodiment of the present invention.

As shown in FIG. 6, a continuous process for the management of silica is provided. Silica management system 1106 includes three stirred vessels 1108, 1110, and 1112 provided in series. To first reactor 1108 is provided a geothermal brine via line 1104. In some embodiments, the geothermal brine has an iron content of approximately 1500 ppm and a silica content of about 160 ppm is added at a rate of about 6 gpm. Air is supplied via line 1140 to each reactor 1108, 1110, and 1112 and is sparged through the geothermal brine. In some embodiments, the air is supplied at a rate of about 100 cfm. In some embodiments, the brine supplied to each of the three reactors is maintained at a temperature of about 95° C.

An aqueous calcium oxide slurry is prepared by mixing solid calcium oxide proved from tank 1130 via line 1132 to vessel 1134, where the solid is mixed with water 1120 provided via line 1122. In some embodiments, the calcium oxide slurry includes between about 15 and 25% by weight, alternatively about 20% by weight, calcium oxide, and is supplied to second reactor 1110 at a rate on a wet basis of about 0.5 lb/min.

In silica management system 1106, brine is supplied to first vessel 1108 where the brine is sparged with air via line 1140'. The brine is then supplied from first vessel 1108 to second vessel 1110. The brine in second vessel 1110 is contacted with calcium oxide supplied via line 1136 and is again sparged with air supplied via line 1140". The brine is then supplied from second vessel 1110 to third vessel 1112 where it is again sparged with air supplied via line 1140'''. In some embodiments, the air to the vessels is supplied at a constant rate. In further embodiments, the air to the vessels is supplied at a constant rate of about 100 cfm.

After the addition of the air via line 1140' to first reactor 1108, the pH drops. In some embodiments, the pH drops to between about 2.3 and 3.5. Air is added to second reactor 1110 via line 1140". In some embodiments, air is supplied at a rate of about 100 cfm and a charge of approximately 15-25% by weight of an aqueous calcium oxide slurry at a rate of about 0.5 lb/min., which can raise the pH in the second reactor to between about 4.8 and 6.5, and preferably between about 5.0 and 5.5. The addition of calcium oxide slurry initiates the precipitation of iron (III) hydroxide and iron silicate. In some embodiments, to third reactor 1112, air is added via line 1140''' at a rate of about 100 cfm. Each of the three reactors includes means for stirring to ensure sufficient mixing of the brine, base, and air oxidant.

In some embodiments, the continuous addition of air and base to the reaction vessels results in the precipitation of the iron and silica at rates up to about 0.5 lb/min., depending upon the concentration of iron and silica in the geothermal brine.

The geothermal brine, which now includes precipitates of iron (III) hydroxide and iron silicate, is then supplied from third vessel 1112 to clarifier 1146 via line 1144. Water may be added to clarifier 1146 via line 1122. In some embodiments, an aqueous flocculant solution of Magnafloc 351, in a concentration between about 0.005% and 1% by weight, such as about 0.025% by weight, is prepared by supplying solid flocculant 1124 via line 1126 to flocculant tank 1128, where the solid is contacted with water 1120 supplied via line 1122. In further embodiments, the aqueous flocculant solution is supplied to clarifier vessel 1146 via line 1138 at a rate of about 0.01 gpm.

Two streams are produced from clarifier 1146. First clarifier product stream 1148 includes the geothermal brine having a reduced concentration of silica and iron, and may be supplied to a secondary process, such as lithium recovery. Second clarifier product stream 1150 includes solid silica-iron waste, as well as some geothermal brine. Stream 1150 can be supplied to filter process 1156 which serves to separate the solid silica-iron waste 1160 from the liquid brine 1162. Alternately, a portion stream 1160 can be resupplied (not shown) to second vessel 1110 via line 1154.

Alternate processes for the removal of silica can also be employed as described herein.

In certain embodiments, the treated brine solution can be supplied to a process designed to selectively remove and recover at least one of manganese and zinc. In a first embodiment, the pH of the solution can be adjusted to selectively precipitate zinc and/or manganese. Following precipitation of zinc and/or manganese, the solids can be separated from the solution by known filtration means.

Separation of the zinc and manganese solids can be achieved by dissolving the solids in acid, followed by selective recovery of either zinc or manganese. In certain embodiments, manganese can be oxidized to precipitate a manganese solid, which can be separated by filtration. Zinc remaining in solution can be recovered by electrochemical means.

Alternatively, zinc and/or manganese can be selectively removed by extraction. In certain embodiments, zinc and manganese can be separately recovered by individual extractions, or by double extraction. In certain embodiments, zinc and manganese can each selectively be recovered by electrochemical means.

Known methods for the recovery of zinc that can be used for recovery from brine solutions are described in U.S. Pat. Nos. 5,229,003, 5,358,700, 5,441,712, 6,458,184, 8,454,816, and 8,518,232.

Known methods for the recovery of manganese that can be used for recovery from brine solutions are described in U.S. Pat. Nos. 6,682,644, 8,454,816, 8,518,232, and U.S. Patent Publication Nos. 2003/0226761 and 2004/0149590.

Figure 7:
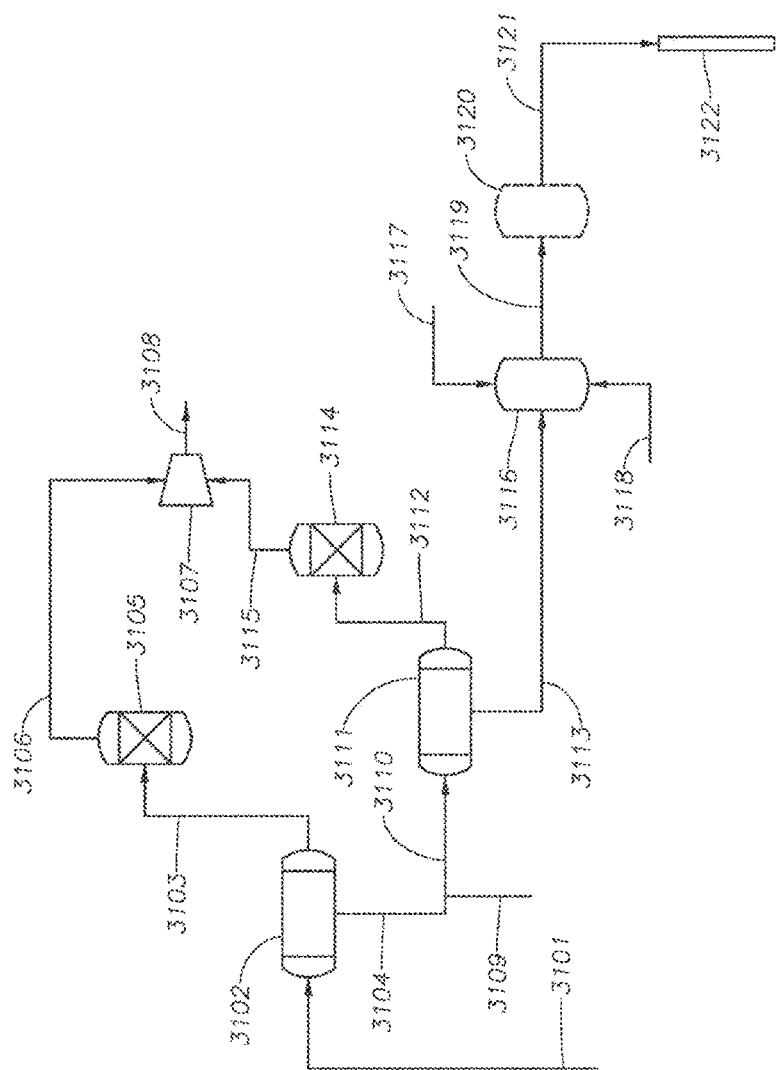
FIG. 7 shows a process according to an embodiment using a pH modification process.
Figure 8:
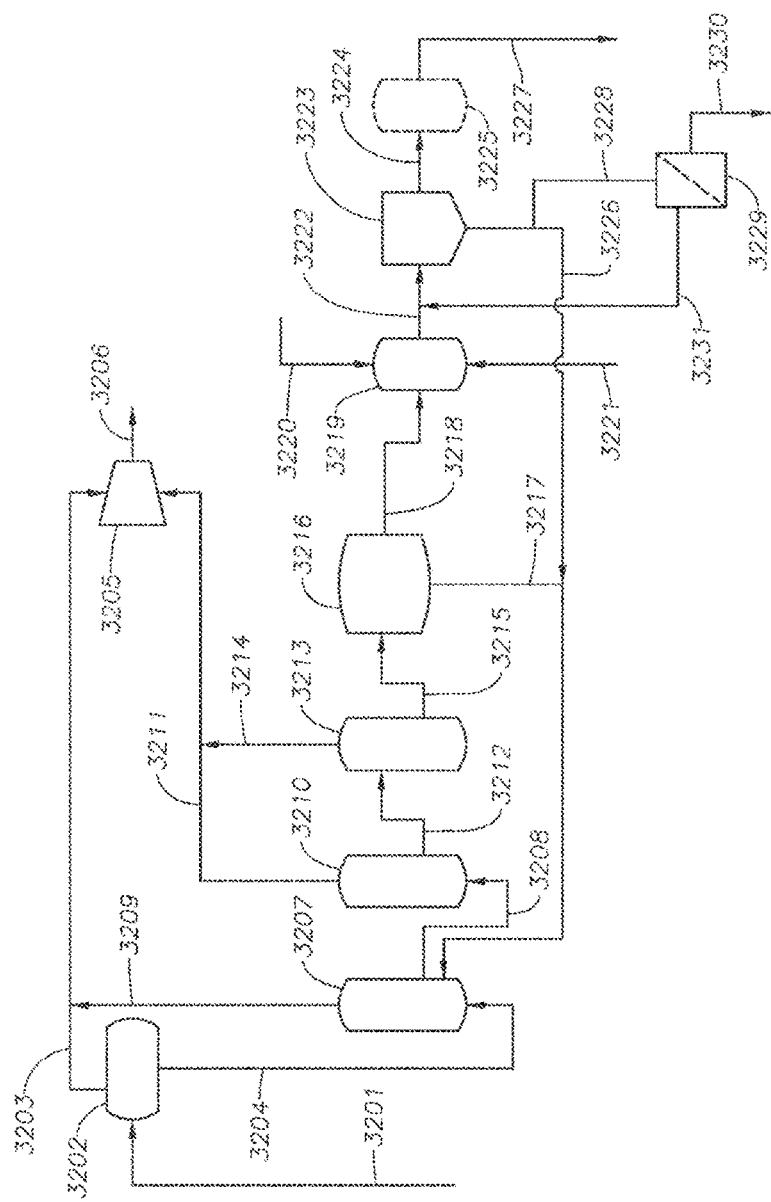
FIG. 8 shows a process according to an embodiment using a crystallizer reactor clarifier process.
Figure 9:
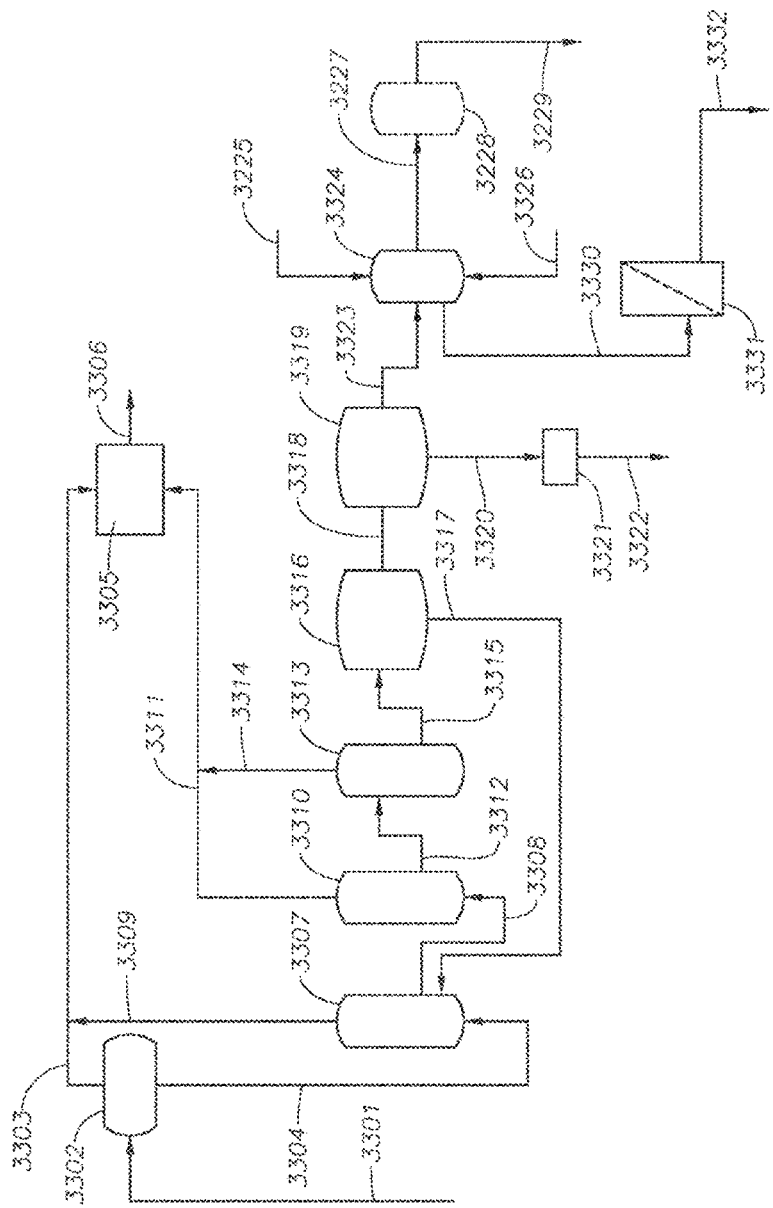
FIG. 9 shows a process according to an embodiment using a crystallizer reactor clarifier process.

FIGS. 7, 8, and 9 show exemplary embodiments of the present invention. FIG. 7 is an illustration of an exemplary embodiment of power production using a geothermal brine, followed by silica management. The brine 3101 is taken from a reservoir and supplied to a high pressure separator 3102. From the high pressure separator are produced two streams, hot brine 3104 and steam 3103. The steam 3103 is then fed to a condenser 3105 to remove salts and entrained water whereby high pressure steam 3106 is generated and fed to a turbine/generator 3107 to produce energy 3108. An acid 3109, preferably hydrochloric acid is added to the hot brine 3104, as the brine is a chloride brine. Other acids also can be used. The acid/hot brine stream 3110 is then fed to a standard pressure separator 3111. Two streams are produced from the standard pressure separator, a standard pressure steam 3112 and return brine 3113. The standard pressure steam 3112 is then fed to a condenser 3114 to remove entrained brine whereby clean standard pressure steam 3115 is generated and fed to turbine/generator 3107 to produce energy 3108. The return brine 3113 is fed to an iron-silica removal process 3116 whereby iron and silica are removed from the brine by addition of a base 3117 and an oxidant 3118 to produce a reduced silica and iron brine stream 3119. The reduced silica and iron brine stream can optionally be fed to a mineral extraction process 3120 whereby at least one mineral is removed from the reduced silica and iron brine stream. The reduced silica and iron brine stream 3121 is then injected into a reservoir 3122.

FIG. 8 is an illustration of an exemplary embodiment of power production using a geothermal brine, followed by silica management. The brine 3201 is taken from a reservoir and supplied to a high pressure separator 3202. From the high pressure separator 3202 are produced two streams, high pressure steam 3203 and concentrated brine stream 3204. The high pressure stream 3203 is then fed to a turbine/generator 3205 to produce energy 3206. The concentrated brine stream 3204 is then fed to a high pressure crystallizer 3207 to produce a stream 3208 that is fed to a low pressure crystallizer 3210. A high pressure steam 3209 is generated and fed to a turbine/generator 3205 to produce energy 3206. From the low pressure crystallizer 3210 is produced a low pressure steam 3211 that is fed to the turbine/generator 3205 to produce electricity 3206 and a stream 3212 that is fed to a flash tank 3213. From the flash tank 3213 are produced two streams, low pressure steam 3214 that is fed to a turbine 3205 and a stream of brine and silica solids 3215 that are fed to a primary clarifier 3216. From the primary clarifier 3216, seeds 3217 are recycled to the high pressure crystallizer 3207 and brine 3218 is fed to a silica management process 3219 to remove silica by addition of a base 3220 and an oxidant 3221. Optionally, iron may be removed, as well. From the silica management process 3219, a reduced silica (and optionally reduced iron) brine 3222 is then fed to a secondary clarifier 3223 to remove silica. From the secondary clarifier 3223 the stream 3224 is fed to an optional metal recovery process 3225. Seeds 3226 are also recycled from the secondary clarifier 3223 to the high pressure crystallizer 3207. The reduced silica (and optionally reduced iron) brine 3227 is then injected into a reservoir. Stream 3228 can be supplied to filter process 3229 which serves to separate the solid silica-iron waste 3230 from the liquid brine 3228. Alternately, stream 3231 can be resupplied to second clarifier 3223.

Similarly, FIG. 9 is an illustration of an exemplary embodiment of power production using a geothermal brine, followed by silica management. The brine 3301 is taken from a reservoir and supplied to a high pressure separator 3302. From the high pressure separator 3302 are produced two streams, high pressure steam 3303 and concentrated brine stream 3304. The high pressure steam 3303 is then fed to a turbine/generator 3305 to produce energy 3306. The concentrated brine stream 3304 is then fed to a high pressure crystallizer 3307 to produce a stream 3308 that is fed to a low pressure crystallizer 3310. A high pressure steam 3309 is generated and fed to a turbine/generator 3305 to produce energy 3306. From the low pressure crystallizer 3310 is produced a low pressure steam 3311 that is fed to the turbine/generator 3305 to produce electricity 3306 and a stream 3312 that is fed to a flash tank 3313. From the flash tank 3313 are produced two streams, a low pressure steam 3314 that is fed to a turbine 3305, and a stream of brine and silica solids 3315 that is fed to a primary clarifier 3316. From the primary clarifier 3316, seeds 3317 are recycled to the high pressure crystallizer 3307, and the brine 3318 is fed to a secondary clarifier 3319. While the primary clarifier 3316 removes the bulk of the solids, the secondary clarifier 3319 can further reduced the TSS. From the secondary clarifier 3319, two streams are produced. One stream 3320 is fed in part to a filter 3321 or alternative solids liquid separator where silica solids 3322 are removed. The brine containing silica and iron 3323 is fed to a silica management process 3324, which receives base 3325 and oxidant 3326. Optionally, iron can be removed as well. In some embodiments, the brine contains about 160 ppm silica and about 1600 to 2000 ppm of iron. The reduced silica (and optionally reduced iron) brine 3327 may be fed to an optional metal recovery process 3328. The reduced silica (and optionally reduced iron) brine is then injected into a reservoir 3329. Stream 3330 can be supplied to filter process 3331 which serves to separate the solid silica-iron waste 3332.

In further embodiments, the reduced silica (and optionally reduced iron) brine is then supplied to a process for the selective removal of lithium. In certain embodiments, the brine or lithium containing solution can be filtered or treated to remove solids or other elements present prior to the selective recovery of lithium.

Preparation of Brines with Reduced Lithium Concentrations Using Lithium Aluminate Intercalate—Polymer Matrix In certain embodiments, a brine composition, particularly treated geothermal brine compositions, with reduced silica and iron concentrations is processed through a lithium aluminate intercalate (LAI) matrix for the removal and recovery of lithium. The LAI matrix advantageously provides the maximum lithium to aluminum ratio, thereby providing increased capacity for removal and recovery of lithium. In certain embodiments, the LAI matrix has a mole fraction of lithium to aluminum of greater than about 0.3, preferably about 0.33. The higher ratio of lithium to aluminum maximizes the number of lithium sites available in the matrix for the loading and unloading of lithium from a brine solution. By producing a material that has the maximum lithium to aluminum ratio, the aluminum hydroxide substrate can then break down to fine particles, and will not exist as a single integral mass. The fine particles, which still retain a maximum lithium to aluminum ratio, can have an average diameter of less than about 80 µm, alternatively less than about 50 µm, alternatively less than about 25 µm, alternatively less than about 10 µm, alternatively less than about 5 µm. In certain embodiments, the particulate matter has a diameter of between about 0.1 and 10 µm, alternatively between about 0.5 and 8 µm, alternatively between about 1 and 5 µm. In certain embodiments, at least about 50% of the particulate matter has a diameter of less than about 2 µm, alternatively at least about 75% of the particulate matter has a diameter of less than about 2 µm, alternatively at least about 90% of the particulate matter has a diameter of less than about 2 µm. In certain embodiments, the particulate matter has a bimodal size distribution, wherein the material has a first peak distribution of about 50 µm and a second peak distribution of about 10 µm.

In some aspects, the LAI matrix is prepared by mixing a lithium aluminum intercalate (LiCl:Al(OH)$_3$) with a polymer or plastic material. The LAI matrix includes a major portion of a lithium aluminum intercalate, prepared according to known methods, and a minor portion that includes polymeric or plastic material that serves as a binder. In certain embodiments, the matrix includes at least about 75% by weight of the LAI. In certain embodiments, the matrix includes at least about 80% by weight of the LAI, and up to about 20% by weight of the plastic material. In alternate embodiments, the matrix includes at least about 85% by weight of the LAI and up to about 15% by weight of the plastic material. Alternatively, the matrix can include at least about 90% by weight of the LAI and up to about 10% by weight of the plastic material. In certain embodiments, the matrix includes between about 85-95% by weight of the LAI, and between about 5-15% by weight of the plastic material. In alternate embodiments, the matrix includes between about 88-94% by weight of the LAI, and between about 6-12% by weight of the plastic material. In an exemplary embodiment, the LAI matrix includes about 90% by weight LAI and about 10% by weight of the polymer or plastic material.

In certain embodiments, the matrix includes at least about 75% by volume of the LAI. In certain embodiments, the matrix includes at least about 80% by volume of the LAI, and up to about 20% by volume of the plastic material. In alternate embodiments, the matrix includes at least about 85% by volume of the LAI and up to about 15% by volume of the plastic material. Alternatively, the matrix can include at least about 90% by volume of the LAI and up to about 10% by volume of the plastic material. In certain embodiments, the matrix includes between about 85-95% by volume of the LAI, and between about 5-15% by volume of the plastic material. In alternate embodiments, the matrix includes between about 88-94% by volume of the LAI, and between about 6-12% by volume of the plastic material. In an exemplary embodiment, the LAI matrix includes about 90% by volume LAI and about 10% by volume of the polymer or plastic material.

The LAI can be prepared by known means, such as is described in U.S. Pat. No. 6,280,693. Generally, in certain embodiments, the LAI can be prepared by contacting alumina pellets, lithium hydroxide, and water, then allowing the lithium hydroxide to infuse the alumina. In certain embodiments, the lithium hydroxide can be replaced with lithium salts, such as lithium chloride or other like lithium salts, and combinations thereof. Suitable sources of the alumina can include gibbsite, alumina hydrate, bayerite, norstrandite, bauxite, amorphous aluminum trihydroxide and activated alumina. The infusion can be a slow process that is typically completed in about 2-48 hours, although it is understood that the process can proceed at different rates, depending upon the exact conditions, such as temperature, used for the infusion process. Infusion is typically carried at or near room temperature, but can also be carried out at elevated temperatures up to about 125° C. (at pressures of less than about 5 atm). Following infusion of the lithium hydroxide into the alumina, the solution can then be neutralized by adding hydrochloric acid or other like acid, to achieve a pH of between about 5 and 7. When the acid used is HCl, the acidification of the solution produces LiCl/2Al(OH)$_3$. It is the intention to fracture the infused material, thereby generating a fine particulate matter, rather than an integral mass. In certain embodiments, the fine particulate matter has a diameter of less than about 80 µm, alternatively less than about 50 µm, alternatively less than about 25 µm, alternatively less than about 10 µm. In certain embodiments, the material has a bimodal size distribution wherein the material has a first peak distribution of about 50 µm and a second peak distribution of about 10 µm. In certain embodiments, the particulate material has a diameter of between about 0.1 and 8 µm, alternatively between about 0.5 and 5 µm. In certain embodiments, at least about 50% of the particulate matter has a diameter of less than about 2 µm, alternatively at least about 75% of the particulate matter has a diameter of less than about 2 µm, alternatively at least about 90% of the particulate matter has a diameter of less than about 2 µm. In certain embodiments, the lithium hydroxide is added to the alumina in a molar ratio of between about 1:1 and 1:5, preferably between about 1:2 and 1:4. The finalized LAI matrix preferably has a stoichiometric composition of LiCl:Al(OH)$_3$ of between about 1:2 and 1:4, preferably between about 0.75:2 and 1:2. In certain embodiments, the LAI can be used as prepared. In alternate embodiments, the LAI can be used as a milled material using known techniques to mill the LAI. In yet other embodiments, the LAI can also be prepared by treating a milled alumina hydrate and with lithium hydroxide, followed by neutralization with acid. Generally, in contrast to similar prior art compositions which utilize integral polycrystalline compositions, the present invention preferably utilizes particulate LAI material, wherein the particulate matter can generally have any shape or size, and may have a diameter of less than about 100 µm, alternatively a diameter of less than about 50 µm. In certain embodiments, the particle size can be greater, for example, between about 200 and 500 µm, or greater, and the resulting larger particles can then be reduced in size by grinding or by other procedure. The use of particles resulting from the grinding of larger particles, however, can in certain instances result in materials having a reduced capacity and a measurable gibbsite content.

The polymer or plastic binder material that makes up the matrix can be selected from any suitable thermoplastic or thermoset polymer material. Representative thermoplastic resins can include polyethylene (PE) (including ultra-high molecular weight polyethylene (UHMWE), high density polyethylene (HDPE), and linear low density polyethylene (LLDPE)), as well as various ethylene co-polymers such as ethylene vinyl acetate, ethylene vinyl alcohol, ethylene vinyl chloride, ethylene co-acrylate, or similar materials, polypropylene (PP) and its copolymers, polymethyl pentene, polystryene, poly vinyl alcohol (PVA), poly acrylic acid (PAA), polyacrylamide (PAM), acrylic and methacrylic polymers, polycarbonate, polyacrylonitrile (PAN), polyvinylidenedifluoride (PVDF) homo or co-polymers, polytetrafluoroethylene (PTFE), and related fluoropolymers, polyurethanes, and polysiloxanes. Representative thermoset resins can include epoxy resins, phenolic resins, vinyl ester resins, one or two component methacrylic resins, melamine based resins, cross-linked polysiloxanes, or other plastic or polymeric materials that can function as suitable matrix materials. In one embodiment, the lithium aluminate matrix is prepared from a polymer that facilitates granulation. In another embodiment, the matrix polymer precursor is water based, such as a water soluble resin, an aqueous dispersion, or an emulsion. In certain embodiments, the plastic and polymeric materials are suitable for operation at temperatures in excess of about 90° C. Alternatively, the materials are suitable for operation at temperatures in excess of about 100° C. In yet other embodiments, the materials are suitable for operation at temperatures in excess of about 110° C. The polymer or plastic material can be added to the LAI material as a solid powder or pellet form and mixed together, or it can be added as a low or high viscosity fluid. Preferably, the LAI and the polymer or plastic material are thoroughly mixed together.

In certain embodiments, the polymer is an emulsified water insoluble polymer. In certain embodiments, the water insoluble polymer is a fluoropolymer. In certain embodiments, the water insoluble polymer is an acrylic interpolymer. In certain embodiments, the polymer can be a cross-linked polymer.

In certain embodiments, the polymer/plastic material and the LAI material can be mixed together and sintered at elevated temperature to form the LAI matrix. In certain embodiments, pressure can be applied to the mixture before, during, or after the sintering process. In certain embodiments, up to about 10,000 psi can be applied to the mixture, with or without concurrent heating thereof. In certain embodiments, pressure of at least about 2500 psi is applied. In alternate embodiments, increasingly greater pressures are applied to the mixture. The resulting sintered product is typically a solid, which can then be broken into smaller pieces, preferably to form a plurality of particulates, for use. Optionally, the solid sintered products can be ground to a desired particulate diameter or size. In certain embodiments, the ground LAI matrix can be separated, using for example sieves, to provide multiple sizes or ranges of diameters of the LAI matrix particles.

In one exemplary embodiment, an LAI matrix is prepared from a mixture that includes the LAI powder and a powdered polymer, which can be combined in a mixing vessel and thoroughly mixed. The resulting LAI powder and powdered polymer mixture can then be subjected to elevated temperature and/or pressures utilizing a hydraulic press, a roll mill, an extruder, or a high shear mixer. For example, in certain embodiments, the powder mixture can be subjected to pressures of at least about 3000 psi, for a time period of at least about 3 minutes. In certain other embodiments, the powder mixture can be subjected to increasing pressures, for example, the powder mixture can first be subjected to increasing pressures of at least 3000 psi, and up to about 10,000 psi. In one specific embodiment, the powder mixture is sintered, wherein the powder mixture subjected to a pressure of about 3000 psi for about 1 minute, released, subjected to a pressure of about 4000 psi for about 1 minute, released, subjected to a pressure of about 5000 psi for about 3 minutes, released, subjected to a pressure of about 10,000 psi for about 3 minutes, and released. In certain embodiments, during sintering, the press can be heated to a temperature of greater than about 100° C., preferably greater than about 200° C., more preferably greater than about 300° C. It is preferred that the temperature during sintering be maintained at below about 250° C., which, in certain embodiments, is approximately the limit of the thermal stability of the LAI. The resulting solid sintered block or sheet can then be broken into large granules utilizing a hammer or like instrument to provide a variety of different sized particles. The resulting particles can then be sieved into various fractions, such as, a first fraction having a diameter of between about 300 and 450 µm, a second fraction having a diameter between about 180 and 300 µm, and a third fraction having a diameter of between about 100 and 180 µm. In certain embodiments, particles having a diameter of up to about 1000 µm can be used in accordance with the methods described herein, alternatively particles having a diameter of between about 200 and 800 µm, alternatively between about 200 and 500 µm, alternatively between about 500 and 800 µm.

In one embodiment, a water based polymer or polymer precursor is added to LAI powder in a high shear agglomerator, such that small particles are produced directly that may then be used as prepared, or can be further processed by drying and/or curing at elevated temperatures. In another embodiment, LAI powder is mixed with a polymer binder that includes one or more of an acrylic emulsion, a water soluble polymer, or an emulsion of an interpolymer of polyvinylidine fluoride and acrylic, optionally including at least one cross-linking agent, to form a viscous fluid or mass, which can then be formed into particles, sheets, strings, or other desired shapes, dried, cured, and optionally subjected to a granulating process.

In certain embodiments, the LAI-polymer matrix can be pressed in a mold to form any desired shape or size. In certain embodiments, the LAI-polymer matrix can be cured and formed as a sheet or like shape, suitable for use as, for example, a cartridge filter wherein a lithium containing solution is passed over and/or through the sheet for the extraction of the lithium containing ions.

In other embodiments, the LAI-polymer matrix can be pressed into a mold and cured to form a sheet or film that is permeable to lithium salts, but not porous to the solution. Such a sheet or film can be employed in a variety of ways to remove lithium from a brine. For example, in one embodiment, the lithium salt permeable sheet or film can be placed between two fluids, wherein the first fluid is a lithium containing solution or brine, and the second fluid is a low ionic strength solution. The lithium salts from the lithium containing solution or brine would be intercalated into the permeable sheet or film and would pass through to the low ionic strength solution on the other side of the sheet or film. Without wishing to be bound by any specific theory, it is believed that the lithium salts would pass through the sheet or film from the brine to the low ionic strength solution by a tunneling or like mechanism.

In certain embodiments, a lithium ion permeable sheet or film may prevent cross-contamination by other salts as only lithium salts can pass through the sheet or film.

In certain embodiments, the lithium ion permeable sheet or film can find other uses, for example, as a membrane for electrolysis or electrodialysis and therefore serve as a means of extraction and concentration.

The LAI-polymer matrix is preferably formed of particles having a diameter of between about 0.05 and 5 mm, preferably less than about 2.5 mm in diameter, and even more preferably between about 0.1 and 2 mm in diameter. In certain embodiments, the particles have a diameter of between about 0.1 and 0.5 mm. Alternatively, the particles have a diameter of between about 0.2 and 0.8 mm, alternatively between about 0.2 and 0.4 mm, alternatively between about 0.2 and 0.6 mm, alternatively between about 0.4 and 0.6 mm, or alternatively between about 0.6 and 0.8 mm.

In certain embodiments, other additives can be added to the matrix. For example, in one embodiment, a pore forming material can be added to the matrix material and then removed after matrix formation. Preferred pore forming materials can include water or alcohol soluble salts, such as calcium carbonate, lithium chloride, sodium chloride, sodium sulfate, sodium benzoate, organic materials such as polyvinyl alcohol, sugars, polyethylene oxide and copolymers, urea, calcium carbonate, and triacetin. In certain embodiments, a calcined diatomaceous earth and similar material may be added to the matrix to promote fluid flow and prevent compaction of the matrix and the resultant loss of permeability. These additives are generally added before, or during the sintering process.

Generally, during use, the LAI matrix prepared according to the above-described process is washed with a predetermined amount of water to remove a portion of the LiCl from the matrix, thereby creating vacant sites that are available to receive lithium halides or other lithium salts from a brine or solution. For example, upon exposure to a solution or brine that includes lithium chloride, the LAI matrix can then accept lithium chloride ions. The initial wash water preferably includes at least a small concentration of LiCl. In certain embodiments, the wash water includes at least 100 ppm LiCl. In alternate embodiments, the wash water includes at least 150 ppm LiCl. In yet other embodiments, the wash water includes at least 200 ppm LiCl. In certain embodiments, the wash water may include a salt, such as NaCl, KCl, or any other salt or non-ionic solute that may be advantageous for a particular lithium salt extraction process. Typically, chlorides are selected due to their relatively low cost, however it is understood that other halides can also be used. In certain embodiments, divalent and trivalent salts are avoided.

After the vacant sites in the LAI matrix have been exposed by rinsing with the wash water, the vacant sites can then be loaded with "new" LiCl or other lithium salts by exposing the LAI matrix to the brine or solution that includes LiCl or other lithium salts. In certain embodiments, the brine or solution does not include salts that will compete with the extraction of lithium. As the LiCl in the brine or solution contact a vacant site, the lithium ions are captured by the LAI matrix and fill the exposed vacancies. After the LAI matrix is saturated with lithium salt, for example LiCl, the flow of the brine can be stopped. The captured LiCl can then be unloaded from the LAI matrix by again washing the LAI matrix with wash water. In certain embodiments, as noted with respect to the initial wash water above, the wash water includes a small amount of LiCl present, such as at least 100 ppm of lithium, sufficient to ensure that at least a portion of the capture sites on the LAI matrix are filled with ions to prevent the LAI matrix from collapsing. The process can be repeated many times, as desired.

The loading and unloading of the LAI matrix can be monitored by measuring the lithium concentration of the outlet of the column. Means for monitoring the concentration of the lithium can include ion selective electrodes, ion chromatography, or spectrometric analysis, such as atomic absorption or inductively coupled plasma spectroscopy, and other means known in the art. The loading process is typically fairly efficient, such that at least 50% of the lithium ions in the brine or solution are captured by the LAI matrix, preferably at least 90% of the lithium ions in the brine or solution are captured by the LAI matrix. As such, a rapid increase in the lithium ion concentration at the outlet of the LAI matrix is indicative of saturation of the column. Similarly, when recovering the lithium ions from the LAI matrix, as the process is proceeding and ions are being removed, a sudden decrease in the concentration thereof can be indicative of the removal of a majority of the ions captured by the matrix.

In certain embodiments, the LAI matrix prepared according to the present methods has an extraction capacity suitable for use in brines having a lithium concentration similar to that of the Salton Sea geothermal brines, i.e., a lithium concentration of about 260 ppm, of at least about 1 mg of lithium per gram of the LAI matrix, preferably at least about 1.5 mg of lithium per gram of the LAI matrix, even more preferably at least about 2 mg of lithium per gram of the LAI matrix. The extraction capacities would be larger for brines containing higher concentrations of lithium.

Figure 10:
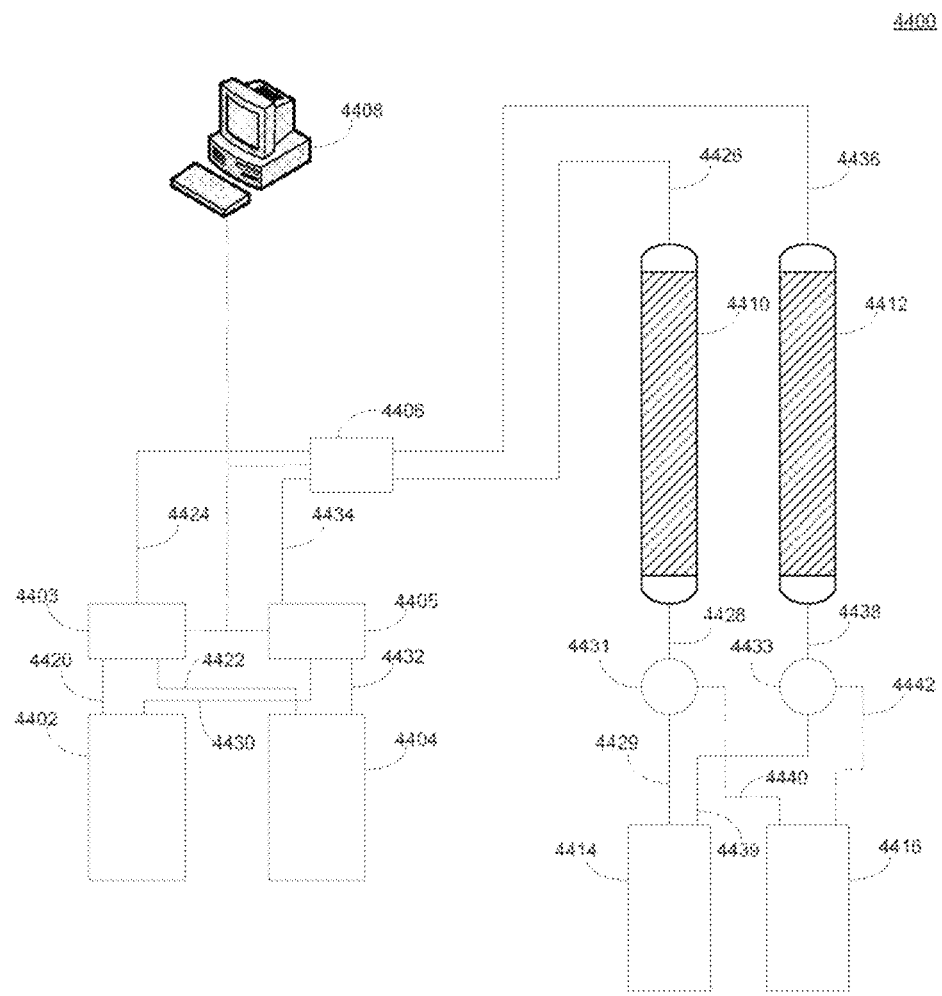
FIG. 10 is a schematic diagram of an apparatus for the production of treated brine composition with reduced lithium.

Referring now to FIG. 10, an exemplary laboratory apparatus for the capture and recovery of lithium ions from a solution or brine is provided. In an embodiment, the solution used herein can be a treated brine composition with reduced concentrations of silica and iron. Apparatus 4400 includes first vessel 4402 for holding a wash (strip) solution and second vessel 4404 for the brine. Vessel 4404 can also contain treated brines with reduced concentrations of silica and/or iron. Valves 4403 and 4405 are connected to computer 4408 and control the input of fluid, i.e., brine or wash solution. Apparatus 4400 further includes digital peristaltic pump 4406 (DPP). Computer 4408 can be coupled to various instruments, such as DPP 4406, and valves 4403 and 4405, and is also a component of apparatus 4400. Apparatus 4400 further includes first LAI matrix column 4410 and second LAI matrix column 4412. Collection vessel 4414 facilitates the collection of wash liquids, and treated brine compositions with reduced concentrations of lithium, silica, and/or iron. Solutions containing the extracted lithium ions can be recovered in sequential aliquots in product collection fractionator 4416. As is understood, apparatus 4400 may also include various heat exchangers, valves, and filters, for the control of the process.

Apparatus 4400 includes two columns, 4410 and 4412 respectively, which are preferably packed with the LAI matrix, typically as particulate matter, according to the present invention. It is understood that the apparatus can include a single column, or can include multiple columns. Glass wool, filters, or the like can be used at the top and bottom of the column to ensure that the LAI matrix, or fines thereof, are not washed out of the column. In operation, columns 4410 and 4412 are operated in parallel, although in certain embodiments the columns can be alternated such that while one column is being loaded, the second column is being unloaded.

For example, during the loading of first column 4410, brine from vessel 4404 is supplied via line 4422 to solenoid valve 4403, and can then be supplied via line 4424 to DPP 4406. The brine is then supplied from DPP 4406 via line 4426 to first column 4410, where the brine contacts the LAI matrix, which is operable to remove lithium ions from said brine. Treated brine with reduced concentration of lithium is recovered in collection vessel 4414 via line 4428, outlet valve 4431, and line 4429. Simultaneously, second column 4412, which can be saturated with lithium ions, can be unloaded. Wash solution from vessel 4402 can be supplied via line 4430 to solenoid valve 4405, and then supplied to DPP 4406 via line 4434. Wash solution is then supplied via line 4436 to second column 4412, where it contacts the LAI matrix and removes lithium ions saturated thereon. A wash solution that is rich in lithium, as compared with the wash solution contained in vessel 4402, is recovered in product collection fractionator 4416, via line 4438, outlet valve 4433, and line 4442.

As can be seen in FIG. 10, the operations of first and second columns 4410 and 4412 can be reversed and the first column can then be supplied with wash water for recovery of lithium ions and the second column can then be supplied with a brine solution for the removal of lithium therefrom.

For example, during the loading of second column 4412, brine from vessel 4404 can be supplied via line 4432 to valve 4405, and can then be supplied via line 4434 to DPP 4406. The brine is then supplied from DPP 4406 via line 4436 to second column 4412, where the brine contacts the LAI matrix, which is operable to remove lithium ions from said brine. Treated brine with reduced concentration of lithium is recovered in collection vessel 4414 via line 4438, outlet valve 4433, and line 4439. Simultaneously, first column 4410, which is saturated with lithium ions, can be unloaded. Wash solution from vessel 4402 can be supplied via line 4420 to valve 4403, and then supplied to DPP 4406 via line 4424. Wash solution is then supplied via line 4426 to first column 4410, where it contacts the LAI matrix and removes lithium ions saturated thereon. A wash solution that is rich in lithium, as compared with the wash solution contained in vessel 4402, is recovered in product collection fractionator 4416, via line 4428, outlet valve 4431, and line 4440.

In certain embodiments, the LAI matrix is capable of being loaded and unloaded at least 550 times without a noticeable decrease in the performance of the LAI matrix, wherein each linked loading and unloading of the column is referred to as a "cycle." Thus, in certain embodiments, the LAI matrix is capable of being cycled at least 250 times without noticeable decrease in the performance of the matrix, preferably at least 500 times without a noticeable decrease in the performance of the matrix, more preferably at least 1000 times without a noticeable decrease in the performance of the matrix. In certain embodiments, the performance of the LAI matrix, as measured by the amount of lithium that is loaded onto the column and subsequently released from the column does not vary by more than 10% over the course of the cycling of the matrix.

In certain embodiments, the LAI matrices prepared according to the methods described herein are capable of being cycled at least 3000 cycles without a noticeable decrease in the performance of the matrix, and in certain embodiments, at least about 6000 cycles without a noticeable decrease in the performance of the matrix. The unexpected increase in the lifetime of the materials provides a significantly greater lifetime of the material than that of prior art LAI material that do not utilize a polymer for the formation of the matrix.

In addition to demonstrating repeated loading and unloading of the LAI matrix, with consistent extraction and recovery of lithium, the pressure drop across the LAI matrix column was also studied. As is understood in the art, in certain embodiments, it can be advantageous to operate the extraction columns with as low a pressure drop as possible. It has been demonstrated that a column that includes an extraction material that includes an LAL/polyvinylidine fluoride matrix displayed a pressure drop of less than about 15 psi/m of column bed over 550 loading and unloading cycles, which is less than the pressure drop typically exhibited by columns that include an LAI material but is not presented as a matrix with a polymer material.

Preparation of Brines with Reduced Lithium Concentrations Using Lithium Aluminate Intercalate on Solid Support In certain embodiments, a brine composition, particularly treated geothermal brines, with reduced silica and iron concentrations is processed for the removal and recovery of lithium using compositions of lithiated granular aluminum intercalates of lithium salts, which are deposited on a variety of solid supports. As used herein, a solid support upon which a LAI coating has been deposited may be referred to as LAI-S. Generally, the LAI has the chemical formula $(LiAl_2(OH)_6X \cdot H_2O)$, wherein X is generally defined as organic or inorganic anion, such as a halide. In certain embodiments, the substrate can be an inorganic material. Exemplary inorganic support materials can include silica, alumina, activated alumina, iron oxide, titania, zirconia, metal oxide, metal silicate, metal aluminate, metal phosphate, metal sulfate and metal hydroxide particles. In certain embodiments, the support material can be a zeolitic material or clay. In certain embodiments, the support material is a refractory metal oxide. In alternate embodiments, the support material can be a diatomaceous earth. In alternate embodiments, the substrate can be a polymer or resin based material, such as polyethylene or polypropylene. In yet other embodiments, the materials can be a carbon based material. In general, it is desired that the poly aluminum hydroxides have a high affinity to bind to the substrate. In certain embodiments, it can be advantageous that the substrate is a porous material.

In certain preferred embodiments, the support material can be porous. Alternatively, the support material can have a relatively high surface area, for example having a surface area greater than about 200 $m^2/g$, alternatively at least about 500 $m^2/g$. In other embodiments, the support material can have an average particle diameter of between about 1 and 1000 μm, alternatively between about 1 and 200 μm; or alternatively between about 1 and 100 μm. In alternate embodiments, the support material has an average particle diameter of less than about 75 μm. In certain other embodiments, the support material has an average particle diameter of between about 100 and 500 µm. In yet alternate embodiments, the support material has an average particle diameter of between about 25 and 80 µm.

The porous support material can have a pore having a diameter size of between about 0.01 µm and 20 µm, preferably between about 0.1 µm and 10 µm, and most preferably between about 0.1 µm and 5 µm. In certain embodiments, the support material can have a relatively wide pore size, for example, having pores having a diameter of up to about 5 µm. In other embodiments, the support material can have a relatively small pore size, for example, having pores having a diameter of between about 0.1 µm and 0.6 µm. In certain embodiments, wherein the support material is a diatomaceous earth, the pore size may be between about 1 µm and about 5 µm, or alternatively greater than about 5 µm. In alternate embodiments, the pores can be up to about 5 µm in diameter. In another embodiment, the support material can be a neutral activated alumina having a particle size ranging from about 50 µm to 400 µm and a pore size of about 5 nm. In embodiments that employ porous materials, the coating adheres to the exterior surface of the support material, as well as the interior surface of the pores, thereby increasing the surface area to which the coating is applied.

In one embodiment, the porous materials can include diatomaceous earth. One exemplary manufacturer of diatomaceous earth includes EP Minerals (USA). Two exemplary products from EP Minerals suitable for use in the present invention include Celatom MP-78 and FW-80. Certain exemplary diatomaceous earth products suitable for use in the present invention can have a silica content of at least about 85% by weight and an alumina content of between about 3.5% and 7% by weight.

Figure 11:
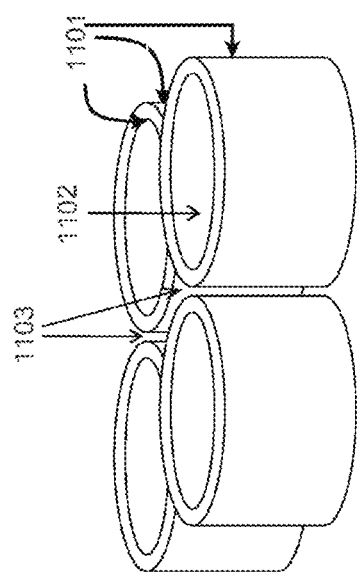
FIG. 11 is a schematic illustration demonstrating deposition of a lithium aluminum intercalate layer on a porous substrate according to one embodiment of the present invention.

In certain embodiments, porous materials can be used as solid support material for the LAI-S composition. In certain embodiments, porous materials may offer certain advantages, such as an increased surface area. In certain embodiments, the porous materials contemplated for use herein have a surface area of at least about 100 m$^2$/g, alternatively at least about 200 m$^2$/g. As shown, for example, in FIG. 11, the surfaces 1101 of a porous material provides increased surface area for application of a coating and the subsequent deposition of the LAI composition. This LAI-S can be beneficial for the extraction of lithium from lithium containing solutions as the increased surface area of the substrate increases the amount of active area of each particle being used for the extraction of lithium. In certain embodiments, the porous material can be a diatomaceous earth. In operation, the brine or salt containing solution flows through intraparticle pores 1102 and interparticle pores 1103 within the porous material. Increased surface area, and increased lithium extraction capacity, helps to prevent loss of lithium ions.

In certain embodiments, the use of inorganic/refractory support materials as a solid support for the LAI-S composition may provide several advantages over possible polymeric/resin based materials for depositing fine particles of LAI. For example, inorganic/refractory support materials are typically less expensive, provide easier use during synthesis, and have both chemical and physical stability that can be superior to that of many of the polymeric materials that can be used as support materials. Several exemplary and readily available silica, alumina, and refractory based materials in different forms, sizes and shapes can be used as support material. For example, fibers having dimensions ranging from about 0.5 µm to about 1 mm can be used. Silica gel beads having dimensions ranging from about 1 µm to about 1000 µm can also be used. Porous papers or blankets, which are made up of fibers that may subsequently be coated with the aluminum hydroxide and intercalated with a lithium salt, can also be used. In certain embodiments, the methods described herein can be used to prepare aluminum intercalates coated on blankets made up of silica or alumina fibers, or large scale porous products that include silica or alumina.

In certain embodiments, various inorganic, ceramic, and/or refractory materials can serve as solid supports for the LAI-S material. In certain embodiments, the materials can be carbon based fibers, particles, and/or tapes. Potential solid supports for depositing LAI/extracting lithium can take a variety of shapes, for example, fibers, strings, porous particles, solid particles, thin papers, films or membranes, and porous papers/blankets. For example, inorganic fibers can be used as a solid support for the LAI-S. Exemplary fibers for use in certain embodiments disclosed herein include silica fibers from Fibertec, Inc. (USA). Exemplary fibers can have a length of up to about 210 µm and an average diameter of between about 1 and 5 µm, alternatively up to about 10 µm. In certain embodiments, exemplary fibers for use herein can have an aspect ratio (i.e., the ratio of the length to the diameter of the particle) of between about 5:1 and 20:1.

Silica gel beads with tunable pore size distribution (as determined by the chemical properties of the material used as the substrate) can be used as a substrate for the deposition of the LAI composition. In certain embodiments, the pore size distribution can be varied from about 5 nm to about 5 µm. An exemplary silica gel that can be used in the present invention is Silica Gel (grade SG 10) from Makall industries (China), and similar material available from Microsolv Technology (USA), which is claimed to have a pore size that ranges from about 0.6 µm to about 1 µm and an overall particle size of between about 100 and 1000 µm.

Certain other potential substrates for use as solid supports for the LAI-S composition can include polymeric/porous membranes, porous inorganic or ceramic papers and blankets. For example, the LAI-S composition can readily be applied, deposited, and/or integrated into polymeric membranes to generate lithium ion transporting membranes. Exemplary materials can include porous ceramic papers, boards, tapes and blankets, such as are available from Cotronics Corp. (USA). For example, ceramic porous blankets can be produced from long ceramic fibers, which may be cross-linked for additional strength. Suitable cross-linkers for cross-linking the ceramic fibers are known in the art.

Other suitable substrates for use can include glass fibers (such as the glass fibers produced by Fibertec, Inc., USA), preferably having an average length of up to about 210 µm and an average diameter of up to about 10 µm. Alternatively, the solid substrate can be sand particles having an average diameter of between about 50 and 70 mesh. In alternate embodiments, Ludox particles (available from WR Grace & Co. USA), a mixture of lithium polysilicate and various inorganic components (such as, carbon black, titanium dioxide, and the like) can be utilized with a polymeric material as a coating for the surface thereof.

In one embodiment of the present invention, an LAI layer can be deposited or precipitated on a support material. Specifically, in the presence of a base, the LiAl$_2$(OH)$_6$X·nH$_2$O, (wherein X can be an organic or inorganic anion, and n is between 0 and 2) is deposited on the support material, which is preferably an inorganic support. In certain embodiments, materials can be used for the support material that have strong chemical affinity to bind with LAI on their respective surfaces, such as silica based materials that readily bind with LAI or precursors of LAI.

In certain embodiments, the surface of the inorganic or polymer or resin-based substrate can be treated prior to impregnation or attachment of the LAI to the substrate surface. One exemplary surface treatment is poly aluminum hydroxyl chloride ("PAC"). Generally, upon exposure of the PAC to the surface of the substrate, a thin coating of poly aluminum hydroxide is formed on the surface, and may alter the surface charge. The PAC, upon reacting with a base, such as an alkali hydroxide, preferably lithium hydroxide, allows the LAI material to deposit on the substrate of interest. If the surface of the substrate, preferably either an inorganic or polymeric substrate, does not bind with the PAC or other precursor of aluminum hydroxide, the surface can optionally be pre-treated with various materials that more readily bind with PAC or the related precursors, such as polymers having acidic functional groups, silicate/phosphate based binders that alter the surface properties, or certain silane compounds. Without wishing to be bound by any specific theory, pretreatment of the substrate surface is believed to facilitate crystallization or precipitation of fine particles of LAI-Cl onto the substrate surface, thereby providing a coating on the surface of the substrate.

In certain embodiments, the LAI-S can be a layered material that can adopt a platelet morphology. Platelet size and thickness, however, may vary depending upon specific synthesis conditions and may require optimization of the synthetic conditions to obtain certain preferred platelet geometries of the materials. For example, in one embodiment, wherein lithium chloride is intercalated into a gibbsite substrate (i.e., $Al(OH)_3$), larger platelets that include lithium are formed (of a gibbsite/LAI material), while the overall morphology of the gibbsite is preserved. In contrast, intercalation of lithium hydroxide into a gibbsite substrate typically leads to fine particles formation. Without wishing to be bound by any one theory, it is believed that with respect to intercalation with lithium hydroxide, the alkaline nature of lithium hydroxide may lead to at least partial, if not complete, dissolution of aluminum hydroxide and re-precipitation of the LAI-S composition.

In addition to particle morphology, the synthetic conditions for the deposition of the LAI composition on the solid support may also influence the resulting crystal/molecular structure of the resulting LAI-S particle. For example, in certain embodiments, the synthetic conditions may influence the hydration levels (i.e., amount of water that is incorporated within the crystal structure), and the nature of stacking of the elementary crystal planes (which defines the LAI structural polymorph). The process of extracting lithium from hot and/or high ionic strength geothermal brines is typically driven by subtle equilibrium conditions that exist between lithium ions in solution and lithium ions in the solid state. Thus, both the crystal structure of lithium aluminum intercalate layers and particle size and/or particle morphology may also play a role in influencing the lithium ion loading and unloading properties of the extraction composition.

In certain embodiments, it is conceivable that a higher surface area (i.e., small and/or porous particles having a surface area of at least about 10 $m^2/g$ having the LAI composition deposited thereon) can enhance the ability to extract lithium from geothermal brines efficiently. The use of fine particles (i.e., particles having a diameter of less than about 10 μm) in a column, however, may not be practical, as the fine particles can, in certain instances, hinder the flow of liquids and, thus, may create high backpressures within the extraction equipment. Therefore, deposition of fine particles of LAI (for example, LAI particles having a diameter of less than about 5 μm) onto a solid support (e.g., inorganic or polymeric substrates) having an average diameter of at least about 50 μm becomes an attractive option and avoids the problems associated with high backpressures. The use of the larger inorganic or polymer substrates also allows for the composition to have the properties associated with the fine LAI particles (such as the high surface area), while also having a large enough overall size to eliminate or reduce the likelihood of hindering the brine flow and the resulting high backpressure.

In certain embodiments, fine LAI particles are deposited onto various inorganic or polymeric substrates. As used herein, in reference to LAI particles, fine particles refers to particles having an average diameter of less than about 10 μm, preferably less than about 5 μm. As noted herein, in certain preferred embodiments, the substrates have a relatively high surface area.

In other embodiments, substrate materials can be carbon based fibers, particles, and or tapes. In yet another embodiment, the substrate can be a monolithic and highly porous structure fabricated from alumina, silica, or any other suitable material upon which the PAC or PAC precursor can be stably deposited. Optionally, the monolithic surface can be pretreated, as may be necessary, to improve deposition of the PAC or PAC precursor. Exemplary monolithic substrates are produced by Koch-Glitsch and Refraction Technologies Corp., although it is understood that other manufacturers may also produce suitable substrates.

In certain embodiments, the high surface area particles may have structures or framework that can be used to maximize the lithium ion extraction capability of the composition. Preferably, the structure or framework maximizing surface area does not adversely affecting the overall physical stability of LAI composition or the flow of the brine or lithium containing solution.

Figure 12:
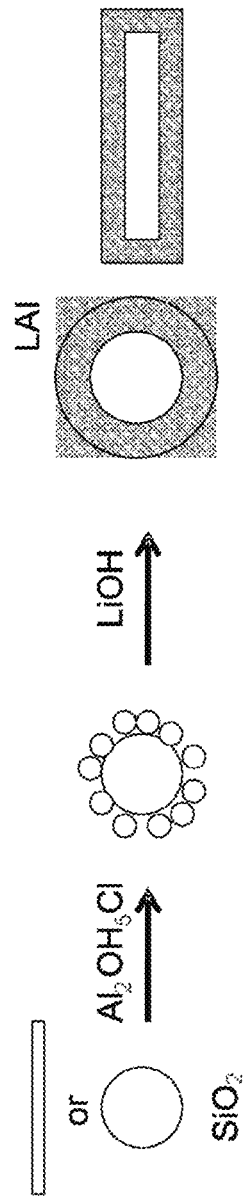
FIG. 12 is a schematic illustration demonstrating the deposition of lithium aluminum intercalate layer on an inorganic substrate according to one embodiment of the present invention.

Referring now to FIG. 12, a schematic illustration demonstrating the deposition of an LAI layer on a solid silica substrate is provided. It is understood that the procedure may also be followed for polymer or other inorganic substrates, such as alumina. The silica substrate, which is shown in FIG. 12 as having either a round or planar structure, is contacted with $Al_2(OH)_5Cl$ (PAC), which deposits upon the outer surface of the substrate. The substrate and PAC deposited thereon are then contacted with a solution that includes lithium hydroxide. Upon contact, the lithium hydroxide then intercalates within the deposited PAC, thereby forming an LAI layer on the surface of the substrate. The general formula for PAC is $Al_2(OH)_a(Cl)_b$, wherein a+b=6, and a and b are each between 1 and 5. Preferably, a is 3 or greater. This reaction is provided as shown below:

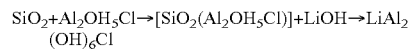

$$SiO_2 + Al_2OH_5Cl \rightarrow [SiO_2(Al_2OH_5Cl)] + LiOH \rightarrow LiAl_2(OH)_6Cl$$

In one embodiment, a single pot synthesis of the LAI-S composition is provided, wherein the synthesis proceeds by controlling the sequence of the addition of the various reactants and the amount of various reactants that are to be added. In alternate embodiments, known methods of synthesizing LAI (e.g., the intercalation of lithium into aluminum hydroxide) can be used to deposit LAI-Cl on solid inorganic support materials, (such as silica) and other related inorganic support materials.

For example, in one embodiment, the one pot synthesis of a solid supported LAI-S composition proceeds as follows. A solid substrate is provided and to that substrate is added a minimum of 1:1 weight ratio of 50% by weight solution of PAC. Preferably, a 1:4 weight ratio of substrate to PAC solution is utilized. As the amount of PAC increases, the amount of LAI-S deposited on surface increases and reaches a steady state, above which addition of PAC will not increase the amount of LAI deposited on the substrate. In certain embodiments, the amount of LAI deposited on a substrate can be increased by repeatedly depositing PAC on samples of dried LAI-S (i.e., the sample is completely dried in between each deposition). Similarly, certain embodiments provide for a single pot synthesis of an LAI impregnated diatomaceous earth.

In a similar fashion, silica, iron oxide, or alumina particles, fibers, or porous membranes may be coated. Generally, the particles or fibers are combined with PAC or a PAC precursor and thoroughly mixed. To the mixture is added an alkali salt, preferably an alkali halide. An exemplary alkali salt is lithium chloride. Typically, the alkali halide is added in a molar equivalent to the amount of aluminum present in the PAC sample. The PAC coated particles can then be titrated with lithium hydroxide to a pH of between about 5 and 9, dried, washed and collected.

In certain embodiments, a particulate extraction media can be prepared by supplying a mixture that includes PAC or a PAC precursor and approximately 1 molar equivalent of an alkali hydroxide or halide, such as lithium hydroxide or lithium chloride, thoroughly mixed to a consistency suitable for extrusion. The extruded particles of LAI-S can be cylindrical or spherical and the particles dimensions are typically less than about 1 mm, preferably less than about 600 μm. In certain embodiments, the mixture can also include an inorganic substrate, although in certain other embodiments, the mixture does not include a substrate. Mixing of the PAC or PAC precursor and the alkali hydroxide or alkali halide can be conducted in an extruder, wherein the product mixture can then be extruded to a desired size and shape of particle or pellet. Alternatively, the mixing can be conducted in any vessel suitable to provide sufficient mixing of the materials, and the product mixture of said mixing vessel can then be supplied to an extruder for the preparation of particles or pellets of various sizes and/or shapes. Exemplary extruders are known in the art, and can include basket extruders or twin dome extruders.

The extruder can prepare particles or pellets ranging in size from 25-100 microns, alternatively between about 100-200 microns, alternatively between about 100-500 microns, alternatively between about 500-1000 microns. Additionally, the extruder can be used to prepare particles or pellets that are spherical, oblong, cylindrical, or rectangular in shape. Alternatively, the particles or pellets can be of any desired shape.

In an embodiment, treated geothermal brine compositions with reduced concentrations of silica, iron, and lithium are produced using a LAI-S composition.

In certain embodiments, treated brines in the present invention are subjected to means for first removing silica from the brine. For example, in certain embodiments, the present brines contemplated for use herein can be treated by silica management processes, to first remove silica and/or iron, prior to the recovery of any lithium. In certain embodiments, the brine or lithium containing solution can be filtered or treated to remove solids or other elements present prior to the selective recovery of lithium. In certain embodiments, during extraction using the solid supported LAI composition, the temperature of the brine is maintained at between about 40° C. and 120° C., preferably between about 70° C. and 100° C. Alternately, the temperature is maintained at between about 85° C. and 100° C. In other embodiments, the temperature is maintained at between about 70° C. and 85° C. In other embodiments, the extraction can be carried out at a temperature that is less than about 110° C. The method also includes the steps of maintaining the pH in the range of between about 4 and 8. Alternately, the pH is maintained at between about 4 and 6. In other embodiments, the pH is maintained at between about 6 and 8. Suitable brine solutions for use with the present invention include solutions having greater than about 10% by weight saline content, and in certain embodiments, upwards of about 16% by weight saline content.

Generally, during use, the LAI-S granular composition prepared according to the above described process is loaded into a column (such as a chromatography column, which can include appropriate packing for retention of the granular material), and washed with a predetermined amount of water to remove a portion of the lithium chloride from the matrix, thereby creating vacant sites that are available to receive lithium halides or other lithium salts from a brine or solution. For example, upon exposure to a solution or brine that includes lithium chloride, the LAI matrix can then accept lithium chloride ions. The initial wash water preferably includes at least a small concentration of lithium chloride, or other lithium salt. In certain embodiments, the wash water includes at least about 100 ppm lithium chloride. In alternate embodiments, the wash water includes at least about 150 ppm lithium chloride. In yet other embodiments, the wash water includes at least about 200 ppm lithium chloride. In certain embodiments, the wash water may include a salt, such as sodium chloride, potassium chloride, or any other salt or non-ionic solute that may be advantageous for a particular lithium salt extraction process. Typically, chlorides are selected due to their relatively low cost, however it is understood that other halides can also be used. In certain embodiments, divalent and trivalent salts are avoided.

After the vacant sites in the LAI-S composition have been exposed by rinsing with the wash water, the vacant sites can then be loaded with "new" lithium chloride or other salts by exposing the LAI-S composition to the brine or solution that includes lithium chloride or other lithium salts. In certain embodiments, the brine or solution does not include salts that will compete with the extraction of lithium. As the lithium chloride in the brine or solution contact a vacant site, the lithium ions are captured by the LAI-S composition and the exposed vacancies are filled. After the LAI-S composition has become saturated with a lithium salt, for example lithium chloride, the flow of the brine can be stopped, thereby stopping the uptake of lithium. The effluent collected during the loading process has reduced concentrations of lithium. Lithium ions captured by the LAI-S composition can then be unloaded from the LAI-S composition by again washing the composition with wash water. In certain embodiments, as noted with respect to the initial wash water above, the wash water can include a small amount of lithium chloride, such as at least 100 ppm of lithium, sufficient to ensure that at least a portion of the capture sites on the LAI-S composition are filled with ions to prevent the LAI-S composition from collapsing. The process can be repeated many times, as desired.

The loading and unloading of the LAI-S composition can be monitored by measuring the lithium concentration of the outlet of the column. Means for monitoring the concentration of the lithium can include ion selective electrodes, ion chromatography, or spectrometric analysis, such as atomic absorption or inductively coupled plasma spectroscopy, and other means known in the art. The loading process is typically fairly efficient, such that at least about 50% of the lithium ions in the brine or solution are captured by the LAI-S composition, preferably at least about 75% of the lithium ions in the brine or solution are captured by the LAI-S composition. As such, a rapid increase in the lithium ion concentration at the outlet of the LAI-S composition is indicative of saturation of the column. Similarly, when recovering the captured lithium ions from the LAI-S composition, as the process is proceeding and lithium ions are being removed, a decrease in the concentration of lithium ions from a first increased concentration correlating to the initial recovery of captured lithium to a steady state concentration that is approximately equal to the steady state concentration of the lithium in the wash water is generally indicative of the removal of a majority of the ions captured by the composition. At this point, the process for capturing lithium ions can begin again.

In certain embodiments, the LAI-S composition prepared according to the present methods has an extraction capacity suitable for use in brines having a lithium concentration similar to that of the Salton Sea geothermal brines, i.e., a lithium concentration of about 260 ppm. The extraction capacity of the LAI-S composition is greater than about 1 mg of lithium per gram of the LAI-S composition, preferably at least about 5 mg of lithium per gram of the LAI-S composition, even more preferably up to about 10 mg of lithium per gram of the LAI-S composition. The extraction capacities would be larger for brines containing higher concentrations of lithium.

Preparation of Brines with Reduced Lithium Concentrations Using Activated Aluminum Lithium Intercalate Sorbent In certain embodiments, a brine composition, particularly treated geothermal brines, with reduced silica and iron concentrations is processed for the removal and recovery of lithium using novel compositions of highly lithiated intercalates of lithium salts, including lithium chloride, in three-dimensionally structured (porous) activated alumina, for the extraction of lithium salts, particularly lithium halides, from solutions and brines that include said lithium salts.

Suitable forms of three-dimensionally structured porous activated alumina for use herein include, but are not limited to, $\alpha$-$A_2O_3$, $\beta$-$Al_2O_3$, $\gamma$-$A_2O_3$, $\theta$-$Al_2O_3$, $\chi$-$Al_2O_3$, $\kappa$-$Al_2O_3$, $\epsilon$-$Al_2O_3$, $\delta$-$Al_2O_3$, $AlO(OH)$, $Al_4O_3(OH)_6$ (pseudoboehmite), and the like, and combinations thereof. In certain embodiments, only activated alumina having a metastable or transition form of alumina, are utilized to prepare the highly lithiated intercalates.

In certain embodiments, a sorbent composition is provided that includes an intercalate material comprising lithium and a three-dimensionally structured (porous) activated aluminum material for use in the removal of lithium from solutions, particularly lithium salts from geothermal and other brines. The activated alumina lithium intercalate sorbent composition advantageously provides a controllable and maximum allowable lithium to aluminum ratio, and a favorable structural form of particulate media, thereby providing increased capacity for removal of lithium. In certain embodiments, the activated alumina lithium intercalate sorbent composition has a mole fraction of lithium to aluminum in the range of about 0.1 to 0.3, and preferably up to about 0.33. The ratio of lithium to alumina is critical in stabilizing the structural form of the material and maximizing the number of lithium sites available in the matrix for the loading and unloading of lithium from a brine solution.

In certain embodiments, a three-dimensionally structured (porous) activated alumina is contacted or reacted with a lithium containing compound, such as a lithium salt, for example lithium hydroxide, and in certain other embodiments lithium chloride, to form composite activated aluminum lithium intercalate sorbent materials. It is understood, that certain reaction conditions may be necessary to promote reaction upon contacting the activated alumina and the lithium containing compound concentration, reactant molar ratios, such as for example temperature, lithium and pH. The ratio of activated alumina to lithium salt can be 1:1, alternatively about 1.3:1, alternatively about 1.4:1, or alternatively about 1.5:1. Furthermore, under certain conditions, the formation of the three-dimensional structure of the intercalate materials occurs controllably with respect to the growth of the materials, thereby resulting in materials having controlled sizes, shapes, and porosity, as compared with other lithium aluminum intercalate materials that are prepared using two-dimensional alumina or aluminum hydroxide. The fact that the rate of reaction between lithium salts and three-dimensional activated alumina can be regulated to control the crystal growth of the resulting sorbent media enables greater lithium extraction efficiencies and physical stability, as compared to lithium extraction media derived from two-dimensional alumina aluminum hydroxide related materials.

In certain embodiments, the step of contacting the activated alumina with the lithium hydroxide during the preparation of the sorbent is done in the presence of a metal halide, particularly an alkali or alkaline earth metal halide, such as sodium chloride or lithium chloride. In certain embodiments, the metal halide, for example lithium chloride, may not actually react with either the activated alumina or the lithium salt, but the presence is believed to assist in the preservation of the structural integrity of the resulting compound. It is believed that the metal halide, for example lithium chloride, may act as a surfactant and may assist in preventing agglomeration of the resulting product. Generally, when the metal chloride is lithium chloride, it can be present in an amount of 1 to 30% by weight. In general, the mole ratio between the LAI, the metal halide, and the weak acid is about 1:1:1. In certain embodiments, the mole ratio of LAI to metal halide is between about 1:1 and 1:10, alternatively between about 1:1 and 1:5, alternatively between about 1:1 and 1:1.5, alternatively between about 1:1.1 and 1:1.4, alternatively between about 1:1.1 and 1:1.3. The mole ratio of LAI to weak acid is between about 1:1 and 1:10, alternatively between about 1:2 and 1:5, provided that the mole ratio of LAI to metal halide is at least about 1:1.1. In certain embodiments, lithium chloride can be present in an amount of between about 1 and 30% by weight (based upon the amount of lithium salt, such as lithium hydroxide) that has been added, alternatively between about 5 and 25% by weight, alternatively between about 5 and 15% by weight, alternatively between about 15 and 25% by weight.

In certain embodiments, during the preparation of the sorbent, the step of contacting the activated alumina with the lithium salt, for example lithium chloride, is done at a pH of greater than about 7, preferably greater than about 10. In certain embodiments, the pH is between about 7 and 10, alternatively between about 9 and 12, alternatively between about 9 and 11, alternatively between about 10 and 12, or alternatively between about 11 and 13. Alternatively, the pH is between about 7 and 11, or between about 10 and 13. In certain embodiments, the pH during the contacting step is between about 11 and 12, alternatively between about 11.25 and 11.75, alternatively between about 11 and 11.5, alternatively between about 11.5 and 12.

In certain embodiments, depending on the structure or form of the activated aluminum oxide that is commercially available, the activated aluminum oxide may react with the lithium salt, for example lithium chloride and lithium hydroxide, at different rates to form the new composite materials. Activated alumina materials can include amorphous, metastable, crystalline, partially crystalline, and polycrystalline forms. In certain embodiments, the activated alumina material can include more than one phase. In certain embodiments, certain polymorphic forms of activated alumina may not react with lithium hydroxide to a significant extent, particularly alumina forms that have been heated to temperatures greater than about 1000° C., or greater than about 1500° C. In certain other embodiments, certain stable polymorphic forms of alumina (e.g., corundum), may be less reactive with respect to lithium hydroxide, as compared with other polymorphic forms (e.g., γ alumina). Similarly, in certain embodiments, non-activated aluminum oxides may react slowly with lithium hydroxide (sometimes to the extent that it is difficult or impractical to infuse lithium salts into such materials), as compared to activated/meta stable aluminum oxides, which can lead to improved cohesive binding crystal growth of LAI platelets and thereby improve lithium extraction efficiency. In certain embodiments, in part due to the variances in reactivity of the different structures and forms of commercially available activated alumina, the products thereof may exhibit differences in their ability to extract lithium from lithium containing solutions.

In certain embodiments, the activated alumina can have a melting point of greater than about 2000° C., preferably greater than about 2025° C., even more preferably greater than about 2045° C. In certain embodiments, the pH of the activated alumina can be between about 4 and 10, preferably about 7.0=0.5, alternatively between about 7.2-0.5. Pore volume of the activated alumina can be about 90 Å, alternatively between about 75 Å and about 110 Å. Bulk density of the activated alumina can be greater than about 800 kg/m, alternatively about 850 kg/m. The surface area of the activated alumina can be between about 100-600 $m^2/g$, alternatively between about 150-350 $m^2/g$, alternatively between about 230-300 $m^2/g$.

The resulting LAI product can be a particulate material having an average diameter of greater than about 75 µm. Alternatively, the product can be a particulate material having an average diameter of less than about 700 µm. In certain embodiments, the resulting particulate material has an average diameter of between about 75 and 700 µm, alternatively between about 200 and 400 µm, alternatively between about 300 and 800 µm.

In certain embodiments, the present invention can be used in conjunction with additional methods, including steps designed to first removing silica from the brine. For example, in certain embodiments, the present brines contemplated for use herein can first be treated by silica management to first remove silica and/or iron, prior to the removal of any lithium. In certain embodiments, the brine or lithium containing solution can also be filtered or treated to remove solids or other elements that may be present in the solution, prior to the selective recovery of lithium.

In certain other embodiments, matrices based upon activated alumina lithium intercalate sorbent compositions can be prepared by mixing the sorbent material with a polymer, plastic, or other organic or inorganic binder material. In certain embodiments, the matrix preferably includes a polymeric material or binder that can be cross-linked. Typically, the resulting matrix can include a major portion of an activated alumina lithium intercalate, prepared according to the methods described herein, and a minor portion that includes polymeric, plastic, or other binder material, which can serve as the matrix binder. In certain embodiments, the matrix includes between about 75% and 99% by weight of the activated alumina lithium intercalate material, and between about 1% and about 25% by weight of the polymer, plastic or binder material. Alternatively, the matrix can include between about 60 and 80% by weight activated alumina and between about 20 and 40% by weight polymer, plastic or binder, alternatively between about 70 and 90% by weight activated alumina and between about 10 and 30% by weight polymer, plastic or binder.

In certain embodiments, the polymer or plastic binder material employed in the preparation of the matrix materials can be selected from any suitable thermoplastic or thermoset polymer material. Some of the inorganic binder may include, aluminates, silicates, silanes, metal alkoxides, metal hydroxides, titanates, zirconates, phosphate, poly aluminum hydroxyl chlorides, and several other forms of inorganic binders, as well as combinations thereof.

In certain embodiments, the polymer/plastic material and the sorbent composition can be mixed together and sintered at elevated temperature to form the sorbent composition. In certain embodiments, pressure can be applied to the mixture before, during, or after the sintering process. In certain embodiments, up to about 10,000 psi can be applied to the mixture, with or without concurrent heating thereof. In certain embodiments, pressure of at least 2500 psi is applied. In alternate embodiments, increasingly greater pressures are applied to the mixture. The resulting sintered product is typically a solid, which can then be broken into smaller pieces, preferably to form a plurality of particulates, for use in the extraction of lithium. Optionally, the solid sintered products can be ground to a desired particulate diameter or size. In certain embodiments, the ground sorbent matrix can be separated, using for example sieves, to provide multiple sizes or ranges of diameters of the sorbent matrix particles.

In certain embodiments, the sorbent-polymer matrix can be pressed in a mold on any desired shape or size. In certain embodiments, the sorbent-polymer matrix can be cured and formed as a sheet or like shape, suitable for use as, for example, a cartridge filter wherein a lithium containing solution is passed over and/or through the sheet for the extraction of the lithium containing ions. In certain embodiments, lithium infused activated alumina particles can be treated with binder solutions/cross-linkers to further enhance the rigidity of the already existing structures.

In other embodiments, methods for the removal of lithium using materials prepared from activated alumina are provided. Generally, during use, the activated alumina lithium intercalate sorbent materials prepared according to the above-described methods can be washed with a predetermined amount of water to remove a portion of the LiCl from the solids, thereby creating vacant sites that are available to receive lithium halides or other lithium salts from a brine or solution. For example, upon exposure to a solution or brine that includes lithium chloride, the sorbent material can then accept lithium chloride ions. The initial wash water preferably includes at least a small concentration of LiCl. In certain embodiments, the wash water includes at least about 100 ppm LiCl. In alternate embodiments, the wash water includes at least about 150 ppm LiCl. In yet other embodiments, the wash water includes at least about 200 ppm LiCl. In certain embodiments, the wash water may include a salt, such as NaCl, KCl, or any other salt or non-ionic solute that may be advantageous for a particular lithium salt extraction process. Typically, chlorides are selected due to their relatively low cost, however it is understood that other halides can also be used. In certain embodiments, divalent and trivalent salts are avoided.

After the vacant sites in the sorbent material have been exposed by rinsing with the wash water, the vacant sites can then be loaded with "new" LiCl or other salts by exposing the sorbent material to the brine or solution that includes LiCl or other lithium salts. In certain embodiments, the brine or solution does not include salts that will compete with the extraction of lithium. As the LiCl in the brine or solution contact a vacant site, the lithium ions are captured by the sorbent material and fill the exposed vacancies. After the sorbent material is saturated with lithium salt, for example LiCl, the flow of the brine can be stopped. The captured LiCl can then be unloaded from the sorbent material by again washing the sorbent material with wash water, as described herein. In certain embodiments, as noted with respect to the initial wash water above, the wash water includes a small amount of LiCl present, such as at least about 100 ppm of lithium, sufficient to ensure that at least a portion of the capture sites on the LAI matrix are filled with ions to prevent the sorbent material from collapsing. The process can be repeated many times, as desired The loading and unloading of the sorbent material can be monitored by measuring the lithium concentration in the brine or the solution exiting the sorbent. Means for monitoring the concentration of the lithium can include ion selective electrodes, ion chromatography, or spectrometric analysis, such as atomic absorption or inductively coupled plasma spectroscopy, and other means known in the art. The loading process is typically fairly efficient, such that at least about 50% of the lithium ions in the brine or solution are captured by the sorbent material, preferably at least about 75% of the lithium ions in the brine or solution are captured by the sorbent material. As such, a rapid increase in the lithium ion concentration at the outlet of the sorbent material is indicative of saturation of the column. Similarly, when recovering the lithium ions from the sorbent material, as the process is proceeding and ions are being removed, a sudden decrease in the concentration thereof can be indicative of the removal of a majority of the ions captured by the material. This results in treated brines or lithium-containing solutions with reduced lithium concentration.

In certain embodiments, the sorbent material prepared according to the present methods has an extraction capacity suitable for use in brines having a lithium concentration similar to that of the Salton Sea geothermal brines, i.e., a lithium concentration of about 300 ppm, of at least about 1 mg of lithium per gram of the sorbent material, preferably at least about 2 mg of lithium per gram of the sorbent material, even more preferably at least about 3 mg of lithium per gram of the sorbent material. The extraction capacities may be larger for brines containing higher concentrations of lithium.

In another aspect, an alternate sorbent material and method for preparing the same are provided. In certain embodiments, the hydroxyl form of the LAI material prepared as previously described can be neutralized with inorganic acids, such as hydrochloric acid or nitric acid. Alternatively, the hydroxyl form of the LAI material prepared as previously described can be neutralized with a weak acid or buffer, such as carboxylic acids, for example acetic acid, boric acid, phosphonic acid, phosphoric acid, sulfonic acid, carbonic acid and bicarbonic acid, in presence of a metal halide, such as concentrated lithium chloride solution. As used herein, buffer is used to refer to a composition that is capable of maintaining the pH of a solution within a certain defined range. For example, in certain embodiments, the neutralization of the intercalate material is preferably conducted such that at equilibrium, the pH is not less than about 2.5, alternatively between about 4 and 6, alternatively between about 3 and 5, alternatively between about 4 and 5. Certain buffers can include weak acids, such as acetic acid. Exemplary LAI acidification buffers can include carboxylates (particularly acetates), sulfonates, phosphates, phosphonates, acetates, borates, carbonates, bicarbonates, and the like.

In general, it is preferred that the neutralization is performed at temperatures of less than about 60° C., alternatively at or below about 40° C., alternatively about room temperature. The neutralization step generally includes removing the liquid from the reaction of the activated alumina and lithium salt, adding an aqueous solution that includes the weak acid buffer or dilute strong acid and metal halide, optionally agitating the solution, and monitoring the pH change. Generally, the pH is initially high, such as greater than about 10, or in certain embodiments, greater than about 11. Gradually, upon contacting the LAI composition, the pH decreases to less than about 7, alternatively less than about 6, alternatively less than about 5, or alternatively less than about 4. After the pH has stabilized, which can be over a period of several hours, the solution added for neutralization is removed, the product is washed with water, and dried. This neutralization step can lead to the formation of a high performance chloride form of LAI material having lithium loading capacities of between about 4.0-5.0 mg/L, lithium concentrations in the product cut, 3.5-5 wt. % and divalent metal impurity of around 1% of lithium carbonate equivalent in the product cut. The product has been shown to be particularly amenable to scale-up.

Without wishing to be being bound by any particular theory, it is believed that neutralization of the LAI material with a combination of a lithium chloride solution and weak acid buffer, such as acetic acid, helps to prevents the formation of unwanted high molecular weight (or polymeric) aluminum hydroxy chlorides, which, once formed, may attract divalent metal cations as impurities during usage in the lithium extraction process. In certain embodiments, the weak acid buffer solution utilized for the neutralization of the LAI material can include up to about 30% by weight lithium chloride, alternatively between about 2 and 7% by weight lithium chloride, alternatively between about 5 and 12% by weight, alternatively between about 10 and 15% by weight lithium chloride.

In certain embodiments, the LAI can be neutralized with a weak acid buffer, such as acetic acid, in presence of concentrated lithium chloride containing solution. In certain embodiments, the molar ratio between the LAI material and the acetic acid can range between about 1:0.75 and about 1:10. In certain embodiments, a relatively low concentration of lithium chloride, for example up to about 10% by weight, alternatively up to about 5% by weight, alternatively between about 5 and 10% by weight, is required. An excess amount of lithium chloride from the concentrated lithium chloride containing solution may preclude potential intercalation of acetate anions and promote ion exchange between hydroxyl and chloride groups. Further, neutralization with a weak acid buffer, such as acetic acid, may prevent the formation of high molecular weight aluminum hydroxide byproducts that can attract impurities during lithium extraction process. In certain embodiments, a 30% aqueous lithium chloride solution was utilized. It was found that the amount of the weak acid buffer, for example acetic acid, used to neutralize the LAI, could be between about 1:0.5 and 1:1.25 molar equivalents, although in certain embodiments the presence of excess weak acid buffer (for example, 5-10 times the required amount) does not result in negative effects, provided the weak acid buffer solution, for example acetic acid, is buffered with a metal chloride solution, such as lithium chloride solution. Acetic acid utilized for the neutralization of the sorbent proceeds normally without dissolving significant quantities of the sorbent material. Performance of the resulting material for the extraction of lithium was not affected.

In certain embodiments, the sorbent material can be prepared using a solution that includes an acetic acid buffer and lithium chloride for the neutralization thereof. In certain embodiments, the neutralization can be carried out in a column. In certain embodiments, various organic acids can be utilized for the neutralization of the LAI in the presence of metal halides to generate different organic salt byproducts. For example, lithium acetate, sodium acetate, and calcium acetate can be generated as byproducts using acetic acid and lithium chloride, sodium chloride, and calcium chloride as the metal salts, respectively. Similarly, in certain embodiments, it may be possible to use other organic acids (e.g., methyl sulfonic acid, propionic acid) to similarly produce the corresponding organic metal salts.

In certain embodiments, the neutralization of LAI with a weak acid buffer and metal halide, such as acetic acid and a concentrated lithium chloride containing solution, offers several advantages over certain other methods for the preparation of the sorbent for material. For example, the product resulting from the acetic acid neutralization demonstrates higher lithium loading capacities (e.g., capacities that are greater than about 4.2 mg/L); reduced impurities in the product cut (<1% LCE); consistent and reliable exchange of hydroxyl groups with chlorides; reduction of unwanted byproducts; the ability to conduct the neutralization on a large scale in a column; the formation of potentially valuable organic-metal salts byproducts (e.g., lithium acetate); and the avoidance of the use of corrosive acids for sorbent synthesis.

In an embodiment, the activated alumina lithium intercalate sorbent can be packed into columns similar to the apparatus described in FIG. 10. In certain embodiments, the sorbent material is capable of being cycled at least 1500 cycles without a noticeable decrease in the performance of the matrix, preferably at least about 6000 cycles without a noticeable decrease in the performance of the sorbent material.

Figure 13:
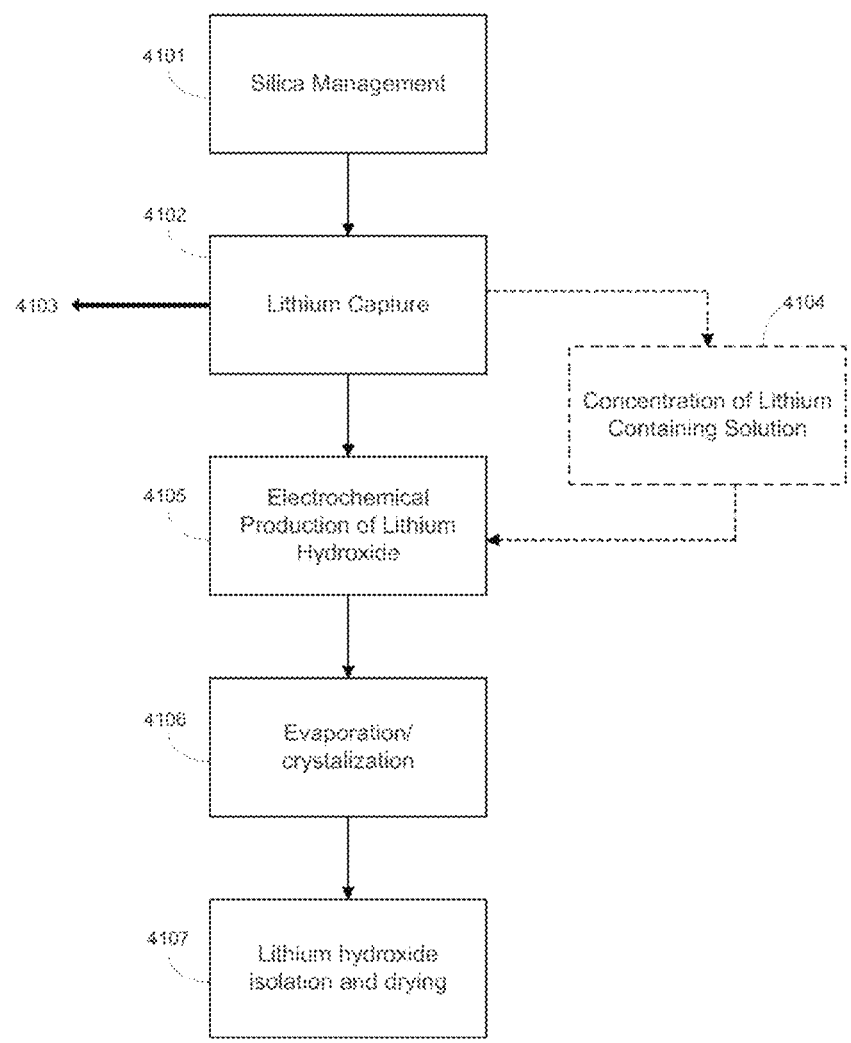
FIG. 13 shows a process for the production of lithium hydroxide from a lithium containing solution according to one embodiment of the invention.

In addition to demonstrating repeated loading and unloading of the sorbent material, with consistent extraction and recovery of lithium, the pressure drop across the sorbent material column was also studied. As is understood in the art, in certain embodiments, it can be advantageous to operate the extraction columns with as low a pressure drop as is possible. It has been demonstrated that a column that includes an extraction material that includes the sorbent material displayed a pressure drop of less than about 15 psi/m of column bed over 550 loading and unloading cycles.
Production of Lithium Compounds Subsequent to the Production of Lithium-Free Brines Referring to FIG. 13, provided herein is a multistep method for the extraction of lithium ions from a brine and the subsequent production of compositions containing reduced concentrations of silica, iron, and lithium. In first step 4101 of the method, the brine is supplied to a silica management process, wherein silica is removed from the brine to produce a relatively silica-free brine. As part of the silica management step, iron may also be removed from the brine compositions. In a second step 4102 of the method, lithium ions are removed from the silica-free brine to produce a treated brine stream 4103 with reduced concentrations of silica, iron, and lithium. This treated brine stream is either injected into a reservoir or subjected to further removal of other metals including but not limited to zinc, manganese or potassium. The lithium containing solution is then subjected to further processing step 4105 to produce lithium hydroxide. Optionally, in a third step 4104, the lithium ion containing solution from the second step 4102 may be concentrated to produce a concentrated lithium ion containing solution. In a fourth step 4105, the lithium containing solution is supplied to an electrochemical cell to produce a lithium hydroxide containing solution. In a fifth step 4106, water can removed from the lithium hydroxide containing solution from fourth step 4105 to crystallize at least a portion of the lithium hydroxide from fourth step 4105. In a sixth step 4107, the lithium hydroxide is isolated, recovered, and dried.

Figure 14:
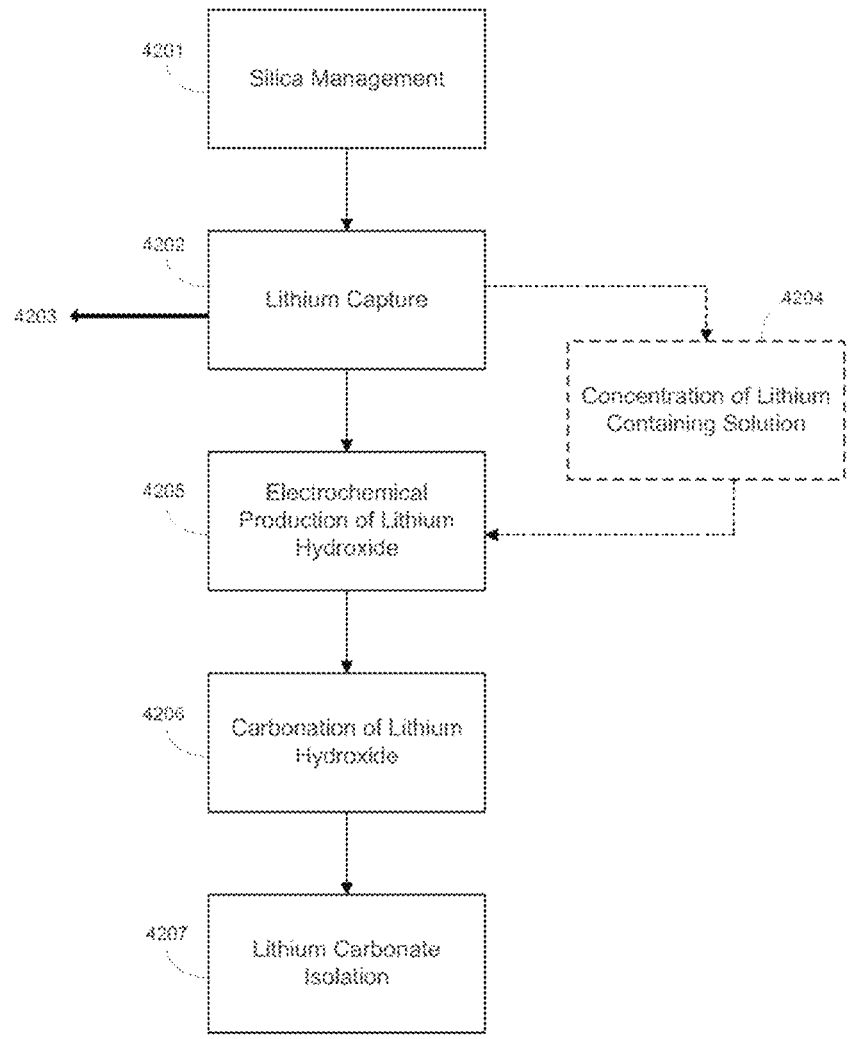
FIG. 14 shows a process for the production of lithium carbonate from a lithium containing solution according to one embodiment of the invention.

Referring to FIG. 14, provided herein is a multistep method for the extraction of lithium ions from a brine and the subsequent production of compositions containing reduced concentrations of silica, iron, and lithium. In a first step 4201 of the method, the brine is supplied to a silica management step, wherein silica is removed from the brine to produce a relatively silica-free brine. As part of the silica management step, iron is also removed from the brine compositions. In a second step 4202 of the method, lithium ions are removed from the silica-free brine to produce a treated brine 4203 with reduced concentrations of silica, iron, and lithium. The lithium containing solution is then subjected to further processing to produce lithium carbonate. In an optional third step 4204, the lithium ion containing solution can be concentrated to produce a concentrated lithium ion containing solution. In a fourth step 4205, the lithium containing solution is supplied to an electrochemical cell to produce lithium hydroxide. The lithium hydroxide can be supplied to a fifth step 4206 where lithium hydroxide is converted to lithium carbonate. In a sixth step 4207, lithium carbonate is isolated and recovered.

Figure 15:
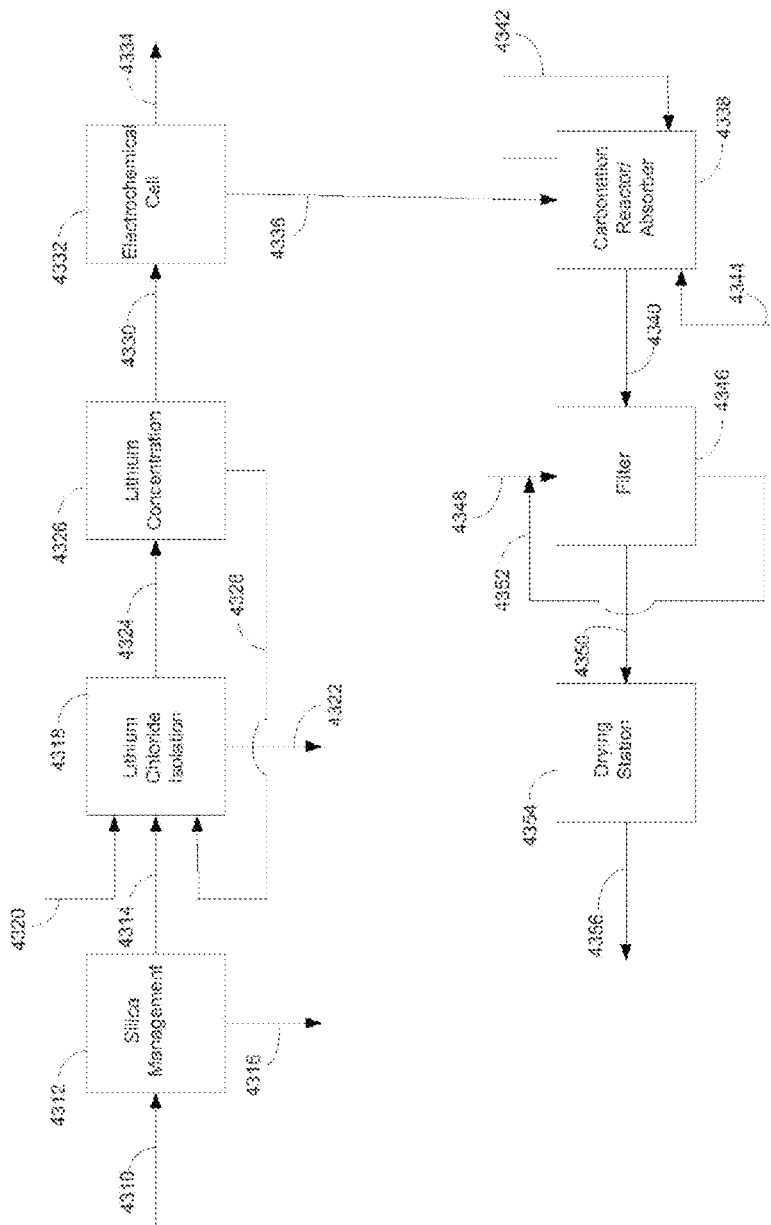
FIG. 15 shows a process for the production of lithium carbonate from a lithium containing solution according to one embodiment of the invention.

Referring to FIG. 15, in one embodiment of the present method, lithium chloride containing solution 4310 can be obtained from a variety of sources, including geothermal brines. The lithium chloride containing solution is supplied to silica management step 4312, which operates to significantly reduce the amount of silica that may be present in lithium chloride containing solution 4310, such that silicate precipitate 4316 and silica-lean lithium chloride containing solution 4314 are produced. Preferably, after the silica management step, the silicon concentration in silica-lean lithium chloride containing solution 4314 is less than about 150 ppm, more preferably the concentration is less than about 100 ppm, even more preferably the concentration is less than about 50 ppm, and even more preferably the concentration is less than about 25 ppm. In certain embodiments, the concentration of silicon in silica-lean lithium chloride containing solution 4314 is less than about 20 ppm, less than about 10 ppm, or even less than about 5 ppm.

The silica management step 4312 can include any known means for removing a portion of the silica present in the feed stream, including those described herein. Silica precipitate 4316 removed from lithium chloride containing solution 4310 can be collected and removed from the mixing or like device, by known means, such as screening or filtering, to yield lithium chloride containing stream 4314 that is substantially free of silica. As known in the art, various membranes can be used to selectively remove specific undesired ions from lithium containing solution 4314.

Silica-lean lithium chloride containing stream 4314, which is substantially free of silica (measured as $SiO_2$), can be supplied to lithium chloride isolation step. In certain embodiments, silica-lean lithium chloride containing stream 4314 can be supplied to at least one intercalated lithium absorbent column 4318, which can be configured to absorb and isolate lithium chloride from the silica-lean lithium chloride containing solution, while at the same time allowing other ions, such as calcium, magnesium, and/or sodium, or the like, to pass with water stream 4322, through the use of a selective molecular sieve, membrane, or other like materials. In embodiments that include more than one intercalated lithium absorbent column, the bulk of the lithium can be removed in the first intercalated lithium absorbent column, with any subsequent "polishing" intercalated lithium absorbent columns being used to minimize overall lithium loss during the recovery process.

In certain embodiments, the intercalated lithium absorbent column can be operated as follows. Lithium alumina intercalate particles having an average diameter of between about 100 and 150 μm can be combined with a saturated sodium chloride solution that includes approximately 200 ppm lithium chloride to prepare a slurry, which can then be added to the column. The column may be jacketed, insulated or may include means to provide heating or cooling to the column. The column may include a method of distributing liquid and support for the extraction media and can include fritted ends having a pore size of between approximately 25 and 50 μm, although other like means, such as supports of glass wool or perforated plates, can also be used instead of fritted ends. In some embodiments, the operating temperature of the column can be maintained at a temperature that is greater than room temperature, and is preferably maintained at a temperature above about 70° C., more preferably between about 95° C. and 110° C.

The column is maintained wet and is unloaded before the first use by circulating at least about 1 bed volume, preferably about two bed volumes, of wash water 4320 that includes approximately 1000 ppm lithium chloride, at a flow rate of between approximately 1 and 4 bed volumes/hour, preferably between about 1.5 and 2.5 bed volumes/hour. In some embodiments, the wash water is deionized water. The column is then contacted with approximately one bed volumes of saturated sodium chloride solution containing approximately 200 ppm lithium chloride is then run.

During loading of the column (i.e., during the step of capturing desired lithium chloride), lithium chloride containing stream 4314 is supplied to column 4318 and the lithium concentration of the treated brine stream 4322 is measured to determine the point at which the column becomes saturated with the lithium chloride. During the lithium ion capture step, the lithium concentration in the treated brine stream 4322 remains relatively low, for example, approximately 0 and 100 ppm. The point at which column 4318 reaches or nears the point of saturation with lithium ions, however, the concentration of the lithium in the treated brine stream 4322 increases, thus indicating that the column has either little or no capacity for additional lithium ions. The treated brine stream 4322 has reduced concentrations of silica, iron, and lithium. Upon reaching this point of saturation, flow of the solution that includes lithium chloride to intercalated lithium absorbent column 4318 stopped, and the column is flushed with between about 1 and 8 bed volumes of wash water 4320, preferably between about 1 and 2.5 bed volumes, and most preferably between about 1 and 1.5 bed volumes, to produce a lithium chloride-rich stream 4324. It is understood that the apparatus can include various valves and control devices for controlling the flow of the lithium containing solution or the wash solution to the column.

In certain embodiments, after loading of the column, but before collection of the captured lithium chloride, the column may be flushed with about 1 bed volume of a 26% saturated sodium chloride solution that includes about 200 ppm lithium chloride.

After the removal of lithium chloride from the lithium containing feed stream during the lithium chloride isolation step, intercalated lithium absorbent columns 4318 can be regenerated and the lithium chloride recovered therefrom. Specifically, at least about 0.5 equivalents of wash water 4320 may be supplied to intercalated lithium absorbent columns 4318 to remove absorbed lithium chloride and produce lithium chloride rich solution 4324. In certain embodiments, between about 1 to 2 equivalents of wash water 4320, or more equivalents, may be used during the regeneration of the intercalated lithium absorbent columns 4318. In preferred embodiments, the wash water may include lithium ions for the regeneration of the intercalated lithium absorbent columns 4318. Optionally, low ionic strength liquids, such as alcohols and water/alcohol mixtures can be used to regenerate the columns. In general, the amount of wash water 4320 utilized from the lithium chloride recovery from the intercalated lithium absorbent columns 4318 is minimized by recycling the product streams to maximize lithium content, without affecting the capacity of the extracting media.

Optionally, a purification step can be employed to remove calcium, magnesium, or other divalent ions such as zinc and manganese that may be present in lithium chloride-rich stream 4324. Removal of calcium, magnesium, and/or other alkaline earth metals can be achieved by known means, such as, by increasing the pH and treating the solution with ion exchange, preferably using selective chelating ion exchange resins, or by the addition of a base, such as lime, sodium hydroxide, lithium hydroxide, or the like, followed by the addition of lithium carbonate, sodium carbonate, potassium carbonate, ammonium carbonate, or other suitable carbonate, which can precipitate magnesium and iron hydroxide, as well as calcium carbonate. In alternate embodiments, ion exchange means can be employed to facilitate the removal of calcium, magnesium, and/or other alkaline earth metals. Other bases, such as sodium hydroxide and other hydroxides of alkali metals, can also be used. In certain brines, it may be beneficial to remove boron from the product stream at this point process by known means, such as by precipitation, solvent extraction, or ion exchange.

Lithium chloride-rich stream 4324 may have a concentration of between about 1% and 42% by weight, preferably greater than about 10% by weight, more preferably greater than about 25% by weight. In alternate embodiments, lithium chloride-rich stream 4324 may have a concentration of greater than about 10% by weight.

In certain embodiments, the process can include steps for increasing the concentration of the lithium chloride stream. Specifically, lithium concentration means 4326 can be utilized for the removal of a portion of the water in the lithium chloride stream, for example, by evaporation, thereby producing a more concentrated lithium chloride solution 30. Exemplary concentration means can include electrodialysis, steam evaporation, or solar evaporation. Water 4328 removed from the lithium chloride containing solution can be recovered, for example by evaporation and subsequent condensation, and resupplied to intercalated lithium absorbent column(s) 4318, or can be supplied to any other step in this or an associated process that requires the supply of water. Alternatively, water 4328 can be supplied to a geothermal well. In embodiments employing a concentration step, overall concentration of concentrated lithium chloride-rich solution 4330 can be increased to greater than 25% lithium chloride by weight, preferably up to about 40% lithium chloride by weight.

Concentrated lithium chloride-rich solution 4330 can be supplied to electrochemical cell 4332, which includes at least one anode, one cathode and a permeable membrane, for the electrochemical preparation of lithium hydroxide. Electrochemical cells suitable for large scale production are commercially available from companies, such as, DeNora, Chlorine Engineers, and Asahi Glass, to name a few. Specifically, chloride ions are oxidized to chlorine at the anode and water is reduced to hydroxide ions and hydrogen gas at the cathode. Preferably, concentrated lithium chloride-rich solution 4330 is substantially free of other ions, particularly ions that may interfere with the electrochemical reaction. In certain embodiments, the concentration of sodium and/or potassium ions in concentrated lithium chloride-rich solution 30 is less than about 5% by weight, preferably less than about 3% by weight. Cations such as iron, calcium, magnesium, and the like, if at all present, preferably have a total concentration of less than about 0.001% by weight, more preferably less than about 0.005% by weight, and even more preferably less than about 0.00001% by weight. Higher concentrations of the interfering ions does not necessarily preclude operation of the electrochemical cell, but instead may reduce the overall life of the cell components and/or the overall effectiveness of the reaction.

Similar to that which is noted above with respect to the presence of non-lithium interfering cations, electrochemical cell 4332 preferably has a total non-chloride anion content of less than about 5% by weight, preferably less than about 3% by weight, and even more preferably less than about 1% by weight.

The cathode of electrochemical cell 4332 can be any suitable material, including nickel, catalyzed nickel mesh, stainless steel, coated stainless steel, mild steel, and the like. Other exemplary catalysts can include mixed ruthenium compounds, platinum and other similar compounds that have low hydrogen over potential. The total area of the cathode can be adjusted based upon reactor size and desired production. The catholyte feed of the electrochemical cell 4332 can be any suitable material having sufficient ions to carry a current. While water may be employed, and in certain embodiments, the addition of lithium carbonate or lithium hydroxide may be beneficial to the operation of the cell.

The anode of electrochemical cell 4332 can be any suitable material, such as titanium mesh coated with ruthenium oxide, titanium mesh coated with platinum, carbon, or the like. Preferably, the anode is a dimensionally stable anode, allowing for reduced power consumption. Dimensionally stable titanium anodes are particularly well-suited for chlorine environments as the titanium substrate is resistant to corrosion. The total area of the anode can be adjusted based upon reactor size and desired production. The anolyte of electrochemical cell 4332 can be any suitable material, including a lithium chloride solution having a concentration of between of about 1% by weight to saturation, preferably between 5% and 40% by weight, more preferably between about 10% and 35% by weight.

The materials for construction of electrochemical cell 4332 can be any material that is chemically resistant to chlorine, activated chlorine, oxygenated chlorine species, and other dissolved species that may exist in brine solutions. Exemplary materials for the construction of electrochemical cell 32 include polytetrafluoroethylene (PTFE), polyvinylidene fluoride (PVDF), HALAR (alternating co-polymers of ethylene and chlorotrifluoroethylene (CTFE)), and other fluorinated or partially fluorinated.

The membrane of electrochemical cell 4332 can be any suitable semi-permeable cation selective membrane that selectively passes cations and inhibits the passage of anions. Such membranes are known in the art. One exemplary membrane is Nafion (E.I. DuPont de Nemours & Co.), particularly the Nafion 300, 400 and 900/9000 series of materials. Other suitable membranes can be supplied by Flemion, however any suitable membrane material can be used provided the material is chemically resistant to both chlorine and lithium hydroxide. The membrane may be placed between the anolyte being electrolyzed and the catholyte.

In certain embodiments, the process can optionally include one or more filter or separation-purification step prior to the step of supplying concentrated lithium chloride solution 4330 to electrochemical cell 4332.

During operation of electrochemical cell 4332, a current density of between about 500 and 10,000 A/m2 can be applied at a voltage of between about 1.5 and 5 volts. Preferably, a current density of between about 2000 and 7000 A/m2 is applied. Electrochemical cell 4332 may be operated at a temperature of between about 600 and 100° C., preferably between about 70° and 95° C., and more preferably between about 90° and 95° C. Cell 4332 can be operated at atmospheric pressure, or slightly above atmospheric pressure. Operation of electrochemical cell 4332 produces lithium hydroxide in solution, and also evolves chlorine and hydrogen gas by products, which can be removed from the electrochemical cell via lines 4334 and 4335, respectively.

The efficiency of electrochemical cell 4332 is at least about 60%, preferably at least about 70%, more preferably at least about 80%, more preferably at least about 90%, more preferably at least about 95%, and even more preferably at up to about 99.9%. The electrolysis can be operated continually until the lithium hydroxide content reaches about 17% by weight, at which time the lithium hydroxide solution may be removed and supplied to a carbonation reactor. At lithium hydroxide concentrations greater than about 17% by weight, the lithium hydroxide in solution can begin to precipitate. Electrochemical cell 4332 can also be operated under conditions designed to produce lower concentration lithium hydroxide solutions and the lower concentration lithium hydroxide solution can be recycled to and from the carbonation reactor. In certain embodiments, electrochemical cell 4332 can also include a feed line (not shown) for supplying water, low concentration lithium hydroxide, low concentration lithium carbonate, or combinations thereof to the cell.

Lithium hydroxide solution 4336 is supplied from electrochemical cell 4332 to carbonation reactor/absorber 4338 and can be contacted with carbon dioxide gas 4344, for example, in an up-flow fashion. Carbonation reactor/absorber 4338 can include a series of trays or other like means that are designed to allow lithium hydroxide 4336 to be supplied to the top of the reactor and flow in a downward fashion through the reactor, thereby contacting up-flowing carbon dioxide gas 4344, which can be introduced near the bottom of carbonation reactor/absorber 4338. In alternate embodiments, carbonation reactor/absorber 4338 can include various mixing means designed to facilitate mixing of liquids and gases. Optionally, carbonation reactor/absorber 4338 can be a jacketed batch reactor having thermostatic heating. The reaction produces lithium carbonate solid. The concentration of the lithium carbonate slurry is preferably at least about 1.5% by weight lithium carbonate, more preferably at least about 6% by weight lithium carbonate. Carbon dioxide can be captured and recycled to carbonation reactor/absorber 4338 via line 4342.

In certain embodiments, the lithium carbonate can be produced by reaction of lithium hydroxide with sodium carbonate in water, wherein the mixture is heated, preferably to a temperature of between about 90° C. and 95° C., with stirring. The reaction produces solid lithium carbonate and a sodium chloride solution, wherein the sodium chloride solution can be separated by filtration from the desired lithium carbonate solids.

Lithium carbonate solution 4340 can be supplied to filtration means 4346, which is operable to separate lithium carbonate containing slurry 4340 into water stream 4352, which may optionally be resupplied to the filtration means, and solid lithium carbonate product 50. Filtration means 4346 can, for example, include a series of screens or filters and water supply 4348. Optionally, water can be recycled to the process via line 4352. Optionally, lithium carbonate can be concentrated from the slurry by centrifugation or decantation thickening. Water collected during the separation of the solids from the slurry via filtration means 4346 can be supplied to the electrochemical cell, or may be supplied to a geothermal well or reservoir. In certain embodiments, lithium carbonate solid can be retained on a band filter and supplied to a wash step, wherein hot water, preferably having a temperature of between about 90° C. and 95° C. is used to wash the solids. In certain embodiments, the aqueous solution collected via filtration means 4346 can have a pH of greater than about 9, most likely having a pH between about 10-12. Alternatively, sufficient acid can be added to the aqueous solution to achieve a pH of between about 5 and 8.5, and the acidified water can then be supplied to the intercalated lithium absorbent column(s). Alternatively, the solution can be returned directly to the cathode side of the electrolysis cell without prior neutralization.

The solid lithium carbonate 4350 is supplied to a drying station 4354, which can optionally include heating means, as well as lines for supplying nitrogen or other inert gases to the chamber. Dried lithium carbonate product 4356 can then be collected, packaged and transported for further use.

EXAMPLES

Example 1. Selective Removal of Silica Using Aluminum Salts

A simulated brine was prepared to mimic the brine composition from exemplary Salton Sea deep test wells (post reactor crystallizer clarifier system), having an approximate composition of 260 ppm (mg/kg) lithium, 63,000 ppm sodium, 20,100 ppm potassium, 33,000 ppm calcium, 130 ppm strontium, 700 ppm zinc, 1700 ppm iron, 450 ppm boron, 54 ppm sulfate, 3 ppm fluoride, 450 ppm ammonium ion, 180 ppm barium, 160 ppm silica (measured as silicon dioxide), and 181,000 ppm chloride. The silica was added to the brine as acidified sodium silicate solution, with the target of a concentration of about 160 ppm, the anticipated value for the test well brine, after undergoing a clarifying process to partially remove silica. The pH of the simulated brine was between about 3 and 4, and was subsequently adjusted with sodium hydroxide or other suitable base.

To enhance separation of the aluminosilicates from the brine once precipitated, aluminosilicates are recycled to contact them with a fresh batch of brine. This enhances silica removal by increasing the size of the particles, making it easier to separate them physically. The amorphous aluminosilicate material was prepared by neutralizing a concentrated sodium silicate solution with an aluminum chloride salt. Specifically, 710 g of $Na_2SiO_3 \cdot 9H_2O$ was dissolved in 400 mL of distilled water. To the solution, 420 g of $AlCl_3$. was slowly added while stirring to produce a wet paste of precipitated material. The paste was dried at 60° C. in an oven overnight and washed with Milli-Q water to remove fines to produce a solid. The resulting solid was relatively insoluble (relative to pure amorphous silica) and suitable for use as a seed material for subsequent silica removal tests.

Approximately 1.6 mL of a 0.1M solution of $AlCl_3$ was added to approximately 60 mL of the simulated brine solution, which had an initial silica concentration of about 160 ppm and a pH of about 5. Approximately 1.5% by weight (relative to the total mass) of solid amorphous aluminosilicate was added to the solution. The $AlCl_3$ was slowly added in an amount equal to the molar amount of silica in solution to achieve a ratio of silica to aluminum of about 1:1. The solution was heated to approximately 95° C. and stirred constantly. The pH was monitored and adjusted by titrating with sodium hydroxide or calcium hydroxide to maintain the starting pH of about 5. The solution was allowed to stir for approximately 10 minutes, during which the silica and aluminum reacted to selectively precipitate on the seed material, thereby removing both aluminum and silica from the solution. The monomeric silica content (i.e., non-amorphous aluminosilicate content) dropped to approximately 25-40 ppm upon addition of base to maintain the pH at about 5. An additional 5-15% of the silica present precipitated over the next 30 minutes. Total silica removal for the process after 15 minutes of stirring was about 95%, resulting in a brine solution having a silica content of approximately 10 ppm. The aluminum concentration of the solution, after precipitation of the silica, was between about 2-10 ppm.

Example 2. Selective Removal of Silica Using Ferrous Iron

A simulated brine was prepared to mimic the brine composition of test wells found in the Salton Sea, having an approximate composition of about 252 ppm lithium, 61,900 ppm sodium, 20,400 ppm potassium, 33,300 ppm calcium, 123 ppm strontium, 728 ppm zinc, 1620 ppm iron, 201 ppm boron, 322 ppm sulfate, 3 ppm fluoride, 201 ppm barium, 57 ppm magnesium, 1880 ppm manganese, 136 ppm lead, 6 ppm copper, 11 ppm arsenic, 160 ppm silicon dioxide, and 181,000 ppm chloride. The simulated brine (1539.2 g) was sparged with air for about 60 minutes, during which time pH was measured. A calcium hydroxide slurry having 20% solids by weight was added dropwise after 60, 90, and 120 minutes (total weight of the calcium hydroxide slurry added was 13.5 g; calcium hydroxide was 2.7 g dry basis) to the solution. The pH was monitored throughout the reaction and was initially allowed to fall, and was then adjusted to a pH of about 5 with the addition of calcium hydroxide after 60 minutes, and maintained at about a pH of 5 thereafter. The reaction was allowed to stir while the pH was maintained at about 5. Total reaction time was about 180 min. A white precipitate was collected, washed and weighed, providing a yield of about 95% recovery of the silica present in the brine and about 100% of the iron present in the brine.

Example 3. Selective Removal of Silica Using Activated Alumina

A 50 mL brine solution having approximately 180 ppm dissolved silica was passed through a 2.5 cm diameter column filled to a depth of 20 cm and containing approximately 0.5 g activated alumina and about 1.2 g water. The silica preferentially adsorbed onto the alumina and was removed from the solution. The activated alumina had a surface area of about 300 m$^2$/g and a grain size of between about 8-14 mesh (~2 mm diameter). The total bed volume was about 102 mL. The temperature during the step of contacting the silica containing brine and the activated alumina was maintained between about 90 and 95° C.

The concentration of silica in the brine was monitored by measuring monomeric silica using the molybdate colorimetric method and using Atomic Absorption for total silica. Silica values were significantly lower in the exit solution due to adsorption of the silica on the activated alumina. Saturation of the activated alumina in the column was indicated by a sudden increase in silica concentration in the exit solution. A total loading of about 1.8% by weight of silica (SiO$_2$) on the activated alumina was achieved.

To regenerate the alumina for another cycle of silica removal, the alumina was first washed with 5 bed volumes of dilute water in order to remove any salt solution remaining in the pores. This removed only a small amount of silica from the alumina. The alumina was then reacted with a dilute (0.1M) sodium hydroxide solution at a temperature of between about 50 to 75° C. until a desired amount of silica has been removed. The alumina was then rinsed with between about 2-3 bed volumes of dilute acid to prepare the surface for the next silica adsorption cycle.

Example 4. Continuous Processing of Geothermal Brine

To a brine solution comprising about 200 mg/L Li, 75,000 mg/L Na, 24,000 mg/l K, 39,000 mg/L Ca, 156 mg/L Sr; 834 mg/L Zn, 539 mg/l B, 219 mg/L Ba, 160 mg/L SiO$_2$, and 215,500 mg/L Cl and maintained at about 95° C. was added approximately 1.5% by weight aluminosilicate seed. To approximately 39 mL of the brine solution was added 1.07 mL of a 0.1M solution of AlCl$_3$ such that the ratio of SiO$_2$:Al was 1:1. About 0.45 mL of a 1N solution of NaOH was used to titrate the pH of the solution to about 5. The solution was heated and stirred for about 10 minutes to ensure complete precipitation of the aluminosilicate.

Analysis of both the feed and the output fluids during silica removal yielded mixed results. Comparing the results of molybdate blue calorimetry (MBC; useful for quantifying monomeric silica) and ICP-OES yielded silica levels that were significantly lower than input levels (160 mg/L).

As shown in Table 1, the results of several methods for the removal of silica from a brine solution were tested. Both Ca(OH)$_2$ and NaOH were investigated, as was NaOH along with a 10% excess of AlCl$_3$. For the use of an excess of AlCl$_3$, the additional AlCl$_3$ was added approximately 2 minutes after initiation of the reaction, and additional NaOH was titrated into the reaction mixture to maintain a pH of about 5. Finally, NaOH and polymerized aluminum in the form of aluminum chlorohydrate (PAC) was also investigated, instead of AlCl$_3$, and was prepared in situ by titrating NaOH into AlCl$_3$ until a pH of about 4.5 was achieved. Additional base was added to raise the pH to about 5.

Both Ca(OH)$_2$ and NaOH were effective in both increasing the pH of the solution, and in removing silica, with Ca(OH)$_2$ being slightly more effective at removing silica than NaOH, and removing at least about 80% of the silica present. Precipitation of silica by contacting with an excess of AlCl$_3$ resulted in the precipitation of nearly 87% of silica present. Finally, use of the PAC resulted in the removal of about 84% of the silica present.

TABLE 1

| Test Condition | ICP % SiO$_2$ remaining in solution | ICP % SiO$_2$ removed | MBC % SiO$_2$ remaining in solution | MBC % SiO$_2$ removed |
|---|---|---|---|---|
| Ca(OH)$_2$ | 17 | 83 | 19 | 81 |
| NaOH | 28 | 72 | 20 | 80 |
| NaOH + 110% AlCl$_3$ | 16 | 84 | 13 | 87 |
| NaOH + PAC | 17 | 83 | 15 | 85 |

Example 5. Silica Removal Process Using Aluminum Salts

Approximately 60 mL of brine containing about 160 mg/L silica at a pH of 5 was added to 1.07 g of amorphous aluminosilicate seed (~1.5 wt. % solids). Approximately 1.6 mL of a 0 μM solution of aluminum chloride (AlCl$_3$) was added to the brine solution. The solution was stirred, maintained at nominally 95° C., and the pH monitored. The pH dropped to about 2.7 upon addition of the AlCl$_3$ solution. Approximately 13 mL of a saturated and filtered Ca(OH)$_2$ solution was added. Silica and the aluminum salt formed precipitates, yielding a brine solution having a silica content of about 0.23 mg/mL.

Example 6. Packed Bed Testing

A hold-up vessel and packed bed tester (HUV-PB) were used in the packed bed testing. A baffled, plug-flow design with stirred sections to keep solid particles suspended in solution was employed. The plug-flow design with mixing is important as it maintains a constant and narrow residence time distribution (RTD) while preventing premature deposition of suspended solids, which would bias scaling and packed-bed fouling rates.

The test set-up included brine pumping and metering equipment, a hold-up vessel (HUV) to provide controlled residence times similar to a full-scale injection system, and related controls and instrumentation.

A HUV sized for the minimum and maximum hold-up time for injection pipelines and wellbores was used to test the fouling rate across the packed bed. The fouling rate was monitored by real-time pressure drop (Δ P) signals at constant flow through the packed bed.

The packing configuration and flow through the packed bed was designed to provide accelerated fouling compared to that occurring in the injection well. The packed beds were packed with screened drilling rock chips from a well hydrothermal zone. The rock chips were primarily of two types: 1) hydrothermally-crystallized fine-grained granitic material composed of quartz and feldspar, and 2) silica-bonded meta-siltstone. The rock chips were uniformly packed to allow for the measurement of relative fouling rates under process conditions for each test.

The run time of each experiment depended on the behavior of the brine across the packed bed and the increase in pressure across the packed bed. If a pressure drop maximum was not reached, the test was run for up to 2 weeks before discontinuation of the test.

A side-stream of brine was supplied to the packed bed through heat-traced packed bed tubing at about 10 psig from continuously flowing bypass loops. The brine streams were metered by positive-displacement peristaltic pumps at a controlled ratio through a HUV to simulate the average residence time in the injection pipeline and well casings. The HUV was fitted with baffles and mixing paddles to provide plug flow without settling of suspended solids. The brine was then pumped under high-pressure (up to 1000 psig) through the columns packed with rock chips in order to simulate the reservoir formation.

During each test, data collection included brine flow rate, temperature, pressure, and differential pressure for each of the columns. Brine samples were collected for chemical analysis upstream and downstream of the beds. The tests were run until the pressure drop (A P) across the packed bed indicated significant plugging (approaching 1000 psig) while the brine flow rate through the column was maintained at a constant rate by a positive displacement pump. The tubes had injection brine pumped through them until the pressure reached about 1000 psig at 1 LPM brine flow. The tests were concluded at 2 weeks, if the pressure drop of 1000 psig was not experienced.

At the end of each test the packed bed and tubing test sections were weighed to determine the amount of scale deposited and the residual bulk porosity of the packed bed was measured. Cross-sections of the packed bed were examined by Scanning Electron Microscopy (SEM) and X-ray diffraction (XRD). Brine samples and deposited solids in the tubing were also analyzed for chemical composition.

The test runs were performed in accordance with Table 2.

TABLE 2

| Test 1 | Untreated Brine (UB) |
| Test 2 | Treated Brine (TB) |
| Test 3 | 50% UB:50% TB |
| Test 4 | Untreated Brine (UB) |
| Test 5 | 50% UB:50% TB |
| Test 6 | Treated Brine (TB) |
| Test 7 | Untreated Brine (UB) |
| Test 8 | Treated Brine (TB) |
| Test 9 | 50% UB:50% TB |
| Test 10 | Untreated Brine (UB) |

Treated brine was brine that had been subjected to a silica management and iron removal step as described in Example 4 above (continuous removal of silica). The brine was treated by first oxidizing the Fe(II) to Fe(III) and precipitating it as FeO(OH) with the addition of lime (as described herein). The lithium was extracted using a granulated sorbent based on a lithium alumina hydroxide. Untreated brine was brine that had been flashed for purposes of extracting energy, but which had only a portion of silica removed, and had not been processed to remove iron, in a process in accordance with that described in U.S. Pat. No. 5,413,718. The untreated brine had approximately 160 mg/kg of silica. The 50:50 blends were 50:50 by volumetric flow rate of treated and untreated brine.

Lithium Extraction Step

Lithium was extracted with a granular lithium aluminate sorbent placed in two five foot deep and 18 inch diameter columns that were run in alternating sequences of load and strip. Each operation was approximately two hours in duration. The sorbent was made according to the process described in U.S. Pat. No. 8,574,519, which is hereby incorporated by reference in its entirety. Once the brine had passed through the columns it was recovered in a holding tank before a part of the flow was pumped packed bed test. The lithium was reduced from approximately 250 mg/kg to generally less than about 100 mg/kg and preferably less than about 15 ppm.

The pressure profiles of each run are shown in FIGS. 16-24, and are summarized in Table 3 below.

TABLE 3

| | Packed Bed Days of Operation(to 1000 psi stop-point) | | | |
|---|---|---|---|---|
| Source | | | | Average |
| Untreated Brine | 1.38 (Test 1) | 1.67 (Test 4) | 0.97 (Test 7) | 1.34 days |
| Treated Brine | +15.0 (Test 2) | 4.59 (Test 6) | +13.0 (Test 8) | +10.9 days sig |
| 50:50 blend | 1.39 (Test 3) | 3.28 (Test 5) | 4.60 (Test 9) | 3.09 days |

Figure 16:
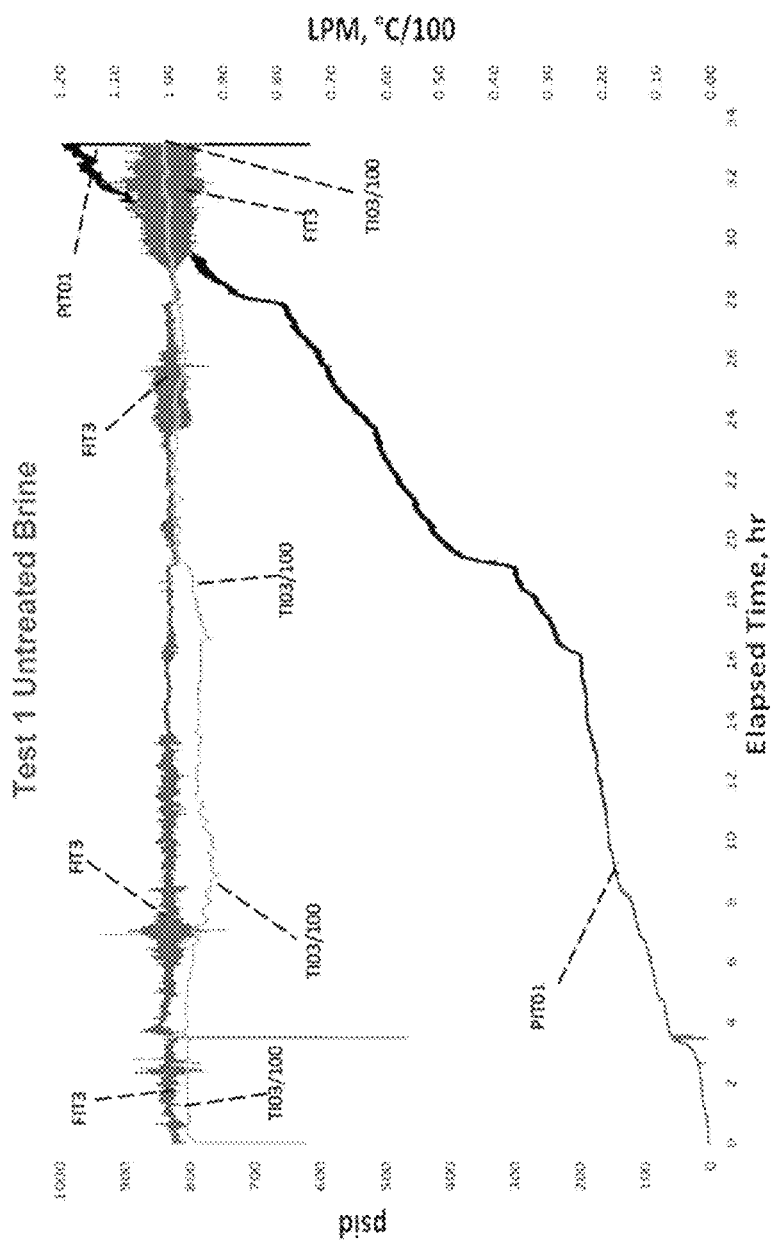
FIG. 16 is a graph showing the packed bed differential pressure versus time for an untreated brine.
Figure 17:
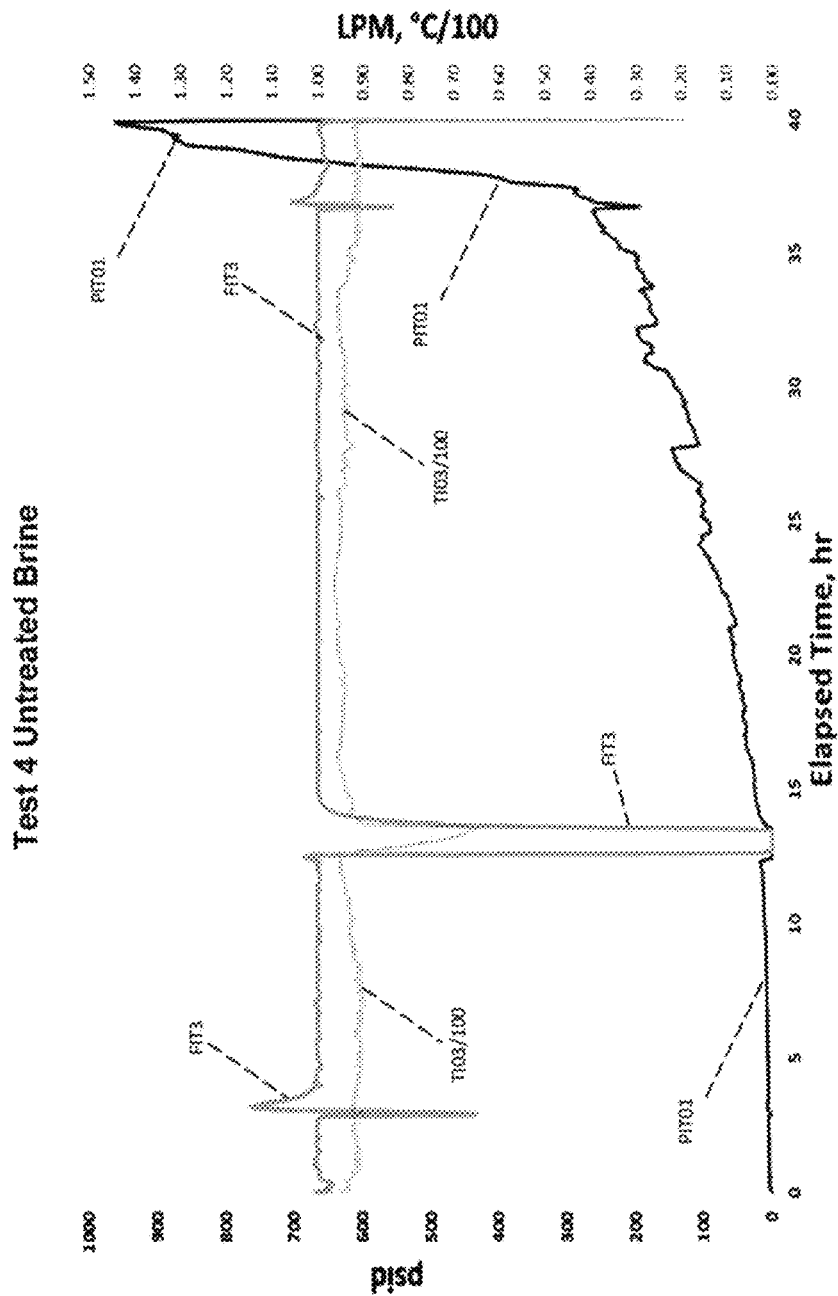
FIG. 17 is a graph showing the packed bed differential pressure versus time for an untreated brine.
Figure 18:
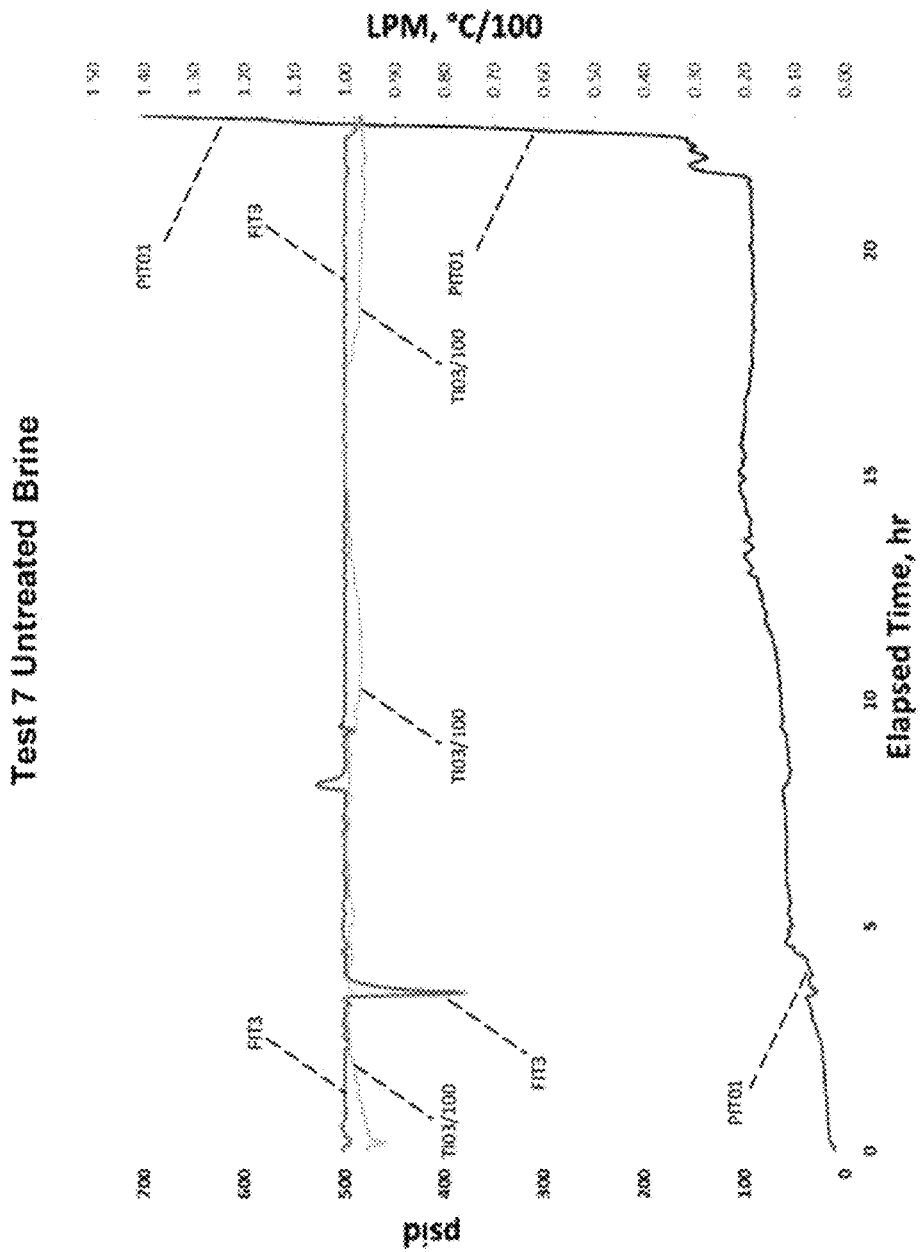
FIG. 18 is a graph showing the packed bed differential pressure versus time for an untreated brine.
Figure 19:
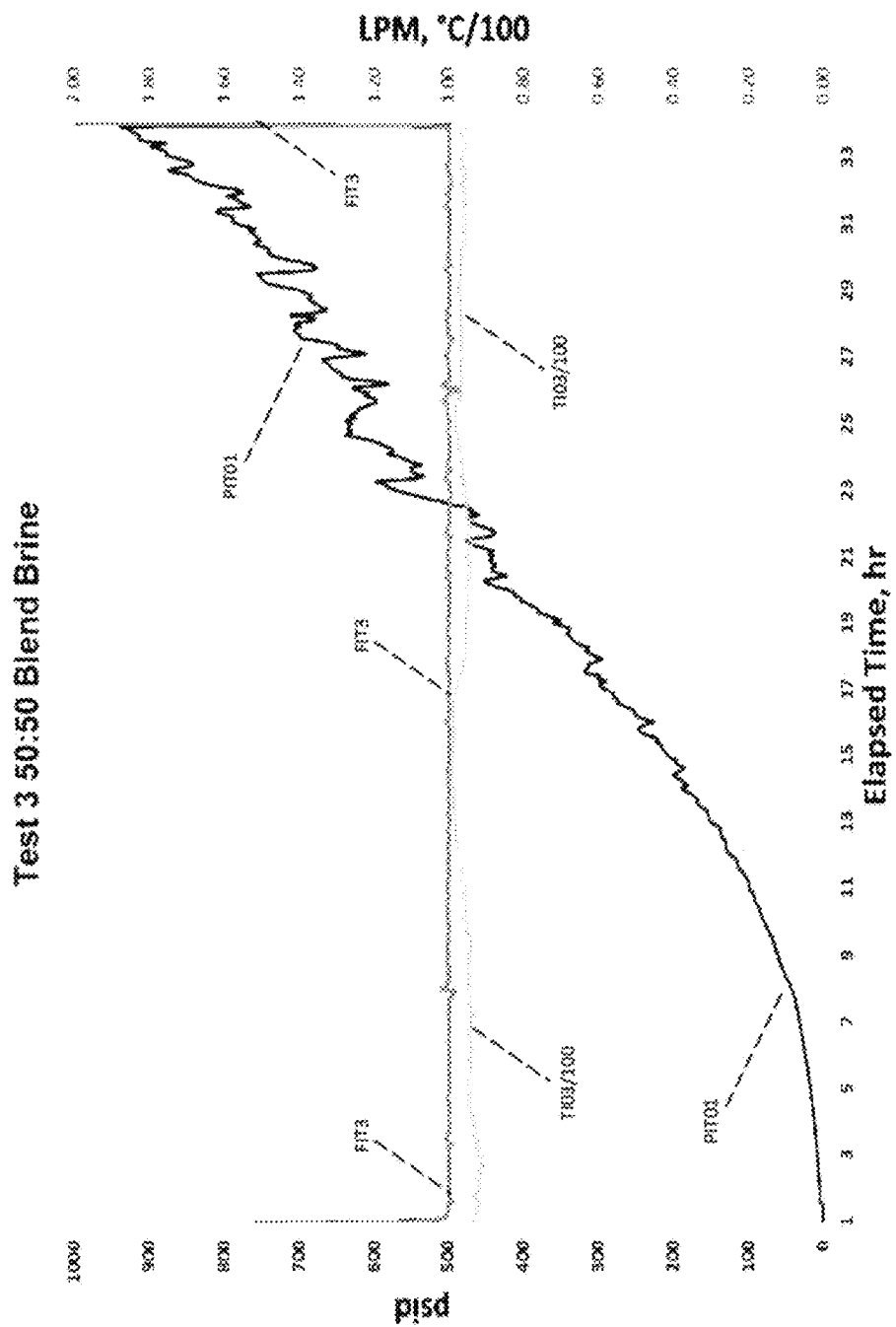
FIG. 19 is a graph showing the packed bed differential pressure versus time for a 50:50 blend brine.
Figure 20:
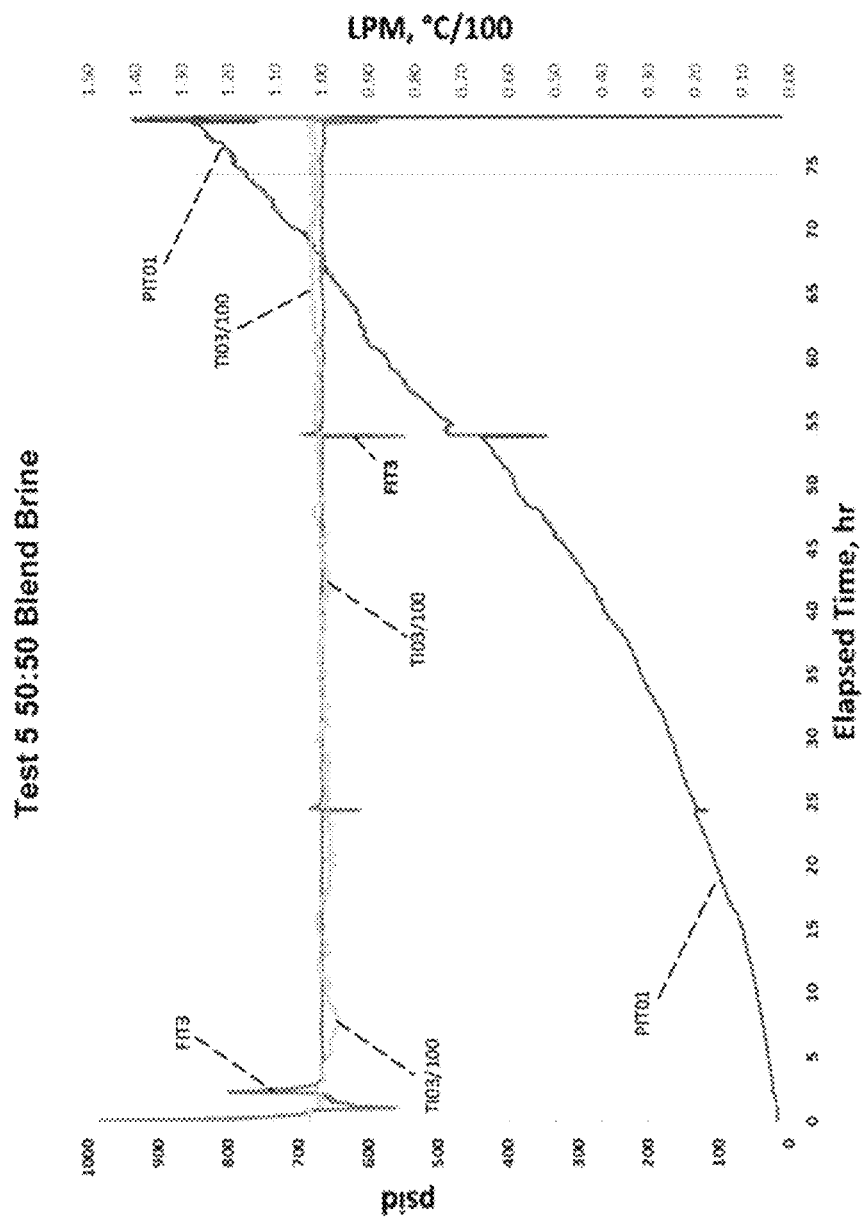
FIG. 20 is a graph showing the packed bed differential pressure versus time for a 50:50 blend brine.
Figure 21:
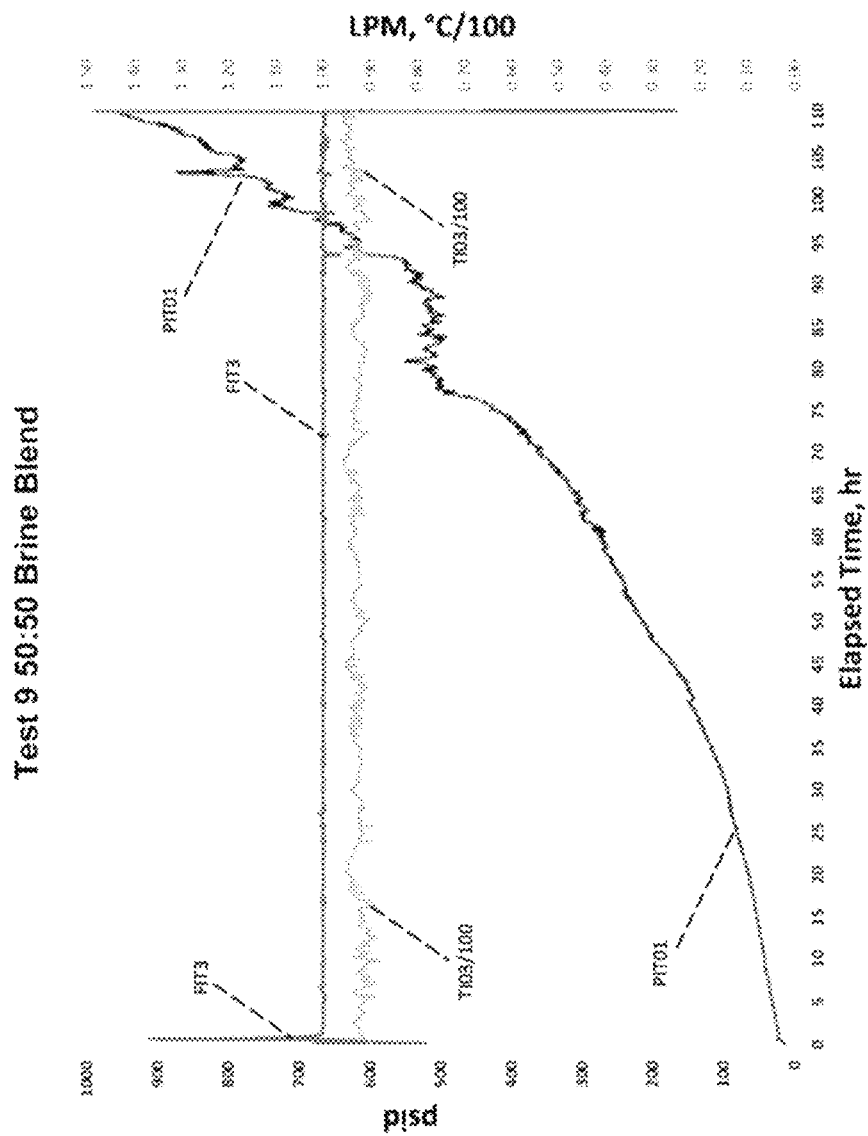
FIG. 21 is a graph showing the packed bed differential pressure versus time for a 50:50 blend brine.
Figure 22:
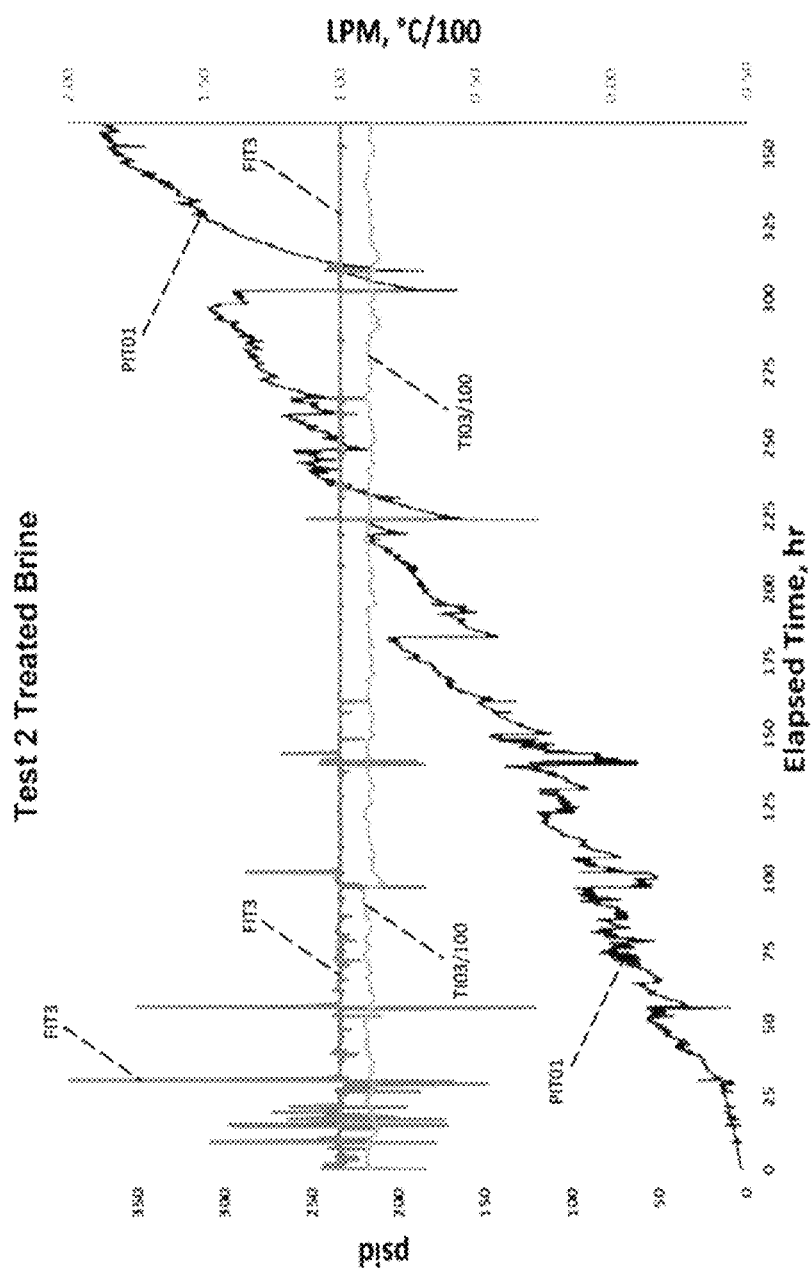
FIG. 22 is a graph showing the packed bed differential pressure versus time for a treated brine.
Figure 23:
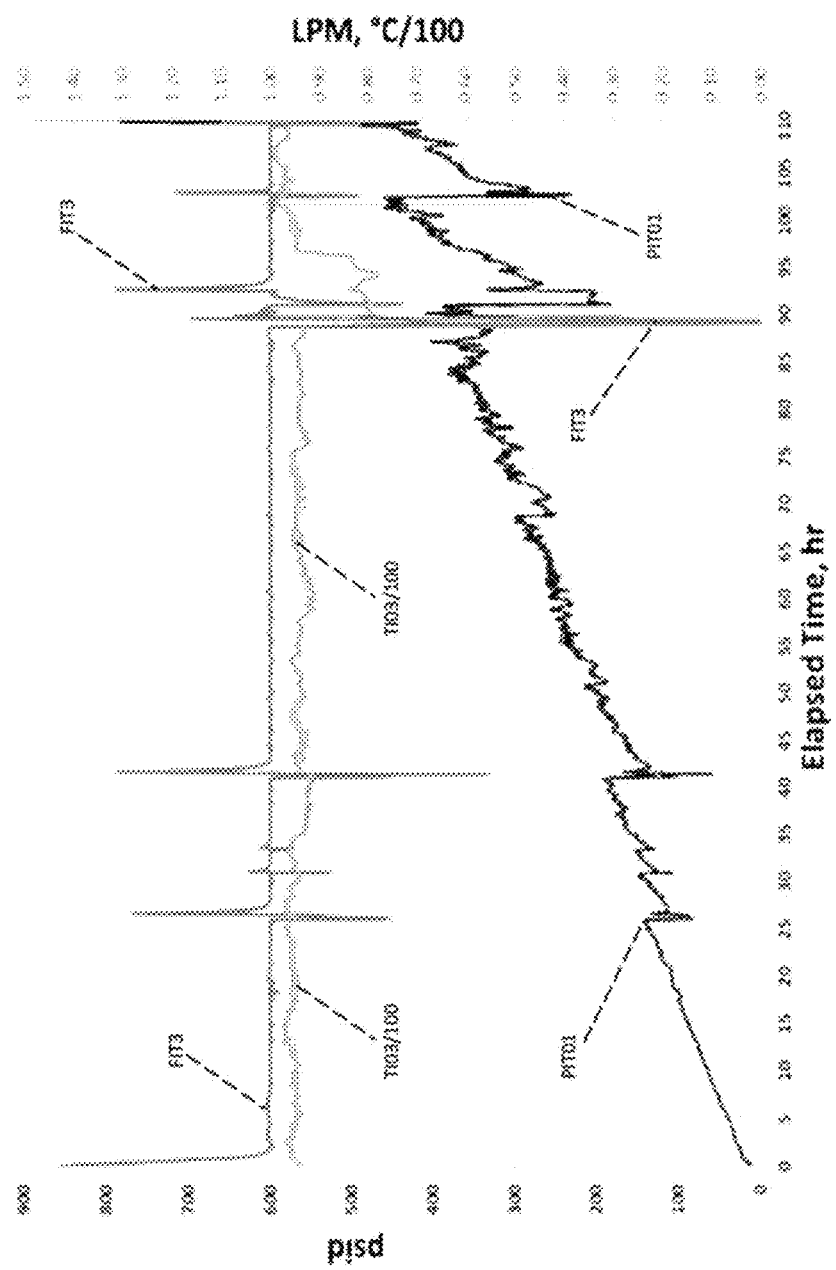
FIG. 23 is a graph showing the packed bed differential pressure versus time for a treated brine.
Figure 24:
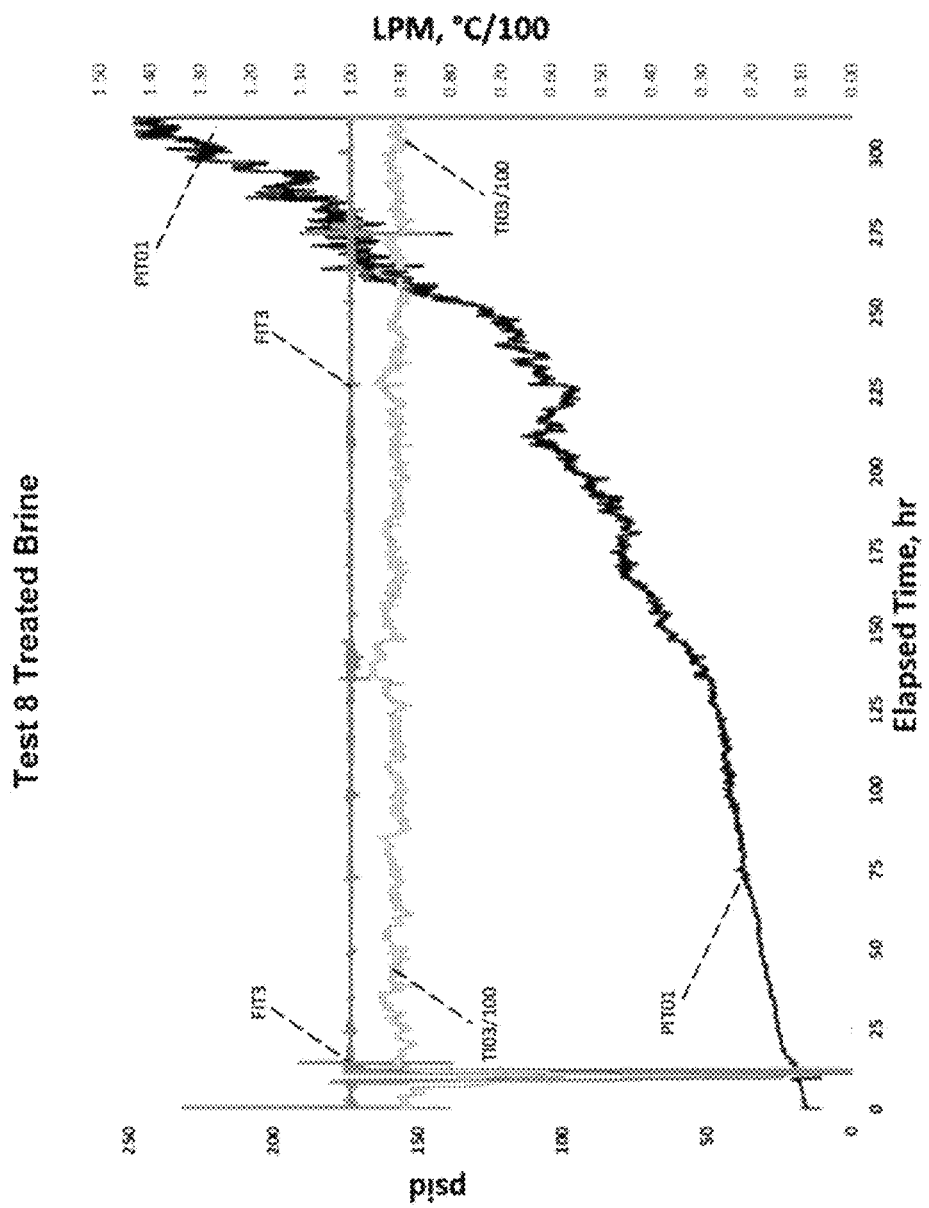
FIG. 24 is a graph showing the packed bed differential pressure versus time for a treated brine.

Comparing the differential pressure profiles from FIGS. 16, 17, and 18 against the differential pressure profiles from FIGS. 19, 20, and 21, the 50:50 brine blend run times were equal or better than the untreated brine, which shows that the blend is not likely to cause scaling problems as quickly as untreated brine. The longest run times were observed with the treated brine as shown in FIGS. 22, 23, and 24, which ran long enough that two of the runs were terminated at two weeks. The maximum potential run time for treated brine, Test 2, FIG. 22, is not known, but an extrapolation of the trend shows it may have been as long as 6 weeks. The long run time of the treated brine is likely due to the lack of iron and silica in the brine solution. Thus, injection of treated brine appears to give the best outcome for injectivity and long term well permeability.

As shown in Table 4, the differences between the treated and untreated brines were the almost total removal of Fe, Si, and As, the significant reduction in Li, Ba, $SO_4$, F, and Pb concentrations, and the increase in pH, oxygen concentration, and ORP in the treated brine relative to the untreated brine. Removal of Fe, Si, As, reduction in Pb concentration, increase in pH, oxygen, and ORP result from the silica management process. Removal/reduction of Li is due to the lithium extraction process. Reduction in Ba, $SO_4$, and F concentrations was due to $BaSO_4$ and $CaF_2$ precipitation during the silica management process. Since Fe and Si are major scaling components, the ultimate impact of the brine treatment process on brine chemistry will reduce the scaling potential of the depleted brine and improve injectivity.

TABLE 4

| Analyte | Treated brine relative to untreated brine |
|---|---|
| Temperature | −15-20° C. |
| pH | +0.8 units |
| ORP | +300 to 500 mV |
| Ca | −3% |
| Fe | −100% |
| Si | −97% |
| Li | −90% |
| As | −100% |
| Pb | −30%-50% |
| Ba | −60% |
| $SO_4$ | −55% |

The chemistry of the brines were measured before and after residence time in the packed bed and blending in the HUV, to ensure that no major chemical reactions were taking place during the packed bed testing. A significant reaction would deplete the brine in one or more elements.

Figure 25:
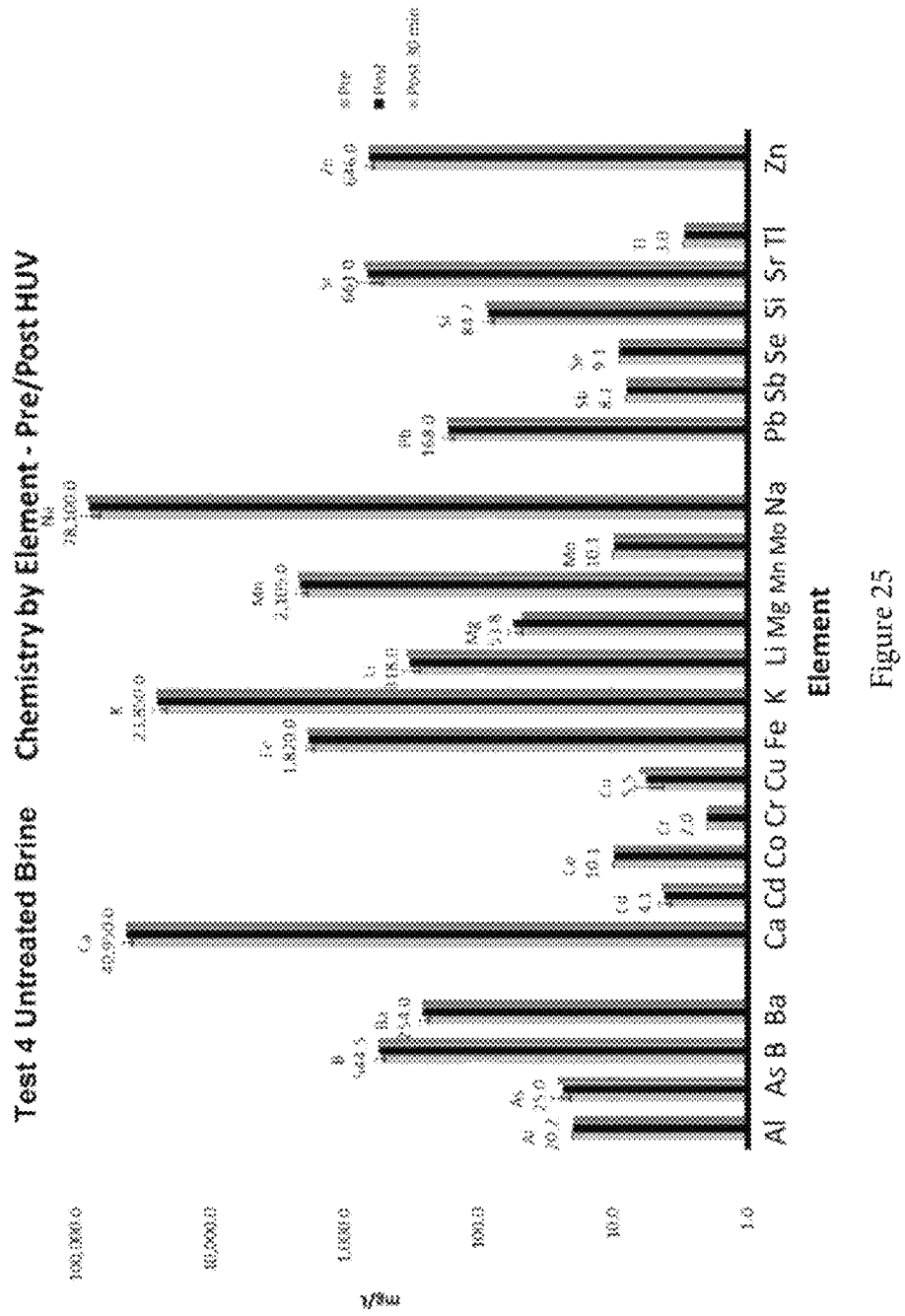
FIG. 25 shows the chemistry of an untreated brine before and after packed bed testing.

In FIGS. 25 through 29, the first column of each element shows the brine chemistry as it entered the HUV, the second column of each element shows the brine chemistry as it exited the HUV, and the third column shows the brine chemistry of a sample pulled 30 minutes from the post-HUV sample. The chemistry of Test 1 (untreated brine) was not measured, as it terminated sooner than expected, before chemical samples could be taken. However, Test 4 is a repeat of the same test and the results are shown in FIG. 25, and due to the consistency seen in the brines, it is believed that Test 1 would yield similar results.

Figure 26:
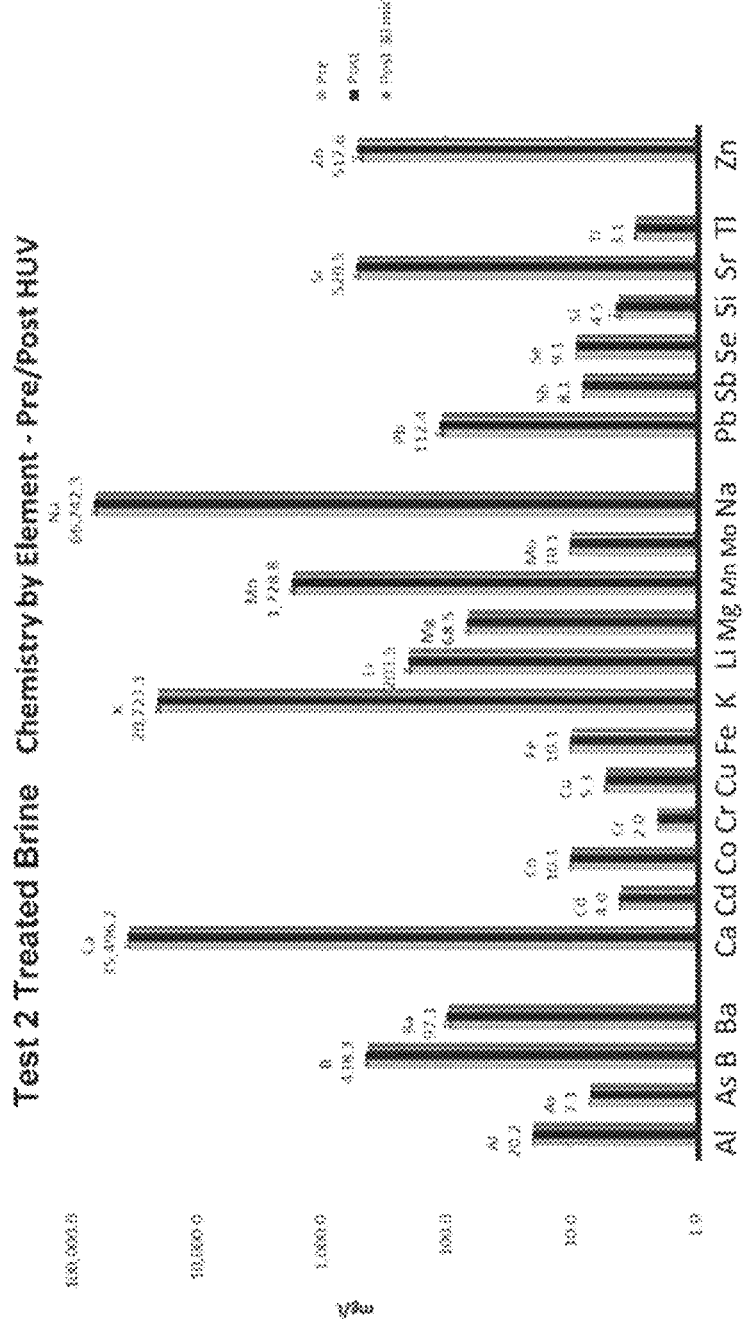
FIG. 26 shows the chemistry of a treated brine before and after packed bed testing.
Figure 27:
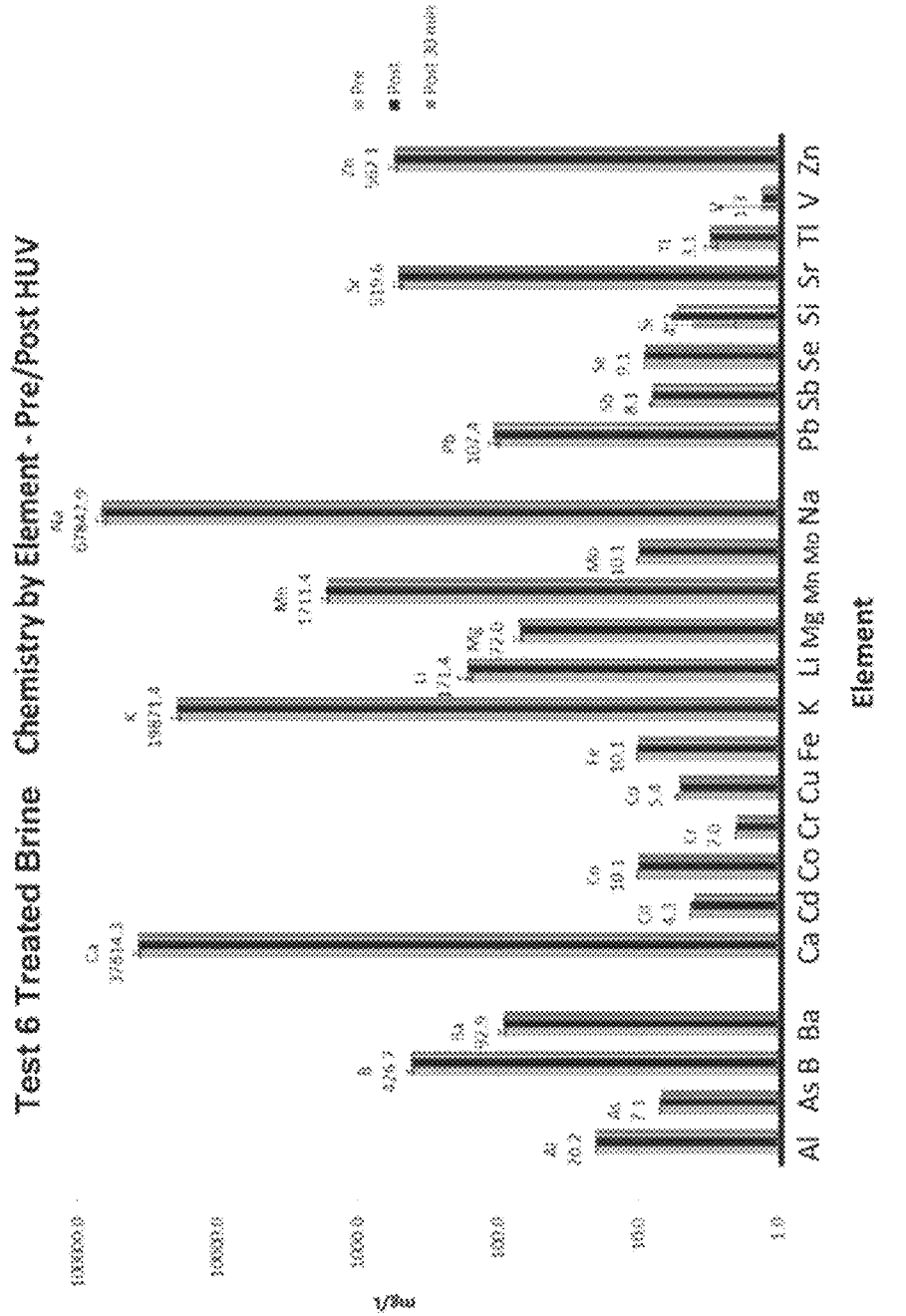
FIG. 27 shows the chemistry of a treated brine before and after packed bed testing.
Figure 28:
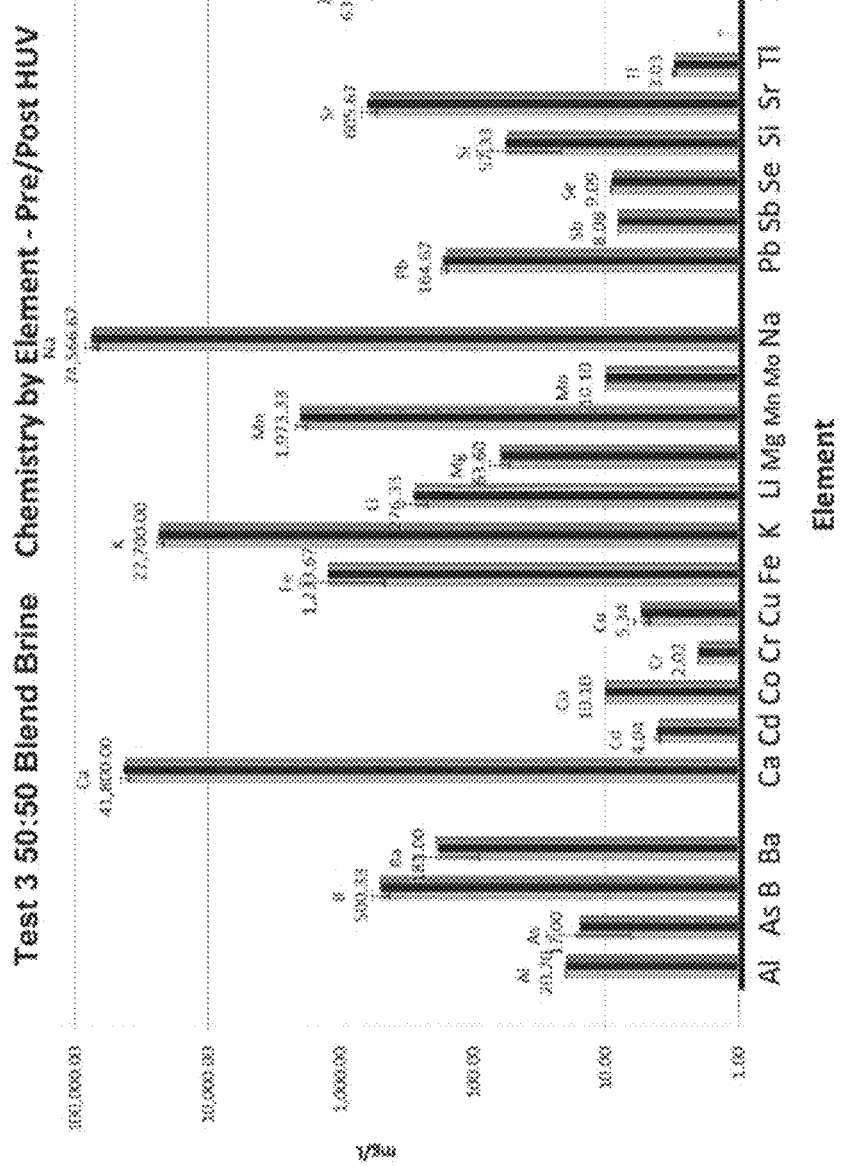
FIG. 28 shows the chemistry of a 50:50 blend brine before and after packed bed testing.
Figure 29:
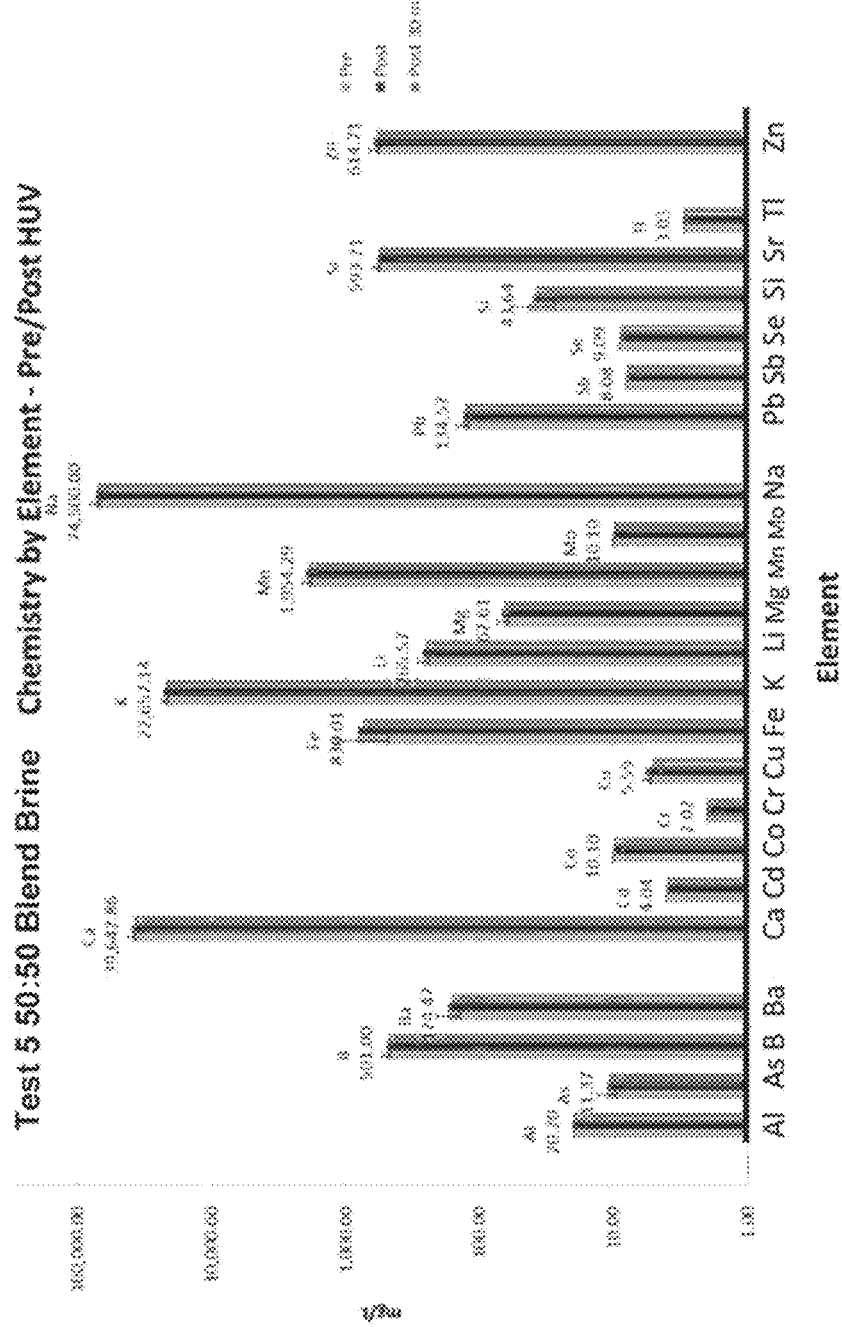
FIG. 29 shows the chemistry of a 50:50 blend brine before and after packed bed testing.

As shown in FIGS. 26 and 27 for treated brines and in FIGS. 28 and 29 for 50:50 blend brines, it was observed in almost every case that any change in the pre- and post-HUV levels was small, and within the normal sample variation. The implication of this result is that the chemistry of the brine is stable during testing, and that there are no major chemical reactions for precipitation reactions that effect brine chemistry in the packed bed. Even in the 50:50 blend brine (FIGS. 28 and 29), there were no significant differences before and after the HUV. The 50:50 blend brine does show more variability, likely due to a small amount of Fe oxidation that also precipitates Si. Typical pH of the tested brines are shown in Table 5.

TABLE 5

|  | Untreated Brine | Treated Brine | 50:50 Blend |
| --- | --- | --- | --- |
| Average pH | 4.61 | 5.67 | 5.20 |
| Std. Dev. | 0.23 | 0.27 | 0.09 |
| Samples | 20 | 34 | 9 |

To evaluate the scale, cut sections of the packed beds from Tests 1 through 5 were submitted for petrologic (mineralogical) evaluation of solids precipitated or trapped during packed bed testing. Scanning electron microscopy and X-ray diffraction analyses were conducted to characterize the chemical deposits and suspended solids that were trapped in the rock matrix. A sample of the unexposed matrix material was also provided in order to compare the fine solids with the original rock material.

Detailed SEM analyses of the scale and fine particles from the five tests show a variety of textures and particle morphologies. Associated spot elemental analyses reveal the composition of each type of fine material. The dominant type of fine material consisted of dark green-colored, amorphous iron silicate with subtle variations based on texture and elemental composition. FIGS. 30 through 35 show low and high magnification SEM images of each brine type.

Figure 30:
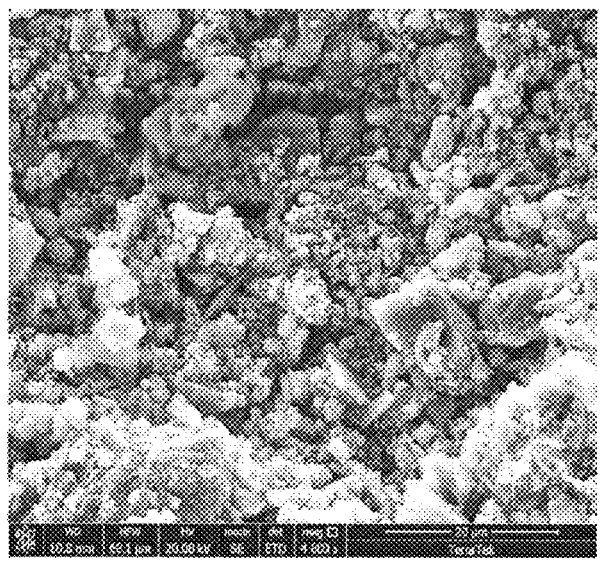
FIG. 30 shows a SEM image from a packed bed test of untreated brine.
Figure 31:
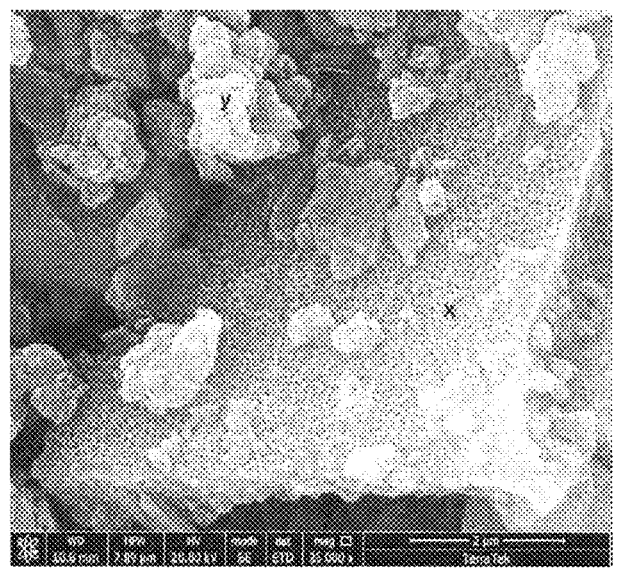
FIG. 31 shows a SEM image from a packed bed test of untreated brine.

FIGS. 30 and 31 show low and high magnification SEM images from the testing of untreated brines. The untreated brine used in Tests 1 and 4, showed smooth, botryoidal (globular textured) particles composed of relatively pure iron silicate. More crumbly, rough-textured, or fuzzy aggregates were composed of iron silicate with minor calcium and aluminum. In places, more flaky or webby-textured surfaces were composed of iron silicate with potassium, aluminum, and calcium. This material could possibly represent a smectite-like clay.

Figure 32:
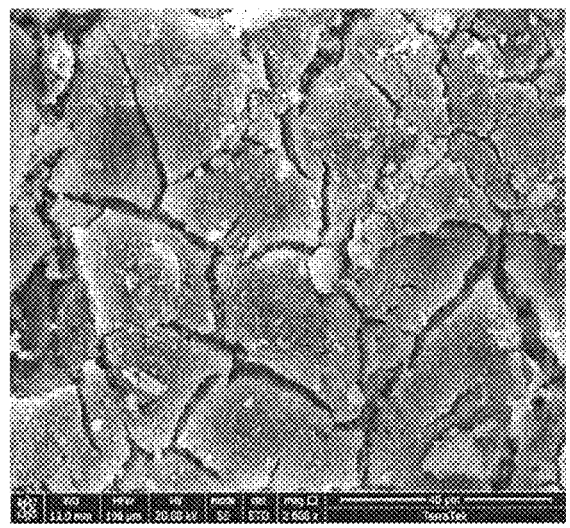
FIG. 32 shows a SEM image from a packed bed test of treated brine.
Figure 33:
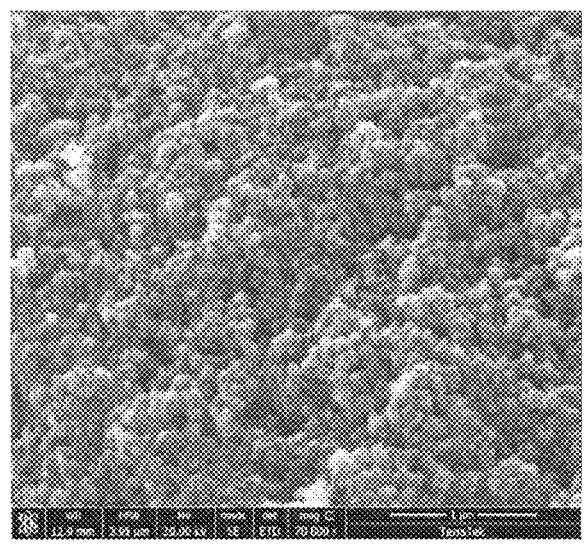
FIG. 33 shows a SEM image from a packed bed test of treated brine.

FIGS. 32 and 33 show low and high magnification SEM images from the testing of treated brines. The treated brine used in Test 2 formed a fine, cracked crust composed of dehydrated iron oxyhydroxide with manganese, chromium, and minor silica. In places, trace amounts of nickel and zinc were also present in the Fe—Mn oxyhydroxide. The Fe—Mn oxyhydroxide formed a thin brown coating on the drill cuttings.

Figure 34:
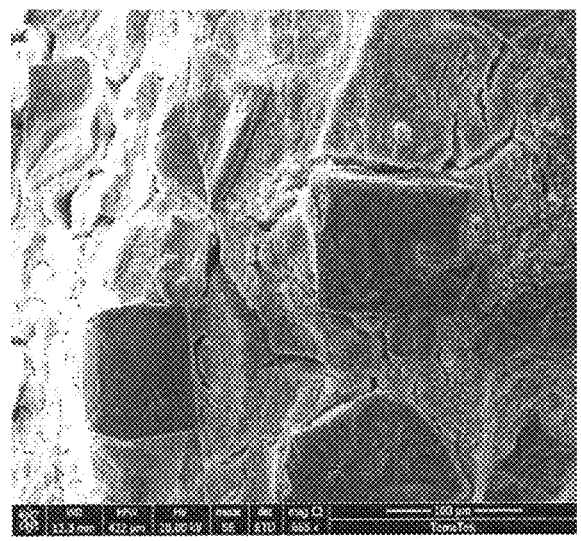
FIG. 34 shows a SEM image from a packed bed test of a 50:50 blend brine.
Figure 35:
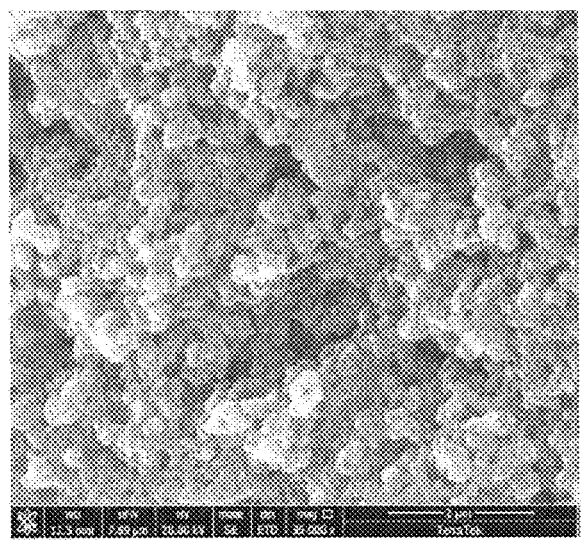
FIG. 35 shows a SEM image from a packed bed test of a 50:50 blend brine.

FIGS. 34 and 35 show low and high magnification SEM images from the testing of 50:50 blend brines. The 50:50 blend brine used in Tests 3 and 5 formed Fe and NaCl deposits in a fine solid form. These were submicron-sized crumbly deposits. The iron chloride had a consistent composition with minor calcium and potassium. Spot analyses also consistently showed minor silica with the iron chloride and it was difficult to determine whether this was one compound (such as eltyubyuite) or an iron-calcium-potassium chloride admixed with opaline silica. XRD analyses indicated minor amounts of opal-A in these two samples. Based on how the chloride crystals in the sample were intermixed with the other scale material, it was possible that the chlorides had precipitated out of solutions during mixing and reaction. This was likely due to the lower temperature of the treated brine when it mixes with the untreated brine. In a real injectivity situation, the temperatures of injectivity will be higher, and this will keep the chlorides in solution.

A material of interest from the packed bed tests was the small scale particles and chemical deposits attached to the rock chip matrix. If the total rock sample was used, the rock matrix would dilute the scale minerals in the sample, rendering them too dilute to be identifiable in the XRD scans. Therefore, the small-scale particles were washed from the matrix rock and concentrated to more accurately measure the mineralogy and composition of the scale.

A summary of the separated packed bed tube scale is shown in Table 6. Other than halite (NaCl) precipitated in the 50:50 blend in Tests 3 and 5, all of the major crystalline material in the XRD patterns was attributed to minerals from the rock fragments in the drill cuttings. Other than trace to minor amounts of crystalline iron oxides (magnetite, maghemite) and iron oxyhydroxides (goethite, akaganeite), most of the chemical deposits appeared to be amorphous or too poorly crystalline to diffract the X-rays.

TABLE 6

XRD Mineralogy Relative Wt %

|  | SAMPLE ID | | | | | |
| --- | --- | --- | --- | --- | --- | --- |
|  | Salton Sea Drill Cuttings | Test #1 | Test #2 | Test #3 | Test #4 | Test #5 |
| Quartz | 63 | 31 | 41 | 0 | 7 | 17 |
| Plagioclase | 15 | 14 | 11 | 1 | 0 | 8 |
| K-Feldspar | 5 | 5 | 8 | 2 | 1 | 3 |
| Calcite | 2 | 2 | 0 | 0 | 0 | 1 |
| Dolomite | 1 | 0 | 0 | 0 | 0 | 0 |
| Ankerite | 1 | 0 | 0 | 0 | 0 | 0 |
| Epidote | 5 | 11 | 7 | 30 | 2 | 6 |
| Barite | 0 | 0 | 1 | 0 | 0 | 0 |
| Pyrite | 0 | 0 | 0 | 0 | 0 | 0 |
| Magnetite | 0 | 1 | 6 | 1 | 4 | 2 |
| Maghemite | 0 | 2 | 0 | 0 | 3 | 1 |
| Geothite | 0 | 0 | 0 | 0 | 3 | 0 |
| Akaganeite | 0 | 0 | 1 | 0 | 0 | 3 |
| Halite | 0 | 0 | 0 | 38 | 0 | 14 |
| Total (Non-Clay) | 91 | 66 | 74 | 71 | 20 | 55 |

TABLE 6-continued

XRD Mineralogy Relative Wt %

| | SAMPLE ID | | | | | |
|---|---|---|---|---|---|---|
| | Salton Sea Drill Cuttings | Test #1 | Test #2 | Test #3 | Test #4 | Test #5 |
| Illite + Mica | 0 | 0 | 4 | 9 | 12 | 11 |
| Mixed-Layer Illite-Smectite | 0 | 0 | 0 | 0 | 0 | 0 |
| Chlorite | 8 | 11 | 22 | 1 | 4 | 18 |
| Total (Clay) | 9 | 11 | 27 | 10 | 16 | 29 |
| Total (Crystalline Material) | 100 | 76 | 100 | 81 | 36 | 84 |
| Amorphous (Opal-A) | 0 | 24 | 0 | 19 | 64 | 16 |
| GRAND TOTAL (Crystalline and Opal-A) | 100 | 100 | 100 | 100 | 100 | 100 |

A summary of the clay fines from the packed tube scale is shown in Table 7. The dominant clay material was fine mica, which was likely a component of the drill cuttings matrix.

TABLE 7

Clay XRD Mineralogy (<4 micron size fraction, Relative Wt %)

| | SAMPLE ID | | | | | |
|---|---|---|---|---|---|---|
| | Rock chips | Test #1 | Test #2 | Test #3 | Test #4 | Test #5 |
| % Expandability of I/S clay (smectite interlayers) | 25 | 0 | 35 | 10 | 0 | 0 |
| Mica | 26 | 67 | 31 | 35 | 71 | 44 |
| Mixed-Layer Illite-Smectite (I/S) | 13 | 0 | 23 | 39 | 0 | 0 |
| Kaolinite | 0 | 0 | 0 | 0 | 0 | 18 |
| Chlorite | 61 | 33 | 46 | 26 | 29 | 38 |
| TOTAL | 100 | 100 | 100 | 100 | 100 | 100 |

TSS is also an important parameter of the brine compatibility testing. The treated brine had lower TSS values than the untreated brine, and even the 50:50 blend brines had less than or equal TSS to the untreated brine.

Figure 36:
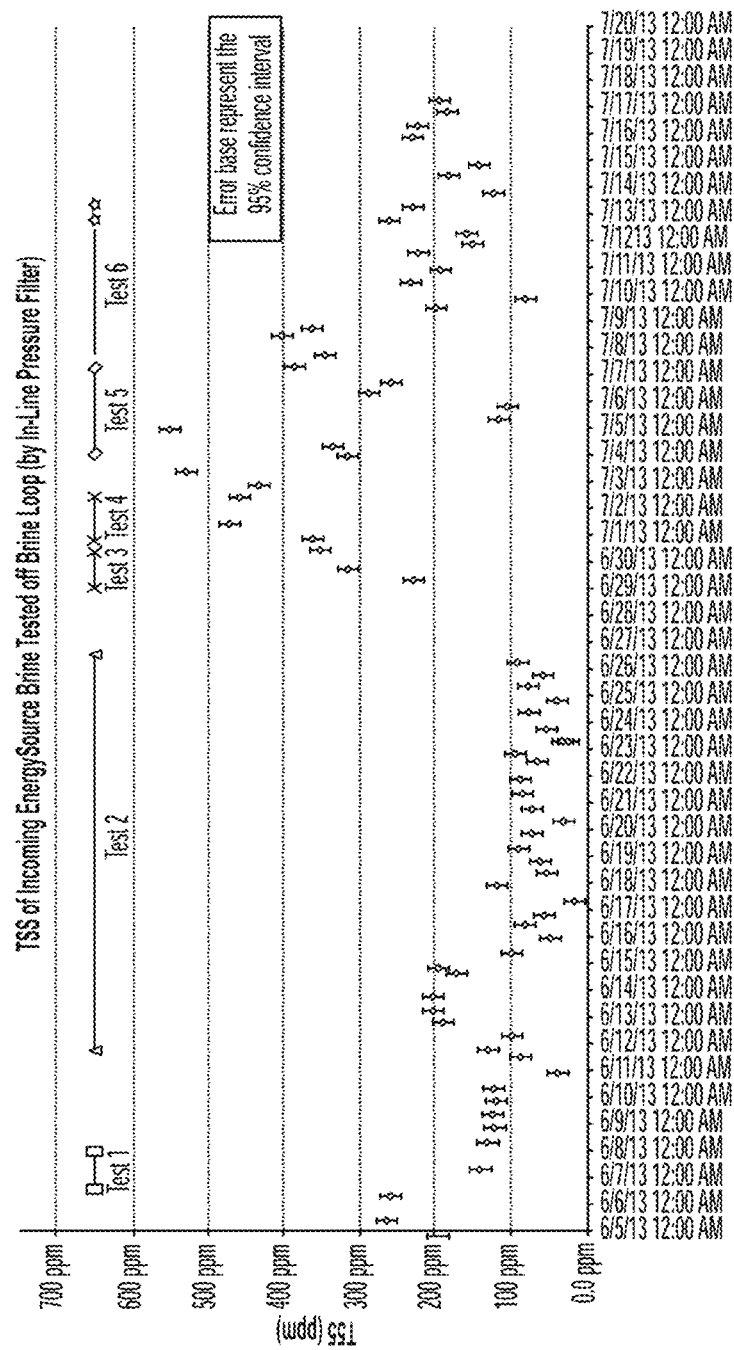
FIG. 36 shows TSS by in-line pressure filter of untreated, treated, and 50:50 blend brines.

The TSS of the untreated brine was measured using an accurate in-line method throughout the series for tests. Those values are shown in FIG. 36. The data showed that the TSS of the untreated brine average was about 20 ppm, but it was variable, and sometimes reached 50 ppm.

Figure 37:
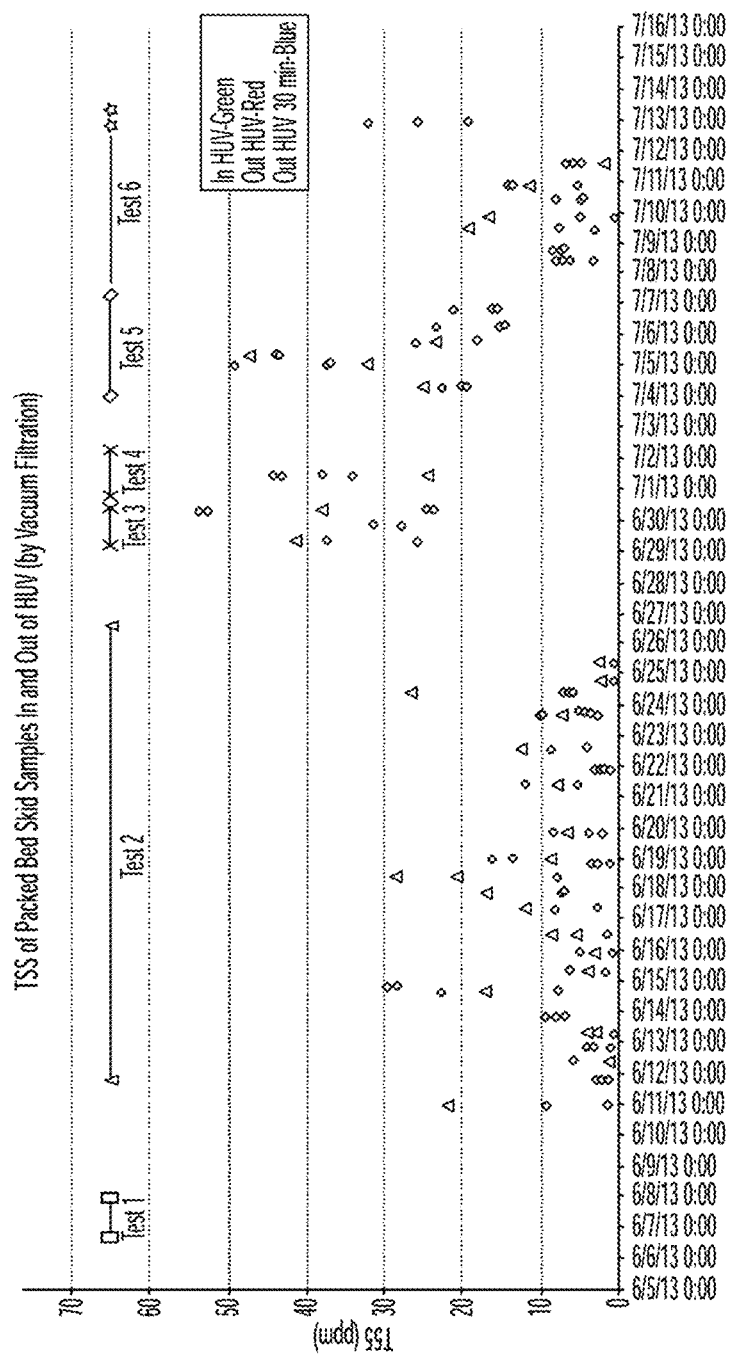
FIG. 37 shows TSS by vacuum filtration of untreated, treated, and 50:50 blend brines.

The TSS were also measured on the brines used for packed bed testing, before and after the HUV using a vacuum filtration method. The values are shown in FIG. 37. As expected, the treated brines possessed a low TSS due to the lack of scaling components and filtration during processing. The untreated brine and the 50:50 blend brine showed higher TSS, at a similar range of values.

Figure 38:
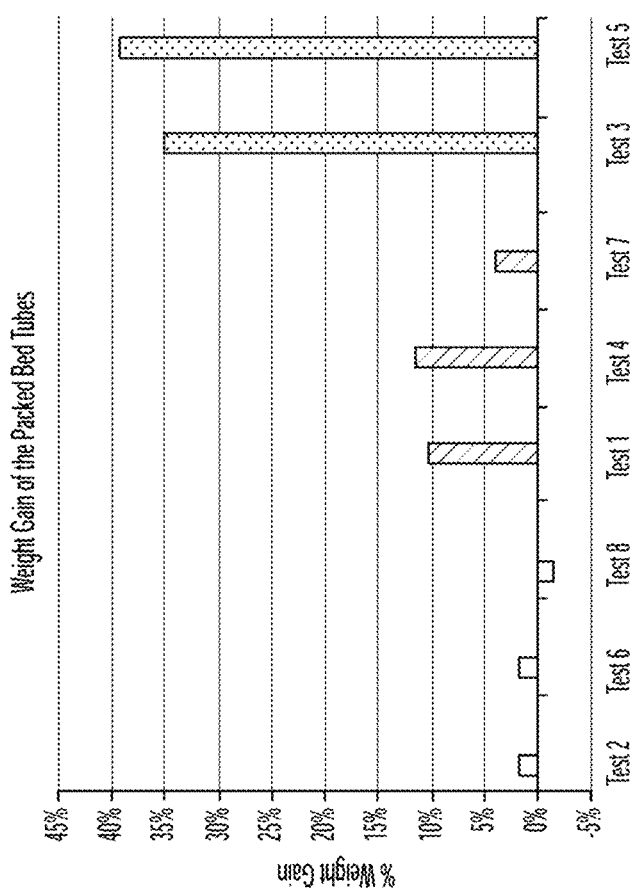
FIG. 38 shows the weight gain of packed bed tubes after the processing of untreated, treated, and 50:50 blend brines.
Figure 39:
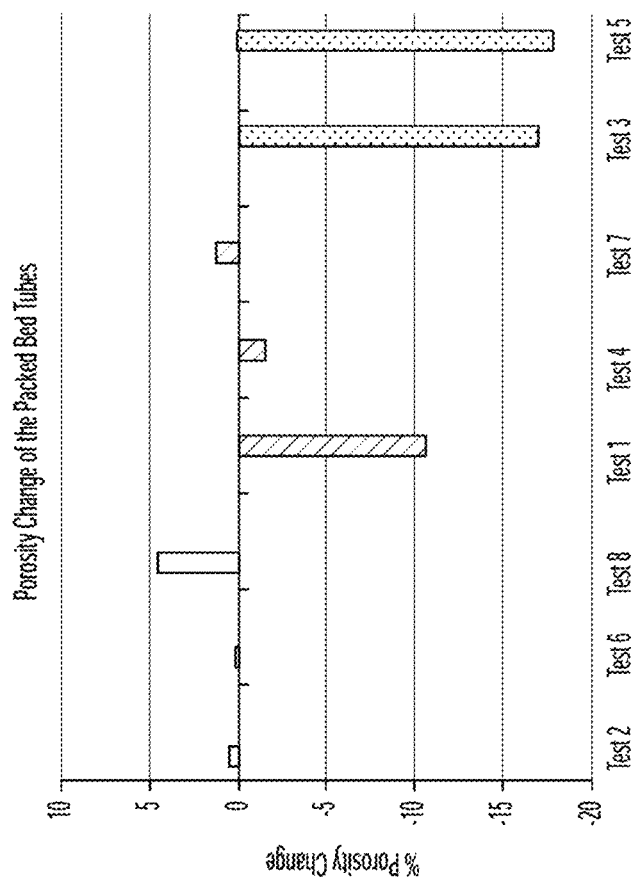
FIG. 39 shows the porosity change of packed bed tubes after the processing of untreated, treated, and 50:50 blend brines.

Shown in FIGS. 38 and 39 are the results of the treated brine (Tests 2, 6, and 8), untreated brine (Tests 1, 4, and 7), and 50:50 brine blends (Tests 3 and 5) analysis for percent weight gain and residual bulk porosity.

The 50:50 blend brines performed equal to or better than the untreated brine in packed bed simulated well testing. This suggests that there are no major compatibility or reaction issues, and that reservoir permeability would not be any worse than the untreated brine.

In addition, treated brine performed far better on the packed bed permeability testing than any other brine or brine blend tested. This is likely due to the lack of scaling compounds in the treated brine, along with a lower TSS value. The results suggests that an injection fluid of 100% treated brine will have the best injectivity and permeability performance than any other brine tested.

One improvement that can be made to the 50:50 blend brine, that may make it perform even better, is to provide dilution water or maintain high temperature to prevent halite (NaCl) from coming out of solution before injection.

Example 7. Preparation of Treated Geothermal Brine Compositions with Reduced Concentrations of Iron and Silica In another example, four 20 L plastic pails of geothermal brine from the Salton Sea, California that were subjected to silica processing, were transferred to the reactor. The combined sample was agitated at 80° C. for 4 hours and then samples were collected for an elemental analysis. Table 8 shows concentrations of various elements in samples of geothermal brine samples.

TABLE 8

| Element analyzed | Concentration in Sample 1 mg/L | Concentration in Sample 2 mg/L |
|---|---|---|
| Arsenic | <3 | <3 |
| Barium | 42 | 44 |
| Iron | 1900 | 1900 |
| Lithium | 310 | 309 |
| Lead | 130 | 130 |
| Silicon | 30 | 30 |

Figure 40:
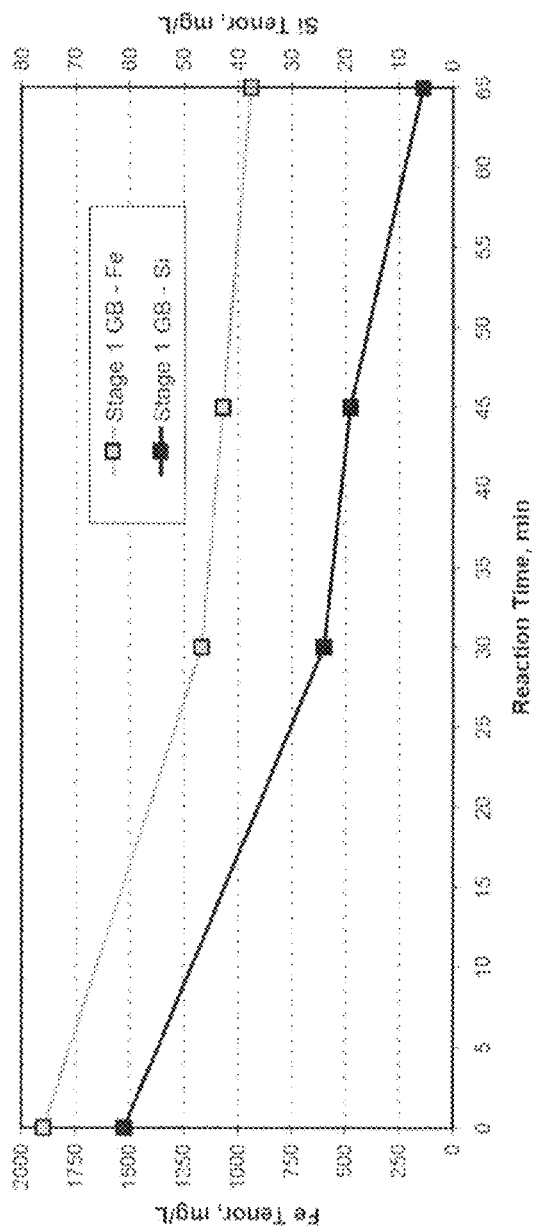
FIG. 40 shows the concentration of iron and silica in an exemplary treated brine composition as a function of time during the silica management process.

A laboratory scale stage 1 precipitation was conducted on a sample of the adjusted geothermal brine. The brine was sparged with air for 20 minutes, and then approximately 70% of the required lime was added to the reaction solution. The balance of the lime was added over the next 20 minute period. The reaction was conducted for a total time of 150 minutes. During the reaction period kinetic samples were collected at set reaction times. At the end of the reaction period the slurry was processed in the standard manner. The Oxidation Reduction Potential of the solution after 20 minutes of air sparging was 200 mV. The solution pH value was 3.0. The solution concentrations for iron and silica were plotted against elapsed reaction time in FIG. 40. Approximately 98% of the silica precipitated and the final silica concentration was reduced to 6 mg/L after 65 minutes. The iron was removed by about 65% of the Fe precipitated and the final Fe solution concentration was 940 mg/L.

Figure 41:
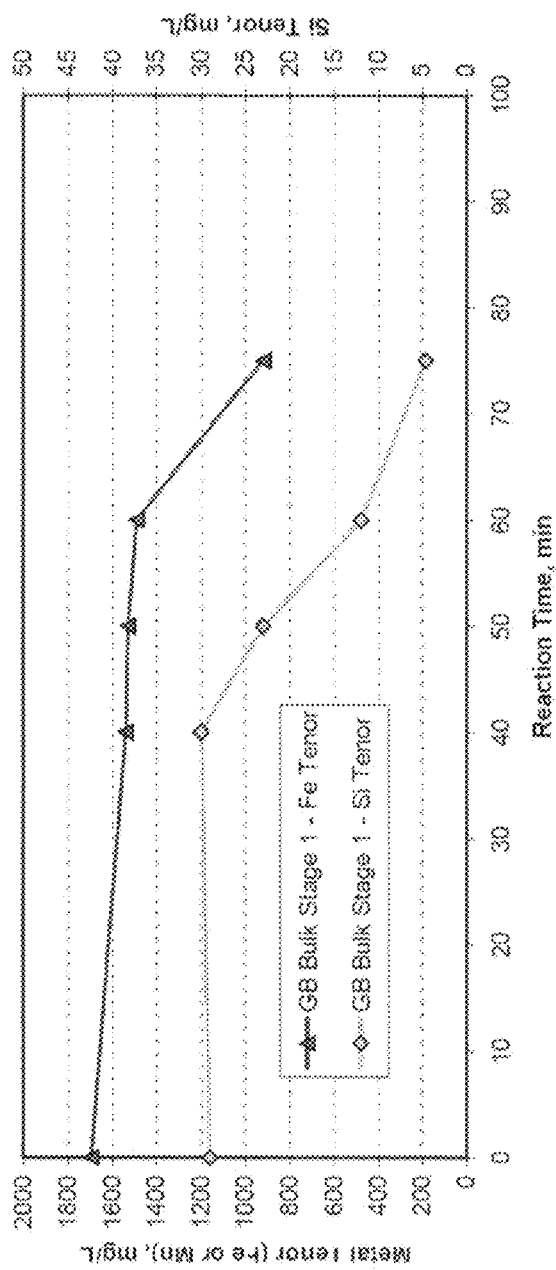
FIG. 41 shows the concentration of iron and silica in an exemplary treated brine composition as a function of time during the silica management process.

Example 8. Preparation of Larger Scale Treated Geothermal Brine Compositions with Reduced Concentrations of Iron and Silica In another example, about 69 liters of adjusted geothermal brine was subjected to processing on a larger scale. An insulated double walled polypropylene reactor (~80 L) was equipped with a polycarbonate lid that had multiple access ports for the various pieces of equipment and instrumentation. The overall reaction as observed at about 81'C, following initial sparging time of 40 minutes with an airflow of 2.25 L/min. About 84 g of dry lime was added. The Si and Fe solution concentrations are plotted against reaction time in FIG. 41. Some of the initial and final test conditions for the bulk test are summarized in Table 9.

TABLE 9

| Condition | Initial Reading | Final Reading |
|---|---|---|
| pH | 4.43 | 5.33 |
| ORP, mV | −14 | −2.93 |

Figure 42:
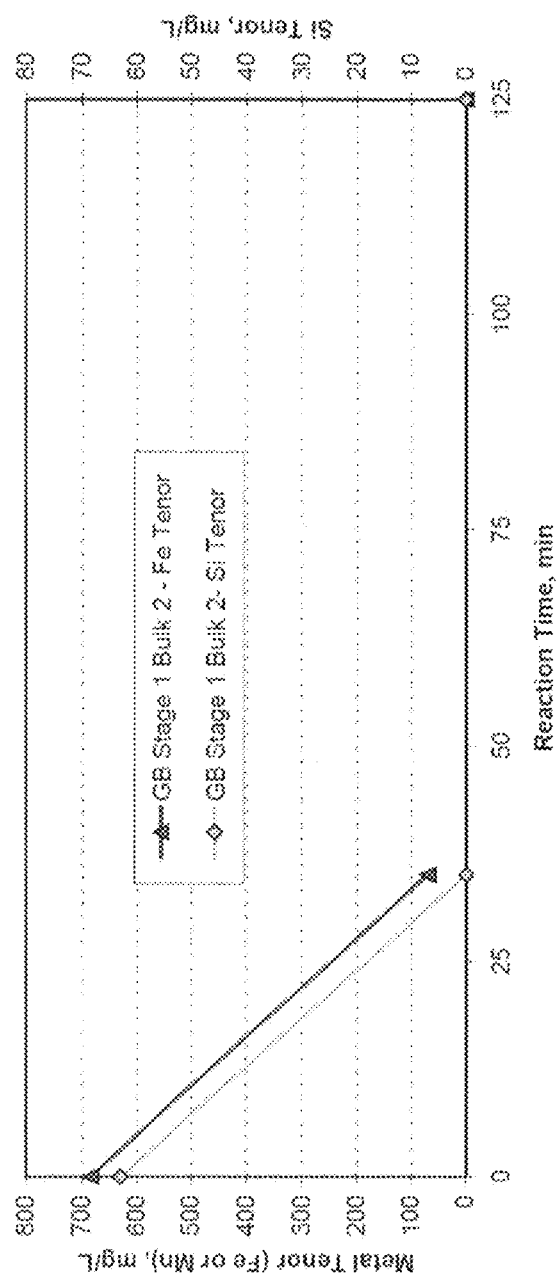
FIG. 42 shows the concentration of iron and silica in an exemplary treated brine composition as a function of time during the silica management process.

Analysis of the data from this experiment revealed that there was insufficient mixing of the solution that resulted in poor suspensions of the initial contained solids. As the reaction progressed, the majority of these solids dissolved and released iron and silica to solution. The silica concentration was reduced to below 10 mg/L and iron was removed to about 900 mg/L. Changes in the air sparging period or changes in the air flow to the system were made to increase the iron removal. The filtrate from the reactor was subjected to further processing at a temperature of about 95'C. Air was sparged into the system for about 20 minutes and then lime was added and the pH constantly monitored. Air sparging continued. The iron concentration at pH 6.0 was below 50 mg/L and therefore the reaction was stopped and the reaction slurry was processed. The Si and Fe solution concentrations were plotted against reaction time in FIG. 42. These experiments revealed that by changing the conditions of the treatment, one could achieve the desired levels of iron and silica removal from the geothermal brine.

Example 9. Preparation of Treated Geothermal Brine Compositions with Reduced Concentrations of Iron and Silica from Brine Treatment at a Physical Plant Producing treated brines with reduced silica and iron concentration minimizes the problems downstream during extraction of minerals like zinc and lithium from the treated brine. As discussed herein, the resulting brines with reduced silica and iron concentration is much less likely to damage the injection wells, because all major scale-producing elements have been removed.

The methods and systems described herein were deployed for silica management of geothermal brine at two different physical plants. One physical plant included three rectangular continuously stirred tank reactors for iron (II) oxidation and iron (III)-oxyhydroxide precipitation, and an inclined plate (lamella) clarifier for initial solid/liquid separation. Another physical plant included two cylindrical continuously stirred tank reactors and a cylindrical conventional rake-style clarifier. The second plant also implemented an improved air-sparging/agitation system for more efficient iron (II) oxidation. Because of the decrease in number of reactors, and the increased sparging efficiency, the total residence time in the reactor train could be reduced by a factor of 3. The switch to a conventional clarifier was made in part to minimize manual operations related to cleaning the clarifier lamella of sticky solids, and partly to provide data for a clarifier design that was suitable for scale up to commercial size.

Operations using the three reactor physical plant included feeding brine from a geothermal energy producer at a specified rate between 3-6 gpm. Operational set points (pH, sparge rate, agitation) for the three reactors were adjusted following the experimental observation from pilot studies. Flocculant was added initially to the clarifier based on batch flocculation tests, and adjusted as necessary to gain control of TSS in overflow. The proportion of underflow directed to recycle, and the recycle return point(s) were set as desired for the specific pilot campaign. Underflow advance was directed to the filter feed tank (or thickener), and then to pressure filter. Filtrate and thickener overflow were generally recycled back to the first reactor. Filter cake was periodically removed from the pressure filter and directed to waste.

Operations using the two-reactor physical plant were essentially similar. Table 10 shows a comparison of the sample operating conditions at the two plants.

TABLE 10

| Plant | Residence time at nominal 5 gph, min | Feed/inlet/outlet | Agitation | Sparging | Clarifier | Recycle |
|---|---|---|---|---|---|---|
| 3-reactor plant | 120 | Inlet feed was pump controlled; advance flow via gravity. Horizontal input near tank bottom below agitator blade. Horizontal output near tank top. | Variable speed; single impeller | Sparging via perforated square U-tube at bottom of tank | Inclined plate with integral flash tank and floc chambers | Recycle underflow to R-1 and R-2 |
| 2-reactor plant | 40 or 20 depending on position of outflow | Inlet feed is pump controlled; advance flow via gravity. Vertical input at tank bottom; mixed with sparge air. Two side outlet ports; upper yielded 40 minute residence time; lower yielded 20 minute residence time at 5 gpm. | Variable speed; dual impeller; lower was 8" Rushton blade; upper was 8" pitched blade | Sparging via air injection into brine feeds at tank bottom | Cylindrical with rake and separate floc mixing tank | Recycle underflow to R-1 only |

Previous studies indicate that at ~110° C. the concentration of dissolved silica in Salton Sea geothermal brine coming out of a crystallizer clarifier is ~116 ppm. The feed brine composition varied depending on variations in the geothermal brine and in the operations of the geothermal energy producer. For example without limitations, the variations could arise from changes in dilution water added to the brine, or from operations related to their flashing and subsequent processing.

In an exemplary set-up, similar to that shown in FIG. 6, geothermal brine was subjected to a continuous process for the management of silica. Silica management system 1106 was carried out using two stirred vessels 1108 and 1110 provided in series. To first reactor 1108 a geothermal brine was supplied via line 1104 having an iron content of approximately 1500 ppm and a silica content of about 160 ppm. The brine is added at a rate of about 6 gpm. Approximately 30 cfm of air was supplied via line 1140 to each reactors 1108 and 1110, and was sparged through the geothermal brine. The operating temperature was approximately about 90 to 95° C. in Reactor 1 and 85 to 90° C. in Reactor 2.

After the addition of the air via line 1140' to first reactor 1108, the pH dropped and was around approximately about pH 4.8 to 5.4. Air was added to second reactor 1110 via line 1140" at a rate of about 30 cfm and a charge of approximately 10-25% by weight of an aqueous calcium oxide slurry at a rate of about 0.5 lb/min., which raised the pH in the second reactor to between about 5.0 and 5.6. The addition of the lime slurry initiated the precipitation of iron (III) hydroxide and iron silicate. The geothermal brine, which included precipitates of iron (III) hydroxide or iron oxyhydroxide and iron silicate, was then supplied from the second vessel 1110 to clarifier 1146 via line 1144. An aqueous flocculant solution of Magnafloc 351, in a concentration between about 0.005% and 1% by weight, such as about 0.025% by weight, was prepared by supplying solid flocculant 1124 via line 1126 to flocculant tank 1128, where the solid was contacted with water 1120 supplied via line 1122. The aqueous flocculant solution was supplied to clarifier vessel 1146 via line 1138 at a rate of about 0.01 gpm.

Two streams were produced from clarifier 1146. First clarifier product stream 1148 included the geothermal brine having a reduced concentration of silica and iron, and was supplied to a secondary process, such as lithium recovery. Second clarifier product stream 1150 included solid silica-iron waste, as well as some geothermal brine. The brine was sampled between reactors 1108 (Reactor 1) and after 1110 (Reactor 2) before as well as after the clarifier 1146 (clarifier overflow).

Table 11 shows the concentration of iron and silicon after silica management through the first reactor and after the second reactor in a physical plant. Based on analysis of the data collected, the iron concentration ranged from about 200 mg/L to 1000 mg/L, while the silicon concentration ranged from about 1 to 60 mg/L.

TABLE 11

| | Fe concentrations (mg/kg) | Si concentrations (mg/kg) |
|---|---|---|
| From Reactor 1 | | |
| Min | 168 | 1 |
| Max | 828 | 43 |
| Mode | 307 | 10 |

TABLE 11-continued

| | Fe concentrations (mg/kg) | Si concentrations (mg/kg) |
|---|---|---|
| Median | 335 | 13 |
| From Reactor 2 | | |
| Min | 180 | <1 |
| Max | 833 | 48 |
| Mode | 297 | 12 |
| Median | 261 | 14 |

Figure 43A:
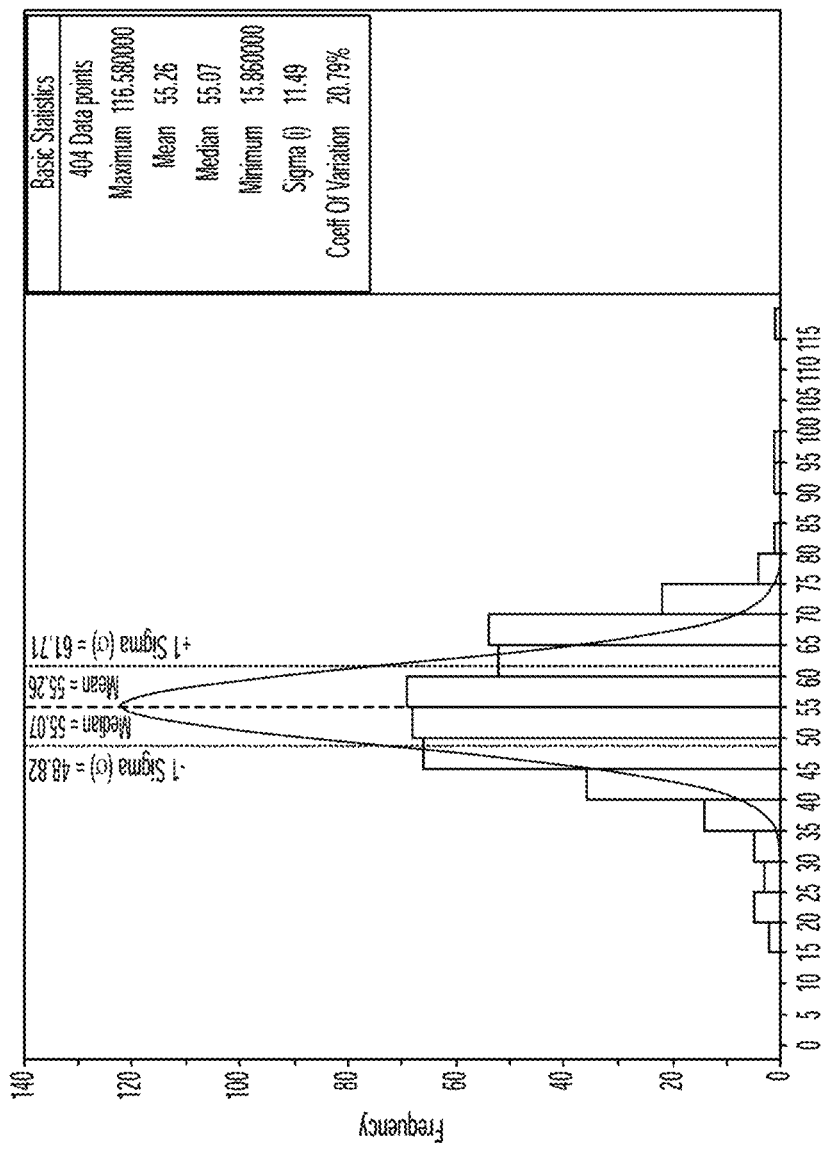
FIGS. 43A and 43B show histograms of silica concentrations in an exemplary treated brine composition during the silica management process.
Figure 43B:
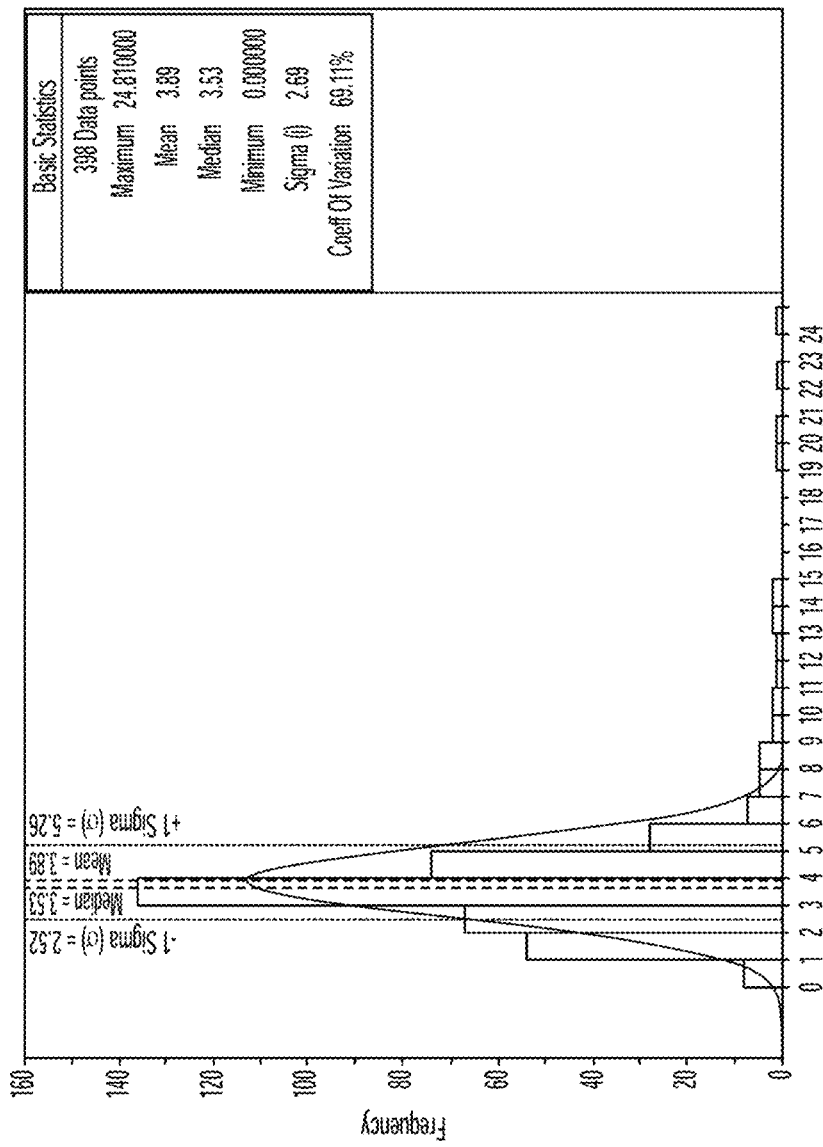

Samples were analyzed from the fee brine and from the clarifier overflow to determine the concentrations of silica and silicon. FIGS. 43A and 43B show the histograms of silicon (not $SiO_2$) concentrations in feed brine (FIG. 43A) and clarifier overflow (FIG. 43B). While the concentration of silicon in the feed brine ranged from 16-117 ppm, the mean and median silicon concentrations were both about 55 ppm. While the concentration of silicon in the treated brine from the clarifier ranged from 0-25 ppm, the mean and median silicon concentrations were both about 4 ppm. The $SiO_2$ concentration in the feed brine ranged from 32 to 250 ppm, with a mean and median of 118 ppm. The silica in the clarifier overflow ranged from 0.4 to 53 ppm, with a mean and median of 8.6 and 7.7 ppm, respectively. Hence, ~93% of the feed $SiO_2$ was removed by the silica management circuit.

Figure 44A:
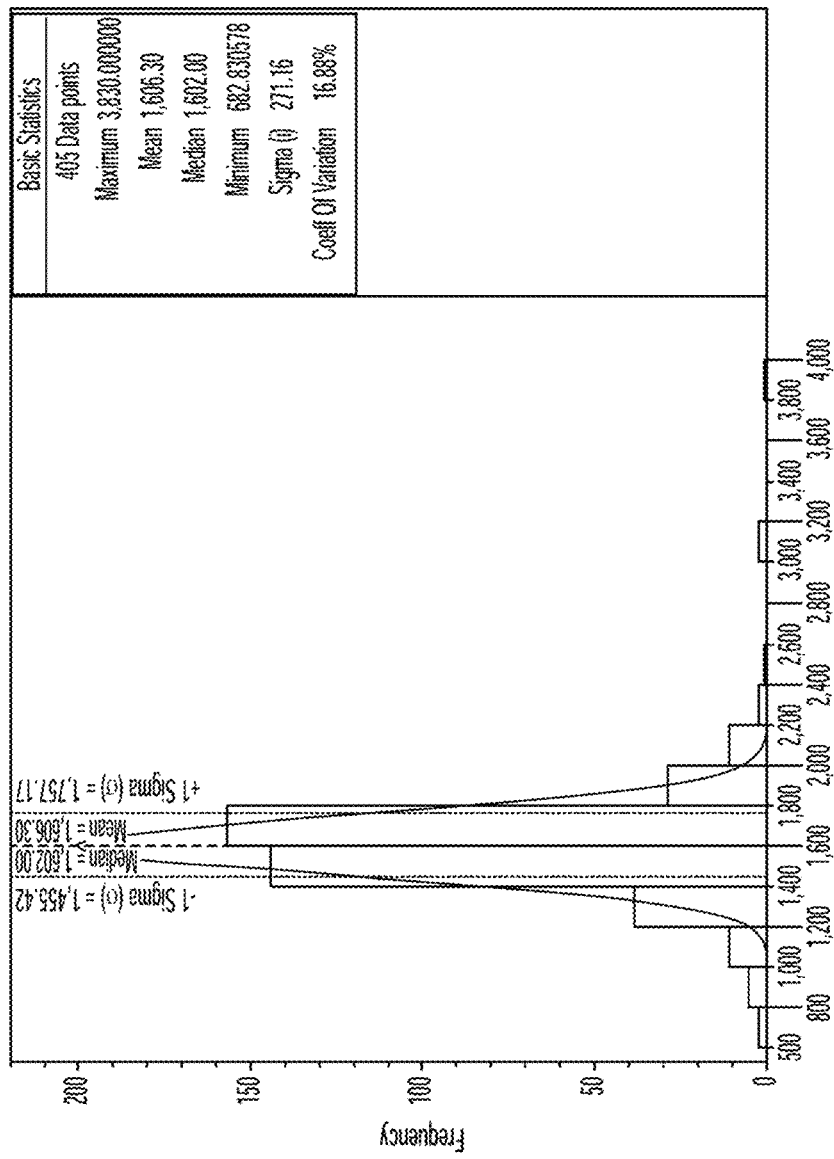
FIGS. 44A and 44B show histograms of iron concentrations in an exemplary treated brine composition during the silica management process.
Figure 44B:
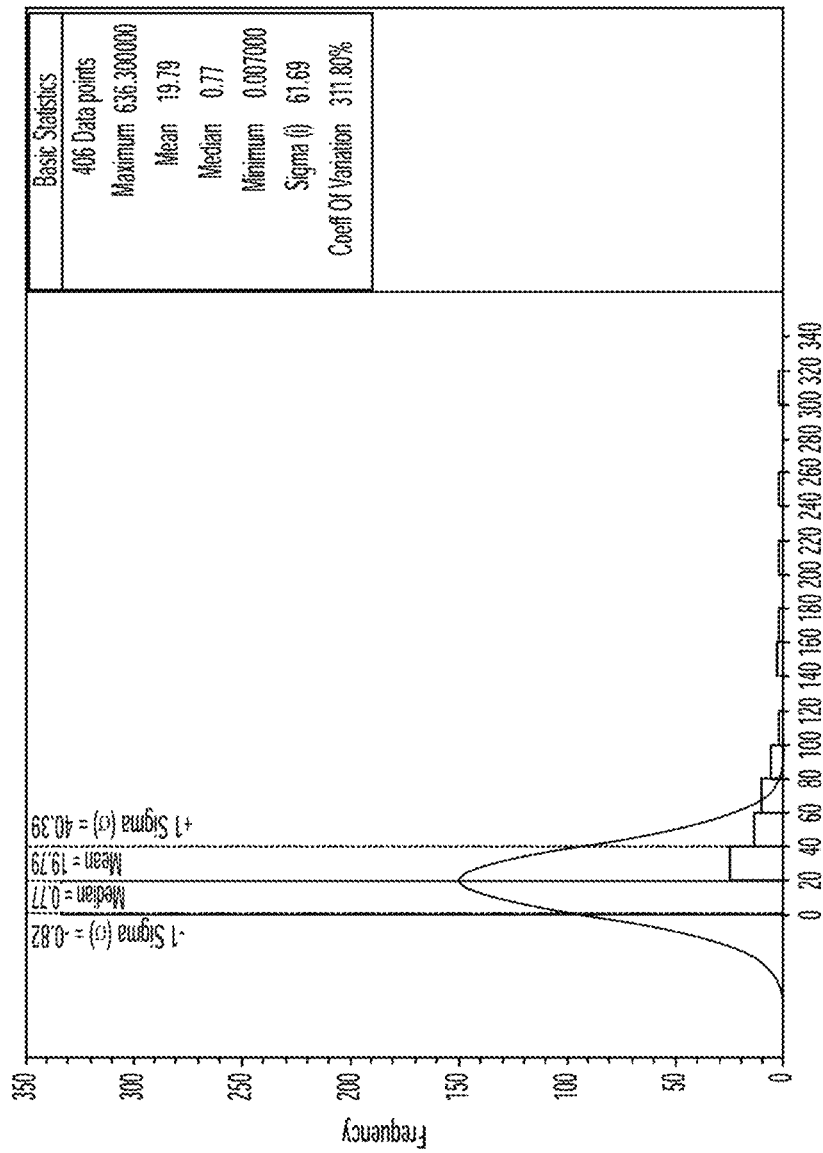

Samples were analyzed from the feed brine and from the clarifier overflow to determine the concentrations of iron. The histograms in FIGS. 44A and 44B illustrate the iron concentrations in feed brine (FIG. 44A) and clarifier overflow (FIG. 44B). While the concentration of iron in the feed brine ranged from 638-3830 ppm, the mean and median iron concentrations were both about 1600 ppm. While the concentration of iron in the treated brine from the clarifier ranged from 0-636 ppm, the mean and median iron concentrations were about 20 ppm and less than 1 ppm respectively.

Figure 45A:
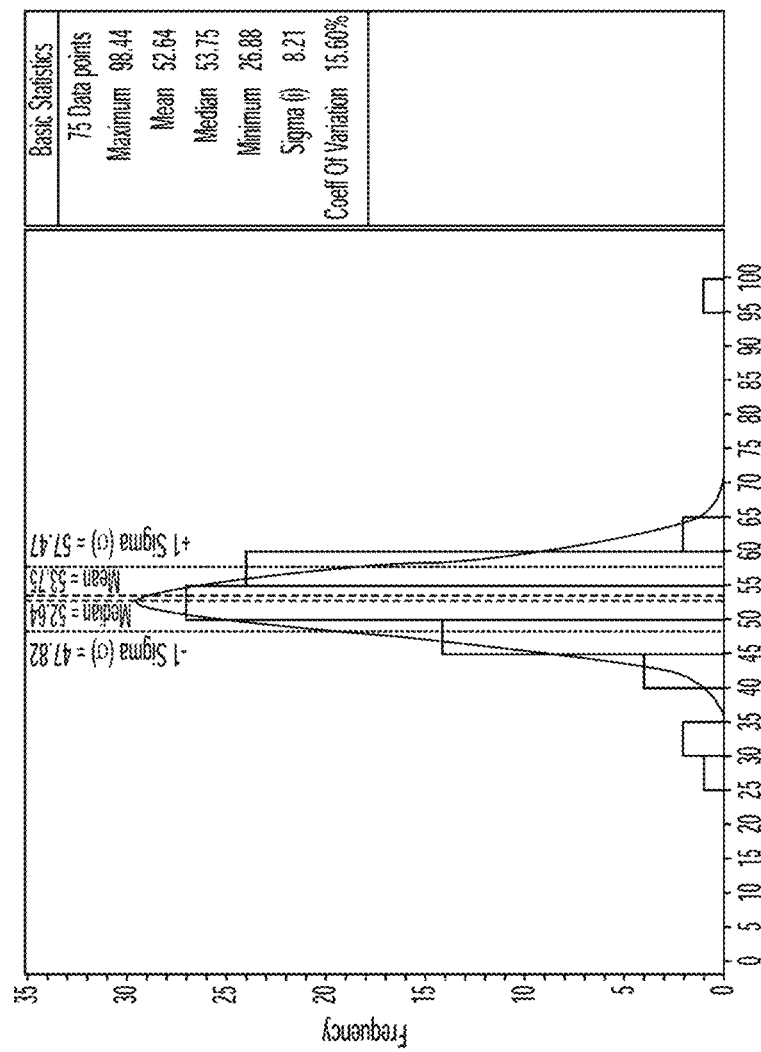
FIGS. 45A and 45B show histograms of silica concentrations in an exemplary treated brine composition during the silica management process.
Figure 45B:
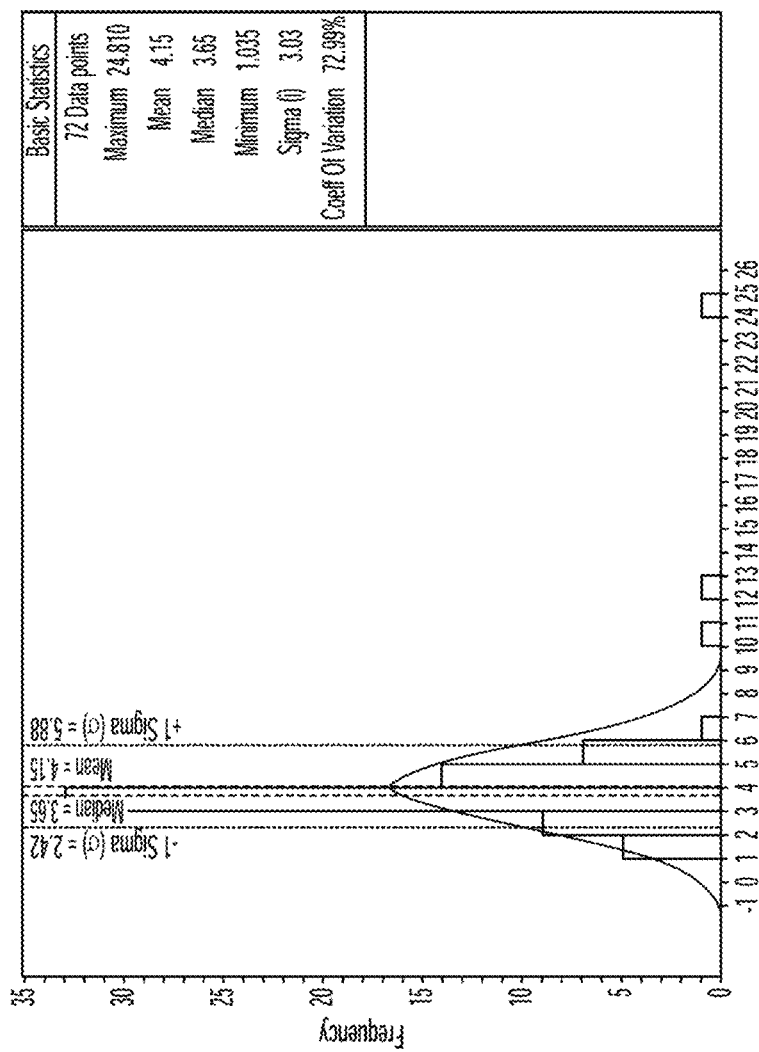
Figure 46A:
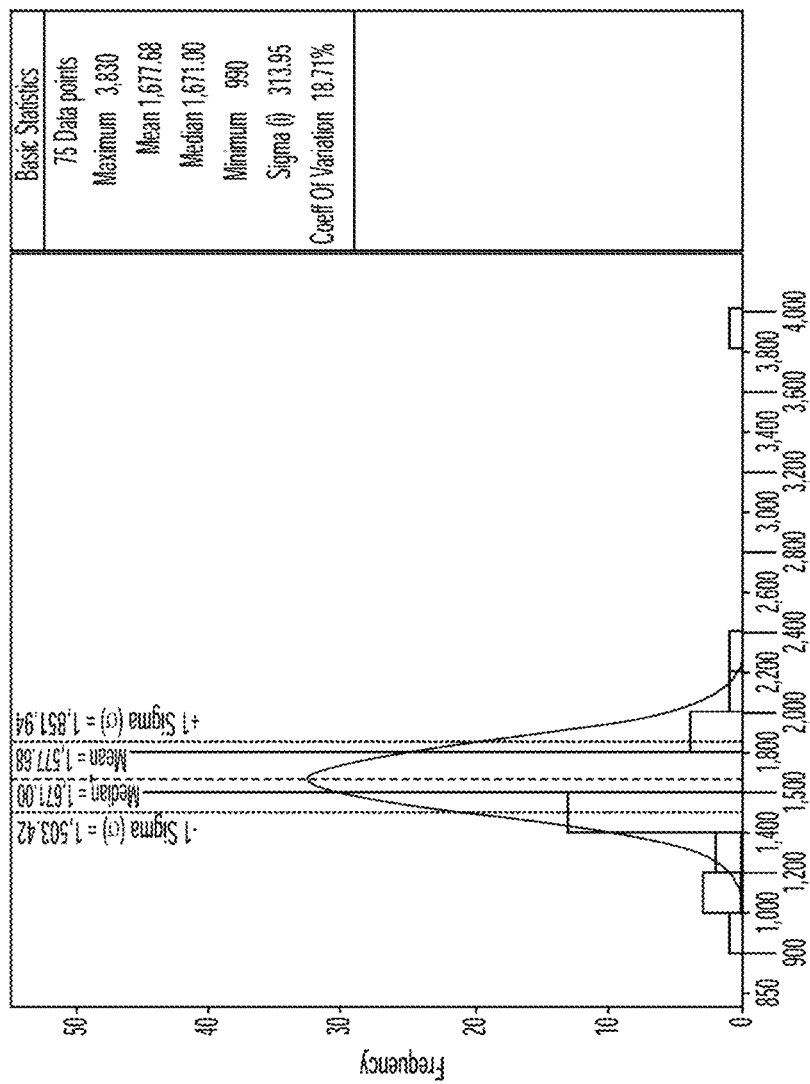
FIGS. 46A and 46B show histograms of iron concentrations in an exemplary treated brine composition during the silica management process.
Figure 46B:
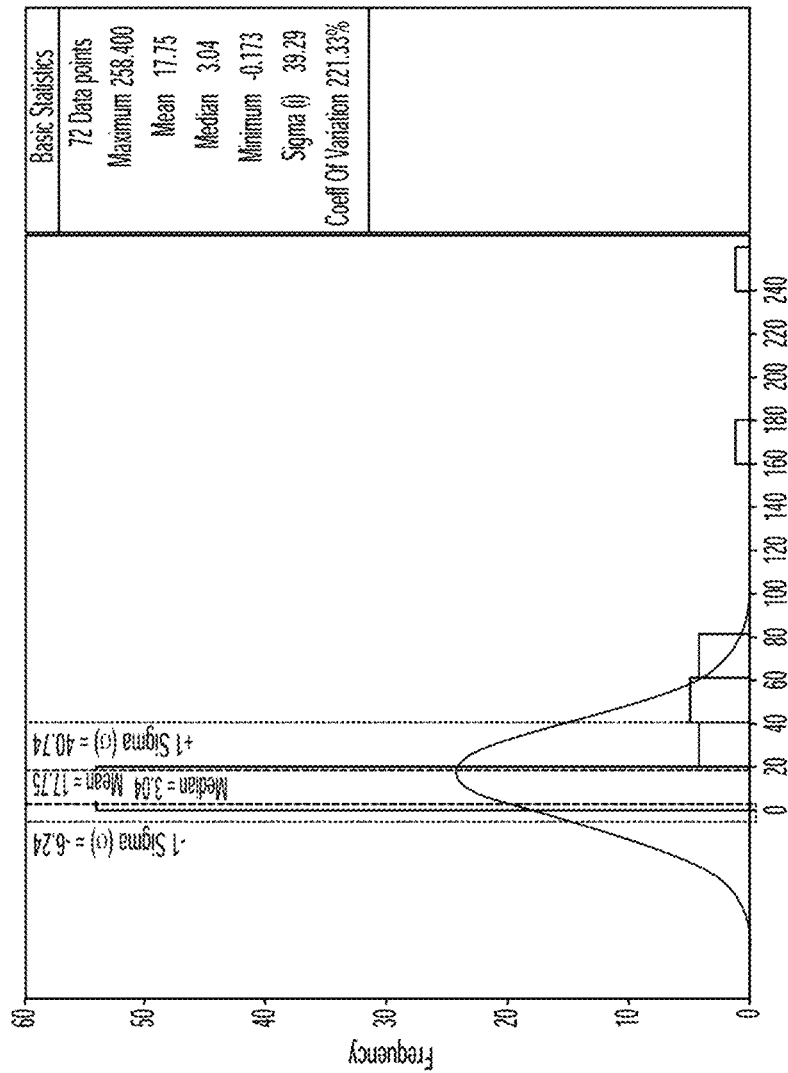

Samples were also analyzed from another exemplary demonstration of the process. FIGS. 45A and 45B show histograms of dissolved silicon (not silica) concentrations in feed brine (FIG. 45A) and clarifier overflow (FIG. 45B). While the concentration of silicon in the feed brine ranged from 27-98 ppm, the mean and median silicon concentrations were both about 53-54 ppm. While the concentration of silicon in the treated brine from the clarifier ranged from 1-25 ppm, the mean and median silicon concentrations were both about 4 ppm. The range in feed $SiO_2$ was 58 ppm to 131 ppm with mean and median of 113 ppm and 115 ppm, respectively. $SiO_2$ in the clarifier overflow ranged between 2 and 53 ppm, with a mean and median of 8.9 and 7.8 ppm, respectively. There was similar removal efficiency in the 95% range. Samples were analyzed from the feed brine and from the clarifier overflow to determine the concentrations of iron. The histograms in FIG. 46 illustrate the iron concentrations in feed brine (FIG. 46A) and clarifier overflow (FIG. 46B). While the concentration of iron in the feed brine ranged from 980-3830 ppm, the mean and median iron concentrations were both about 1670 ppm. While the concentration of iron in the treated brine from the clarifier ranged from 0-258 ppm, the mean and median iron concentrations were about 18 ppm and 3 ppm, respectively.

In another exemplary demonstration of the process, the treated brine with reduced silica and iron concentration was fed to a lithium removal process, and the presence of arsenic, barium, iron, lithium, lead, and silicon was analyzed at different stages of the operation, and the results are shown in Table 12. Concentrations of calcium in these treated compositions can vary from about 30,000 ppm to about 46,000 ppm, with a median concentration of about 36,000 ppm. Concentrations of sodium in these treated compositions can vary from about 40,000 ppm to about 80,000 ppm, with a median concentration of about 61,150 ppm.

about 300 and 450 µm, a second fraction having a diameter between about 180 and 300 µm, and a third fraction having a diameter of between about 100 and 180 µm.

EXAMPLE 10C. Approximately 70 g of a 5% solution of polyvinyl alcohol ("PVA"; Mowiol 56-98) was added to

TABLE 12

| Sampling | | Arsenic ppm | Barium ppm | Iron ppm | Lithium ppm | Lead ppm | Silicon ppm | Potassium ppm | Manganese ppm | Zinc ppm |
|---|---|---|---|---|---|---|---|---|---|---|
| Silica | Min | 8 | 0 | 990 | 144 | 49 | 27 | 10,990 | 889 | 288 |
| Management | Max | 30 | 244 | 2085 | 387 | 110 | 61 | 25,990 | 1558 | 540 |
| Inlet | Median | 13 | 198 | 1673 | 248 | 92 | 54 | 17,920 | 1349 | 472 |
| Silica | Min | 0 | 51 | 0 | 122 | 43 | 1 | 9,063 | 695 | 208 |
| Management | Max | 3 | 516 | 258 | 354 | 90 | 25 | 24,350 | 1556 | 552 |
| Outlet | Median | 0 | 154 | 3 | 251 | 78 | 4 | 18,480 | 1366 | 476 |
| Brine Outlet | Min | 0 | 52 | 0 | 16 | 41 | 0 | 16,860 | 953 | 434 |
| from Lithium | Max | <1 | 191 | 72 | 287 | 86 | 4 | 29,325 | 1803 | 614 |
| Extraction Column 1 | Median | <1 | 120 | 1 | 45 | 65 | 3 | 21,020 | 1483 | 515 |
| Brine Outlet | Min | 0 | 0 | 0 | 5 | 26 | 0 | 10,640 | 753 | 309 |
| from Lithium | Max | 1 | 348 | 331 | 341 | 92 | 12 | 33,850 | 2111 | 678 |
| Extraction Column 2 | Median | <1 | 108 | 1 | 46 | 73 | 3 | 19,920 | 1427 | 499 |

Example 10. Preparation of Compositions with Reduced Concentrations of Lithium Using Lithium Aluminate Intercalate-Matrix EXAMPLE 10A. In one embodiment, the lithium aluminate can be prepared as follows. To an appropriately sized metal or plastic container capable of being heated to a temperature of about 100° C. is added and mixed approximately 1 kg of unfractionated Alcoa aluminum trihydrate (Al(OH)$_3$) and LiOH·H$_2$O, in a ratio of approximately 2 moles of aluminum to approximately 1.05 moles of lithium, and about 0.8 kg of deionized water. The mixture is heated in an oven at a temperature of about 60° C. until the hydroxide concentration, as determined by titration, indicates that at least about 93% of the hydroxide present has reacted. The mixture is removed from heat, cooled to room temperature and approximately 0.8 kg of water is added to the mixture. The resulting mixture is then neutralized using hydrochloric acid over a period of at least 2 hours to achieve a pH of between about 6.5 and 7.5. The resulting solid is filtered and dried.

EXAMPLE 10B. Preparation of Particulate PVDF/LAI Matrix. Approximately 1.47 g of polyvinylidene fluoride copolymer (Kynarflex 2821) and approximately 27.56 g of the LAI powder (as prepared in EXAMPLE 10A, above) were placed in a plastic jar and mixed using a mechanical stirrer, at increasingly higher speeds, 1000-5000 rpm, over a period of about five minutes. The resulting mixed matrix powder was placed in a frame having two Teflon lined metal plates. The powder mixture in the press frame was placed in a hydraulic press and subjected to approximately 3500 psi pressure for approximately three minutes, released, subjected to approximately 4000 psi of pressure for approximately, released, subjected to approximately 5000 psi of pressure and a temperature of about 360° C. for approximately 3 minutes, released, subjected to approximately 10,000 psi of pressure and a temperature of about 360° C. for approximately 3 minutes, and released. The assembly was then subjected to approximately 3500 psi of pressure for about 2-3 minutes. The resulting sintered block was then broken into large granulates using a hammer. The resulting granulates were separated using sieves into three groups consisting of a first group having a diameter of between approximately 1.4 g of a 10% glutaraldehyde solution and mixed for approximately 2 minutes. To the polyvinyl alcohol and glutaraldehyde solution was added approximately 70 g of a LAI prepared according to Example 10A having an average particle diameter of less about 180 µm and stirred with a Cowles blade at about 600 rpm for about 10-15 minutes, until the mixture thickens, yet is still flowable. To the mixture is added approximately 20 g of the same LAI to form a paste. Hydrochloric acid is added dropwise until the pH of the mixture is less than 3. Approximately 10 g of additional LAI is added without mixing to the acidified paste to form a stiff mixture. The mixture was dried at a temperature of about 85° C. in an open atmosphere. The resulting mixture was ground until the matrix consisted of particles having a diameter of less than about 600 m. The resulting powder was sieved to remove any particulates having a diameter of less than about 100 µm, which were then reagglomerated with the polyvinyl alcohol and glutaraldehyde solution, as provided above. The additional steps noted above were repeated for the recoated LAI particles.

EXAMPLE 10D. The LAI/PVDF material from Example 10B, sieved to approximately 180-300 µm, was washed with an approximately 26% solution of sodium chloride having a lithium concentration of approximately 200 ppm, loaded into a standard laboratory ion exchange column (co-current up flow, glass wool packed bed, having a bed volume of approximately 9.4 mL). The column was then subjected to 150 load and unload cycles. The operating capacity of the media was determined to be approximately 2.9 g/L, and the pressure drop was measured to be 10 psi/m of linear length.

EXAMPLE 10E. The LAI-PVA material from Example 10C, sieved to approximately 180 to 300 µm, was washed with an approximately 26% solution of sodium chloride having a lithium concentration of approximately 200 ppm, loaded into a standard laboratory ion exchange column (co-current up flow, glass wool packed bed, having a bed volume of approximately 9.4 mL). The column was then subjected to 129 load and unload cycles. Operation of the loading and unloading was as described for Example 10D. The operating capacity of the media was determined to be approximately 3.5 mg/L, and the pressure drop was measured to be between about 100 and 160 psi/m of linear length.

EXAMPLE 10F. A solution was prepared by combining approximately 7.3 g of Johncryl 540 (BASF), 5 mL of deionized water and 1.5 g of Cymel 327 (Cytec). To this was added portion wise with mixing about 31 g of lithium aluminate having a particle size of less than about 180 microns. Additional water was added as required to maintain the material in plastic state. The resulting paste was extruded through a 425 micron screen and the dried at about 60° C. followed by curing at approximately 120° C. for approximately 4 hours. The cured extrudate was sieved to between about 425 and 800 microns. Extraction of the material in distilled water maintained at about 95° C. yielded approximately 22 mg of lithium per gram of material which was stable toward lithium cycling.

EXAMPLE 10G. Approximately 40 g of lithium aluminate, having a particle size less than about 180 microns, was added to a beaker and stirred with mixing blade at about 1000 RPM (tip speed approximately 2 m/sec). To the high shear mix was added about 9.6 grams of PVDF/acrylic emulsion (Kynar Aquatec RC-10,206 from Arkema Corporation), dropwise from a 10 mL syringe fitted with an 18 gage tip. The mixture was blended at about 1000 RPM with the addition of approximately 1-2 mL distilled water having about 200 ppm lithium ion until granules formed (about 10-20 minutes). The resulting material was dried overnight at about 85° C. and sieved. Approximately 7.5 g of a middle particle size distribution of agglomerates (having a particle diameter ranging from about 180 micron to about 850 micron) was packed into a 10 mm internal diameter jacketed chromatography column and tested for lithium elution at 85° C. The sample showed a net lithium extraction of approximately 2.5 mg per gram of media over two pore volumes of elution at about 0.3 mL/min.

EXAMPLE 10H. Microporous sheets that include approximately 10% by weight UHMWPE and approximately 90% by weight lithium aluminate intercalate were prepared as follows. Approximately 4.7 g of UHMWPE (GUR 403) powder was combined with approximately 17.9 g of mineral oil (Hydrobrite 1000 PO) and heated at a temperature of about 135° C. for approximately 16 hours. The mixture was then heated for an additional 15 minutes at a temperature of approximately 140° C. The oil-polymer mixture was removed, cut into small pieces, and placed in a Brabender mixer at a temperature of about 200° C., and mixed at a speed of about 25 rpm for about 2 minutes. To the masticated oil-polymer mixture was added approximately 44 g of the LAI (prepared according to the procedure described in Example 10A), 0.04 g ethylene bis-stearamide, 0.04 g Doverphos S-9228 (a phosphite antioxidant), and 0.02 g Irganox 1010 (a phenolic anti-oxidant). The mixture was mixed at about 45 rpm and a temperature of about 200° C., for approximately 3 minutes. The resulting mixture was collected, pressed into a frame having a thickness of approximately 0.01 inches, heated at a temperature of about 204° C. for approximately 1 minute under contact pressure from the top plate, pressed at a temperature of 204° C. and a pressure of about 5000 psi for approximately 1 minute, and is then pressed at a temperature of about 60° C. and pressure of about 3000 psi for approximately 2 minutes. The resulting pressed sheet was clamped at opposite edges and slowly stretched while being heated with a hot air gun until the length of the original sheet was stretched by approximately 50%. The stretched LAI-polymer matrix was immersed in ethyl acetate for approximately 16 hours to extract the mineral oil, rinsed with ethanol, air dried for approximately 5 minutes, and dried in an oven at approximately 70° C. for about 30 minutes.

EXAMPLE 10I. For comparison purposes, a resin based lithium sorbent was prepared according to the methods disclosed in U.S. Pat. Nos. 4,159,311; 4,348,296 and 4,430,311. A weak base anion exchange resin (Dowex Marathon WBA) in free base form was contacted with a saturated solution of $AlCl_3$ at a pH of about 0 and reacted at a temperature of between about 50 and 60° C. The reaction mixture was then titrated with concentrated $NH_4OH$ to raise the pH to approximately 7 and precipitate $Al(OH)_3$ in and onto the resin beads. Excess $Al(OH)_3$ and $NH_4Cl$ were removed by washing with water. The resin was heated at a temperature of between about 75 and 80'C to convert the amorphous $Al(OH)_3$ into gibbsite, which served as a seed for subsequent precipitation. The gibbsite-seeded resin was reacted with sodium aluminate solution at a pH of about 13 and titrated with a 37% solution of HCl to lower the pH to approximately 7 and precipitate $Al(OH)_3$ on the gibbsite seed. The mixture was washed with water to remove excess NaCl and $Al(OH)_3$, and then heated to a temperature of between about 75 and 80° C. The gibbsite-loaded resin was reacted with LiOH at a pH of about 12 and a temperature of between about 55 and 60° C. to form a 3-layer polytype lithium aluminate ($LiAl_2(OH)_6OH$) within the resin. The resulting lithiated resin was then titrated with a 20% solution of HCl to a pH of about 7 to convert the hydroxide form of the lithium aluminate to the chloride form. Excess lithium aluminate and LiCl were removed by washing with water. The resulting resin contained between about 2 and 4 mmol of aluminum and between about 1 and 2 mmol of lithium per mL of resin.

EXAMPLE 10J. Comparative Examples. Extractions were performed using a variety of materials, which were then compared against a resin material prepared according to Example 10I. A PVDF LAI-matrix was prepared according to Example 10B, and sieved to produce three separate particle size groupings. Each separate sized grouping was then subjected to multiple loadings and unloadings of lithium chloride, as described herein. A first sample of the PVDF LAI-matrix having a particle size distribution of between about 75 and 180 μm was monitored for over 250 cycles of loading and unloading, and had a lithium recovery of between about 88 and 95%. A second sample of the PVDF LAI-matrix having a particle size distribution of between about 180 and 300 μm was monitored for over 450 cycles of loading and unloading, and had a lithium recovery of between about 83 and 97%. A third sample of the PVDF LAI-matrix having a particle size distribution of between about 300 and 425 μm was monitored for over 15 cycles of loading and unloading, and had a lithium recovery of between about 84 and 84%. As a comparison, the resin based material prepared according to Example 10I was tested, showing a recovery of between about 81 and 88%.

EXAMPLE 10K. Polymer/LAI agglomerates were prepared by first manually mixing approximately 24 mL of PU 442 polycarbonate/polyurethane resin (Picassian Polymers) with about 6 mL XL-702 (a polycarbodiimide crosslinker available from Picassian Polymers) and 45 mL of distilled water. Approximately 84 g of dried LAI particles (prepared according to the procedure described in Example 10A) were added and mixed manually to provide a mixture that includes about 10.2% binder by weight. The mixture was then transferred to a Keyence Hybrid mixer HM-501 and mixed for a total of 1 minute (two 30 second mixes) to produce a paste that includes wet agglomerated particles. The paste was manually pressed through a 500 micron square opening screen while hot air was directed over the strands to prevent sticking. The resulting strands were collected and dried for approximately seventy-two hours in an oven maintained at a temperature of about 50° C., followed by curing for about two hours at approximately 120° C. The cured strands were then manually broken into shorter agglomerates on a 600 micron sieve. The broken strands were sieved in a stack of various size screens, having openings ranging from about 106 to 600 µm and various size fractions of agglomerated particles were collected separately and weighed. Agglomerates from the 425 to 600 µm fraction were further tested for operating capacity. Polymer/LAI agglomerates described in Example 10K were loaded onto a column having a volume of about 10.6 mL and were loaded with about eight bed volumes (hereinafter, "BV") of a simulated brine prepared as described herein at a rate of about 8 BV/hour. The column was stripped with approximately 1.5 BV of a deionized water solution containing about 1000 ppm lithium at a rate of about 2.4 BV/hour. All test solutions were supplied by co-current upflow, and because these tests were accelerated by reducing the loading and stripping solution volumes, lithium saturation in the column effluent during loading was not observed (i.e., the lithium concentration in the column effluent never equaled the lithium concentration in the feed solution). Sample aliquots were collected after 100 cycles and the metals were analyzed with ICP. The differential pressure in the system increased after approximately 100 cycles and remained high for the remainder of the cycles, ranging between about 2 and 7 psi. Attempts to reduce the increased differential pressure, including clearing the tubing lines, replacing glass wool used to contain the bed, and ensuring feed concentrations maintained at levels suitable to prevent the precipitation of salts, proved unsuccessful. After approximately 300 cycles, fines were observed at the inlet (bottom) of the bed and were subsequently removed. The total bed volume loss over 600 cycles was approximately 10%. The lithium capacity on loading was generally unchanged over the 600 cycle test, ranging from between about 1.5 and 3.5 mg Li/mL polymer/LAI agglomerate sorbent.

In addition to capacity, the robustness of the material was tested by subjecting it to ultrasonic agitation for approximately 1 minute. Fines having a diameter of less than about 45 µm dispersed from the material as a result of the agitation were measured, and reported as the rate of fines released per joule of energy added. A value between about 0.2 to 0.3 mg fines released per joule of energy input (mg/J) is considered the upper acceptable limit, as above this value the potential risk of particle disaggregation during column operation is increased. The present sample yielded a fines release value of 0.50 mg/J.

EXAMPLE 10 L. Polymer/LAI agglomerates were prepared by first manually mixing about 14.5 g of Kynar Aquatec 10,206 fluoropolymer/acrylic resin (Arkema, Inc.) with approximately 3.3 g XL-702 (polycarbodiimide cross-linker available from Picassian Polymers) and about 35 mL of distilled water. Approximately 93 g of dried LAI particles (from Example 10A) were added in two increments and mixed in a Keyence Hybrid mixer for about 1 minute (in two 30 second mixings) to produce a paste that includes wet agglomerated particles having a binder content of about 8.2% by weight. The paste was transferred to a Fuji Paudal KAR75 basket extruder equipped with a screen having 0.6 mm diameter holes and was extruded at maximum speed into strands in 60 to 70° C. in the presence of hot circulating air flow. Strands of the polymer/LAI agglomerate were collected and dried for 2 hours in an oven at a temperature of about 60° C., followed by curing for about 2 hours at a temperature of approximately 120° C. The cured strands were broken into shorter agglomerates by running in a Vorti-Siv shaker, equipped with a nylon brush and ceramic balls. The broken strands were then sieved in a stack of various size screens, ranging from about 106 to 850 µm, and the various size fractions of agglomerated particles were collected separately and weighed. Agglomerates from the 300 to 425 µm and 425 to 600 µm fractions were tested for operating capacity.

Polymer/LAI agglomerates described in Example 10L having a diameter of between about 300 to 425 µm were loaded onto a column having an internal volume of about 10.6 mL and were loaded with approximately 12 BV of a simulated brine prepared as described herein at a rate of about 8 BV/hour. The column was stripped with about 1.5 BV of a deionized water solution containing approximately 1000 ppm Li at a rate of about 2.4 BV/h. All test solutions were supplied by co-current upflow. Sample aliquots were collected after 100 cycles and the presence of metals was analyzed with ICP. Differential pressure across the bed remained low throughout the cycles, although pressure in the tubing increased several times due to sorbent particles bypassing the glass wool and collecting in the influent and effluent tubing. Fines were not observed, but bed volume decreased during the testing due to a sorbent loss of approximately 19% over a total of 1300 cycles. The lithium capacity during loading ranged from about 2.3 mg Li/mL sorbent at the beginning of testing to about 1.7 mg Li/mL sorbent after approximately 1300 cycles of loading and unloading of the column. Corrections for bed loss were made in determining sorbent capacity calculations.

Mechanical robustness of the sorbent material was tested as described in Example 10K. Samples prepared according to Example 10L yielded fines release values of about 0.17 mg/J and 0.10 mg/J, for the 300 to 425 and 425 to 600 µm fractions, respectively.

EXAMPLE 10M. A 14 L capacity high shear granulator from Lancaster (K-Lab) was fitted with a pressure sprayer to introduce the binder/water solution uniformly and rapidly to the powder mixture. Approximately 6000 g of dried LAI prepared according to Example 10A (above) was introduced into the Lancaster mixer and sheared until all large lumps were broken up. Approximately 100 g of distilled water was introduced and allowed to mix and thoroughly wet the polymer/LAI powder. A mixture of about 1191 g of Kynar Aquatec 10,206 fluoropolymer/acrylic resin (Arkema, Inc.), approximately 271 g XL-702 (a polycarbodiimide cross-linker available from Picassian Polymers), and about 1470 g of distilled water were blended and introduced to the mixer stepwise over a period of 7 minutes at maximum pan speed and maximum blade speed (about 40 RPM and 3000 RPM, respectively). During this process, about 30% of the agglomerates produced had an average diameter of greater than about 850 µm. The wet agglomerated mixture was passed through the Vorti-Siv equipped with an 850 µm screen using ceramic balls. The resulting material was then passed through 600 µm screen on the Vorti-Siv with ceramic balls and then dried at a temperature of about 60° C., followed by curing at a temperature of about 120° C. This resulted in a final distribution where 80% of material fell in range of about 180 to 600 µm, suitable for operational capacity testing.

The mechanical robustness of particles prepared according to Example 10M having diameters ranging from about 106 to 180 µm, 180 to 300 µm, and 300 to 425 µm were tested, yielding sample fines release values of about 0.22 mg/J, 0.25 mg/J, and 0.27 mg/J, respectively.

EXAMPLE 10N. A large scale method for the preparation of LAI particulate material for use herein is provided. Approximately 20 gallons of water was added to the reactor and heated to about 95° C. Approximately 17.1 kg of LiOH·H$_2$O was added to the water and agitated until dissolved. To the mixture was added about 57.7 kg of Al(OH)$_3$. The resulting mixture of lithium and aluminum compounds was heated to between about 85-90° C. for at least about 4 hours. Water was added, as necessary, to maintain a constant water content. Reaction progress was monitored by titrating samples from the reaction and after the reaction was determined to be at least 92% complete, the reaction was slowly neutralized with 6N HCl over 1 hour to provide a pH of between about 6.5 and 7. A metering pump was used to titrate for up to about 4 hours to provide a stable pH of between about 6.5 and 7, ensuring that the pH is greater than 6. The water and supernatant are removed and the resulting solid material is dried in an oven. The yield was about 80 kg (90%) providing LAI particles having a bimodal distribution of about 100 to 125 µm and about 10 µm, as determined with a Microtrac Laser Diffraction Type Analyzer. The free flow bulk density was about 0.6 g/mL and the tapped bulk density was about 0.8 g/mL.

Example 10O. An alternate route to preparing the LAI materials for use herein according to a dry process that includes mixing approximately 16 kg Al(OH)$_3$ and about 17.1 kg LiOH·H$_2$O in a reactor until the dry materials are thoroughly mixed and adding to the mixture approximately 16.3 L of water, and the mixture was heated to a temperature of between about 85 and 90° C. and continuously stirred for at least 4 hours. Reaction progress was monitored by titrating samples from the reaction and after the reaction was determined to be at least 92% complete, the reaction was slowly neutralized with a solution containing 31% by weight HCl over a period of about 2 hours to provide a pH of between about 5.5 and 7.5. A metering pump was used to titrate for up to about 4 hours to provide a stable pH of between of greater than 5.5. The water and supernatant are removed by heating the reactor to a temperature of about 110° C. until at least 90% of the moisture has been removed, and the resulting solid material is dried in an oven. The yield was about 23 kg (90%) providing LAI particles having diameter of less than of about 1 µm, as determined with a Microtrac Laser Diffraction Type Analyzer. The free flow bulk density was about 0.83 g/mL and the tapped bulk density was about 1 g/mL.

EXAMPLE 10P. A simulated brine containing lithium was supplied to an apparatus similar to the exemplary set-up described in FIG. 10. The column is loaded with approximately 9.4 cc of a granular LAI matrix having an average particle diameter of between about 0.18 and 0.3 mm, consisting of approximately 95% by weight lithium aluminate intercalate and 5% by weight polyvinylidine fluoride to simulate the loading and unloading of the column. A water solution that includes between approximately 100 and 1,000 mg/L of lithium is used as the stripping solution for the LAI matrix bed. During the loading step, approximately 4 bed volumes (i.e., approximately 40 mL, four times the volume of the column) of a simulated brine having a lithium concentration of between about 284 mg/L and about 332 mg/L were supplied to the column. The output stream from the column during loading unexpectedly had a lithium concentration of between about 10 and 50 mg/L, corresponding to the capture of between about 83% and 96% of the lithium present in the feed solution.

Figure 47:
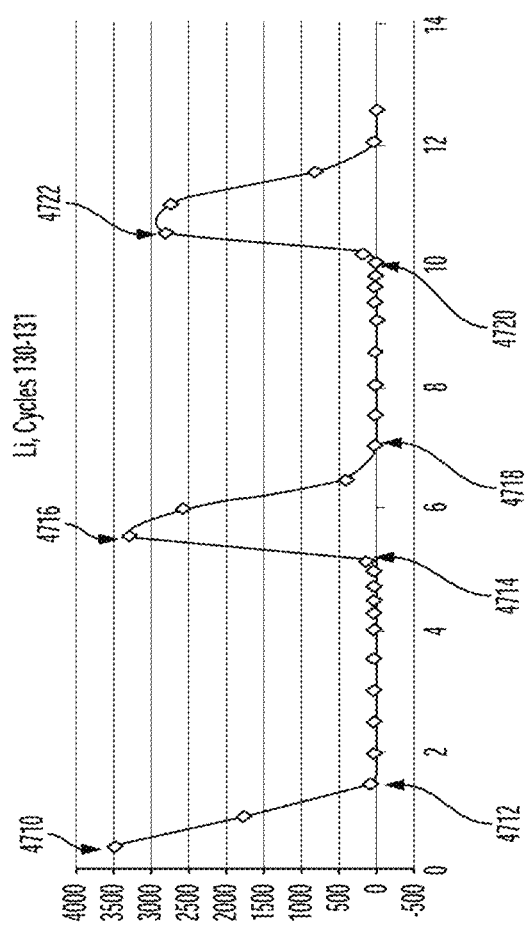
FIG. 47 is a graphical representation showing the loading and unloading of a lithium sorbent column for the production of treated brine composition with reduced lithium, according to an embodiment of the present invention.

Unloading of the column is achieved by supplying approximately 2 bed volumes (i.e., approximately 20 mL) of a lithium strip solution (i.e., a solution having a LiCl concentration of approximately 6,000 mg/L). The output stream had a maximum LiCl concentration of about 21,000. The loading and unloading of the column was repeated more than 500 times, with unexpectedly repeatable results for the capture of between about 83% and 96% of the LiCl present in the brine solution. FIG. 47 shows the lithium concentration of the brine exiting the column during the loading and unloading of a LAI sorbent column. FIG. 47 shows cycles 130 and 131 of a total of 550 consecutive cycles of loading and unloading the column. The figure shows two full loading-unloading cycles, with lithium concentration of the liquid exiting the column in mg/L plotted on the Y-axis and bed volumes of liquid supplied to the column on the X-axis. Point 4710 of FIG. 47 indicates the midpoint of an unloading cycle for the column. From point 4710 to point 4712 of FIG. 47, the brine (loading solution) is supplied to the column and is replacing the strip solution (unloading solution). Between points 4712 and 4714 of FIG. 47, the concentration of lithium in the treated brine exiting the column is relatively low, typically much less than the concentration of the strip solution. After point 4714, the concentration of lithium exiting the column increases. At approximately 1 BV prior to point 4714, the solution being fed to the column is switched from the lithium containing brine solution to stripping solution (having a lithium concentration of about 1000 mg/L) and a total of 1 to 1.5 BV is passed through the column. At point 4716, the strip solution is switched back to the lithium containing brine loading solution and another cycle begins. At point 4712, a lithium recovery cycle has been completed and the column is empty or only has negligible lithium content, and loading of the lithium begins. At approximately 1.5 BV prior to point 4714, supply of the lithium containing brine solution to the column stops. At point 4714, loading of the column with lithium has been completed, and removal of the captured lithium begins. At point 4714, after approximately 1 bed volume of the "release" solution has been applied, the concentration of the lithium being removed from the column increases. At point 4716, the concentration of the lithium salt in the "release" solution begins to decrease. At point 4718, the column has been completely unloaded, and the loading cycle of the column begins again. After point 4716, the column is again exposed to the brine solution for the capture of lithium ions. As the column is exposed to increasing volumes of the brine solution, the lithium is loaded onto the column. After complete loading of the column, at a point that is approximately 2 bed volumes of liquid before point 4722 on FIG. 47, exposure to the brine solution is stopped and the "release" solution is applied to the column. At point 4722, the lithium that had been retained on the column is released, as shown by the increased lithium production from the column. Thus, two "loading" and "unloading" cycles of the column have been shown.

Example 11. Preparation of Compositions with Reduced Concentrations of Lithium Using Lithium Aluminum Intercalate-Substrate EXAMPLE 11A. Approximately 0.9 g of FW80 diatomaceous silica (EP Minerals, USA) was combined with approximately 2 g of a 50% by weight Al$_2$OH$_5$Cl solution (about 9 mmol of aluminum) and stirred at room temperature for about 30 minutes. To the resulting mixture was added approximately 0.21 g LiCl (5 mmol) and stirred at room temperature for about 5 minutes. To the lithium chloride intercalated mixture was added about 2 mmol lithium hydroxide (5.7% by weight aqueous solution) and stirred. The resulting slurry was dried at 70° C. and washed with 15 mL of deionized water. The resulting product (1.4 g, 155% yield; which includes both the substrate and lithium aluminum intercalate) was collected having an Al:Li ratio of about 1:0.26.

EXAMPLE 11B. Approximately 1 g of MP78 diatomaceous silica (EP Minerals, USA) was combined with approximately 2 g of a 50% by weight $Al_2OH_5Cl$ solution (about 9 mmol of aluminum) and stirred at room temperature for about 30 minutes. To the resulting mixture was added approximately 0.22 g LiCl (5 mmol) and stirred at room temperature for about 5 minutes. To the lithium chloride intercalated mixture was added about 2 mmol lithium hydroxide (5.7% by weight aqueous solution) and stirred. The resulting solid was dried at 70° C. and washed with 10 mL of deionized water. The resulting product (1.9 g, 190% yield; which includes both the substrate and lithium aluminum intercalate) was collected having an Al:Li ratio of about 1:0.26. The resulting product (1.9 g, 190% yield; which includes both the substrate and lithium aluminum intercalate) was collected having an Al:Li ratio of about 1:0.25.

EXAMPLE 11C. Approximately 1 g of FW80 diatomaceous silica (EP Minerals, USA) was combined with approximately 2 g of a 50% by weight $Al_2OH_5Cl$ solution (about 9 mmol of aluminum) and stirred at room temperature for about 30 minutes. To the resulting mixture was added approximately 2.8 g of a lithium hydroxide (5.7% by weight) aqueous solution and stirred at room temperature for about 10 minutes. To the lithium hydroxide intercalated mixture was added with stirring a solution of about 2 N HCl until a pH of about 6.5 was achieved. The resulting solid was separated and dried at a temperature of about 60° C. for approximately 12-18 hours, followed by drying at a temperature of about 120° C. for about 3-4 hours. The resulting solid was washed with deionized water and dried at about 60° C. The resulting product (1.23 g, 123% yield; which includes both the substrate and lithium aluminum intercalate) was collected having an Al:Li ratio of about 1:0.17.

EXAMPLE 11D. Approximately 1 g of MP78 diatomaceous silica (EP Minerals, USA) was combined with approximately 2.1 g of a 50% by weight $Al_2OH_5Cl$ solution (about 9 mmol of aluminum) and stirred at room temperature for about 30 minutes. To the resulting mixture was added approximately 2.0 g of a lithium hydroxide (5.7% by weight) aqueous solution and stirred at room temperature for about 10 minutes. To the lithium hydroxide intercalated mixture was added with stirring a solution of about 2 N HCl until a pH of about 6.5 was achieved. The resulting solid was separated and dried at a temperature of about 60° C. for approximately 12-18 hours, followed by drying at a temperature of about 120° C. for about 3-4 hours. The resulting solid was washed with deionized water and dried at about 60° C. The resulting product (1.75 g, 175% yield; which includes both the substrate and lithium aluminum intercalate) was collected having an Al:Li ratio of about 1:0.19.

EXAMPLE 11E. Approximately 1 g of FW80 diatomaceous silica (EP Minerals, USA) was combined with approximately 2.1 g of a 50% by weight $Al_2OH_5C$ solution (about 9 mmol of aluminum) and stirred at room temperature for about 30 minutes. To the resulting mixture was added approximately 2.1 g lithium hydroxide (5 mmol) and stirred at room temperature for about 10 minutes. To the lithium hydroxide intercalated mixture was added about 6 mmol LiCl and stirred. The resulting solid was dried at 120° C. for 2 hours and washed with 12 mL of water and further dried. The resulting product (1.75 g, 175% yield; which includes both the substrate and lithium aluminum intercalate) was collected having an Al:Li ratio of about 1:0.53.

EXAMPLE 11F. Scale up of Example 11E. Approximately 760 g of FW80 diatomaceous silica (EP Minerals, USA) was combined with approximately 3.43 kg of a 50% by weight $Al_2OH_5Cl$ solution (about 15.9 mmol of aluminum) and stirred at room temperature for about 1 hour. To the resulting mixture was added approximately 3.34 kg of a 5.7% LiOH solution (8 mol) and stirred at room temperature for about 2 hours. To the lithium hydroxide intercalated mixture was added about 425 g (10 mol) LiCl followed by 500 g of deionized water and stirred. The resulting slurry was dried at 70° C. until all the solids were dry. Finally, the solids were washed with generous amounts of deionized water (approximately 10 L) at room temperature and dried at 70° C. The resulting product, about 2.0 kg, was collected having an Al:Li ratio of about 1:0.5.

Figure 48:
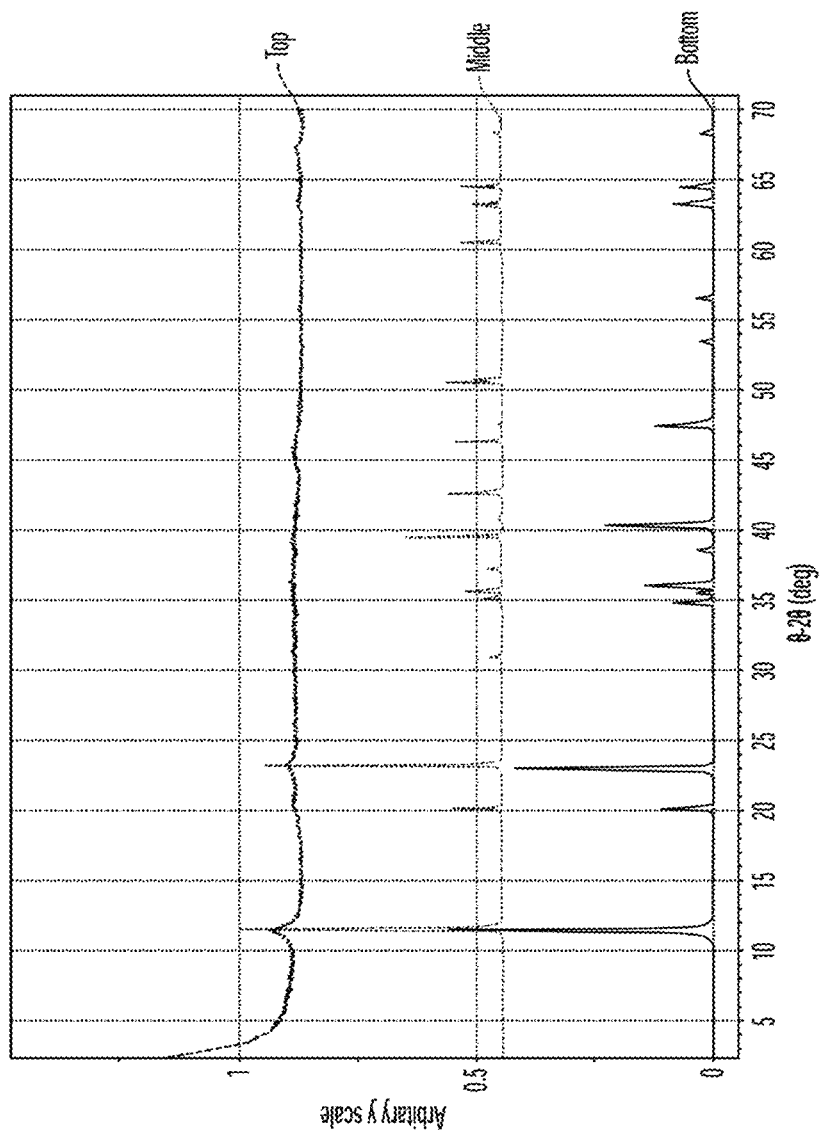
FIG. 48 is graph showing the x-ray powder diffraction pattern for a lithium aluminate deposited on neutral activated alumina according to one embodiment of the present invention (top), monohydrate of lithium aluminate ($LiAl_2(OH)_6Cl \cdot H_2O$) (middle) and dihydrate of lithium aluminate ($LiAl_2(OH)_6Cl_2 \cdot H_2O$) (bottom).

EXAMPLE 11G. Approximately 20 g of neutral activated alumina having an average diameter of between about 50-200 microns (Aldrich, Milwaukee, USA) was combined with approximately 70 g of a 50% by weight $Al_2OH_5C$ solution (about 0.32 mmol of aluminum) and stirred at room temperature for about 1 hour. To the resulting mixture was added approximately 60 g of a 5.7% LiOH solution (0.14 mol) and stirred at room temperature for about 2 hours. To the lithium hydroxide intercalated mixture was added about 10.4 g LiCl (0.25 moles) followed by 50 g of deionized water and stirred. The resulting slurry was dried at 70° C. until all the solids were dry. Finally, the solids were washed with generous amounts of deionized water (about 200 g) at room temperature and dried at 70° C. The resulting product, approximately 63 g, was collected having an Al:Li ratio of about 1:0.3. The x-ray diffraction pattern of the LAI-S composition is shown in FIG. 48 (top), and is compared against mono- and di-hydrates of pure LAI-Cl (middle and bottom, respectively).

EXAMPLE 11H. An activated alumina composition prepared as detailed in Example 11G was tested for loading lithium ion from a synthetic geothermal brine (that mimics the geothermal fluids of Salton Sea, CA). Our repeated loading/unloading studies at high temperatures 95° C. indicate that the surface modified porous alumina repeatedly exhibits at least about 2 mg/L, alternatively at least about 2.6 mg/L, capacity under the conditions studied.

EXAMPLE 11I. Approximately 20 g of iron oxide particles (10 microns, Sigma Aldrich, USA) was combined with approximately 70 g of a 50% by weight solution of $Al_2OH_5Cl$ and stirred at room temperature for about 30 minutes. To the resulting mixture was added approximately 60 g of an aqueous solution that included about 5.7% by weight lithium hydroxide and stirred at room temperature and dried at 70° C. for about 4 hours and further dried at a temperature of about 100° C. overnight. The resulting solid was washed with deionized water and dried at about 60° C. The resulting product (40.2 g, approximately a 200% yield; which included both the substrate and lithium aluminum intercalate) was collected having an Al:Li ratio of about 1:0.38. The equilibrium lithium loading capacities measured for this material using synthetic brine solution containing 670 mg/L lithium are found to be around 4.5 g/l.

EXAMPLE 11J. Certain embodiments provide for a single pot synthesis of an LAI impregnated diatomaceous earth. Diatomaceous earth and poly aluminum hydroxyl chloride ($Al_2(OH)_5Cl$) are combined and thoroughly mixed. Lithium chloride is added to the mixture at room temperature in a molar amount equivalent to the amount of aluminum present in the poly aluminum hydroxyl chloride sample. After stirring for about 30 minutes, the reactant slurry was titrated with a 5.7% by weight solution of lithium hydroxide until a pH of between about 5 and 8 is achieved (approximately 1.0 molar equivalents added).

Figure 49:
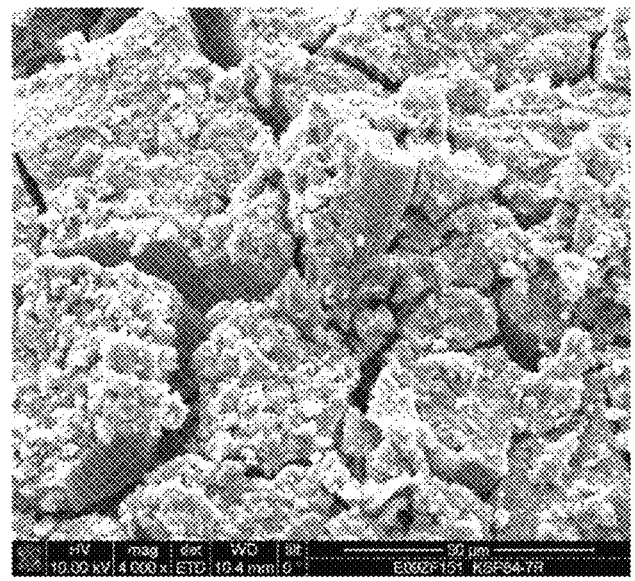
FIG. 49 is an SEM image of a diatomaceous earth sample that has not been impregnated with lithium aluminum intercalate.
Figure 50:
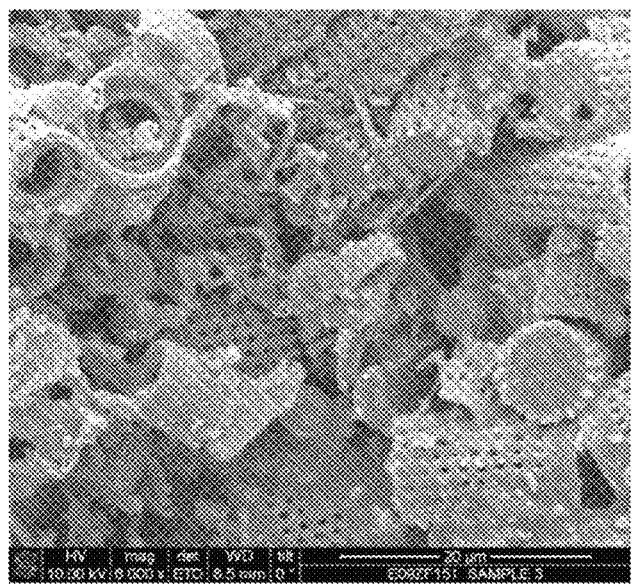
FIG. 50 is an SEM image of a diatomaceous earth sample impregnated with lithium aluminum intercalate.

For example, approximately 90 g of 50% by weight PAC solution (about 0.42 moles of Al, KPAX-XL 19 from Kemira) was added slowly to approximately 20.0 g of diatomaceous earth, FW80 (from EP minerals Inc.). Approximately 88 g of a 5.7% by weight lithium hydroxide containing aqueous solution (0.21 moles of Li) was added dropwise while stirring at room temperature. The lithium hydroxide was titrated to a pH of between about 5 and 9, preferably to a pH of between about 6 and 8. After allowing intercalation of the lithium hydroxide into the alumina coating on the solid substrate, a thick gel type structure is formed. To this gel, approximately 11.2 g of lithium chloride (0.26 moles) was added to promote lithium intercalation and to break the gel structure to form a uniform slurry. The slurry was maintained in an oven at 70° C. overnight to complete the reaction and dry the sample. The dried sample was washed with 300 mL of water at room temperature to remove fines and excess amount of lithium chloride that may present. FIG. 49 provides an SEM micrograph of uncoated diatomaceous earth particles. FIG. 50 provides diatomaceous earth particles that have been coated with the LAI material.

Example 12. Preparation of Compositions with Reduced Concentrations of Lithium Using Activated Aluminum Lithium Intercalate Sorbent EXAMPLE 12A. In one embodiment, the lithium aluminate can be prepared as follows. To an appropriately sized metal or plastic container capable of being heated to a temperature of about 100° C. is added and mixed approximately 1 kg of unfractionated Alcoa aluminum trihydrate $(Al(OH)_3)$ and $LiOH \cdot H_2O$, in a ratio of approximately 2 moles of aluminum to approximately 1.05 moles of lithium, and about 0.8 kg of deionized water. The ratio of activated alumina to lithium hydroxide can generally vary between about 1:1 and 1.5:1. The mixture is heated in an oven at a temperature of about 60° C. until the hydroxide concentration, as determined by titration, indicates that at least about 93% of the hydroxide present has reacted. The mixture is removed from heat, cooled to room temperature and approximately 0.8 kg of water is added to the mixture. The resulting mixture is then neutralized using hydrochloric acid over a period of at least 2 hours to achieve a pH of between about 6.5 and 7.5. The resulting solid is filtered and dried.

EXAMPLE 12B. Preparation of Particulate PVDF/LAI Matrix. Approximately 1.47 g of polyvinylidene fluoride copolymer (Kynarflex 2821) and approximately 27.56 g of the LAI powder (as prepared in Example 12A) were placed in a plastic jar and mixed using a mechanical stirrer, at increasingly higher speeds, 1000-5000 rpm, over a period of about 5 minutes. The resulting mixed matrix powder was placed in a frame having two Teflon lined metal plates. The powder mixture in the press frame was placed in a hydraulic press and subjected to approximately 3500 psi pressure for approximately 3 minutes, released, subjected to approximately 4000 psi of pressure for approximately 3 minutes, released, subjected to approximately 5000 psi of pressure and a temperature of about 360° C. for approximately 3 minutes, released, subjected to approximately 10,000 psi of pressure and a temperature of about 360° C. for approximately 3 minutes, and released. The assembly was then subjected to approximately 3500 psi of pressure for about 2-3 minutes. The resulting sintered block was then broken into large granulates using a hammer. The resulting granulates were separated using sieves into three groups consisting of a first group having a diameter of between about 300 and 450 µm, a second fraction having a diameter between about 180 and 300 µm, and a third fraction having a diameter of between about 100 and 180 µm.

EXAMPLE 12C. Approximately 10.0 g of activated alumina (Dynamic Adsorbents, USA), having a particle size of less than about 400 microns was reacted with 45 mL of a solution of 10% lithium hydroxide monohydrate at a temperature of about 85-90° C. for approximately 3 hours. The mixture was stirred occasionally during the reaction to promote uniform crystal growth of the expanding aluminum oxide particles. After the Reaction was complete, while the volume of the media was found to be increased, the particles retained structural integrity. The final product was thoroughly washed with water and titrated with 2 N HCl until the pH of the solution was close to neutral. The final yield of the product was about 17.8 g and was analyzed by X-ray powder diffraction.

EXAMPLE 12D. Activated alumina derived sorbent composite particles prepared according to the method described in Example 12C, having a diameter of between about 300-800 microns, was tested for extraction of lithium ions from a synthetic geothermal brine (wherein the brine is designed to simulate the geothermal fluids found at the Salton Sea, CA, having lithium concentration of about 300 mg/L) using a column with 1 cm internal diameter. The preliminary loading/unloading was conducted at high temperatures 95° C., which indicates that the loading capacity of the sorbent composite exceeds about 3-3.7 g/L. This compares favorably to the materials prepared with two-dimensional alumina, which has a loading capacity of about 1.3 g/L, under the given experimental conditions. Thus, sorbent materials generally have capacities at least 50% greater, preferably about 66% greater, or even at least 100% greater than similar materials prepared using two-dimensional alumina materials.

EXAMPLE 12E. Approximately 10 g of activated alumina (Dynamic adsorbents, GA), having a particle size of less than about 400 microns, was initially heated up to 700° C. for a period of about 3 hours to ensure that the material is fully dehydrated and has phase purity prior to adding 50 mL of 10% lithium hydroxide monohydrate solution. The reaction was carried at 80 to 90° C. for 30-40 hours. It is believed that the extended heating of the aluminum oxide (prior to reacting with lithium hydroxide) may prolong the reaction time, and may alter crystal growth properties. The final product had a mass of about 21 g.

EXAMPLE 12F. Approximately 100 g of 8-14 mesh activated alumina granules (Fisher Scientific, USA) was reacted with 450 mL of a 10% solution of lithium hydroxide monohydrate at about 90° C. for about 3 hours. The volume of the granules enhanced significantly following the reaction and the final weight of the product was around 200 g and was analyzed by X-ray powder diffraction.

Figure 51:
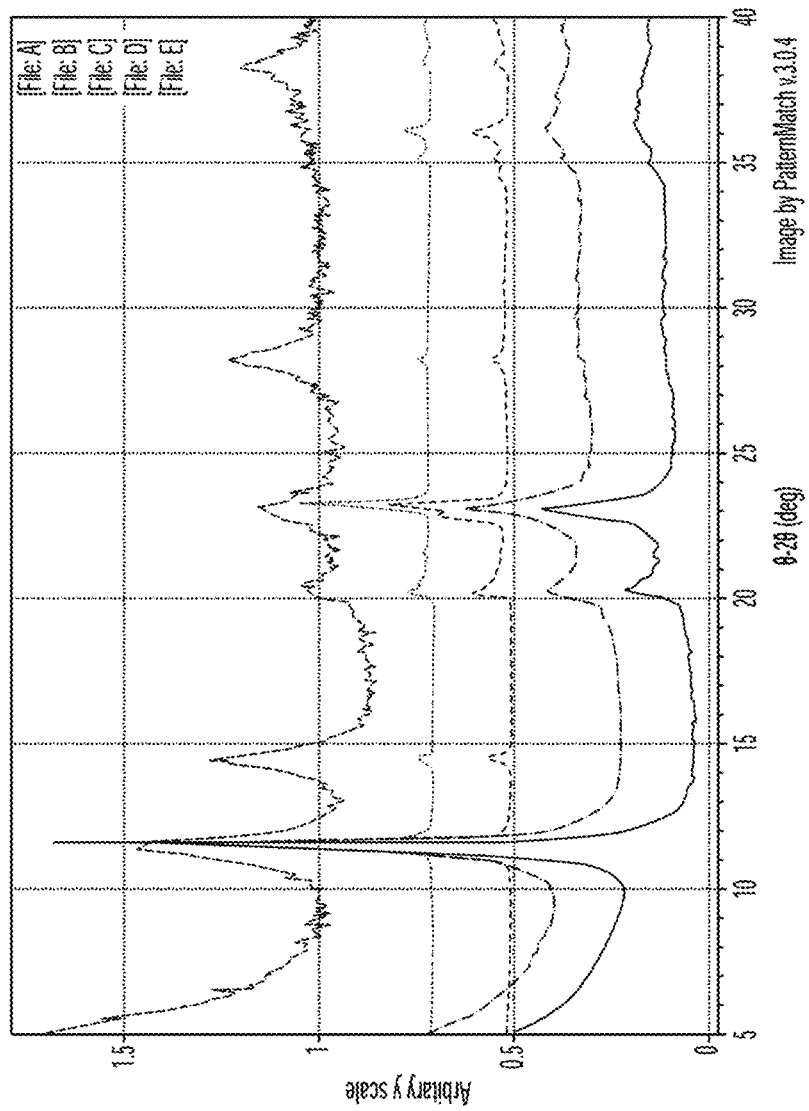
FIG. 51 is the X-ray powder diffraction patterns of the sorbents used in some embodiments of the invention.

EXAMPLE 12G. Approximately 20 g of 8-14 mesh activated alumina (Fisher Scientific, USA) was added to 50 mL of a 40% by weight solution of lithium chloride, and was heated at about 90° C. for about 12 hours. The final product was washed and dried to produce 32 g of product, having a bulk density of about 1.16 g/cc. The x-ray powder diffraction, shown as a stacked plot in FIG. 51, indicated the conversion of alumina into LAI composite (as compared against other known forms of LAI). In FIG. 51, the topmost spectra corresponds to the product prepared according to Example 12F. The next two spectra correspond to lithium salt infused activated alumina prepared using activated alumina (Dynamic Adsorbents), and the bottom two spectra correspond to LAI materials deposited on activated alumina using polyaluminum hydroxyl chloride.

EXAMPLE 12H. Approximately 10 g of 100 mesh alumina (Sigma-Aldrich, m.p. 2038° C., batch #03996TJ) was added to 45 g of 10% by weight solution of lithium hydroxide and was heated at about 90° C. for about 24 hours. No reaction took place under these conditions, as the weight of alumina remain unchanged and the lack of reaction confirmed by comparing SEM images of the starting material and the reaction product).

EXAMPLE 12I. Approximately 11 g of lithium hydroxide monohydrate and 11 g of anhydrous lithium chloride were dissolved in approximately 225 mL of water at room temperature. To this lithium salt solution, approximately 50 g of activated alumina was added slowly and the reactants were kept in an oven at 95° C. for 6 hours. The yield of the hydroxyl form of LAI was found to be close to 85 g. A portion of this final product, approximately 30 g was neutralized using about 45 g of a 30% lithium chloride solution mixed with 5 g of acetic acid. The final pH of the solution reached a steady state of about 4.2 in about 1 hour. The resulting solid product was washed with water and dried. The lithium extraction capability of the final product was tested in a column, as provided for the previous examples, having a lithium extraction capacity in the range of between about 4 and 5 g/L. The final product was analyzed and determined to have an impurity content of about 1% of lithium carbonate equivalent. The top most diffraction pattern in FIG. 52 represents the XRPD pattern of materials neutralized using weaker acids, such as is described in Example 12I.

Example 12J. A resin based lithium aluminum intercalate material was synthesized as described in U.S. Pat. Nos. 4,159,311, 4,348,296, and 4,430,311, wherein a weak base anion exchanger in the free base form, for example, Dowex Marathon WBA, was contacted with a saturated solution of $AlCl_3$. The mixture, having a pH of approximately 0, was reacted at between about 50° C. and 60° C., and was then titrated with concentrated $NH_4OH$ to raise the pH to near neutrality, at which point $Al(OH)_3$ precipitated in and on the resin beads. Excess $Al(OH)_3$ and $NH_4Cl$ were washed out with water. The resin was then heated at about 75° C. to 80° C. to convert amorphous $Al(OH)_3$ into gibbsite, which served as a seed for subsequent precipitation. The gibbsite-seeded resin was then reacted with sodium aluminate solution at a pH of about 13 and then titrated with 37% HCl to reduce the pH to near neutral, and to grow $Al(OH)_3$ on the gibbsite seed. The mixture was then washed with water to remove excess NaCl and Al(OH); and was then heated at about 75° C. to 80° C. to the conversion of all intra-bead $Al(OH)_3$ into gibbsite. The gibbsite-loaded resin was then reacted with LiOH at between about 55° C. to 60° C. to form a 3-layer polytype lithium aluminate ($LiAl_2(OH)_6OH$) within the resin at a pH of about 12. The resin was then titrated with approximately 20% HCl to neutrality, to convert the OH form of the lithium aluminate to the chloride form. Excess lithium aluminate and lithium chloride removed by washing with water. The procedure produced a resin having between about 2 and 4 mmol of aluminum and between about 1 and 2 mmol lithium per mL of resin.

The resin based LAI synthesized according to the procedure above was loaded into a column having a diameter of about 2.5 cm, a bed height of about 20 cm, and a bed volume of about 100 $cm^3$. A total of 10 load, wash, and unload cycles were completed, wherein the first 5 cycles were used to optimize flow and volume parameters and the next 5 cycles were run semi-continuously using the optimized parameters. Loading capacity of the resin based LAI using a simulated brine as described herein was about 0.96 g/L.

Figure 52:
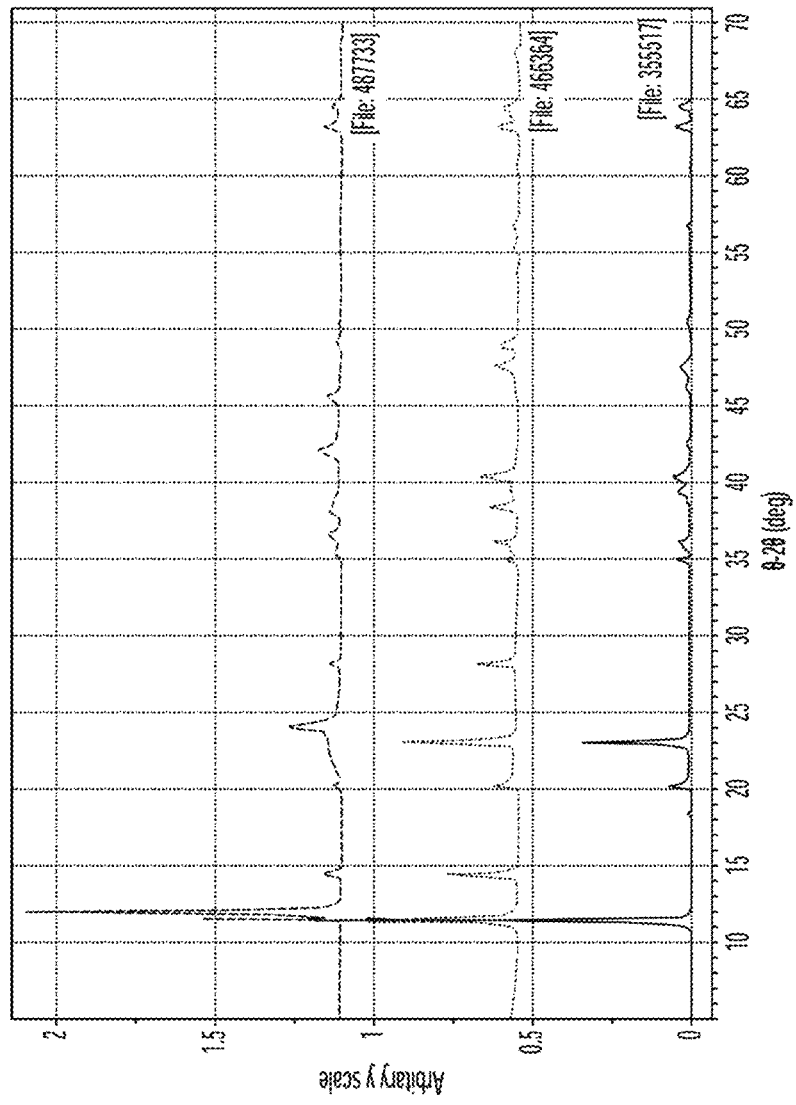
FIG. 52 is the X-ray powder diffraction patterns of the sorbents used in some embodiments of the invention.

FIG. 52 shows a comparison of the x-ray powder diffraction (XRPD) pattern for an LAI sorbent prepared according to Example 12I (top spectra), which utilizes a three-dimensional activated alumina wherein the product LAI was neutralized with acetic acid, an LAI sorbent prepared according to Example 12C (middle spectra), which similarly utilizes a three-dimensional activated alumina wherein the product LAI was neutralized with HCl, and an LAI sorbent composition made by a similar method using Gibbsite, a two-dimensional alumina (bottom spectra). As can be seen by the x-ray powder diffraction patterns, the spectra for the LAI product utilizing the three-dimensional activated alumina is different than the LAI product prepared using a two-dimensional Gibbsite alumina base. For example, the x-ray powder diffraction pattern of the three-dimensional activated alumina includes peaks that are not present in the Gibbsite based LAI product indicates that a distinct composition of matter is prepared and plays a role in the improved performance. For example, additional peaks are found in the in the XRPD spectra at approximately 15 deg., 28 deg., and 38 deg., as compared with the XRPD of the Gibbsite based alumina. Additionally, the main peak at approximately 12 deg. is slightly shifted for the Gibbsite based alumina, as compared to the three-dimensional activated alumina based LAI.

Referring still to FIG. 52, minor differences are shown in the XRPD spectra based upon whether acetic acid or HCl is utilized in the neutralization step. For example, the three-dimensional activated alumina based LAI material that is neutralized with HCl includes a peak at about 40.5 deg., while the acetic acid neutralized product does not include a peak at 40.5 deg. These structural/compositional differences appear to be important in the extraction of lithium with higher selectivity (i.e., lower impurities) and high lithium extraction capacities.

EXAMPLE 12K. A simulated brine containing lithium was supplied to an apparatus similar to the exemplary set-up described in FIG. 10. The column is loaded with approximately 10.8 mL of a granular sorbent having an average particle diameter of between about 0.3 and 0.8 mm consisting of lithium chloride infused activated alumina.

During the loading step, approximately 13 bed volumes (i.e., approximately 140 mL, thirteen times the volume of the column) of a simulated brine having a lithium concentration of between about 284 mg/L and about 310 mg/L were supplied to the column. The output stream from the column during loading had a lithium concentration of between about 10 and 50 mg/L, in the first 4 to 5 bed volumes, corresponding to the capture of between about 83% and 96% of the lithium present in the feed solution.

Unloading of the column is achieved by supplying approximately 2 bed volumes (i.e., approximately 20 mL) of a lithium strip solution (i.e., a solution having a LiCl concentration of approximately 6,000 mg/L). The output stream had a maximum LiCl concentration of about 21,000. The loading and unloading of the column was repeated more than 20 times, with repeatable results of the capture of between approximately 95% of the LiCl present in the brine solution.

Figure 53:
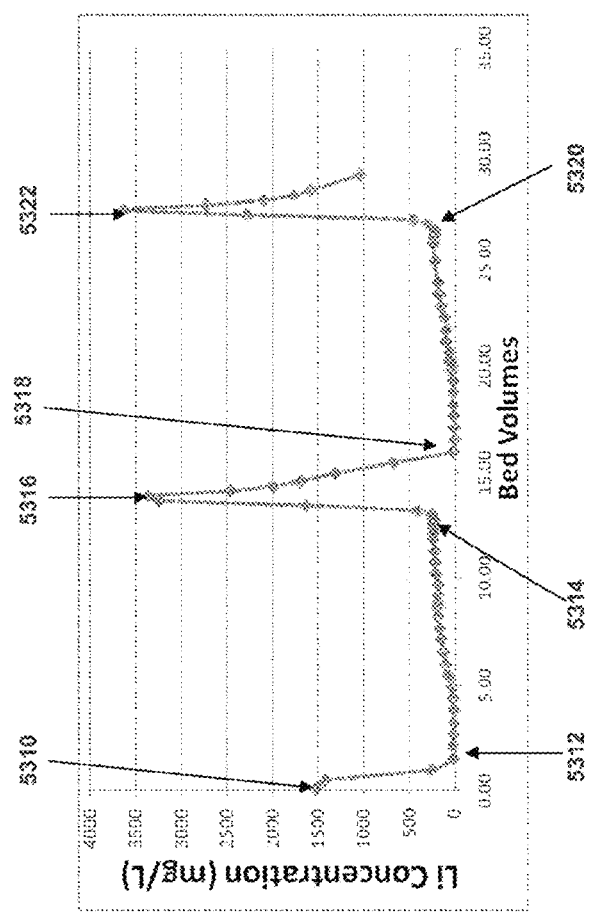
FIG. 53 is a graphical representation showing the loading and unloading of a lithium sorbent column for the production of treated brine composition with reduced lithium, according to an embodiment of the present invention.

Referring now to FIG. 53, the loading and unloading of the sorbent in the column is shown. (FIG. 53 shows cycles 5 and 6 of a total of 21 consecutive cycles of loading and unloading the column). FIG. 53 shows two full loading-unloading cycles of the column, with lithium concentration of the liquid exiting the column in mg/L plotted on the Y-axis and bed volumes of liquid supplied to the column on the X-axis. Point 5310 of FIG. 53 indicates the midpoint of an unloading cycle for the column. From point 5310 to point 5312 of FIG. 53, the brine (loading solution) is supplied to the column and is replacing the strip solution (unloading solution). Between points 5312 and 5314, the concentration of lithium in the liquid exiting the column is relatively low, typically much less than the concentration of the strip solution. After point 5314 of FIG. 53, the concentration of lithium exiting the column increases. At point 5314, the solution being fed to the column is switched from the lithium containing brine solution to stripping solution (having a lithium concentration of about 1000 mg/L) and a total of 2 BV is passed through the column. In general, the amount of lithium that is unloaded or stripped from the column is close to the amount of lithium that is extracted from brines, such that lithium extraction efficiency is maximized/optimized, without compromising the structural integrity of the media. At point 5318 of FIG. 53, the strip solution is switched back to the lithium containing brine loading solution and 5320 through 5322 to the end of the plot represent another complete cycle.

Still referring to FIG. 53, at point 5312, a lithium recovery cycle has been completed and the column is empty or only has negligible lithium content, and loading of the lithium begins. At approximately point 5314, supply of the lithium containing brine solution to the column stops. At point 5314, loading of the column with lithium has been completed, and removal of the captured lithium begins. At point 5316, after approximately 1 bed volume of the "release" solution has been applied, the concentration of the lithium being removed from the column increases. At point 5318, the concentration of the lithium salt in the "release" solution begins to decrease. At point 5320, the column has been completely unloaded, and the loading cycle of the column begins again. After point 5320, the column is again exposed to the brine solution for the capture of lithium ions. As the column is exposed to increasing volumes of the brine solution, the lithium is loaded onto the column. After complete loading of the column, at a point that is approximately 1 bed volume of liquid before point 5322 on FIG. 53, exposure to the brine solution is stopped and the "release" solution is applied to the column. At point 5322, the lithium that had been retained on the column is released, as shown by the increased lithium production from the column. Thus, 2 "loading" and "unloading" cycles of the column have been shown.

As is understood in the art, not all equipment or apparatuses are shown in the figures. For example, one of skill in the art would recognize that various holding tanks and/or pumps may be employed in the present method.

The singular forms "a," "an" and "the" include plural referents, unless the context clearly dictates otherwise.

"Optional" or "optionally" means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

As used herein, recitation of the term about and approximately with respect to a range of values should be interpreted to include both the upper and lower end of the recited range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The invention claimed is:

1. A method for producing lithium hydroxide or lithium carbonate from a brine solution, the method comprising the steps of,
   providing a brine solution comprising lithium and silica;
   supplying the brine solution to a silica management step to remove silica from the brine solution to produce a silica-lean lithium containing solution;
   supplying the silica-lean lithium containing solution to a lithium capture step, the lithium capture step being operable to capture lithium from the silica-lean lithium containing solution, wherein the lithium capture step selectively isolates lithium from the silica-lean lithium containing solution;
   wherein the lithium capture step includes the step of contacting the silica-lean lithium containing solution with an intercalate operable to capture the lithium from the silica-lean lithium containing solution;
   recovering the lithium from the lithium capture step using wash water to produce a lithium-rich stream comprising at least one of calcium, magnesium, manganese or zinc, and
   contacting the lithium-rich stream with a base and a carbonate such that a portion of the at least one of calcium, magnesium, manganese or zinc present in the lithium-rich stream is removed as a solid precipitate to produce a purified lithium-rich stream comprising lithium hydroxide or lithium carbonate.

2. The method of claim 1, wherein the brine solution is a geothermal brine.

3. The method of claim 1, wherein the brine solution is a Salton Sea geothermal brine.

4. The method of claim 1, wherein the silica-lean lithium containing solution is substantially free of silica.

5. The method of claim 1, wherein the silica-lean lithium containing solution comprises a lithium chloride containing solution.

6. The method of claim 1, further comprising the step of:
   increasing the concentration of lithium in the lithium-rich stream by removing at least a portion of the water in the lithium-rich stream.

7. The method of claim 1, wherein the intercalate is an intercalated lithium absorbent.

8. The method of claim 1, wherein the intercalate is a lithium aluminate intercalate.

9. The method of claim 1, further comprising:
   separating precipitate from the lithium-rich stream to produce a solid waste precipitate and a purified lithium-rich stream, the purified lithium-rich stream having a lower concentration of the at least one of calcium, magnesium, manganese or zinc, wherein the purified lithium-rich stream comprises at least one of ions selected from the group consisting of borate, calcium, magnesium, manganese and zinc; and contacting the purified lithium-rich stream with an ion selective media to reduce the concentration of at least one of the ions selected from the group consisting of borate, calcium, magnesium, manganese and zinc.

\* \* \* \* \*